US008854370B2

(12) United States Patent
Bryant et al.

(10) Patent No.: US 8,854,370 B2
(45) Date of Patent: Oct. 7, 2014

(54) COLOR WAVEFORM

(75) Inventors: Andrew Bryant, Los Gatos, CA (US);
Toshihiro Horie, San Jose, CA (US);
James C. Arndt, Livermore, CA (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 13/134,280

(22) Filed: Jun. 3, 2011

(65) Prior Publication Data
US 2012/0206475 A1 Aug. 16, 2012

Related U.S. Application Data

(60) Provisional application No. 61/443,718, filed on Feb. 16, 2011, provisional application No. 61/443,708, filed on Feb. 16, 2011, provisional application No. 61/443,730, filed on Feb. 17, 2011.

(51) Int. Cl.
| G06T 11/20 | (2006.01) |
| G11B 27/034 | (2006.01) |
| H04N 1/60 | (2006.01) |
| G11B 27/34 | (2006.01) |
| H04N 9/73 | (2006.01) |

(52) U.S. Cl.
CPC .............. *G11B 27/34* (2013.01); *G11B 27/034* (2013.01); *H04N 1/6077* (2013.01); *H04N 9/73* (2013.01)
USPC .......................................... 345/440; 345/591

(58) Field of Classification Search
USPC .......... 345/440, 619, 591, 589; 382/162, 164; 386/239; 348/649; 715/792
See application file for complete search history.

(56) References Cited

U.S. PATENT DOCUMENTS

| 5,130,789 A | 7/1992 | Dobbs et al. |
| 5,317,425 A | 5/1994 | Spence et al. |

(Continued)

FOREIGN PATENT DOCUMENTS

| JP | 2004-228734 | 8/2004 |
| WO | 01/26050 | 4/2001 |

(Continued)

OTHER PUBLICATIONS

Author Unknown, "Adobe Photoshop 5.0 Limited Edition, Chapter 4: Making Color and Tonal Adjustments," Adobe Photoshop 5.0 User Guide, Jan. 1, 1998, 11 pages.

(Continued)

*Primary Examiner* — Chante Harrison
(74) *Attorney, Agent, or Firm* — Robert C. Kowert; Meyertons, Hood, Kivlin, Kowert & Goetzel, P.C.

(57) ABSTRACT

Some embodiments provide a program that provides a graphical user interface (GUI). The GUI includes a display area for displaying an image that includes several pixels. Each pixel includes a set of color component values. The GUI includes a waveform monitor for displaying a graph that includes several graphical representations of the several pixels in the image. Each graphical representation is (1) plotted along a first axis of the graph based on a position of a corresponding pixel in the image and (2) plotted along a second axis of the graph based on the set of color component values of the corresponding pixel in the image. A color of each graphical representation is similar to a color of the corresponding pixel that is used for displaying the pixel in the display area.

26 Claims, 71 Drawing Sheets
(20 of 71 Drawing Sheet(s) Filed in Color)

(56) References Cited

U.S. PATENT DOCUMENTS

| | | |
|---|---|---|
| 5,589,890 A | 12/1996 | Mancuso et al. |
| 5,751,845 A | 5/1998 | Dorff et al. |
| 5,874,988 A | 2/1999 | Gu |
| 6,118,455 A | 9/2000 | Hidaka et al. |
| 6,137,540 A | 10/2000 | Desprez-le Goarant et al. |
| 6,181,321 B1 | 1/2001 | Zhao et al. |
| 6,351,557 B1 | 2/2002 | Gonsalves |
| 6,362,829 B1 | 3/2002 | Omvik et al. |
| 6,477,271 B1 | 11/2002 | Cooper et al. |
| 6,683,982 B1 | 1/2004 | Kohn |
| 6,757,425 B2 | 6/2004 | Pettigrew et al. |
| 6,763,134 B2 | 7/2004 | Cooper et al. |
| 6,952,655 B2 | 10/2005 | Cake et al. |
| 7,383,509 B2 | 6/2008 | Foote et al. |
| 7,430,339 B2 | 9/2008 | Rother et al. |
| 7,602,991 B2 | 10/2009 | Kokemohr |
| 7,623,138 B2 | 11/2009 | Fukao et al. |
| 7,664,336 B2 | 2/2010 | Zhang et al. |
| 7,672,022 B1 | 3/2010 | Fan |
| 7,693,341 B2 | 4/2010 | Pettigrew et al. |
| 7,702,149 B2 | 4/2010 | Ohkubo et al. |
| 7,827,491 B2 | 11/2010 | Tran |
| 7,853,094 B2 | 12/2010 | Pan et al. |
| 7,978,938 B1 | 7/2011 | Wilensky |
| 2001/0036310 A1 | 11/2001 | Pettigrew et al. |
| 2002/0041707 A1 | 4/2002 | Newman |
| 2003/0016866 A1 | 1/2003 | Cooper et al. |
| 2003/0146915 A1 | 8/2003 | Brook et al. |
| 2004/0114904 A1 | 6/2004 | Sun et al. |
| 2004/0227768 A1 | 11/2004 | Bates et al. |
| 2004/0264767 A1 | 12/2004 | Pettigrew |
| 2005/0216841 A1 | 9/2005 | Acker et al. |
| 2005/0238217 A1 | 10/2005 | Enomoto et al. |
| 2006/0028483 A1 | 2/2006 | Kondo et al. |
| 2006/0126719 A1 | 6/2006 | Wilensky |
| 2007/0065006 A1 | 3/2007 | Wilensky |
| 2007/0171443 A1 | 7/2007 | Pan |
| 2007/0189627 A1 | 8/2007 | Cohen et al. |
| 2008/0117333 A1 | 5/2008 | Walsh |
| 2008/0124050 A1* | 5/2008 | Deschamp et al. ............ 386/109 |
| 2008/0131010 A1 | 6/2008 | Wilensky |
| 2009/0256907 A1 | 10/2009 | Faragher |
| 2009/0263016 A1 | 10/2009 | Kuo |
| 2009/0297022 A1* | 12/2009 | Pettigrew et al. ............ 382/162 |
| 2012/0020553 A1* | 1/2012 | Pettigrew et al. ............ 382/164 |
| 2012/0084064 A1* | 4/2012 | Dzenis et al. ................. 703/11 |
| 2012/0201450 A1 | 8/2012 | Bryant et al. |
| 2012/0201451 A1 | 8/2012 | Bryant et al. |
| 2012/0206475 A1 | 8/2012 | Bryant et al. |
| 2012/0206655 A1* | 8/2012 | Pettigrew et al. ............ 348/649 |
| 2012/0210229 A1* | 8/2012 | Bryant et al. ................. 715/723 |
| 2012/0299949 A1* | 11/2012 | Suzuki et al. ................. 345/591 |
| 2013/0050252 A1* | 2/2013 | Bhatt et al. ................... 345/619 |

FOREIGN PATENT DOCUMENTS

| | | |
|---|---|---|
| WO | 02/28087 | 4/2002 |
| WO | 2012/154258 | 11/2012 |

OTHER PUBLICATIONS

Author Unknown, "Adobe Premiere Pro CS3: User Guide," Month Unknown, 2007, 455 pages, Adobe Systems Incorporated, San Jose, California, USA.

Author Unknown, "Using Adobe Premiere Elements 8 Editor," Month Unknown, 2009, pp. 1-308, Adobe Systems Incorporated, San Jose, California, USA.

U.S. Appl. No. 13/134,289, filed Jun. 3, 2011, Pettigrew, Daniel, et al.
U.S. Appl. No. 13/134,308, filed Jun. 3, 2011, Pettigrew, Daniel, et al.
U.S. Appl. No. 13/134,313, filed Jun. 3, 2011, Bryant, Andrew, et al.
U.S. Appl. No. 13/134,319, filed Jun. 3, 2011, Bryant, Andrew, et al.
Portions of prosecution history of U.S. Appl. No. 13/134,289, filed Nov. 8, 2011, Pettigrew, Daniel, et al.
Portions of prosecution history of U.S. Appl. No. 13/134,313, filed Nov. 8, 2011, Bryant, Andrew, et al.
Portions of prosecution history of U.S. Appl. No. 13/134,308, filed Nov. 8, 2011, Pettigrew, Daniel, et al.
Portions of prosecution history of U.S. Appl. No. 13/134,319, filed Nov. 8, 2011, Bryant, Andrew, et al.
Author Unknown, "Adobe Photoshop 5.0 User Guide, Chapter 7: Selecting," Adobe Photoshop 5.0 User Guide, Month Unknown, 1998, pp. 137-164, Adobe Systems Incorporated.
Bai, Xue, et al., "A Geodesic Framework for Fast Interactive Image and Video Segmentation and Matting," Dec. 26, 2007, pp. 1-8.

* cited by examiner $$\begin{bmatrix} R_{new} \\ G_{new} \\ B_{new} \end{bmatrix} = \begin{bmatrix} M1 & M2 & M3 & M4 \\ M5 & M6 & M7 & M8 \\ M9 & M10 & M11 & M12 \end{bmatrix} \times \begin{bmatrix} R_{orig} \\ G_{orig} \\ B_{orig} \\ K \end{bmatrix}$$

↓

$$R_{new} = (R_{orig} \times M1) + (G_{orig} \times M2) + (B_{orig} \times M3) + (K \times M4)$$

$$G_{new} = (R_{orig} \times M5) + (G_{orig} \times M6) + (B_{orig} \times M7) + (K \times M8)$$

$$B_{new} = (R_{orig} \times M9) + (G_{orig} \times M10) + (B_{orig} \times M11) + (K \times M12)$$

| *Figure 51* | *Figure 51a* |
|---|---|
| | *Figure 51b* |

| Figure 52 | Figure 52a |
|---|---|
| | Figure 52b |

| Figure 53 | Figure 53a |
|---|---|
| | Figure 53b |

| Figure 53 | Figure 53a |
| --- | --- |
| | Figure 53b |

COLOR WAVEFORM

CLAIM OF BENEFIT TO PRIOR APPLICATIONS

This application claims the benefit of U.S. Provisional Patent Application 61/443,718, filed Feb. 16, 2011, U.S. Provisional Patent Application 61/443,730, filed Feb. 17, 2011, and U.S. Provisional Patent Application 61/443,708, filed Feb. 16, 2011. The contents of U.S. Provisional Patent Applications 61/443,718 and 61/443,730 are hereby incorporated by reference.

CROSS REFERENCE TO RELATED APPLICATIONS

This Application is related to the following applications: U.S. patent application Ser. No. 13/134,289, filed Jun. 3, 2011; U.S. patent application Ser. No. 13/134,308, filed Jun. 3, 2011; U.S. patent application Ser. No. 13/134,313, filed Jun. 3, 2011; and U.S. patent application Ser. No. 13/134,319 filed Jun. 3, 2011.

BACKGROUND

Different media editors available in the market today provide different sets of tools for editing media, including audio tools, video tools, trimming tools, etc. One particular set of tools provided by some media editors is color correction tools. Generally, color correction tools allow a user of a media editor to adjust the colors of media in order to accurately reproduce what was originally shot, compensate for variations in the material (e.g., film errors, white balance, varying lighting conditions), optimize transfer for use of special effects, create a desired look or appearance, enhance and/or alter the mood of a scene, etc.

Many of the different color correction tools provide different techniques for achieving the same result. Some color correction tools may provide a wide range of features that are cumbersome to use while other color correction tools may provide meager features that are easy to use. In addition, some color correction tools provide a combination of both types of tools.

BRIEF SUMMARY

For a media-editing application that creates a composite media presentation from several media clips, some embodiments of the invention provide a novel method that applies color correction operations (e.g., by using color correction tools) to modify the colors and effects within the media clips. A media clip contains media content that is stored on a computing device on which the media-editing application executes, or on a computing device to which the media-editing application has access. Examples of such content include audio data, video data, text data, pictures, and/or other media data. Accordingly, media clips are any kind of content clip (audio clip, video clip, picture clip, or other media clip) that can be used to create a composite presentation.

Each media clip that makes up the composite media presentation includes one or more frames that each displays a photographic image. A video clip may include several frames whereas a picture may include only one frame. The media-editing application of some embodiments allows the user to edit the pixels of each frame of a media clip using various color correction tools provided by the application.

Some embodiments provide a graphical user interface (GUI) that allows a user of the media-editing application to perform various color correction operations including a color balance operation that automatically balances colors, a color matching operation that automatically matches the color and look of a particular clip, a primary color correction operation, a secondary color correction operation, etc. The user may follow an exemplary workflow of performing different color correction operations on images using this media-editing application.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the invention are set forth in the appended claims. However, for purposes of explanation, several embodiments of the invention are set forth in the following figures.

FIG. 34 illustrates an example of determining new values for a pixel of an image.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed.

For a media-editing application that creates a composite media presentation from several media clips, some embodiments of the invention provide a novel method that applies color correction operations (e.g., by using color correction tools) to modify the colors and effects within the media clips. A media clip contains media content that is stored on a computing device on which the media-editing application executes, or on a computing device to which the media-editing application has access. Examples of such content include audio data, video data, text data, pictures, and/or other media data. Accordingly, media clips are any kind of content clip (audio clip, video clip, picture clip, or other media clip) that can be used to create a composite presentation.

Each media clip that makes up the composite media presentation includes one or more frames that each displays a photographic image. A media clip may include several frames whereas a picture may include only one frame. The media-editing application of some embodiments allows the user to edit the pixels of each frame of a media clip using various color correction tools provided by the application.

Some embodiments provide a graphical user interface (GUI) of a media-editing application that allows a user of the media-editing application to perform various color correction operations on a media clip. In some embodiments, the color correction operations include a color balance operation for automatically balancing colors of the media clip, a color matching operation for automatically matching the color and look of a particular clip (or image) to the media clip, manual color correction operations (e.g., hue/saturation/exposure adjustment operations, color masking operation, shape masking operation) for manually adjusting colors of the media clip, etc. The user may follow an exemplary workflow of performing different color correction operations on the media clip using this media-editing application.

Figure 1:
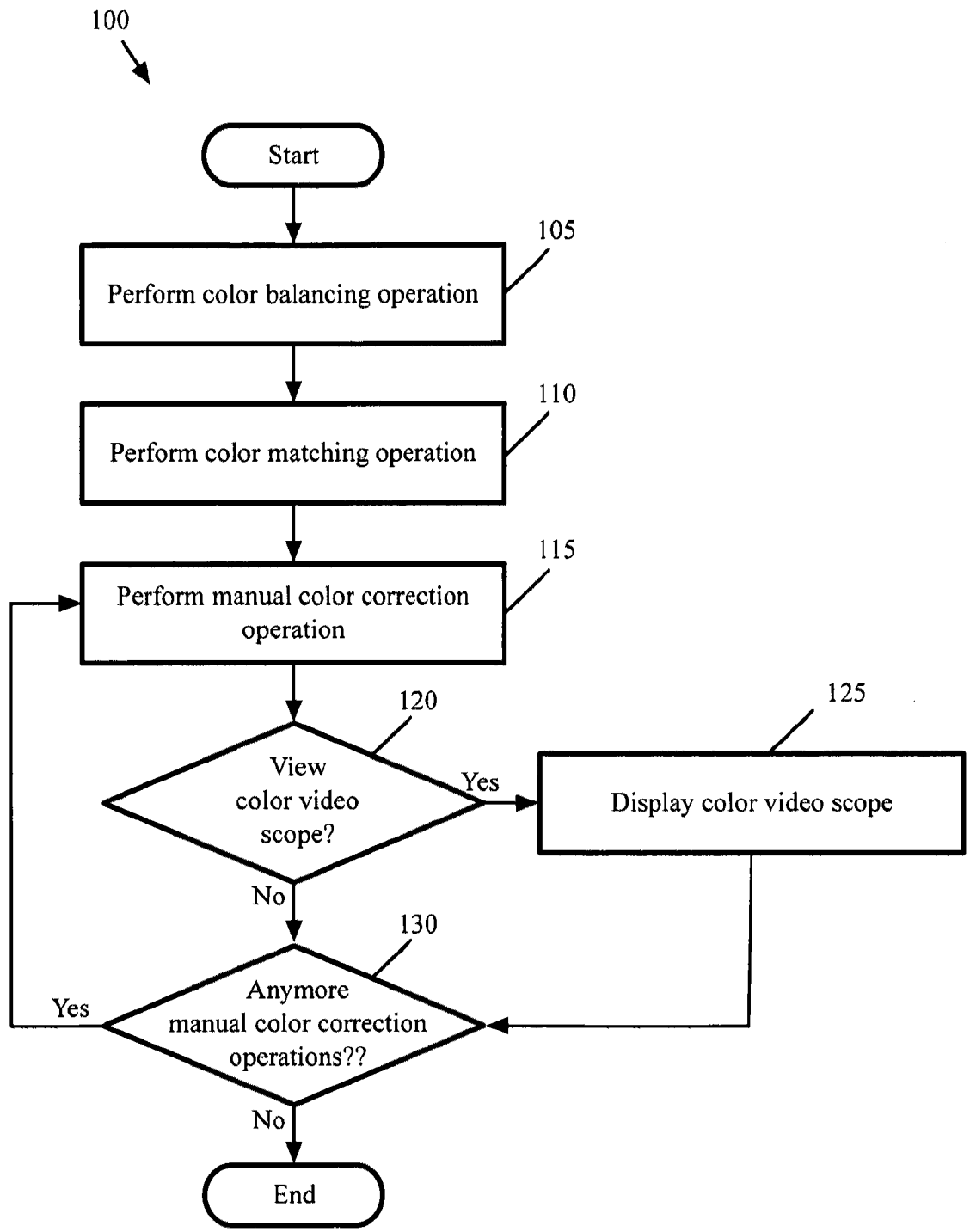
FIG. 1 conceptually illustrates a process of a workflow provided by the media-editing application of some embodiments.

FIG. 1 conceptually illustrates a process 100 of a workflow provided by the media-editing application of some embodiments. This process will be explained by reference to FIGS. 2-7, which illustrate a GUI of a media-editing application of some embodiments that provides this workflow.

As shown, the process 100 begins by performing (at 105) a color balance operation to an image (or a media clip). The color balance operation of some embodiments balances the colors of the image by modifying the image to reduce or eliminate color casts in the image. In some embodiments, a color cast of an image is an unwanted color or range of colors that affects a substantial portion (e.g., 70%, 80%, 90%, or 100%) of the image. Some embodiments reduce or eliminate color casts in the image by equalizing the distribution of chroma component values of pixels in the image. In some embodiments, the color balance operation balances the colors of the image by modifying the image to adjust the contrast of the image. For example, some such embodiments of the color balance operation adjust the contrast of the image by equalizing the distribution of luma component values of pixels in the image. Some embodiments of the media-editing application provide a color balancing tool for applying the color balance operation to the image. In some embodiments, the media-editing application automatically performs the color balance operation on images and media clips (e.g., upon import of the images and media clips into the media-editing application).

Figure 2:
FIG. 2 conceptually illustrates a graphical user interface (GUI) of a media-editing application that provides a color balancing tool of some embodiments.

An example of such a color balancing tool is illustrated in FIG. 2. FIG. 2 conceptually illustrates a GUI 200 of a media-editing application that provides a color balancing tool of some embodiments. Specifically, this figure illustrates the GUI 200 at two different stages: a first stage 205 that shows the GUI 200 before a color balance operation has been applied to an image of a media clip and a second stage 210 that shows the GUI 200 after the color balance operation has been applied to the image of the media clip. As shown in this figure, the GUI 200 includes the image display area 215 and the color correction panel 220.

The image display area 215 is for displaying an, image or a frame of a media clip that the user of the media-editing application is currently editing. Some embodiments allow the user to view the adjustments made to the image or media clip as the user performs different operations to the image using the various color correction tools provided by the media-editing application.

The color correction panel 220 is an area in the GUI 200 through which a user of the media-editing application can activate color correction tools for performing color correction operations on an image or a media clip. In the example of FIG. 2, the color correction tools provided in the color correction panel 220 are presented as color correction options that the user can select (e.g., through a cursor controller operation, a finger tap on the screen of the electronic device, a keystroke, etc.) to activate a corresponding color correction tool. As shown, the color correction panel 220 includes a color correction option 225 for activating a color balancing tool.

The operation of the GUI 200 will now be described by reference to the state of this GUI 220 during the first and second stages 205 and 210 that are illustrated in FIG. 2. In the first stage 205, the image display area 215 displays a visual representation of an image of a media clip that the user is editing. As shown, the image displayed in the display area 215 is of two children. In this example, the image displayed in the image display area 215 has a red color cast.

The second stage 210 illustrates that the user has activated the color balancing tool by selecting the color correction option 225 (e.g., by performing a cursor operation such as clicking a mouse button, tapping a touchpad, or touching a touchscreen), as indicated by a highlighting of the color correction option 225. In some embodiments, when the media-editing application receives the selection of the color correction option 225, the media-editing application automatically applies the color balance operation on the image (and the other images of the media clip in some embodiments) and highlights the color correction option 225. As shown, the color balance operation has eliminated the red color cast and the color of the image appears more neutral and natural.

Different embodiments allow the user to select the color correction option 225 in different ways. For example, some embodiments allow the use to select the color correction option 225 through a keystroke, a selection of another item in the GUI, a selection of an option included in a pull-down menu or pop-up menu, etc.

Returning to FIG. 1, the process 100 then performs (at 110) a color matching operation to the image (or the media clip). In some embodiments, the color matching operation matches the colors of a target image to the colors of a source image by modifying the color attributes of pixels in the target image so that the colors of the target image appear the same or similar to the colors of the source image. Some embodiments of the media-editing application provide a color matching tool for automatically matching colors of an image (e.g., target image or destination image) or video clip to colors of another image (e.g., source image or reference image) or video clip.

Figure 3:
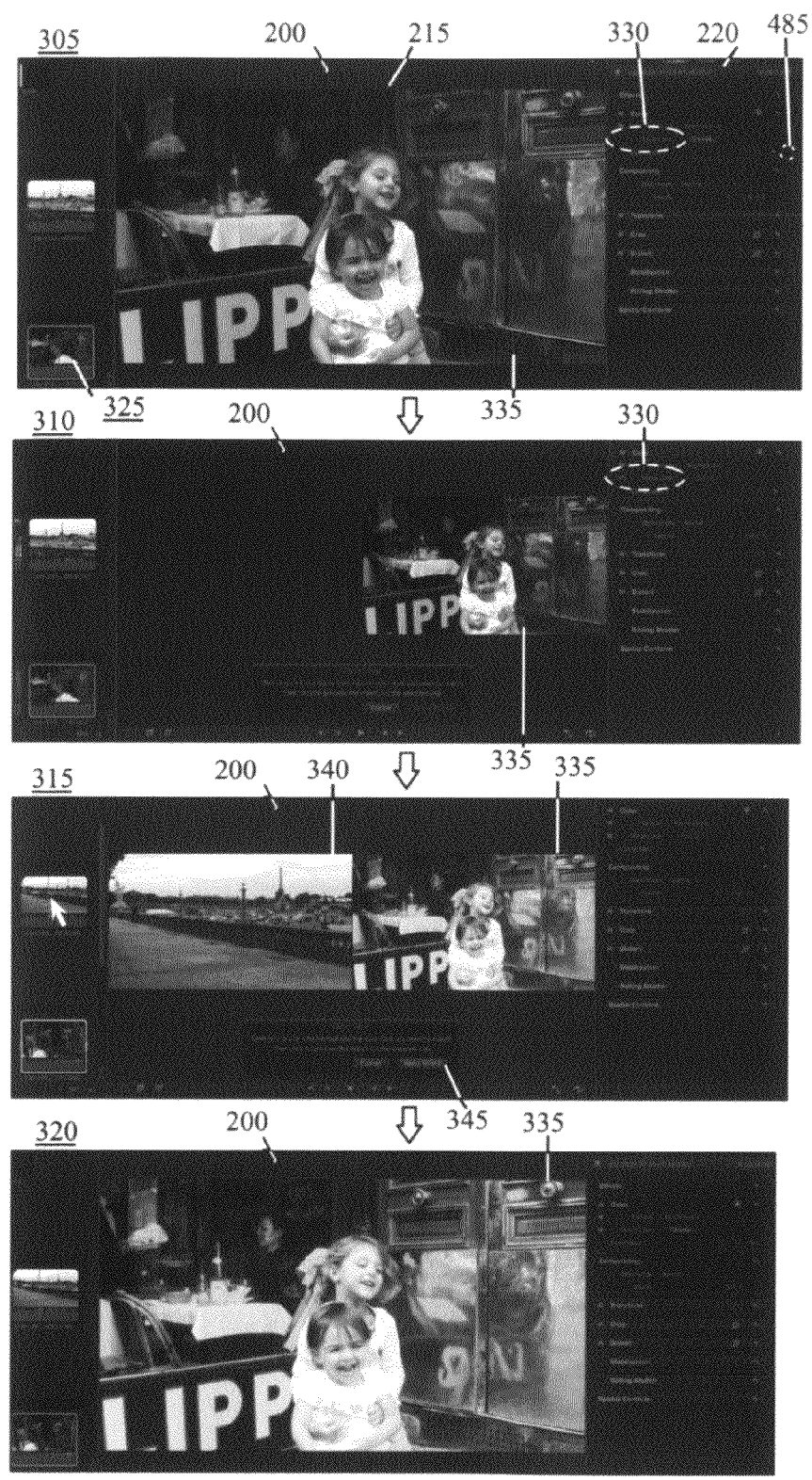
FIG. 3 conceptually illustrates GUI of a media-editing application that provides a color matching tool of some embodiments.

An example of a color matching tool is illustrated in FIG. 3. FIG. 3 conceptually illustrates GUI 200 of a media-editing application that provides a color matching tool of some embodiments. Specifically, this figure illustrates the GUI 200 at four different stages 305-320. As described above, the GUI 200 includes the image display area 215 and the color correction panel 220.

The image display area 215 displays an image of a frame in a media clip. The color correction panel 220, as described above, allows the user of the media-editing application to activate color correction tools for performing color correction operation on an image or a media clip. As shown, the color correction panel 220 includes color correction option 330 for activating a color matching tool.

The operation of the GUI 200 will now be described by reference to the state of this GUI during the four different stages 305-320 that are illustrated in FIG. 3. The first stage 305 illustrates the GUI 200 before a color matching operation has been applied to an image 335 of a media clip 325. As shown, the first stage 305 shows the image 335, which includes two children, displayed in the image display area 215. In addition, the first stage 305 of the GUI 200 displays the media clip 325 in a portion of an event browser. In some embodiments, the event browser is an area of the GUI 200 for organizing and displaying media clips.

The second stage 310 illustrates that the user has activated the color matching tool by selecting the color correction option 330 (e.g., by performing a cursor operation such as clicking a mouse button, tapping a touchpad, or touching a touchscreen), as indicated by a highlighting of the color correction option 330. As shown, the second stage 310 also illustrates that the image display area 215 displays a smaller version of the image 335 and a pop-up screen that instructs the user to select a frame in a media clip that has a color arrangement to which the user wishes to match the colors of the image 335. In some embodiments, when the media-editing application receives the selection of the color correction option 330, the media-editing application displays the smaller version of the image 335 and the pop-up screen and highlights the color correction option 330.

The third stage 315 illustrates that the user has selected a reference frame (e.g., by performing a cursor operation such as clicking a mouse button, tapping a touchpad, or touching a touchscreen during a skim operation of the media clip to which the reference frame belongs) that has the color arrangement to which the user wishes to match the colors of the image 335. In addition, the third stage 315 shows that the image display area 215 displays an image 340 of the reference frame alongside the image 335 in a side-by-side fashion. Some embodiments of the media-editing application display the image 340 of the reference frame when the media-editing application receives the selection of the reference frame. As shown, the image 340 of the reference frame is of a bridge in the daytime, and the colors of the image 340 of the reference frame contains more highlights and generally looks brighter than image 335.

In some embodiments, the user of the media-editing application may select a reference image by performing a skim operation on a media clip located on a timeline (not shown) or event browser and then selecting the desired frame. The user may skim through a variety of media clips until the user finds a color arrangement of interest.

The third stage 315 also illustrates that the image display area 215 displays a user-selectable UI item 345 in the pop-up screen. In some embodiments, the UI item 345 is for performing a color match operation on the image 335 that matches the color and appearance of a selected reference frame to the color and appearance of the image 335.

The fourth stage 320 shows that the user has selected the UI item 345 (e.g., by performing a cursor operation such as clicking a mouse button, tapping a touchpad, or touching a touchscreen) in order to apply a color matching operation on the image 335 that matches the color and appearance of the image 340 of the reference frame to the color and appearance of the image 335. When the media-editing application receives the selection of the UI item 345, some embodiments of the media-editing application performs a color matching operation that matches the color and appearance of the image 340 of the reference frame to the color and appearance of the image 335. As shown in the fourth stage 320, the color (not shown) and appearance of the image 335 has been brightened to match the color (not shown) and appearance of the image 340 of the reference frame.

Returning to FIG. 1, the process 100 performs (at 115) a manual color correction operation to the image (or the media clip). In some embodiments, the manual color correction operation allows the user of the media-editing application to manually adjust the colors of the entire image (also referred to as a primary color correction operation). Some embodiments of the manual color correction operation allows the user of the media-editing application to manually identify a region of the image and adjust the color of that region of the image without affecting the rest of the image (also referred to as a secondary color correction operation).

Different embodiments of the media-editing application provide different manual color correction tools for manually adjusting colors of an image. For instance, some embodiments provide a color board tool for adjusting colors (e.g., saturation adjustments, exposure adjustments, hue adjustments, etc.) of an image. In some embodiments, the media-editing application provides a shape masking tool for identifying a spatial region in the image to which a color correction operation may be applied (e.g., by using the color board tool). The media-editing application of some embodiments provides a color masking tool for identifying colors in the image to which a color correction operation may be applied (e.g., by using the color board tool).

Some embodiments of the media-editing application provide a color board tool that allows a user to manually adjust a clip's color properties (e.g., color, saturation, exposure, etc.). Specifically, the color board tool allows the user to adjust the color, the saturation, and/or exposure of all the pixels within the image or a select portion within the image (e.g., the pixels that correspond to highlights, midtones, and/or shadows).

Figure 4:
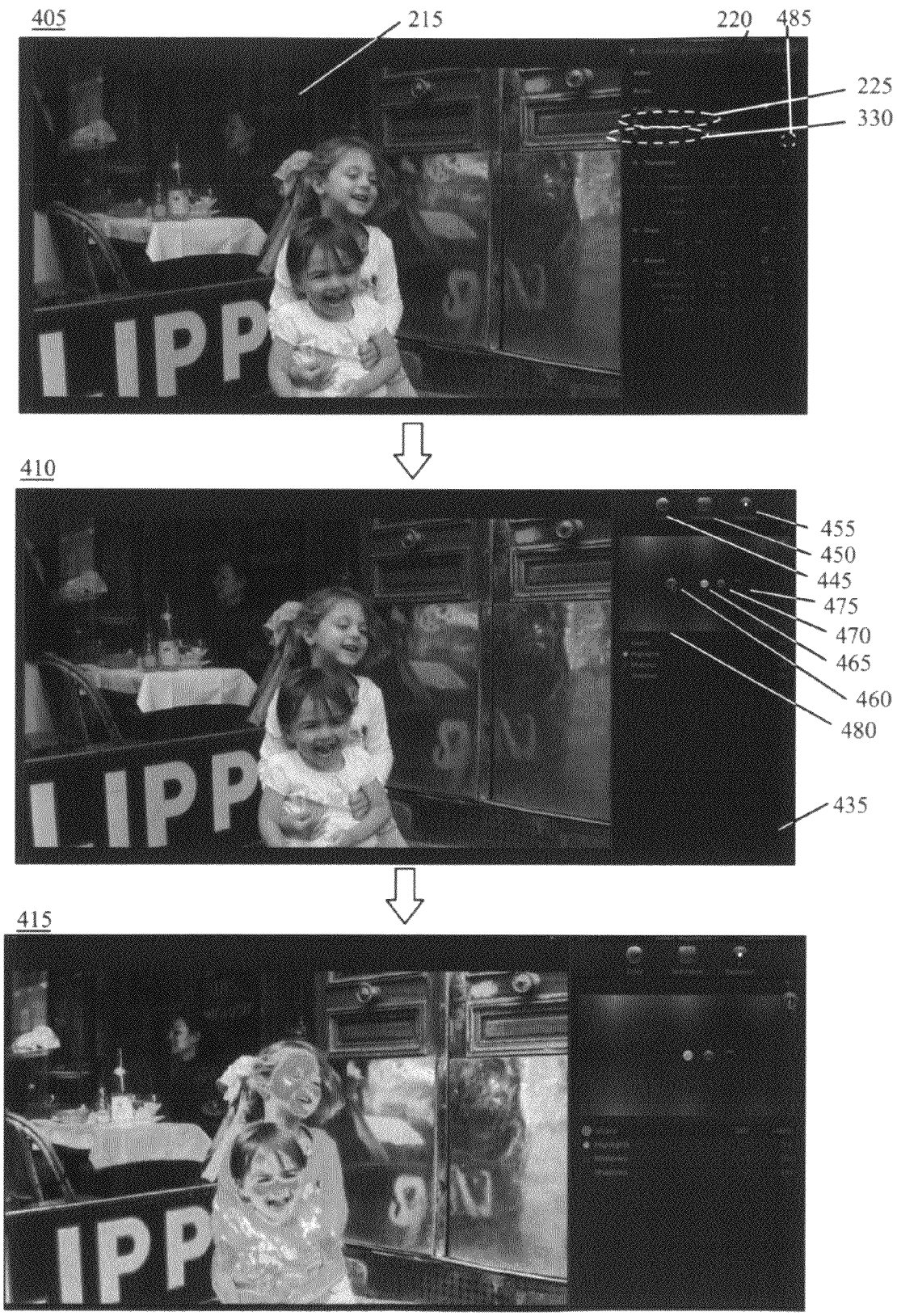
FIG. 4 conceptually illustrates the GUI of a media-editing application that provides a color board tool of some embodiments.

An example of a color board tool is illustrated in FIG. 4. FIG. 4 conceptually illustrates the GUI 200 of a media-editing application that provides a color board tool of some embodiments. Specifically, this figure illustrates the GUI 200 at three different stages 405-415. As described above, the GUI 200 includes the image display area 215 and the color correction panel 220.

The image display area 215 displays an image in a media clip. The color correction panel 220, as described above, allows the user of the media-editing application to activate color correction tools (e.g., a color balancing tool and/or a color matching tool) for performing color correction operations on an image. As shown, the color correction panel 220 includes color correction option 485 for activating a color board tool.

The operation of the GUI 200 will now be described by reference to the state of this GUI during the three different stages 405-415 that are illustrated in FIG. 4. The first stage 405 illustrates the GUI 200 before manual color corrections are applied to an image in a media clip. In the first stage 405, the image display area 215 displays an image of two children.

The second stage 410 illustrates that the user has activated the color board tool by selecting the color correction option 485 (e.g., by performing a cursor operation such as clicking a mouse button, tapping a touchpad, or touching a touchscreen). The second stage 410 also illustrates that a color board panel 435 is displayed. When the media-editing application receives the selection of the color correction option 485, some embodiments of the media-editing application display the color board panel 435.

The color board panel 435 of some embodiments allows the user to manually adjust a media clip's color properties, such as the color, the saturation, and the exposure, etc. As shown in this figure, the color board panel 435 includes three user-selectable tabs 445-455 for activating three corresponding color board panes. The tab 445 is for activating a color board pane that allows the user to adjust an image's colors (e.g., hue, saturation), the tab 450 is for activating a color board pane that allows the user to adjust an image's saturation, and the tab 455 is for activating a color board pane that allows the user to adjust an image's exposure (e.g., luminance).

When the media-editing application receives a selection of one of the three tabs 445-455, the media-editing application of some embodiments displays the corresponding color board pane in the color board panel 435. As shown in the second stage 410 the color board pane corresponding to the tab 445 is displayed, as indicated by a darkening of the tab 445. In some embodiments, when the media-editing application receives the selection of the color correction option 485, the media-editing application display the color board pane that corresponds to the tab 445 by default. However, other embodiments of the media-editing application may display color board panels corresponding to one of the other tabs 450 or 455 by default.

As shown, the color board pane corresponding to the tab 445 includes a sliding region 480. The sliding region 480 includes four controls (or slider shapes): a global slider shape 460 for adjusting colors of all of the pixels in the image, a highlights slider shape 465 for adjusting colors of pixels in the image that have high luminance values, a midtones slider shape 470 for adjusting colors of pixels in the image that have medium luminance values, and a shadows slider shape 475 for adjusting colors of pixels in the image that have low luminance values. The user of the media-editing application may select these controls or slider shapes individually (or simultaneously in some embodiments) and drag them in any direction (e.g., a non-collinear direction, an angular direction, etc.) across the sliding region 480 (e.g., via a cursor click-and-drag operation).

In some embodiments, when the user selects a slider shape and slides the slider shape across the sliding region 480, the media-editing application of some embodiments adjusts the colors of pixels in the image displayed in the image display area 215 according to which slider shape (e.g., global, highlights, midtones, shadows, etc.) is selected and the position of the selected slider shape with respect to the sliding region 480.

The third stage 415 illustrates that the user has selected the global slider shape 460 and positioned the global slider shape 460 in the upper right hand corner of the sliding region 480. In this example, the upper right hand corner of the sliding region 480 corresponds to a red color (not shown). As mentioned above, some embodiments of the media-editing application adjust the colors of pixels in the image displayed in the image display area 215 according to which slider shape (e.g., global, highlights, midtones, shadows, etc.) has selected and the position of the selected slider shape with respect to the sliding region 480. Accordingly, when the global slider shape 460 is positioned in the upper right hand corner of the sliding region 480, the media-editing application of some of these embodiments corresponding increases the colors of all the pixels in the image displayed in the image display area 215 with the red color.

As described above, FIG. 4 illustrates a manual color correction tool for performing primary color correction. As noted above, some embodiments of the media-editing application provide a manual color correction tool for performing secondary color correction. For example, in some embodiments, the media-editing application provides a shape masking tool that provides a shape mask for identifying a region of an image to which a color correction operation may be applied. In some embodiments, a shape mask is a manipulatable two-dimensional shape that is displayed over the image in order to identify the region in the image that is within the two-dimensional shape.

Figure 5A:
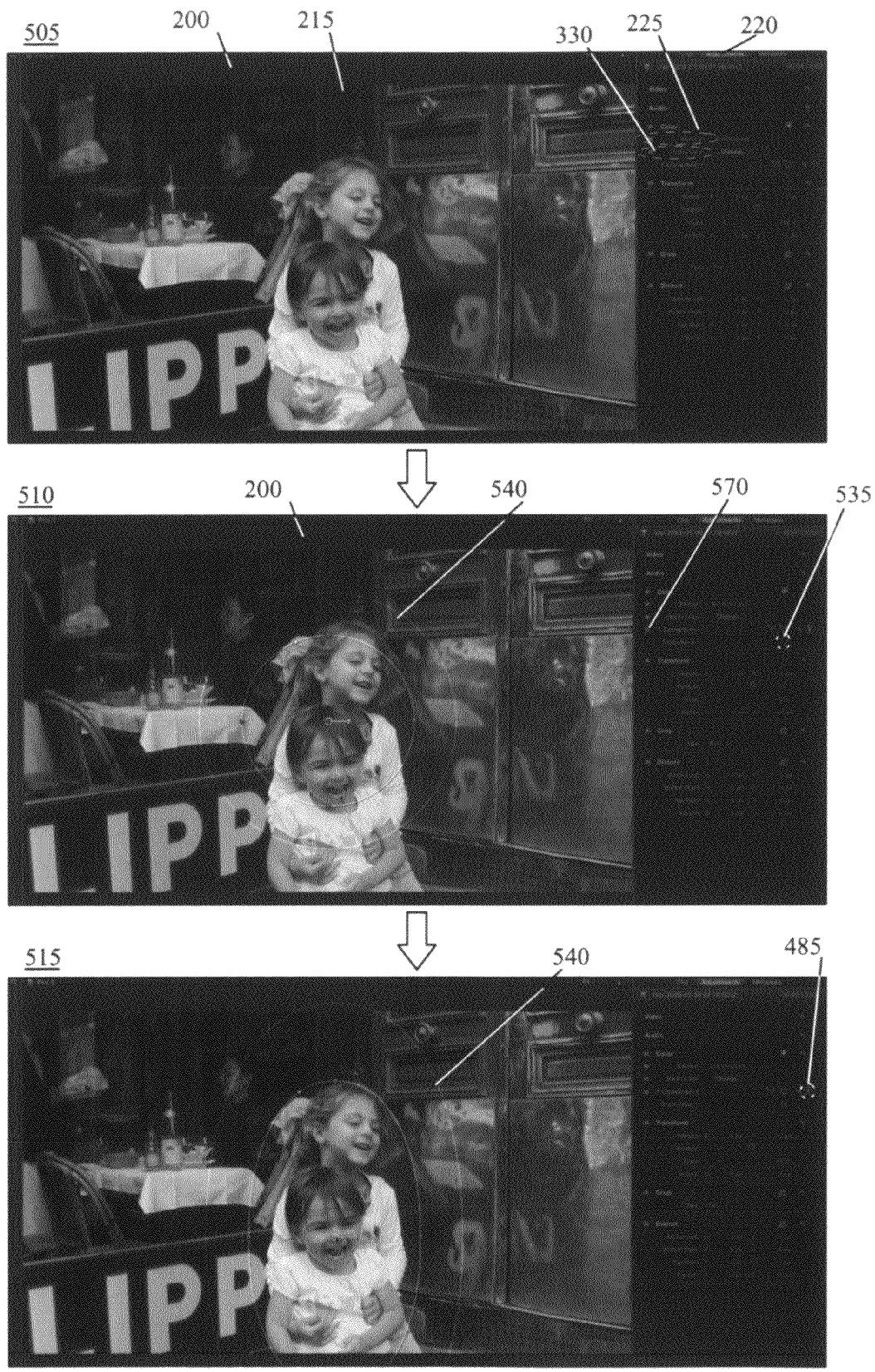
FIG. 5 conceptually illustrates the GUI of a media-editing application that provides a shape masking tool of some embodiments.
Figure 5B:
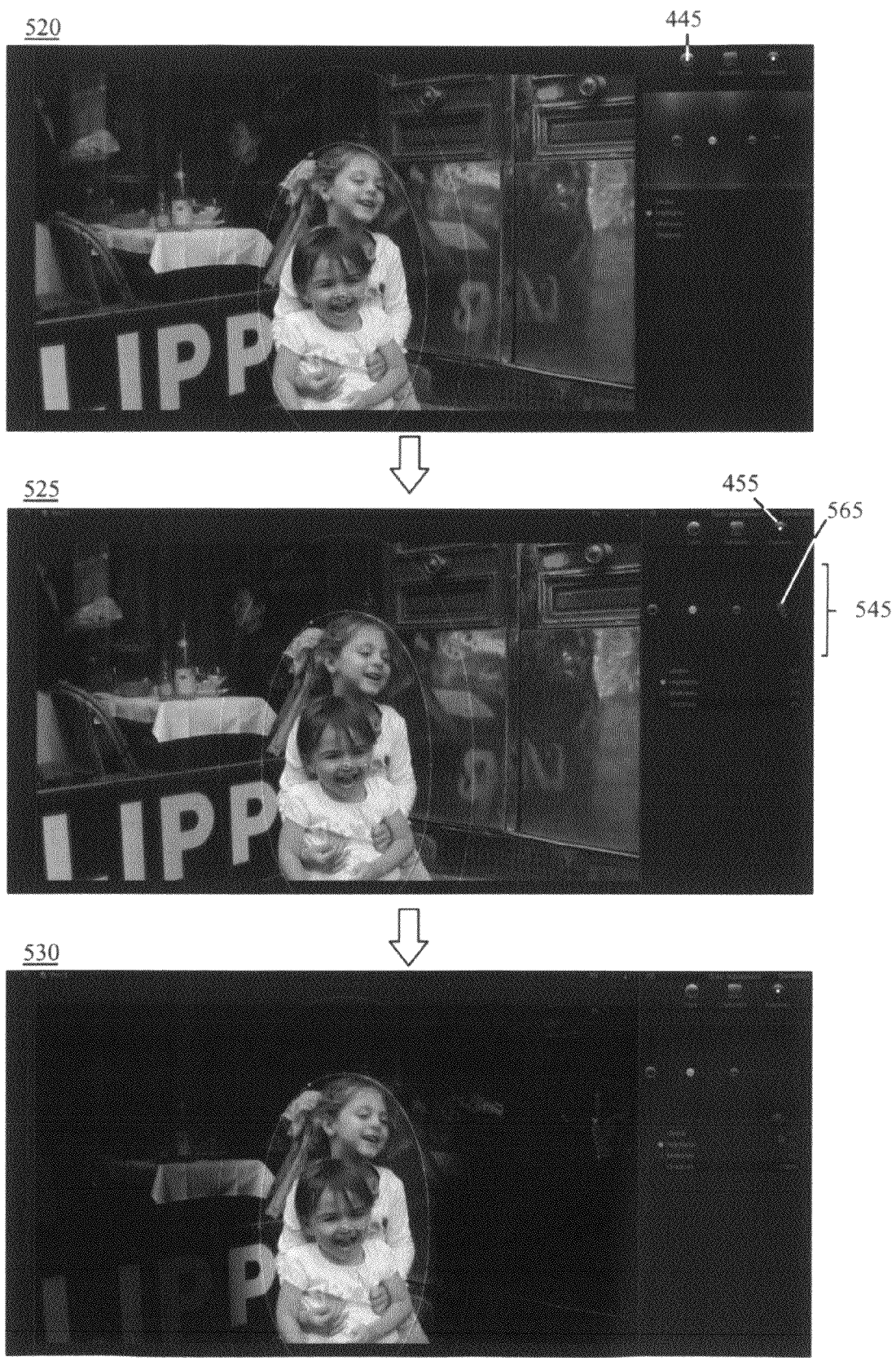

An example of such a shape masking tool is illustrated in FIG. 5. Specifically, FIG. 5 conceptually illustrates the GUI 200 of a media-editing application that provides a shape masking tool of some embodiments. Specifically, this figure illustrates the GUI 200 at six different stages 505-530. As described above, the GUI 200 includes the image display area 215 and the color correction panel 220.

The image display area 215 displays an image in a media clip. The color correction panel 220, as described above, allows the user of the media-editing application to activate color correction tools (e.g., a color balancing tool, a color matching tool, and a color board tool) for perform color correction operations on an image or media clip.

The operation of the GUI 200 will now be described by reference to the state of this GUI during the six different stages 505-530 that are illustrated in FIG. 5. The first stage 505 is the same as the first stage 405 illustrated in FIG. 4. That is, the first stage 505 illustrates the GUI 200 before manual color corrections are applied to an image in a media clip. In addition, the image display area 215 displays an image of two children in the first stage 505.

The second stage 510 illustrates that the user has activated the shape masking tool by selecting a color correction option 570 (e.g., by performing a cursor operation such as clicking a mouse button, tapping a touchpad, or touching a touchscreen) and then selecting a user-selectable UI item 535 to activate (e.g., add) a shape mask 540. When the media-editing application receives the selection of the UI item 535, some embodiments of the media-editing application displays the shape mask 540 in the image display area 215.

As noted above, some embodiments of the shape mask are for identifying a region of an image to which color correction operations may be applied. As shown, the shape mask 540 includes two concentric shapes. In this example, the shape mask 540 is for identifying a region of the image that is outside the outer concentric shape of the shape mask 540 to which color correction operations may be applied. In addition, the second stage 510 illustrates a set of shape mask controls, which are displayed on the shape mask 540, for manipulating the shape mask 540.

The third stage 515 illustrates that the user has manipulated the shape mask 540 (e.g., by using the set of shape mask controls) by vertically elongating the shape of the shape mask 540 and moving the shape mask 540 within the image display area 215. In particular, the shape mask 540 has been manipulated such that the shape mask 540 closely surrounds the two children, which is the region of interest in this example.

The fourth stage 520 illustrates that the user has activated the color board tool by selecting the color correction option 485 for activating the color board tool. As explained above, the media-editing application of some embodiments displays the color board panel 435 with the color board pane corresponding to the tab 445 by default when the media-editing application receives the selection of the color correction option 485.

The fifth stage 525 illustrates that the user has selected the tab 455 to activate the corresponding color board pane that allows the user to adjust an image's exposure. As shown, the color board pane includes a sliding region 545 that is similar to the sliding region 480 except different slider shapes are included in the sliding region 545. The sliding region 545 includes three slider shapes for adjusting the exposure (e.g., luminance) of pixels in the image that is displayed in the image display area 215. In particular, the sliding region 545 includes a slider shape 565 that is for adjusting the exposure of pixels in the image that have low luminance values.

The sixth stage 530 illustrates that the user has applied a color correction operation to the image by selecting the slider shape 565 and moving the slider shape down with respect to the sliding region 545. In this example, the position of the slider shape 565 near the bottom of the sliding region 545 corresponds to a decrease in exposure. Therefore, the exposure (e.g., luminance) of pixels in the image that have low luminance values is correspondingly decreased. As described above, the shape mask 540, in this example, is for identifying a region of the image that is outside the outer concentric shape of the shape mask 540 to which color correction operations may be applied. As such, the exposure of pixels outside the shape mask 540 are decreased, which is indicate by a darkening of the region outside the shape mask 540 in the sixth stage 545. In some embodiments, when some embodiments of the media-editing application receive the selection of the slider shape 565 and receive the position of the slider shape 565 with respect to the sliding region 545, these embodiments of the media-editing application decrease the exposure (e.g., luminance) of pixels in the image displayed in the image display area 215 that have low luminance values.

Some embodiments of the media-editing application provide a color masking tool that allows a user to select a particular region in the image. The color masking tool then defines pixels in the image that contains the same or similar color values as those in the selected region. The user may apply color correction operations to the region to adjust the color values of those pixels in the region.

Figure 6A:
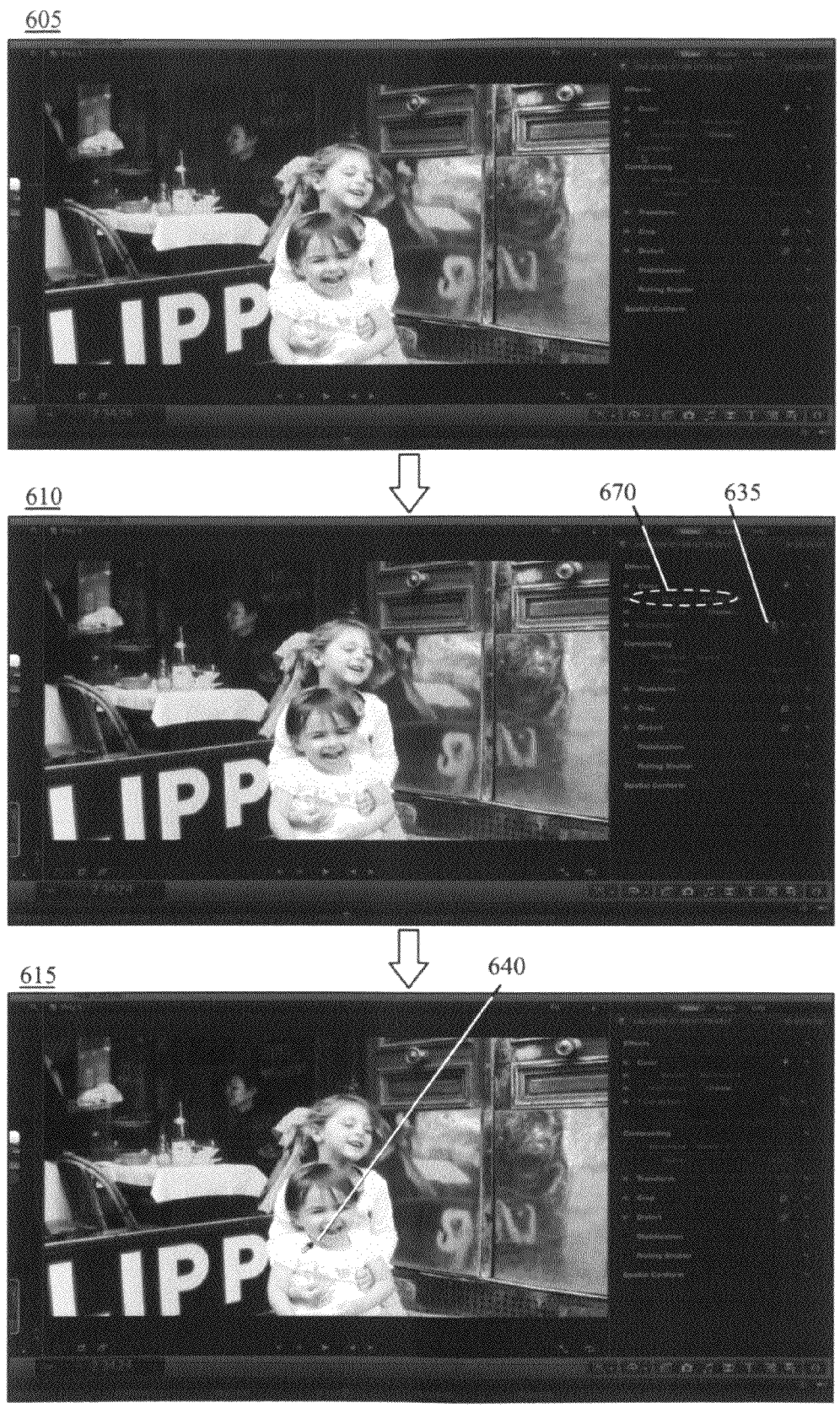
FIG. 6 conceptually illustrates the GUI of a media-editing application that provides a color masking tool of some embodiments.
Figure 6B:
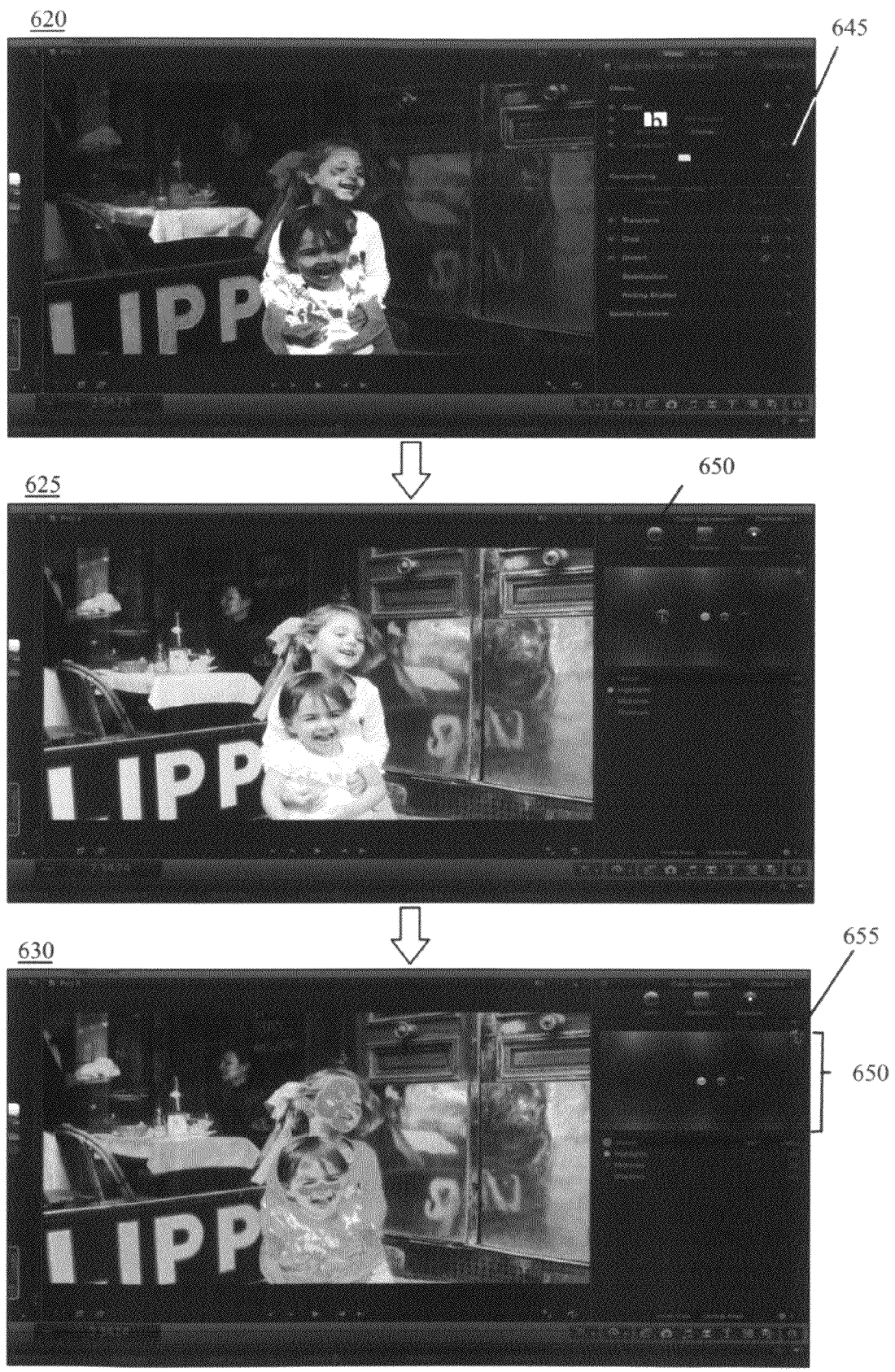

An example of such a color masking tool is illustrated in FIG. 6. FIG. 6 conceptually illustrates the GUI 200 of a media-editing application that provides a color masking tool of some embodiments. Specifically, this figure illustrates the GUI 200 at five different stages 605-625. As described above, the GUI 200 includes the image display area 215 and the color correction panel 220.

The image display area 215 displays an image in a media clip. The color correction panel 220, as described above, allows the user of the media-editing application to activate color correction tools (e.g., a color balancing tool, a color matching tool, a color board tool, and a shape masking tool) to perform color correction operations on an image or a media clip.

The operation of the GUI 200 will now be described by reference to the state of this GUI during the five different stages 605-625 that are illustrated in FIG. 6. The first stage 605 illustrates the GUI 200 before a color correction operation is performed on an image of a media clip. In the first stage 605, the image display area 215 displays an image of two children.

The second stage 610 illustrates that the user has activated the color masking tool by selecting a color correction option 570 (e.g., by performing a cursor operation such as clicking a mouse button, tapping a touchpad, or touching a touchscreen) and then selecting a user-selectable UI item 635.

The third stage 615 illustrates an eyedropper 640 displayed in the image display area 215. In some embodiments, the media-editing application displays the eyedropper 640 when the position of the cursor is within the image display area 215. Some embodiments of the eyedropper 640 allow the user to select the color that the user wants to correct by moving the eyedropper over the color in the image and then sampling the color (e.g., by performing a cursor operation such as click-and-drag operation or performing a touch-and-drag operation on a touchscreen). Some embodiments display a set of adjustable concentric circles when the user is sampling the desired color in the image. The colors included in the set of concentric circles when the user completes the sampling (e.g., by releasing the click for a click-and-drag operation or lifting a finger from a touchscreen for a touch-and-drag operation) are included in a color mask. The user may then control the range of variations in the selected color that are included in the color mask by controlling the size of the set of circles (e.g., through the drag of a click-and-drag operation or touch-and-drag operation) in some embodiments.

In some embodiments, the user may also add color shades to the color mask by creating more eyedroppers (e.g., via selection of the selectable item 635) to select other color shades within the image. The user may also add more color shades to the color masks upon performing a keystroke and dragging the eyedropper on the sampled color.

The fourth stage 620 illustrates the selection of the sampled color within the image. As shown in this figure, the user has sampled the young girl's white shirt. Different embodiments may perform this selection differently (e.g., via a color keyer, via a numerical input that corresponds to a range of colors, etc.). As the user finishes sampling the desired color (e.g., by using the color mask), the user of the media-editing application may perform a number of color correction operations (e.g., luminance adjustments, chrominance adjustments, saturation adjustment, etc.) on the colors of the image (or media clip) that correspond to the sampled color.

The fifth stage 625 illustrates that the user has activated the color board tool by selecting (e.g., by performing a cursor operation such as clicking a mouse button, tapping a touchpad, or touching a touchscreen) color correction option 485. As shown, the GUI 200 displays the color board panel 435 with the color board pane corresponding to the tab 445 by default. When the media-editing application receives the selection of the color correction option 485, some embodiments of the media-editing application the display the color board panel 435 in this manner.

The sixth stage 630 illustrates that the user has selected the global slider shape 460 and positioned the slider shape 460 in the upper right hand corner of the sliding region 480 to adjust the colors of the pixels that are included in the color mask. In this example, the upper right hand corner of the sliding region 480 corresponds to a red color (not shown). Thus, pixels in the image that have a white color are increased with the red color. When the global slider shape 460 is position in the upper right hand corner of the sliding region 480, the media-editing application of some of these embodiments corresponding increases the colors of pixels in the image that are included in the color mask with the red color.

Returning to FIG. 1, the process 100 determines (at 120) whether input has been received (e.g., a selection of an option included in a pull-down menu or a pop-up menu) indicating that the user of the media-editing application wants to view a color video scope. In some embodiments, the media-editing application provides a color video scope for displaying video information.

Different embodiments may provide different types of color video scopes. For instance, some embodiments of the media-editing application provide a color waveform monitor (also referred to as a waveform scope) for displaying luma information of pixels in an image by displaying a dot (e.g., a pixel) in the color waveform monitor for each pixel in the image. The luma level (e.g., luma component value) of a pixel is represented by the position of the dot along the y-axis of the waveform monitor and the relative horizontal location of the pixel in the image is represented by the position of the dot along the x-axis of the waveform monitor. Some embodiments additionally display the color of the dot in the waveform monitor as the color (or a similar color) of the corresponding pixel in the image. In this manner, the waveform monitor provides a visual indication of the spatial location of highlights and shadows in the image and the color of those highlights and shadows in the image. Other embodiments of color waveform monitor provide additional and/or different color waveforms as well (e.g., an RGB color waveform, a chroma color waveform, etc.).

As another example of a color video scope, some embodiments of the media-editing application provide a color vectorscope for displaying chrominance information of pixels in an image by displaying a dot (e.g., a pixel) in the color vectorscope for each pixel in the image. The chrominance component values Cb and Cr of a pixel are represented by corresponding Cartesian coordinates values x and y of the position of the dot in the color vectorscope. In other words, pixels' distance from the center of the vectorscope (i.e., the origin of the Cartesian coordinate plane) represents the saturation of the pixel, and the angle around the Cartesian coordinate plane represents the hue of the pixel. Some embodiments additionally display the color of the dot in the color vectorscope as the color (or a similar color) of the corresponding pixel in the image.

Returning to FIG. 1, when the process 100 determines that input has been received indicating that the user of the media-editing application wants to view the color video scope, the media-editing application displays the color video scope. In some embodiments, the media-editing application displays the color video scope in a side-by-side view along with its corresponding image. Some embodiments display the color video scope in a picture-in-picture view with the image displayed in the image display area in the background and the corresponding waveform in the foreground inset, or vice versa. Different embodiments may display the color video scope differently.

Figure 7:
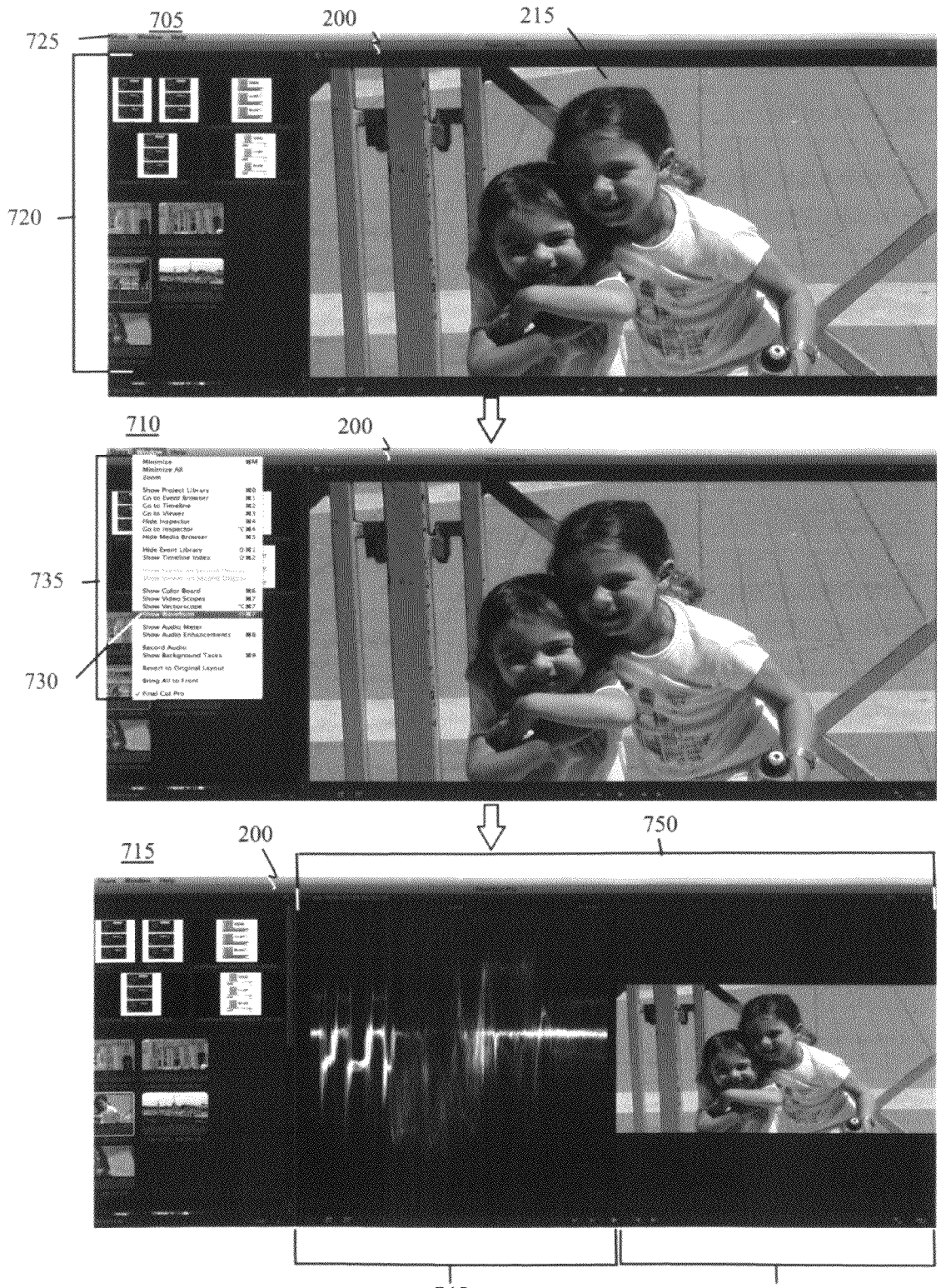
FIG. 7 conceptually illustrates the GUI of a media-editing application that provides a color waveform monitor of some embodiments.

An example of a color video scope is illustrated in FIG. 7. FIG. 7 conceptually illustrates the GUI 200 of a media-editing application that provides a color waveform monitor of some embodiments. Specifically, this figure illustrates the GUI 200 at three different stages: a first stage 705 that shows the GUI 200 before a color waveform monitor is displayed, a second stage 710 that illustrates the activation of the color waveform monitor, and a third stage 715 that shows the GUI 200 after the color waveform monitor is displayed.

As shown in FIG. 7, the GUI 200 includes the image display area 215, a portion of a media library 720, and a portion of a pull-down menu bar 725. As described above, the image display area 215 displays a frame in a media clip that the user of the media-editing application is currently editing. The media library 720 allows the user to select a media clip that the user wants to edit. In some embodiments, the pull-down menu bar 725 allows the user select (e.g., by selecting a selectable item under one of the pull-down menus from the pull-down menu bar 725 using a cursor controller operation or keystroke) a selectable item to activate the color waveform monitor.

The operation of the GUI 200 will now be described by reference to the three different stages 705-715 that are illustrated in FIG. 7. The first stage 705 illustrates the GUI 200 before the user of the media-editing application activates the color waveform monitor. As shown, the GUI 200 displays an image of two children in the image display area 215. Different embodiments may display the image differently (e.g., in a full-screen mode, etc.).

The second stage 710 illustrates that the user has activated the color waveform monitor by selecting a selectable item from a drop-down menu (e.g., via a cursor controller operation or touching a touchscreen), through performing a keystroke, through selecting a selectable item displayed on the GUI, etc. In this example, the user of the media-editing application activates the color waveform monitor through selecting a selectable item 730 provided in a pull-down menu 735. As shown, the "Show Waveform" selectable item 730 is selected under the pull-down menu 735 labeled Window.

The third stage 715 illustrates the display of the color waveform monitor after the user has selected the selectable item 730 to activate the color waveform monitor. In some embodiments, the media-editing application displays a video scope view layout 750 that displays an image display area 740 and a waveform display area 745 when the media-editing application receives the selection of the selectable item 730. The image display area 740 displays a smaller version of the image displayed in the image display area 215 (e.g., half the size or two-thirds the size of the image in image display area 215) in the second stage 710. The waveform display area 745 displays the color waveform (a luma waveform in this example) that corresponds to the image displayed in the image display area 740. In this example, the media-editing application displays the image displayed in the image display area 740 and its corresponding color waveform in the waveform display area 745 in a side-by-side view. Different embodiments may display the video scope view layout differently (e.g., full screen mode, or a picture-in-picture display).

Returning to FIG. 1, when the process 100 determines that input has not been received indicating that the user of the media-editing application wants to view the color video scope, the process 100 determines (at 130) whether there are any more manual color correction operations to process.

When the process 100 determines that there are more manual color correction operations to process, the process returns to 115 to continue processing any remaining manual color correction operations. Otherwise, the process 100 ends.

The process 100 conceptually illustrates an exemplary workflow that can be achieved through the media-editing application of some embodiments. While FIG. 1 shows a particular order of a series of operations, one of ordinary skill in the art would realize that the operations may be performed in different orders in different embodiments. For instance, determining whether input has been received indicating that the user wants to view a color video scope (i.e., operation 120) and displaying the color video scope (i.e., operation 125) may be performed before performing manual color correction operations (i.e., operation 115).

Several more detailed embodiments are described below. Section I describes details of the color balance operation of some embodiments. Section II then describes details of the color matching operation of some embodiments. Section III describes the details of the manual color correction operations of some embodiments. Next, Section IV describes details of the color waveform monitors of some embodiments. Section V describes an example GUI of a media-editing application of some embodiments. Next, Section VI describes a software architecture of a media-editing application of some embodiments. Finally, Section VII describes an electronic system with which some embodiments of the invention are implemented.

I. Color Balance

Figure 8:
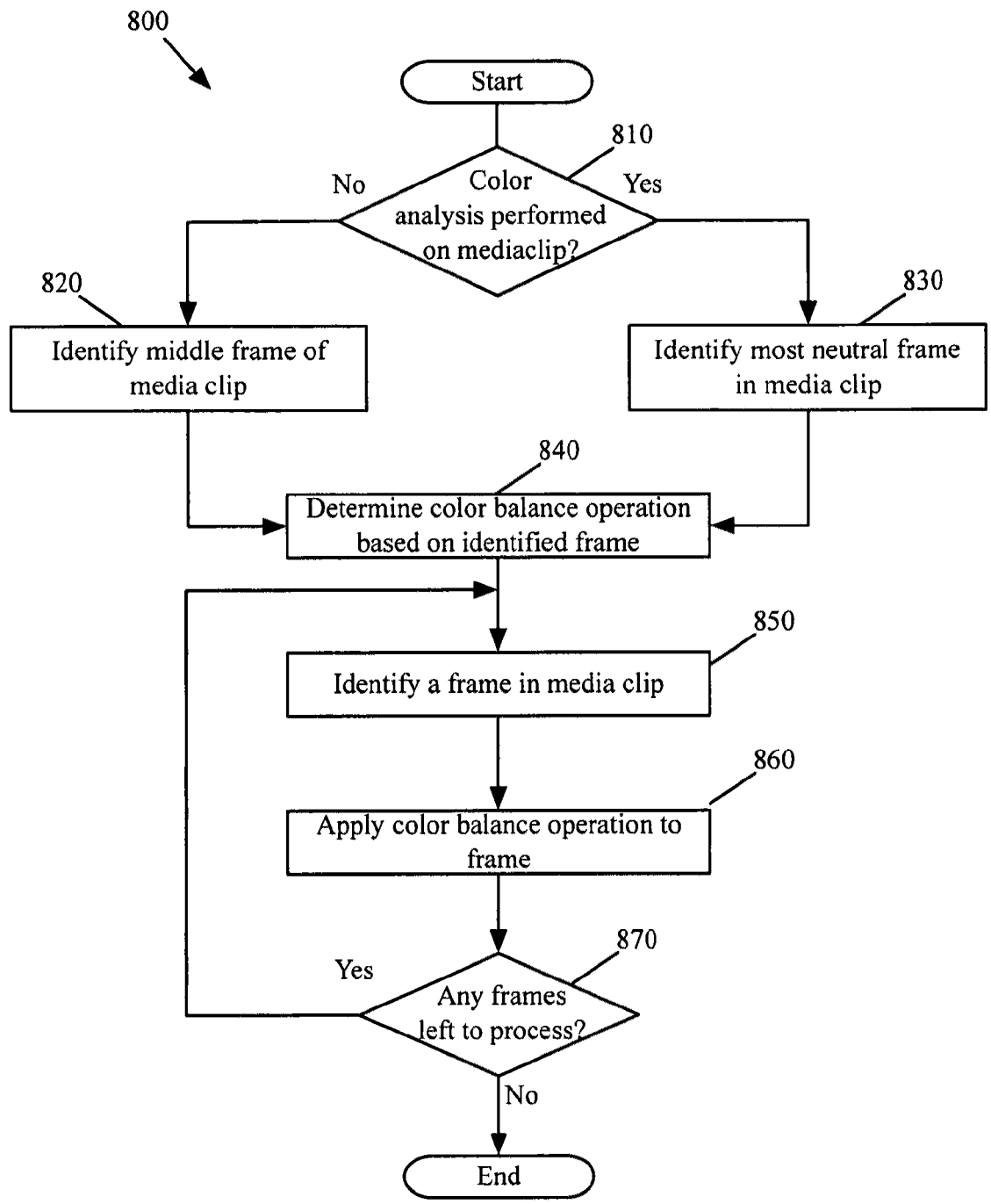
FIG. 8 conceptually illustrates a process of some embodiments for applying a color balance operation to frames of a media clip.

As mentioned above, the media-editing application of some embodiments provides a color balance tool that automatically applies a color balance operation on frames of a media clip to reduce or eliminate color casts (e.g., by equalizing the distribution of chroma component values of pixels) in frames in the media clip and adjust the contrast of frames in the media clip (e.g., by equalizing the distribution of luma component values of pixels in frames of the media clip). FIG. 8 conceptually illustrates an example of such a process. Specifically, FIG. 8 conceptually illustrates a process 800 of some embodiments for applying a color balance operation to frames of a media clip. In some embodiments, the process 800 is automatically performed by the media-editing application when a media clip is imported into the media-editing application. The process 800 is performed when a command to color balance a media clip is received through the media-editing application of some embodiments (e.g., by selecting a user-selectable UI item, a menu option provided in a pull-down, drop-down, or pop-up menu, a keystroke, a series of keystrokes, a combination of keystrokes). The process 800 will be described by reference to FIG. 10, which illustrates an example a middle frame that is identified in a media clip.

The process 800 starts by determining (at 810) whether color analysis has been performed on the media clip. In some embodiments, color analysis of a media clip determines a set of attributes (e.g., average color, luma of darkest pixel, luma of brightest pixel, saturation of most saturated pixel, etc.) for each frame in the media clip. An example of a process that performs such a color analysis on a media clip is described further below with respect to FIG. 9.

When the process 800 determines that color analysis has not been performed on media clip, the process 800 identifies (at 820) the middle frame of the media clip as the frame on which a color balance operation is based. In some embodiments, the process 800 identifies the middle frame of the media clip by determining the total number of frames in the media clip and identifying a frame in the media clip that has the same number of frames sequentially before and after the frame.

Figure 10:
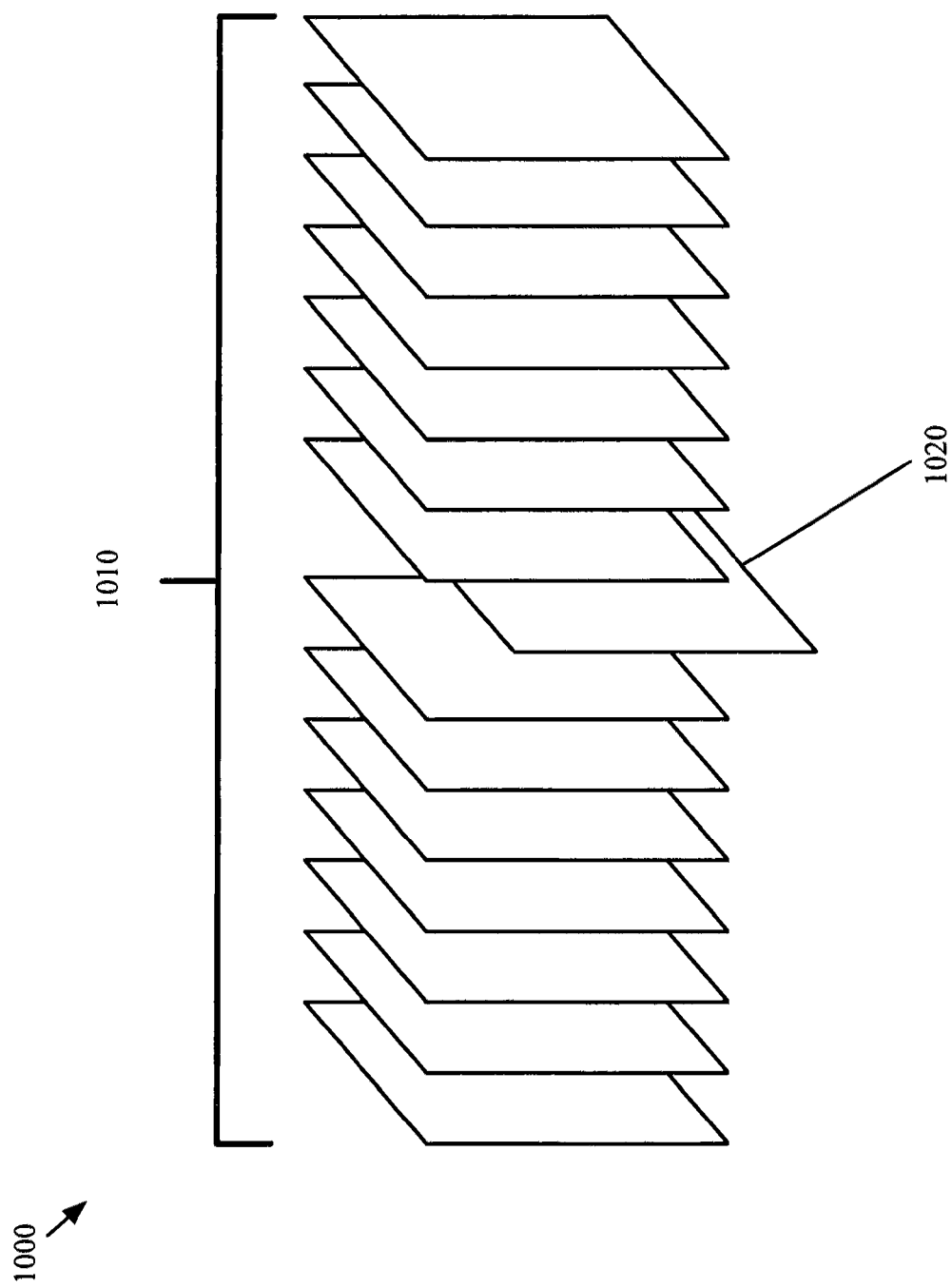
FIG. 10 illustrates an example of a middle frame that is identified in a media clip.

FIG. 10 illustrates an example of a middle frame of a media clip 1010 that is identified by the process 800 of some embodiments. As shown, the media clip 1010 includes fifteen frames, with the first frame (i.e., the frame of the media clip that is displayed first upon playback of the media clip) on the left side and the last frame (i.e., the frame in the media clip that is displayed last upon playback of the media clip). In this example, the process 800 has identified frame 1020 as the middle frame of the media clip since the frame 1020 has seven frames sequentially before and after the frame 1020.

While FIG. 10 illustrates an example of a media clip that includes an odd number of frames, media clips that include an even number of frames do not have a middle frame. Different embodiments of the process 800 identify a media clip that includes an even number of frames differently. In some embodiments, the process 800 identifies a "middle" frame for a media clip that includes an even number of frames by determining the total (even) number of frames in the media clip and dividing the total number of frames by two. In other embodiments, the process 800 identifies a "middle" frame for a media clip that includes an even number of frames by determining the total (even) number of frames in the media clip, dividing the total number of frames by two, and adding one.

Figure 11:
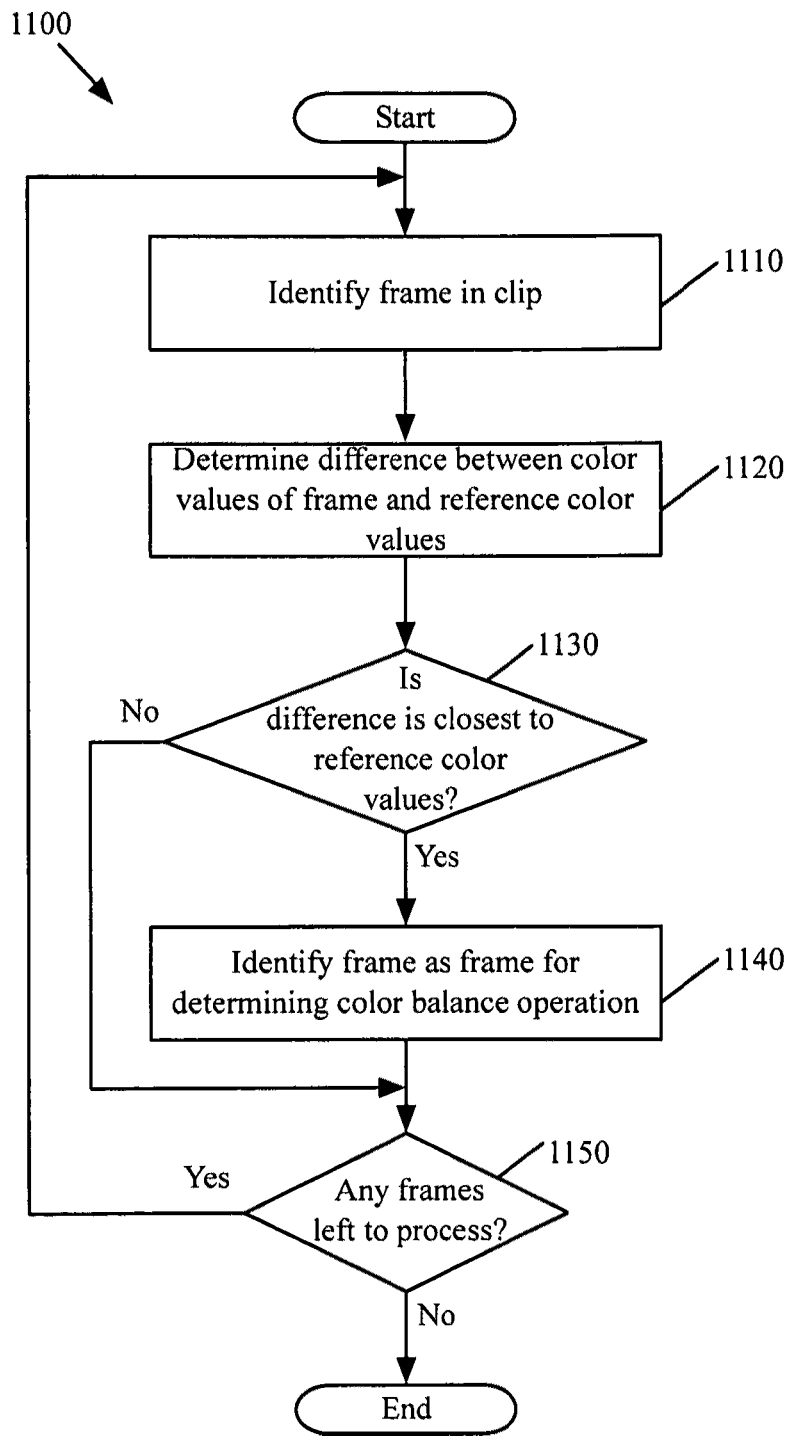
FIG. 11 conceptually illustrates a process of some embodiments for identifying a frame in a media clip.

Returning to FIG. 8, when the process 800 determines that color analysis has been performed on media clip, the process 800 identifies (at 830) the most neutral frame in the media clip. As mentioned above, color analysis of a media clip determines, in some embodiments, a set of values for a set of attributes (e.g., average color, luma of darkest pixel, luma of brightest pixel, saturation of most saturated pixel, etc.) of each frame in the media clip. Some embodiments of the process 800 identify the most neutral frame in the media clip by identifying the frame in the media clip whose set of values for the set of attributes is most similar to a predefined set of values. For example, some embodiments define a set of values that represents the corresponding set of attributes of a middle gray color. FIG. 11, which is further described below, conceptually illustrates an example of a process that identifies the most neutral frame in a media clip that has been color analyzed based on such sets of attributes.

After identifying a frame in the media clip, the process 800 determines (at 840) a color balance operation based on the identified frame in the media clip. Some embodiments of the process 800 determine the color balance operation by identifying a color cast in the identified frame, identifying the luma levels of the dark and bright pixels in the frame, and determining a set of transforms for reducing the color cast in the identified frame and adjusting the luma levels pixels in the frame. As such, the set of transforms represent the color balance operation in these embodiments in these embodiments. In some of these embodiments, the set of transforms is represented by a set of matrices for reducing the color cast in the identified frame and adjusting the luma levels pixels in the frame. An example of a process for determining such transforms is described in further detail below by reference to FIG. 12.

Next, the process 800 identifies (at 850) a frame in the media clip. Different embodiments identify the initial frame in the media clip differently. For instance, the process 800 of some embodiments identifies the frame in the media clip that was used to determine the color balance operation at the operation 840. Some embodiments identify the first frame of the media clip (i.e., the frame that is displayed first upon playback of the media clip) while other embodiments identify the last frame in the media clip (i.e., the frame that is displayed last upon playback of the media clip). Other ways of identifying an initial frame in the media clip are possible.

The process 800 then applies (at 860) the color balance operation to the identified frame (which was identified at the operation 850) in the media clip. As explained above, some embodiments determine a set of transforms for representing the color balance operation. In such embodiments, the process 800 applies the set of transforms to the image. In some embodiments where the set of transforms is represented by a set of matrices, the process 800 applies the set of matrices to each pixel in the image.

Finally, the process 800 determines (at 870) whether any frame in the media clip is left to process. When the process 800 determines that there is a frame in the media clip left to process, the process 800 returns to the operation 850 to continue applying the color balance operation to the remaining frames in the media clip. Otherwise, the process 800 ends.

Figure 9:
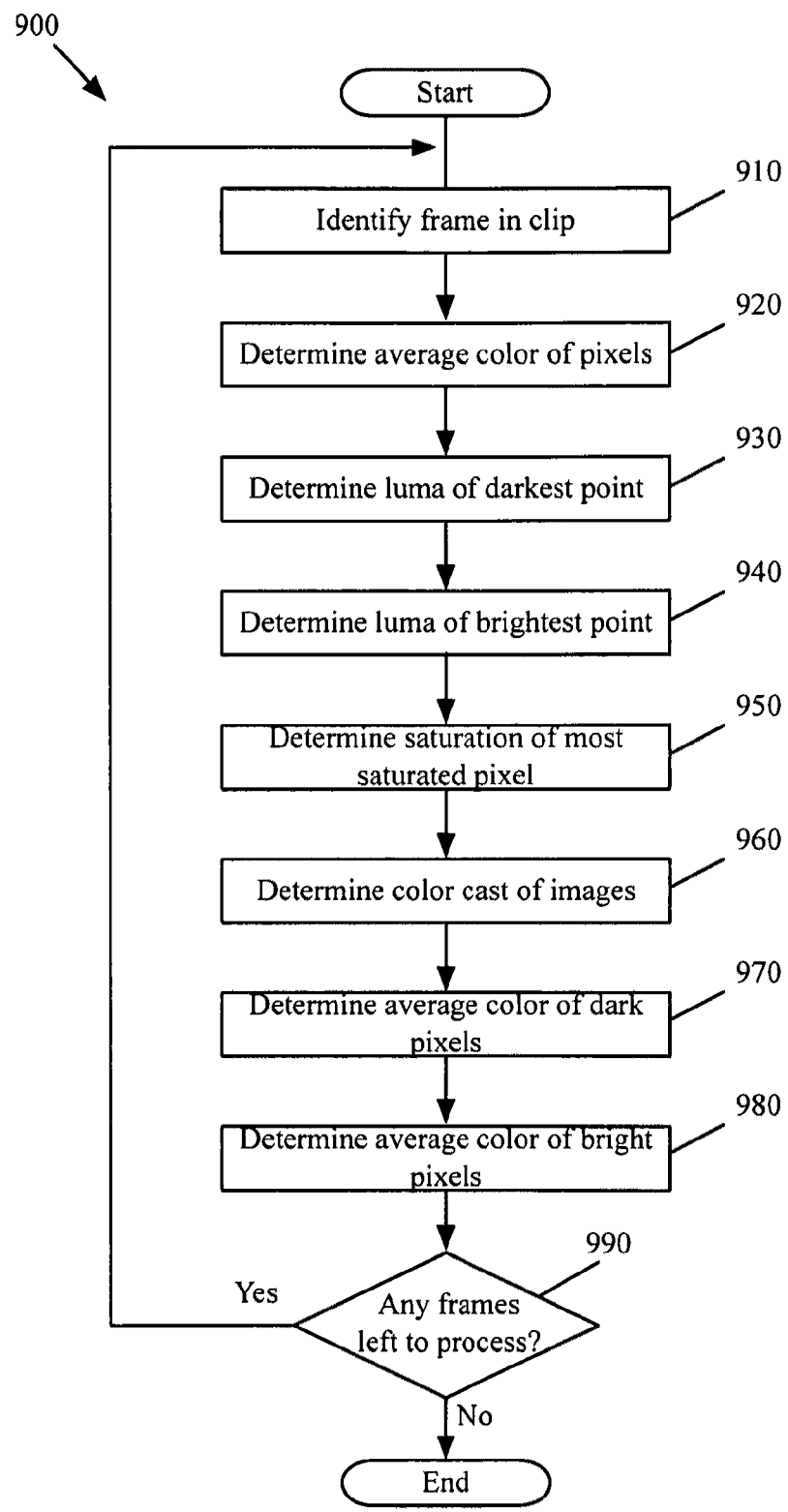
FIG. 9 conceptually illustrates a process of some embodiments for analyzing colors of frames in a media clip.

FIG. 9 conceptually illustrates a process 900 of some embodiments for analyzing colors of each frame in a media clip. The media-editing application of some embodiments performs the process 900 when a media clip is imported into the media-editing application (e.g., the media-editing application receives the media clip). In some embodiments, the process 900 is performed by the media-editing application when the media-editing application receives a command to color analyze a media clip (e.g., receiving a selection of a media clip and receiving a selection of a UI item through a GUI of the media-editing application).

The process 900 begins by identifying (at 910) a frame in the media clip to be color analyzed. Different embodiments determine an initial frame in the media clip. For instance, the process 900 of some embodiments identify the first frame (i.e., the frame of the media clip that is displayed first upon playback of the media clip) as the initial frame while the process 900 of other embodiments identify the last frame (i.e., the frame in the media clip that is displayed last upon playback of the media clip) as the initial frame. Other ways of identifying an initial frame in the media clip are possible in other embodiments.

Next, the process 900 determines (at 920) an average color value of pixels in the frame. In some embodiments, the process 900 determines the average color value (e.g., RGB component values) by averaging the color values of each pixel in the frame.

The process 900 then determines (at 930) a luma value of the brightest pixel in the frame. Some embodiments of the process 900 determine such a luma value by determining the luma value of each pixel in the frame and identifying the pixel that has the highest luma value.

After determining the luma value of the brightest pixel in the frame, the process 900 determines (at 940) a luma value of a pixel in the frame that has the lowest luma value. The process 900 of some embodiments determine this luma value by determining the luma value of each pixel in the frame and identifying the pixel that has the lowest luma value.

Next, the process 900 determines (at 950) a saturation value of the most saturated pixel in the frame. In some embodiments, the process 900 determines such a saturation value by determining the saturation value of each pixel in the frame and identifying the pixel that has the highest saturation value.

The process 900 then determines (at 960) a color value of a color cast of the frame. A color cast, in some embodiments, is a tint of a color that affects the entire frame image evenly. The process 900 of some embodiments determines the color cast of the frame by averaging the color values (e.g., hue, saturation, and luminance component values) of pixels that have saturation values that are below a predefined saturation threshold value. Different embodiments may define the threshold value differently. For instance, some embodiments define the saturation threshold value to correspond to a 50 percent saturation level. In these embodiments, pixel values that have saturation values that correspond to a 50 percent saturation level or less are included in the color values that are averaged by the process 900. Other embodiments may define other saturation threshold values as well in order to identify pixels with low saturation values.

After determining the color value of the color cast of the frame, the process 900 determines (at 970) an average color value of dark pixels in the frame. The process 900 of some embodiments determines such a color value by identifying pixels in the frame that have luma component values less than a predefined luma threshold value and averaging the luma component values of those pixels. Different embodiments define the luma threshold value for identifying dark pixels differently. For instance, some embodiments define the luma threshold value to correspond to a 12.5 percent luma component level. In these embodiments, pixel values that have luma component values that correspond to a 12.5 percent luma level or less are included in the luma component values that are averaged by the process 900. Other embodiments define other luma component threshold values for identifying dark pixels.

Next, the process 900 determines (at 980) an average color value of bright pixels in the frame. In some embodiments, the process 900 determines this color value by identifying pixels in the frame that have luma component values greater than a predefined luma threshold value and averaging the luma component values of those pixels. Different embodiments define the luma threshold value for identify bright pixels differently. For example, some embodiments define the luma threshold value to correspond to an 87.5 percent luma component level. In these embodiments, pixel values that have luma component values that correspond to a 87.5 percent luma level or greater are included in the luma component values that are averaged by the process 900. Other embodiments define other luma component threshold values for identifying bright pixels.

Finally, the process 900 determines (at 990) whether any frame in the media clip is left to process. When the process 900 determines that there is a frame in the media clip left to process, the process 900 returns to the operation 910 to continue to process any remaining frames in the media clip. Otherwise, the process 900 ends.

Although the above description of the process 900 describes a pixel's color as being represented by one color value, a pixel's color can be represented by a set of color values depending on the color space in which the pixel's color is defined. For example, a color defined in an RGB color space includes three values—a red component value, a green component value, and a blue component value. As another example, a color defined in a Y'CbCr color space includes two values—a blue-difference chroma component value and a red-difference chroma component value. A color defined in different colors spaces may be expressed by a different number of color values.

Furthermore, some embodiments of the process 900 may convert the color space of the image to another color space in order to determine some or all of each of the characteristics described in FIG. 9. For example, the process 900 of some embodiments converts the color space of a frame to an RGB color space in order to identify color values of each pixel (e.g., at the operation 920, 970, and 980). In some embodiments, the process 900 converts the color space of a frame to a Y'CbCr to identify luma characteristics of the image (e.g., at the operation 930 and 940).

As shown, FIG. 9 determines a number of characteristics of each frame in a media clip. However, different embodiments may determine additional and/or other characteristics of each frame in the media clip. For instance, some embodiment may determine an average saturation value and/or an average contrast value.

As mentioned above, when identifying a frame in a media clip with which to determine a color balance operation, some embodiments of the media-editing application identify the frame in the media clip differently based on whether the media clip has been color analyzed. For a media clip that has been color analyzed by some embodiments of the process 900 illustrated in FIG. 9, some embodiments identify the frame in the media clip that is closest based on the characteristics that were determined when the process 900 color analyzed the media clip. The following FIG. 11 illustrates an example of identify a frame.

FIG. 11 conceptually illustrates a process 1100 of some embodiments for identifying a frame in a media clip that has been color analyzed by the process 900 of some embodiments. In some embodiments, the process 1100 is performed by the process 800, which is described above by reference to FIG. 8, to identify a frame in a media clip that has been color analyzed.

As shown, the process 1100 starts by (at 1110) identifying a frame in the media clip. Different embodiments determine an initial frame in the media clip. For instance, the process 1100 of some embodiments identify the first frame (i.e., the frame of the media clip that is displayed first upon playback of the media clip) as the initial frame while the process 1100 of other embodiments identify the last frame (i.e., the frame in the media clip that is displayed last upon playback of the media clip) as the initial frame. Other ways of identifying an initial frame in the media clip are possible in other embodiments.

Next, the process 1100 determines (at 1120) a difference between a set of color values of the identified frame and a predefined set of reference color values. In some embodiments, the set of color values of the identified frame represents a gray color of the identified frame. Some of these embodiments determine the set of color values of the identified frame based on the set of characteristics determined from the color analysis operation. In some embodiments, the set of reference color values represents a mid gray color (e.g., a color that has a tone approximately halfway between black and white). Based on the set of color values of the identified frame and the set of reference color values, the process 1100 of some embodiments determines the difference between those values.

The process 1100 then determines (at 1130) whether the determined difference, is closest to the predefined set of reference color values. When the process 1100 determines that the determined difference is closest to the predefined set of reference color values, the process 1100 identifies (at 1140) the frame as the frame with which to determine a color balance operation and then proceeds to operation 1150. When the process 1100 determines that the determined difference is not closest to the predefined set of reference color values, the process 1100, the process 1100 proceeds to the operation 1150.

Finally, the process 1100 determine (at 1150) whether there is any frame in the media clip left to process. When the process 1100 determine that there is a frame in the media clip left to process, the process 1100 returns to the operation 1110 to continue processing any remaining frames in the media clip in order to identify the closest frame with which to determine a color balance operation. Otherwise, the process 1100 ends.

Figure 12:
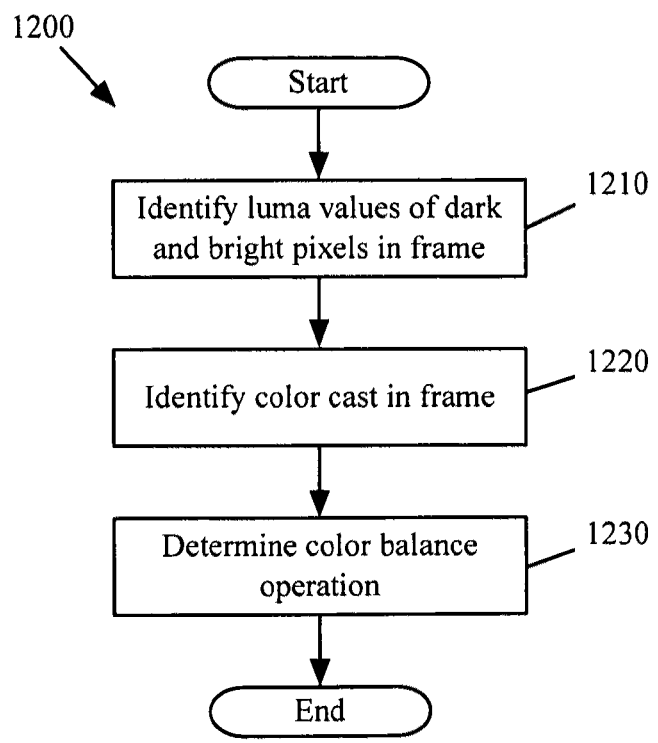
FIG. 12 conceptually illustrates a process of some embodiments for determining a color balance operation.

FIG. 12 conceptually illustrates a process 1200 of some embodiments for determining a color balance operation for a media clip based on a frame in the media clip. In some embodiments, the process 1200 is performed by the process 800 to determine a color balance operation to apply to a media clip.

The process 1200 begins by identifying (at 1210) luma values of dark pixels and bright pixels in the frame. Different embodiments determine the luma values of the dark and bright pixels in the frame differently. Some embodiments determine luma values of the dark and bright pixels in the frame based on the distribution of luma component values of pixels in the frame. For instance, some of these embodiments identity the luma component value of the darkest 5 percent pixels for the luma component value of dark pixels and identity the luma component value of the brightest 5 percent pixels for the luma component value of bright pixels. Other luma component values based on the distribution of luma component values of pixels in the frame are used in other embodiments. In some embodiments, the process 1200 determines luma values of the dark and bright pixels in the frame by determining average luma component values in the dark pixels and bright pixels in the frame in the same manner as described in FIG. 9 (i.e., operations 970 and 980, respectively).

Next, the process 1200 identifies (at 1220) a color cast in the frame. Some embodiments of the process 1200 identify the color cast of the frame by averaging the color values (e.g., hue, saturation, and luminance component values) of pixels that have saturation values that are below a predefined saturation threshold value. Different embodiments may define the threshold value differently. For instance, some embodiments define the saturation threshold value to correspond to a 50 percent saturation level. In these embodiments, pixel values that have saturation values that correspond to a 50 percent saturation level or less are included in the color values that are averaged by the process 900. Other embodiments may define other saturation threshold values as well in order to identify pixels with low saturation values. In addition, some embodiments assign a weight to the color values of the pixels that are below the saturation threshold. In some such embodiments, pixels that have a higher saturation value are assigned a lower weight and pixels that have a lower saturation value are assigned a higher weight. In this manner, higher saturation pixels affect the average color value less than lower saturation pixels.

Finally, the process determines (at 1230) the color balance operation for the media clip based on the identified luma values of dark and bright pixels and the identified color cast of the frame. In some embodiments, the process 1200 determines a set of transforms for adjusting the distribution of luma component values of pixels in the image. Some such embodiments determine the set of transforms for adjusting the black and white points of the frame in order to maximize image contrast (e.g., the distribution of luma component values of pixels in the frame occupy the widest available range of possible luma component values). In addition, the process 1200 determines another set of transforms for reducing the identified color cast of the frame in some embodiments. In some embodiments, the set of transforms for reducing the identified color cast of the frame include a set of transforms for increasing the complementary color of the color cast by an amount that is the same or similar to the amount of the color cast that affects the frame.

The numerous figures and examples above illustrate one technique that a color balancing tool of some embodiments might utilize to automatically balance the colors of an image in a media-editing application. The following will describe another technique that a color balancing tool of some embodiments might utilize to automatically balance the colors of an image in a media-editing application. Specifically, this other technique utilizes a luma-based approach to balance the colors of the image. In some embodiments, this other technique balances the colors of the image by equalizing the distribution of chroma component values of pixels in the image to reduce color casts in the image and by equalizing the distribution of luma component values of pixels in the image to adjust the contrast of the image.

Figure 13:
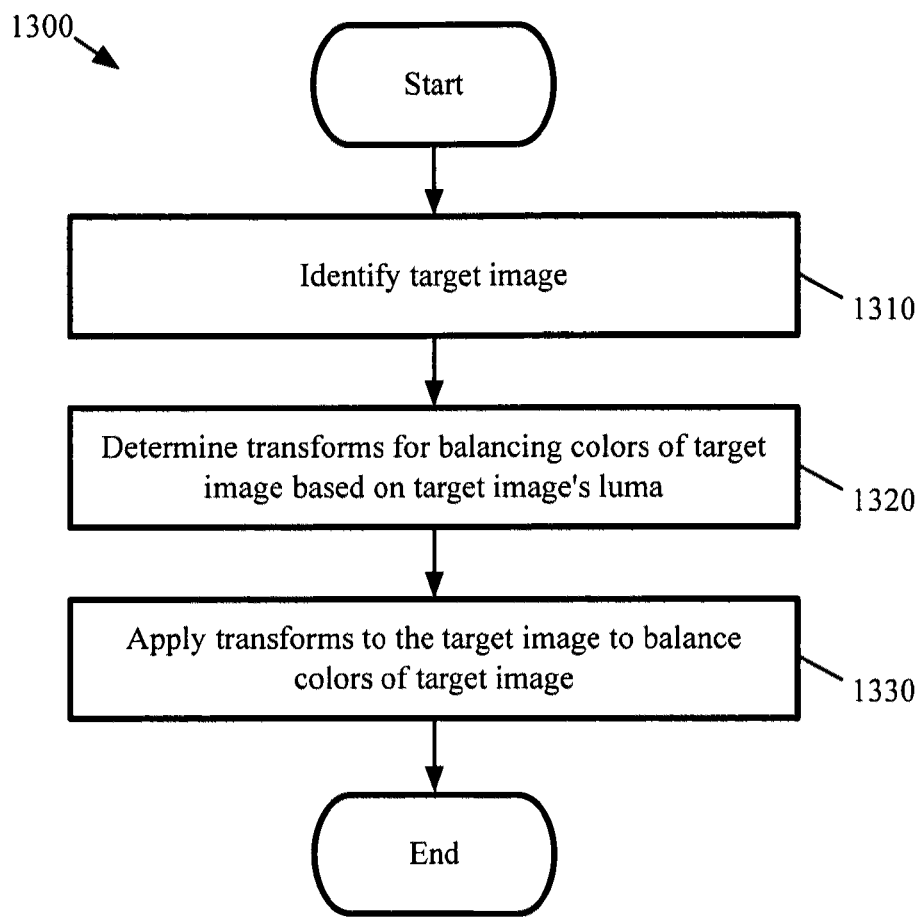
FIG. 13 conceptually illustrates a process of some embodiments for color balancing an image based on the image's luma.

FIG. 13 conceptually illustrates a process 1300 of some embodiments for balancing colors of an image based on the image's luma. In some embodiments, the process 1300 is performed by the color balancing tool when it performs a color balance operation.

As shown, the process 1300 begins by identifying (at 1310) an image to be color balanced, which is also referred to as a target image in this application. The target image may be a still image, an image (e.g., frame) from a video, or any other type of image. In some embodiments, the identified image is selected by a user through a GUI of an application (e.g., GUI 200) that provides the color balancing tool.

Figure 14:
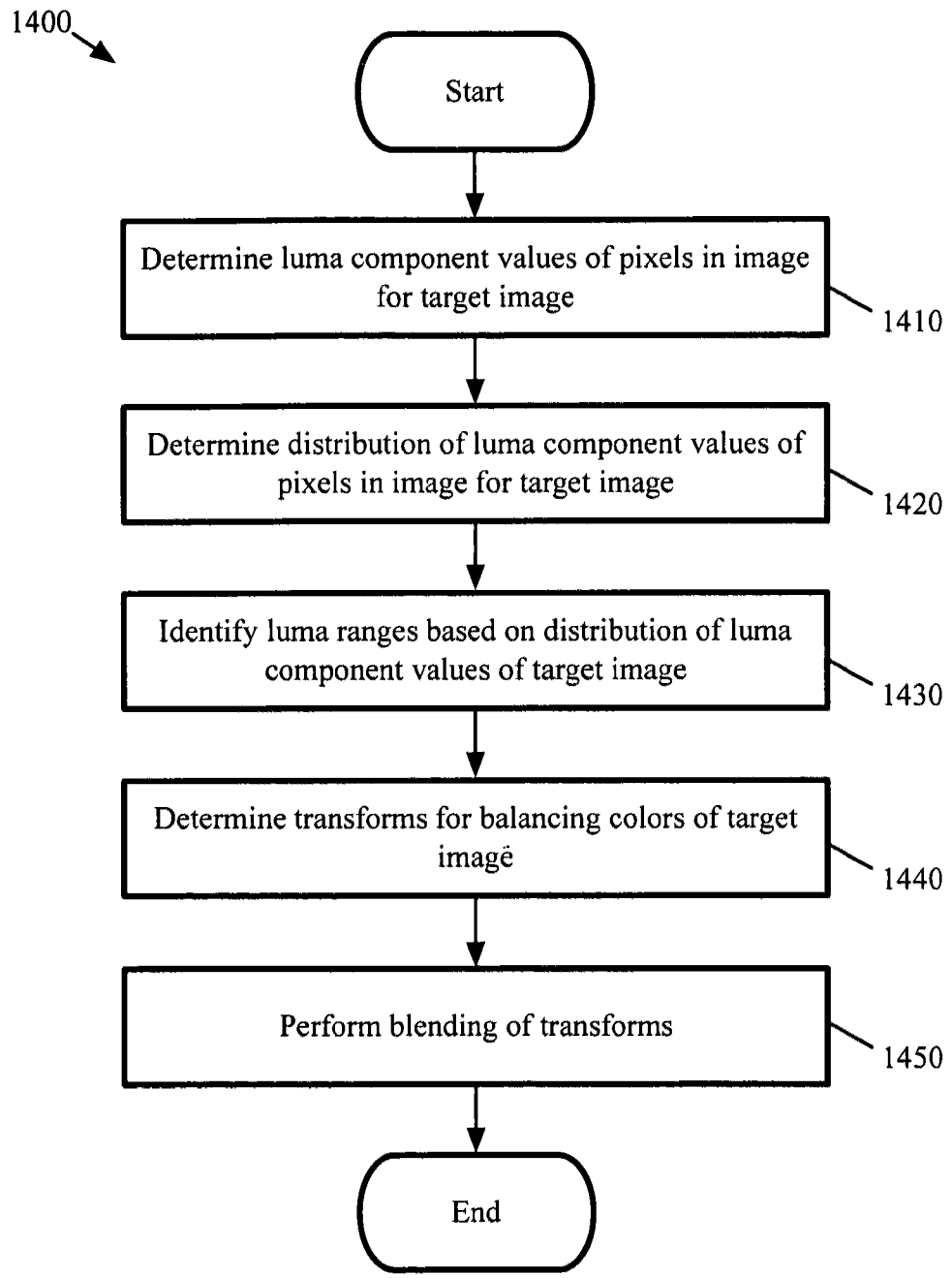
FIG. 14 conceptually illustrates a process of some embodiments for determining transforms for color balancing an image based on the image's luma.

After the target image is identified, the process 1300 then determines (at 1320) transforms for balancing the colors of the target image based on the target image's luma. In some embodiments, a set of transforms is determined for every luma level (e.g., luma component value) of an image while, in other embodiments, a set of transforms is determined for each of several luma ranges (e.g., ranges of luma levels). FIG. 14, as will be described in more detail below, conceptually illustrates a process of some embodiments for determining transforms for each of several luma ranges.

Figure 33:
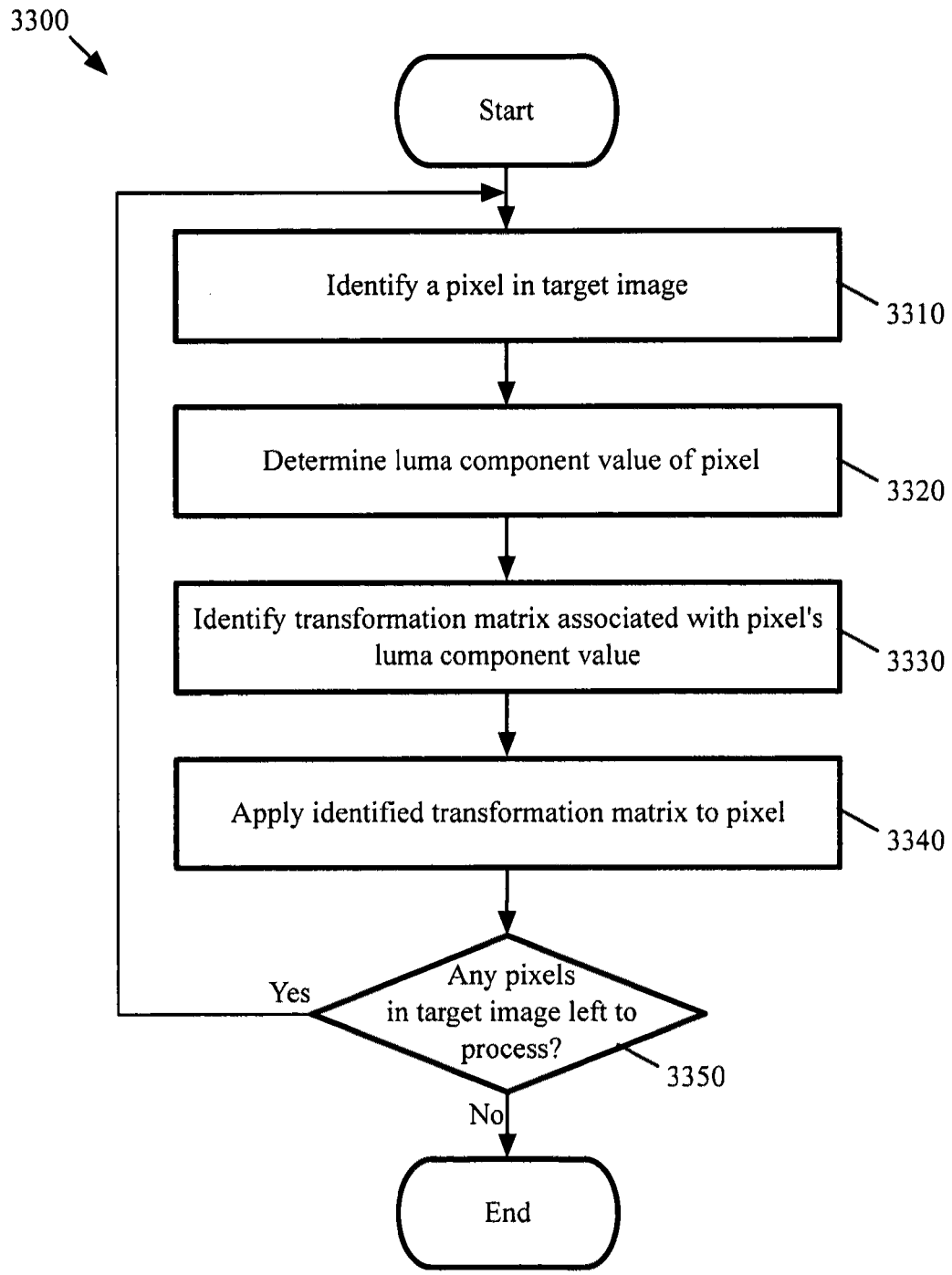
FIG. 33 conceptually illustrates a process of some embodiments for applying transforms to a target image.

Finally, the process 1300 applies (at 1330) the transforms to the target image to balance the colors of the target image. FIG. 33, which is described in further detail below, conceptually illustrates such a process for applying transforms to a target image. For each pixel in the target image, some embodiments apply a set of transforms to the pixel. After all the pixels in the target image are processed, the colors of the target image are balanced based on the target image's luma.

A. Determining Transforms

Some embodiments of a color balancing tool balance the colors of an image by determining transforms that modify the colors of an image in order to reduce color casts and adjust the contrast of the image. The transforms, in some embodiments, are mathematical operations that are applied to the pixel values of an image in order to modify the pixel values. For example, some embodiments, as described with respect to the process 1300, balance colors of a target image by determining a set of transforms for balancing the images' colors based on the images' luma. The following FIG. 14 conceptually illustrates a process 1400 of some embodiments for determining transforms for color balancing an image based on the image's luma. As noted above, the process 1400 is performed by the process 1300 of some embodiments (e.g., at the operation 1320).

The process 1400 begins by determining (at 1410) the luma component values of pixels in the target image. Different embodiments determine the luma component values of pixels in an image differently. For example, some such embodiments convert the target image to a color space that uses a luma component to represent pixels. A Y'CbCr color space is an example of such a color space. As mentioned above, in a Y'CbCr color space of some embodiments, the color and brightness of pixels in an image are represented using a luma component value, a blue-difference component value, and a red-difference component value. Some embodiments apply a transform to the pixels of the image based on the color space in which the image is defined in order to determine the pixels' luma component values.

Figure 15:
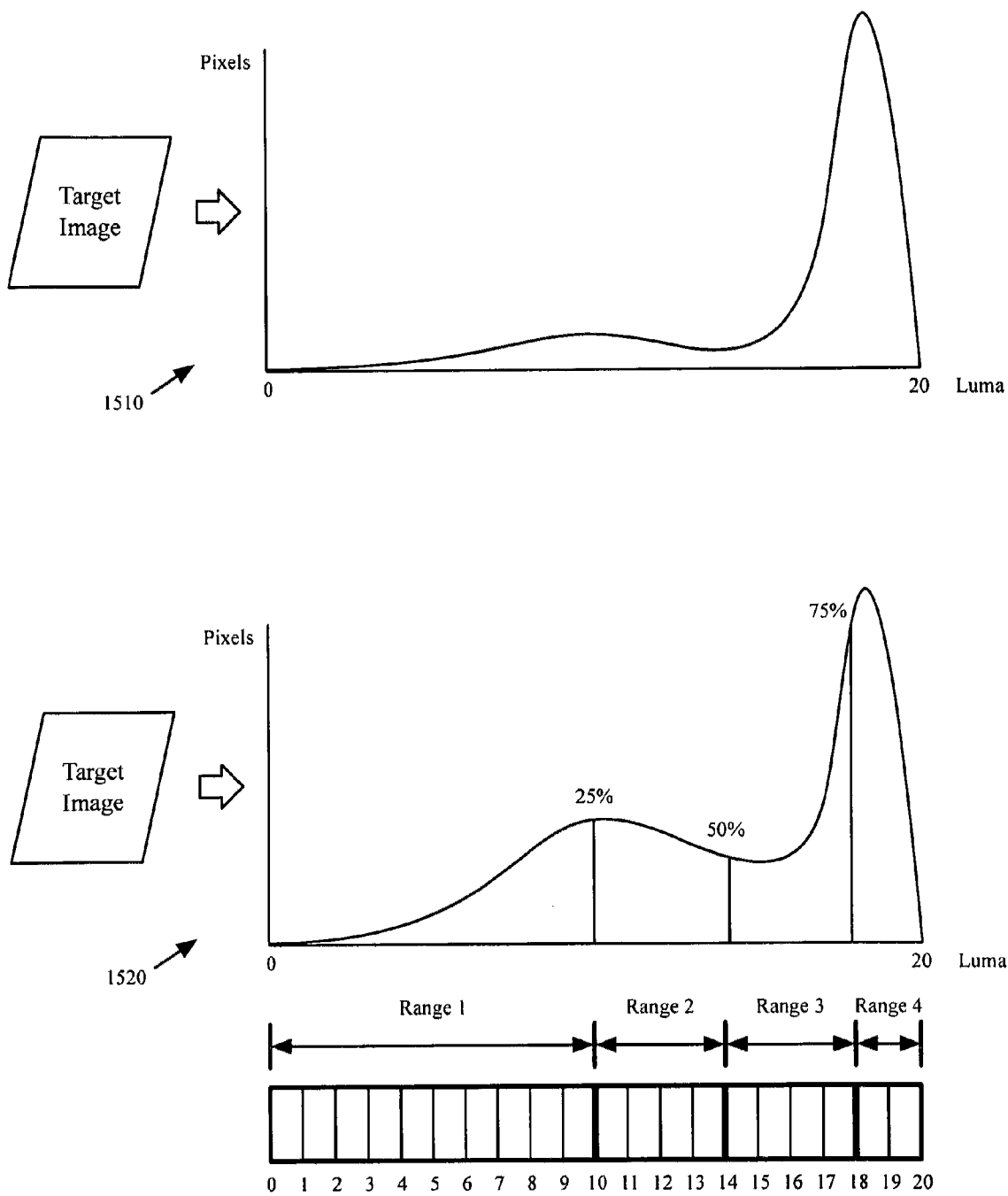
FIG. 15 illustrates histograms of example distributions of luma component values of pixels for a target image.

Next, the process 1400 determines (at 1420) the distribution of luma component values of pixels in the target image. FIG. 15 illustrates histogram 1510 of an example distribution of luma component values of pixels in a target image. As shown, the horizontal axis of the histogram 1510 represents different luma levels. In this example, the luma component value of the pixels in the target image can have twenty different levels of luma (i.e., 0-20). The left side of the histogram 1510 (i.e., the low luma levels) represents pixels in the target image that do not have any brightness or have a low amount of brightness (e.g., black pixels and dark pixels). The right side of the histogram 1510 (i.e., high luma levels) represents pixels in the target image that have a high amount of brightness or have a full amount of brightness (e.g., light pixels and pure white pixels). The middle of the histogram 1510 represents pixels that have a medium amount of brightness (e.g., medium gray pixels) Different embodiments define the luma component to represent a different number of luma levels. For example, the luma component of some embodiments can be defined to represent 256 different luma levels (e.g., 0-255). The luma component can be defined to represent any number of luma levels in other embodiments. The vertical axis of the histogram 1510 represents the number of pixels in the target image that have a particular luma component value.

Some embodiments apply luma compression to a luma histogram in order to decrease the range of the distribution in the luma histogram. Different embodiments perform luma compression differently. Some embodiments perform luma compression through exponentiation using the following equation:

$$\text{luma}_{comp} = \text{luma}_{orig}^{t}$$

where $\text{luma}_{orig}$ is the original distribution of pixels for a particular luma value in the luma histogram, t is a compression factor value ranging from 0 to 1, and the $\text{luma}_{comp}$ is the compressed distribution of pixels for the particular luma value in the luma histogram. Different embodiments define different compression factors to control the amount of compression (the amount of compression decreases as the value of t increases). For example, some embodiments define a compression factor of 0.18 when applying the luma compression. Other embodiments may use other techniques to compress the distribution of the luma histogram in order to decrease the range of the distribution in the luma histogram.

Histogram 1520 in FIG. 15 illustrates an example of luma compressed luma component values. In particular, the histogram 1520 is a distribution of luma component values of pixels in the target image illustrated in the histogram 1510 after luma compression has been applied to the luma component values. As shown by the distribution curve of the histogram 1520, the target image has a number of dark (e.g., low brightness) pixels and a larger number of bright pixels. Specifically, approximately 25 percent of the pixels have a luma component value of between 0-10, 25 percent of the pixels have a luma component value between 10-14, 25 percent of the pixels have a luma component value between 14-18, and 25 percent of the pixels have a luma component value between 18-20, as shown by the indicated percentiles.

Figure 16:
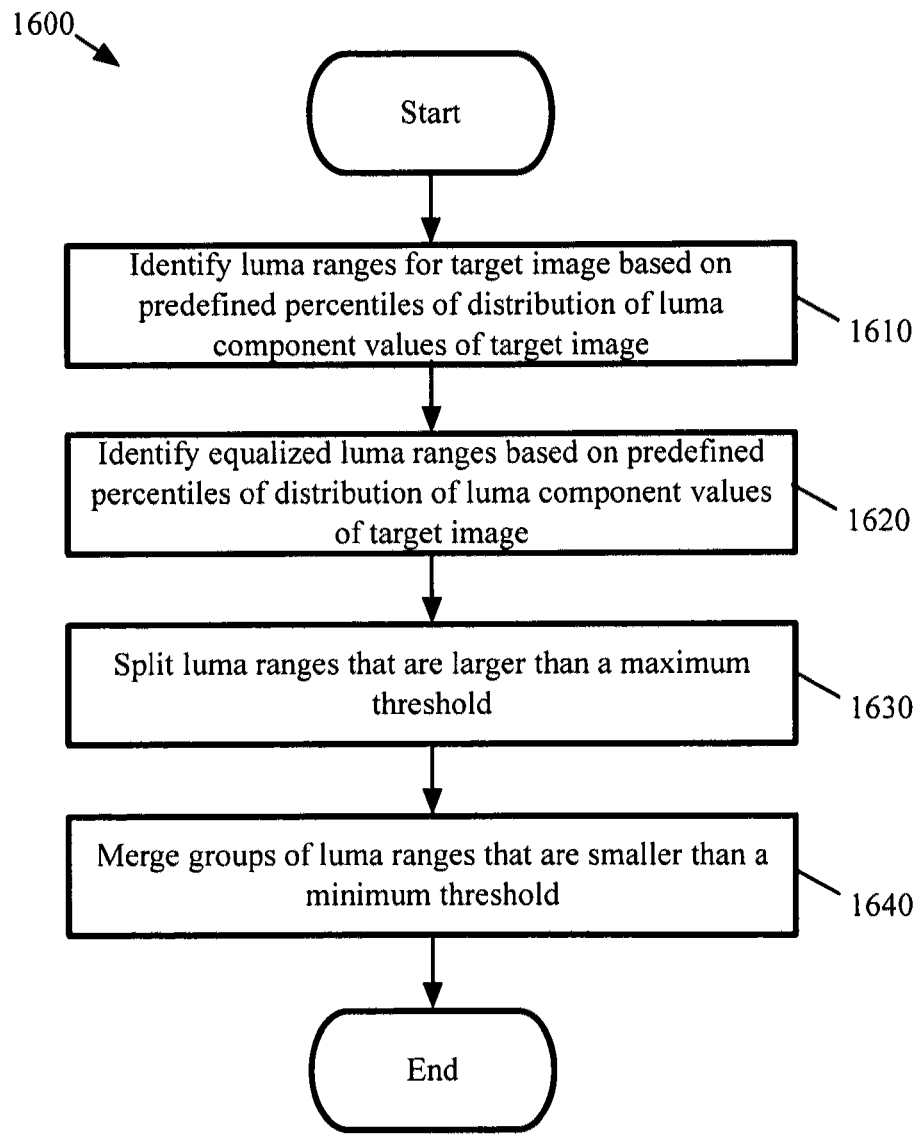
FIG. 16 conceptually illustrates a process of some embodiments for identifying luma ranges for a target image.

Returning to FIG. 14, the process 1400 identifies (at 1430) luma ranges for the target image based on the distribution of the luma component values of the target image. The luma ranges of an image are identified, in some embodiments, based on percentiles (e.g., 25 percent, 50 percent, and 75 percent or 20 percent, 40 percent, 60 percent, and 80 percent) of the distribution of luma component values of pixels in the image. FIG. 16, which is described in further detail below, conceptually illustrates an example of such a process of some embodiments.

Referring again to FIG. 15, the identified luma ranges of the target image based on the distribution of luma component values of the target image are illustrated in this figure. As shown, the luma ranges identified for the target image are based on the 25 percent, 50 percent, and 75 percent percentiles of the distribution of luma component values of the target image. Thus, each luma range represents the luma range of 25 percent of the pixels in the image.

Figure 20:
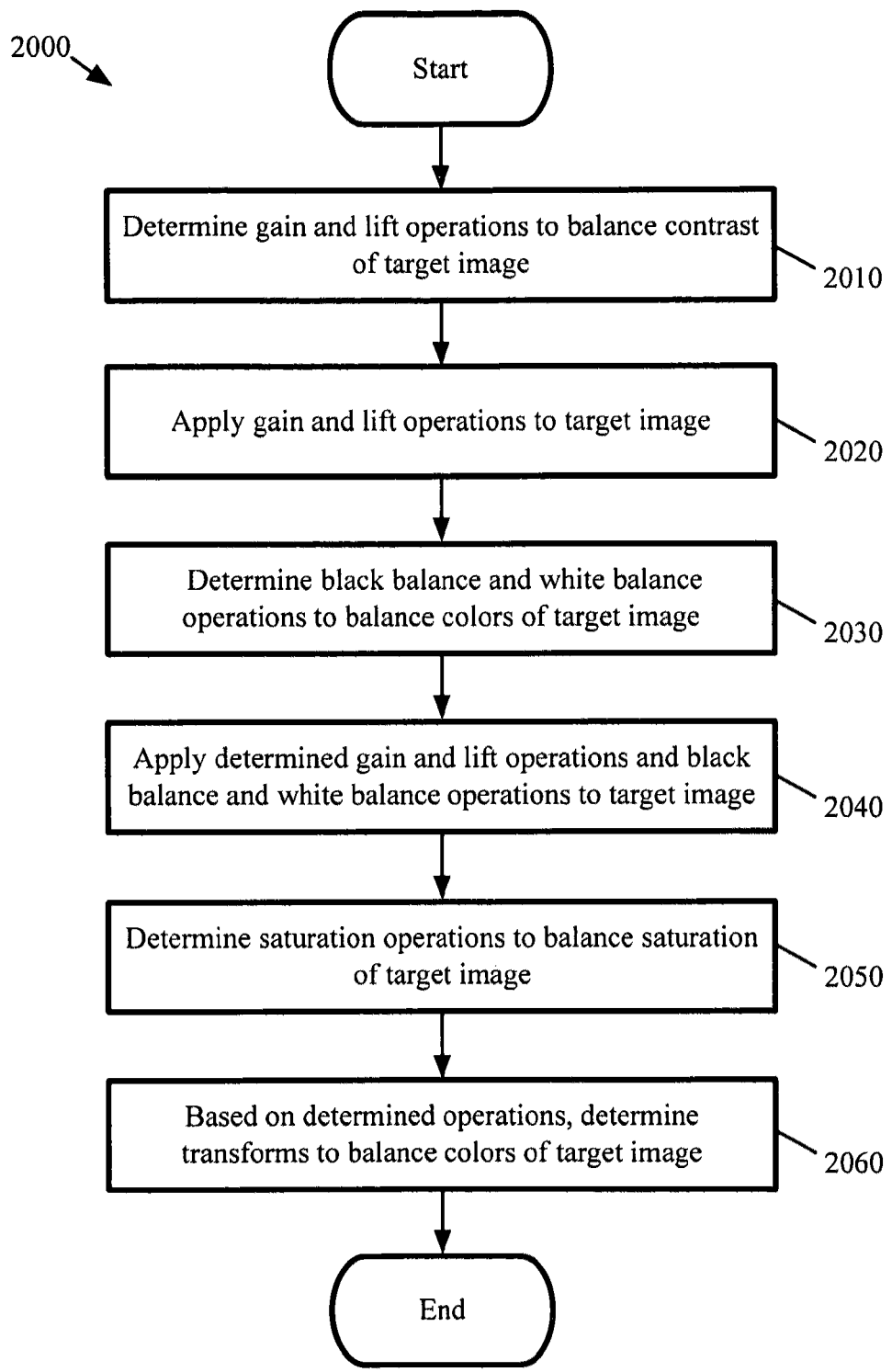
FIG. 20 conceptually illustrates a process of some embodiments for determining transforms for balancing colors of an image.

The process 1400 then determines (at 1440) transforms for balancing colors of the target image. In some embodiments, a set of transforms is determined for each identified luma range of the target image. Each set of transforms is for balancing the colors of pixels in the target image that have luma component values within the luma range of the target image. FIG. 20, which will be described in more detail below, conceptually illustrates a process of some embodiments for determining transforms for balancing colors of the target image. Referring to FIG. 15 as an example, a set of transforms determined for the first luma range of the target image is for balancing the colors of the pixels in the target image that have luma component values within the first luma range of the target image (i.e., 0-9).

Finally, the process 1400 performs (at 1450) a blending operation on the determined transforms. As described with respect to the process 1300, some embodiments determine a set of transforms for each of the luma ranges of the target image. As such, sharp transitions may exist among transforms of luma levels near the border of luma ranges. Referring again to FIG. 15 as an example, a sharp transition may exist between the transform of last luma level (luma level 9) in the first luma range and the first luma level (luma level 10) in the second luma range. Thus, some embodiments blend the set of transforms in order to reduce or eliminate these sharp transitions. For instance, some embodiments employ a neighbor-averaging technique, such as the one described in further detail below by reference to FIG. 31, to blend transforms. Other blending techniques are possible in other embodiments.

i. Identifying Luma Ranges

As noted above, some embodiments determine transforms for each luma range of several luma ranges of a target image. Different embodiments may identify these luma ranges of the target image differently. For instance, some embodiments identify luma ranges for the target image based on the distribution of the luma component values of the target image and determine a set of corresponding equalized luma ranges.

FIG. 16 conceptually illustrates a process 1600 of some embodiments for identifying luma ranges for the target image and identifying equalized luma ranges that are used to balance the target image. As mentioned above, the process 1600 is performed by the process 1400 of some embodiments (e.g., at the operation 1430). The process 1600 will be described by reference to FIG. 17, which illustrates different stages 1710-1730 of an example of identifying luma ranges according to some embodiments of the invention.

Figure 17:
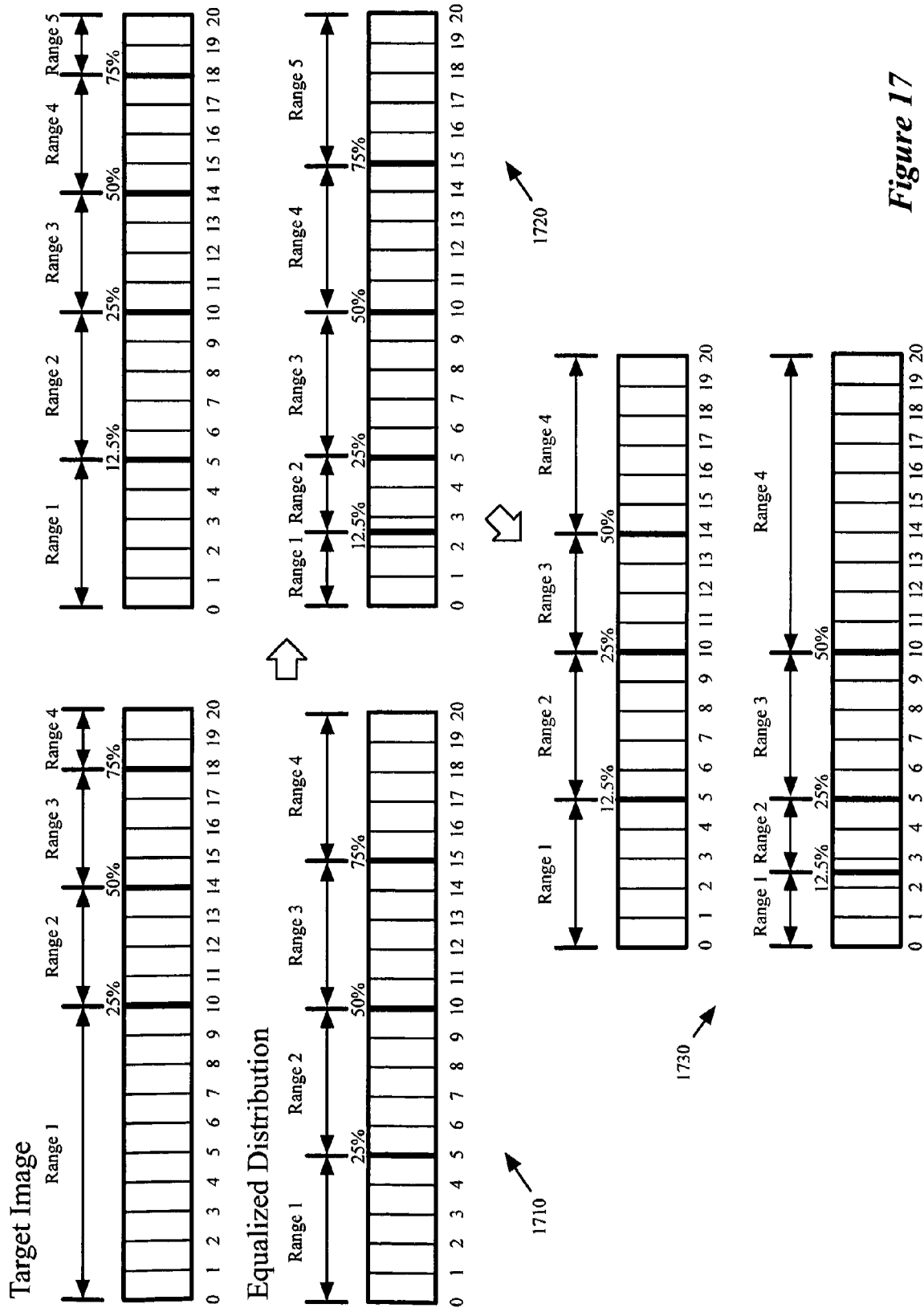
FIG. 17 illustrates the luma ranges illustrated in FIG. 15 after a split operation and a merge operation have been performed according to some embodiments of the invention.

The process 1600 starts by identifying (at 1610) luma ranges for the target image based on predefined (e.g., default) percentiles of the distribution of luma component values of target image. Different embodiments define different numbers of different percentiles of distribution. For instance, quartile distributions are predefined as the percentiles of distribution in some embodiments. Any number of quantiles (e.g., tertiles, quintiles, sextiles, etc.) can be predefined as the percentiles of distribution in other embodiments. As shown, the first stage 1710 of FIG. 17 illustrates luma ranges of the target image that are identified based on quartiles of the distribution of luma component values of the target image that is illustrated in FIG. 15.

Next, the process 1600 identifies (at 1620) a set of equalized luma ranges based on the predefined percentiles of the distribution of luma component values of the target image. In some embodiments, the set of equalized luma ranges has the same number of luma ranges as the identified luma ranges of the target image, and each luma range in the set of equalized luma ranges has the same number of luma levels. The set of equalized luma ranges represents an equal distribution of luma levels across luma ranges, which can be used as a reference luma distribution to which the luma distribution of the target image maps. In some embodiments, this technique is the same as or similar to histogram equalization. Referring to FIG. 17, the first stage 1710 shows equalized luma ranges that are identified based on quartiles of the distribution of luma component values of the target image that is illustrated in FIG. 15. Since four luma ranges are identified for the example target image illustrated in FIGS. 15 and 17, the equalized luma distribution for this example includes four equalized luma ranges.

Figure 18:
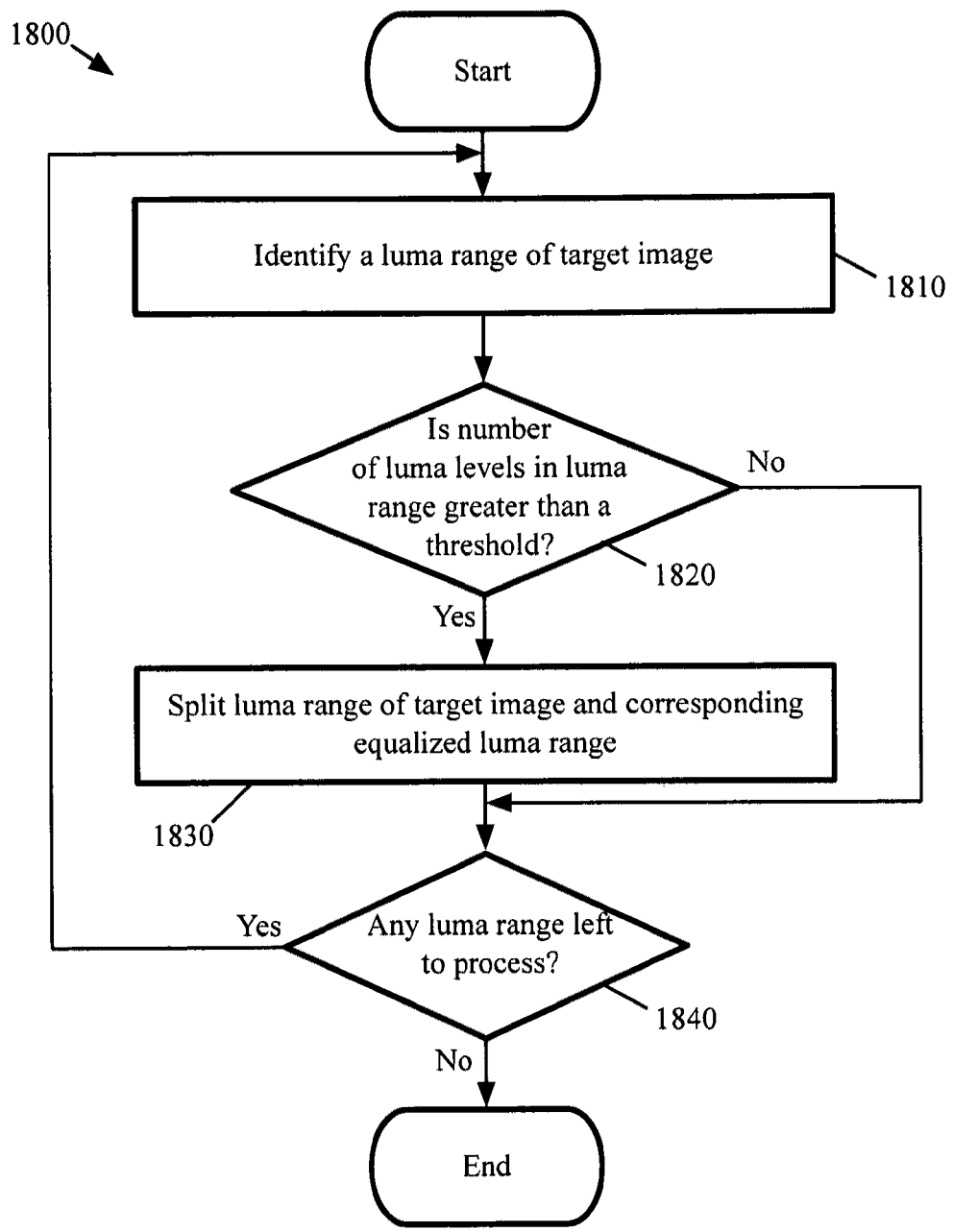
FIG. 18 conceptually illustrates a process of some embodiments for splitting luma ranges.

The process 1600 then splits (at 1630) groups of luma ranges that are larger than a maximum threshold. Some embodiments examine the luma ranges of the target image to determine whether to perform a split operation. FIG. 18, which is described in more detail below, illustrates a process that examines luma ranges of the target image to determine whether to perform a split operation.

Different embodiments define a maximum threshold differently. For instance, some embodiments define the threshold in terms of an amount of luma levels (e.g., five luma levels, ten luma levels, etc.) while other embodiments define the threshold in terms of a percentage (e.g., 30 percent, 40 percent, 50 percent, etc.) of all possible luma levels. Other ways of defining the threshold are possible.

Referring to FIG. 17, the second stage 1720 shows the luma ranges illustrated in the first stage 1710 after operation 1630 has been performed. For this example, a percentage threshold of 40 percent is defined as the threshold used to determine whether to perform a split operation. That is, a split operation is performed on a luma range of the target image and its corresponding luma range of the equalized luma distribution when the number of luma levels in the luma range of the target image is greater than eight.

As shown in second stage 1720, since the number of luma levels in first luma range of the target image is greater than eight (i.e., ten), the first luma range of the target image and the equalized luma distribution in the first stage 1710 are each split into two equal ranges. Specifically, the first luma range of luma levels 0-10 of the target image is split into a luma range of luma levels 0-5 and a luma range of luma levels 5-10. The corresponding first luma range of luma levels 0-5 of the equalized luma distribution is split into a luma range of luma levels 0-2.5 and a luma range of luma levels 2.5-5. A split operation is not performed on any of the other luma ranges (i.e., the second, third, and fourth luma ranges of the target image and the equalized luma distribution) because none of other luma ranges of the target image have a number of luma levels that is greater than eight.

Figure 19:
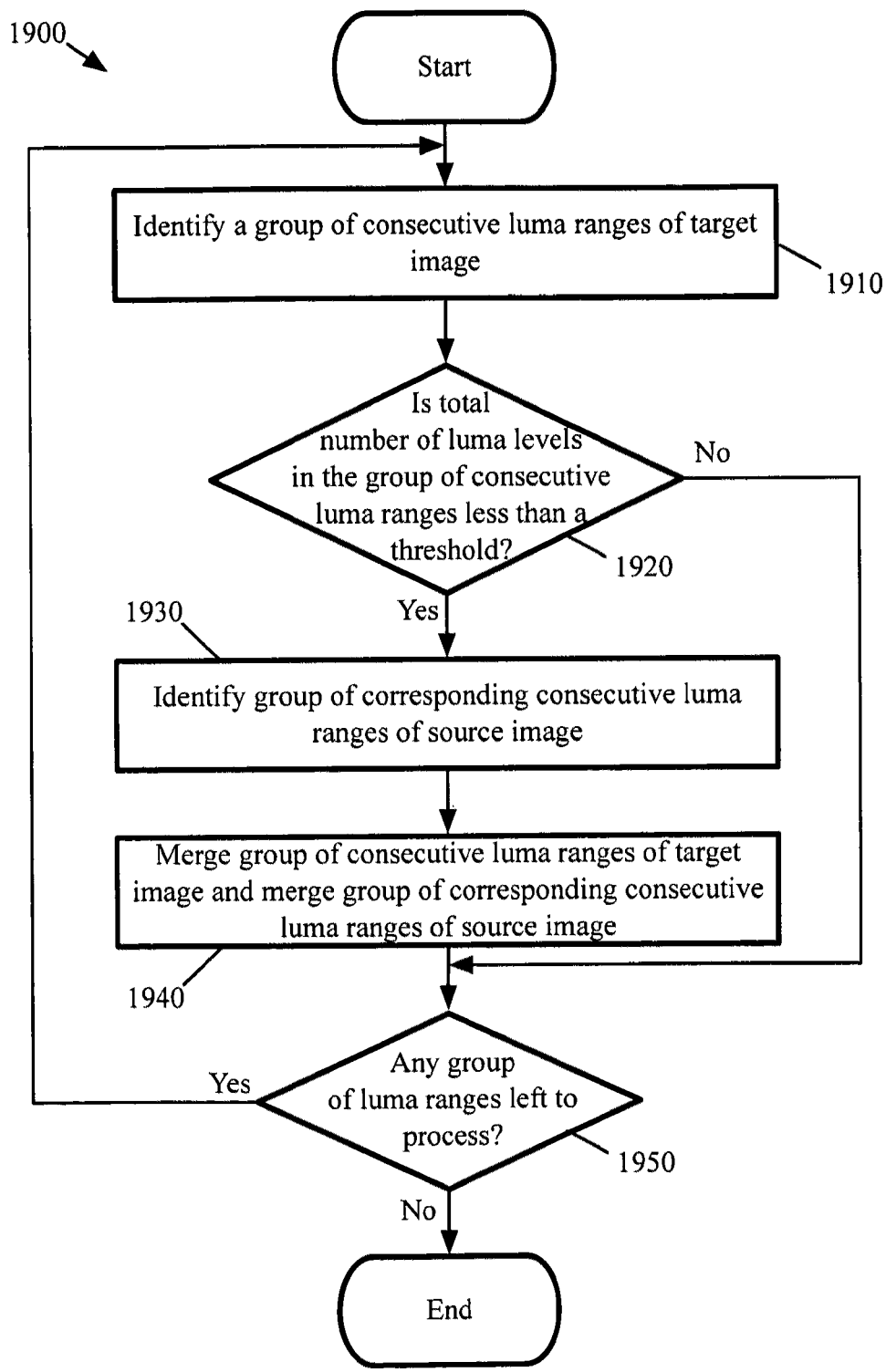
FIG. 19 conceptually illustrates a process of some embodiments for merging luma ranges.

After splitting luma ranges, the process 1600 then merges (at 1640) groups of consecutive luma ranges that are smaller than a minimum threshold. The luma ranges of the target image are examined to determine whether to perform a merge operation in some embodiments. FIG. 19, which is described in further detail below, illustrates a process that examines luma ranges of the target image to determine whether to perform a merge operation.

Different embodiments define a minimum threshold differently. For example, some embodiments define the threshold in terms of an amount of luma levels (e.g., five luma levels, ten luma levels, etc.) whereas other embodiments define the threshold in terms of a percentage (e.g., 30 percent, 40 percent, 50 percent, etc.) of all possible luma levels. Other ways of defining the threshold are possible as well.

Referring back to FIG. 17, the third stage 1730 illustrates the luma ranges illustrated in the second stage 1720 after operation 1640 has been performed. In this example, a percentage threshold of 35 percent is defined as the threshold used to determine whether to perform a merge operation. Thus, a merge operation is performed on a group of consecutive luma ranges of the target image and its corresponding luma range of the equalized luma distribution when the total number of luma levels in the group of consecutive luma ranges of the target image is less than seven.

As illustrated in the third stage 1730, the first and second luma ranges are not merged because the total number of luma levels of first and second luma ranges of the target image is greater than or equal to seven (i.e., ten). Similarly, the second and third luma ranges of the target image and the third and fourth luma ranges of the target image are not merged. However, the fourth and fifth luma ranges of the target image are merged because the total number of luma levels of fourth and fifth luma ranges of the target image is less than seven (i.e., six). The third stage 1730 illustrates that the fourth luma range of luma levels 14-18 and the fifth luma range of luma levels 18-20 of the target image have been merged into a single luma range of luma levels 14-20. The corresponding fourth luma range of luma levels 10-14 of the equalized luma distribution has been merged with the fifth luma range of luma levels 14-20 of the equalized luma distribution to create a single luma range of luma levels 10-20.

After merging groups of consecutive luma ranges, the process 1600 ends. As shown in FIG. 16, the merging operation is performed after the splitting operation. However, in some embodiments, the merging operation creates luma ranges that would otherwise have been split in the splitting operation (e.g., the number of luma levels of the merged luma range is larger than the maximum threshold). Thus, in some such embodiments, the process 1600 performs the merge operation before the split operation. However, the splitting operation may create luma ranges that would otherwise have been merged in the merging operation (e.g., the number of luma levels of the split luma ranges is less than the minimum threshold). Therefore, the process 1600 of some embodiments repeats operations 1630 and 1640 until the luma ranges are no longer split or merged. In other embodiments, the process 1600 repeats operations 1630 and 1640 a defined number of times.

FIG. 18 conceptually illustrates a process 1800 of some embodiments for splitting luma ranges. As mentioned above, the process 1800 is performed by the process 1600 of some embodiments (e.g., at the operation 1630). The process 1800 begins by identifying (at 1810) a luma range of the target image.

The process 1800 then determines (at 1820) whether the number of luma levels in the luma range of the target image is greater than a threshold. As described above, some embodiments define the threshold in terms of an amount of luma levels while other embodiments define the threshold in terms of a percentage of all possible luma levels. Some embodiments define multiple different types of thresholds (e.g., a threshold of an amount of luma levels and a threshold of a percentage of all possible luma levels) as well.

When the process 1800 determines that the number of luma levels in the luma range of the target image is greater than the threshold, the process 1800 splits (at 1830) the luma range of the target image and the corresponding equalized luma range. In some embodiments, the process 1800 splits the luma ranges into a set (e.g., two, three, five, etc.) of luma ranges that each has the same number of luma levels. For example, some embodiments split the luma range of the target image into a set of luma ranges such that each luma range in the set of luma ranges includes the same distribution of luma component values, and split the corresponding equalized luma range into a set of luma ranges in a similar fashion. In other embodiments, the process 1800 splits the luma ranges into a set of luma ranges that have different numbers of luma levels.

When the process 1800 determines that the number of luma levels in the luma range of the target image is not greater than the threshold, the process 1800 then determines (at 1840) whether any luma range of the target image is left to process. When the process 1800 determines that there is a luma range of the target image to process, the process 1800 returns to the operation 1810 to process any remaining luma ranges of the target image. Otherwise, the process 1800 ends.

FIG. 19 conceptually illustrates a process 1900 of some embodiments for merging groups of consecutive luma ranges. As mentioned above, the process 1900 is performed by the process 1600 of some embodiments (e.g., at the operation 1640). The process 1900 begins by identifying (at 1910) a group (two in this example) of consecutive luma ranges of the target image. For instance, referring to FIG. 17, the first and second luma ranges of the target image are a group of consecutive luma ranges, the second and third luma ranges of the target image are a group of consecutive luma ranges, the third and fourth luma ranges of the target image are a group of consecutive luma ranges, and the fourth and fifth luma ranges of the target image are a group of consecutive luma ranges.

The process 1900 then determines (at 1920) whether the total number of luma levels included in the group of consecutive luma ranges is less than a threshold. As mentioned above, some embodiments define the threshold in terms of an amount of luma levels while other embodiments define the threshold in terms of a percentage of all possible luma levels. Some embodiments define multiple different types of thresholds (e.g., a threshold of an amount of luma levels and a percentage threshold of all possible luma levels) as well.

When the process 1900 determines that the total number of luma levels in the group of consecutive luma ranges of the target image is not less than the threshold, the process 1900 proceeds to operation 1950. When the process 1900 determines that the number of luma levels in the group of consecutive luma ranges of the target image is less than the threshold, the process 1900 identifies (at 1930) the group of corresponding consecutive luma ranges of the equalized luma distribution.

Next, the process 1900 merges (at 1940) the group of consecutive luma ranges of the target image into a single luma range and merges the group of corresponding consecutive luma ranges of the equalized luma distribution into a single luma range.

At 1950, the process 1900 determines whether any group of consecutive luma ranges of the target image is left to process. When the process 1900 determines that there is a group of consecutive luma ranges of the target image to process, the process 1900 returns to the operation 1910 to process the remaining groups of consecutive luma ranges of the target image. When the process 1900 determines that there is not a group of consecutive luma ranges of the target image left to process, the process 1900 ends.

ii. Operations for Determining Color Balancing Transforms

After identifying the luma ranges of the target image and the corresponding luma ranges of the equalized luma distribution, some embodiments determine transforms for modifying colors of the target image in order to balance the colors of the target image (e.g., by reducing color casts and adjusting the contrast of the target image). As described below, some of these embodiments determine the transforms for the luma ranges on a luma-range-by-luma-range basis. FIG. 20 conceptually illustrates a process 2000 of some embodiments for determining transforms to modify the colors of the target image in order to balance the colors of the target image. In some embodiments, the process 2000 is performed by the process 1400 (e.g., at the operation 1440), as described above.

The process 2000 starts by determining (at 2010) gain and lift operations to balance the contrast of the target image. Some embodiments of the process 2000 determines gain and lift operations to match the contrast of the target image to the contrast of a reference luma distribution (e.g., an equalized luma distribution). In some embodiments, a lift operation uniformly lightens or darkens (e.g., increases or decreases luma) an image by adjusting shadows, midtones, and highlights by the same amount. A gain operation, in some embodiments, adjusts contrast by raising or lowering the white point (e.g., the point at which solid white occurs) of an image while leaving the black point (e.g., the point at which solid black occurs) pinned in place, and scaling the midtones between the new white point and the black point.

Figure 24:
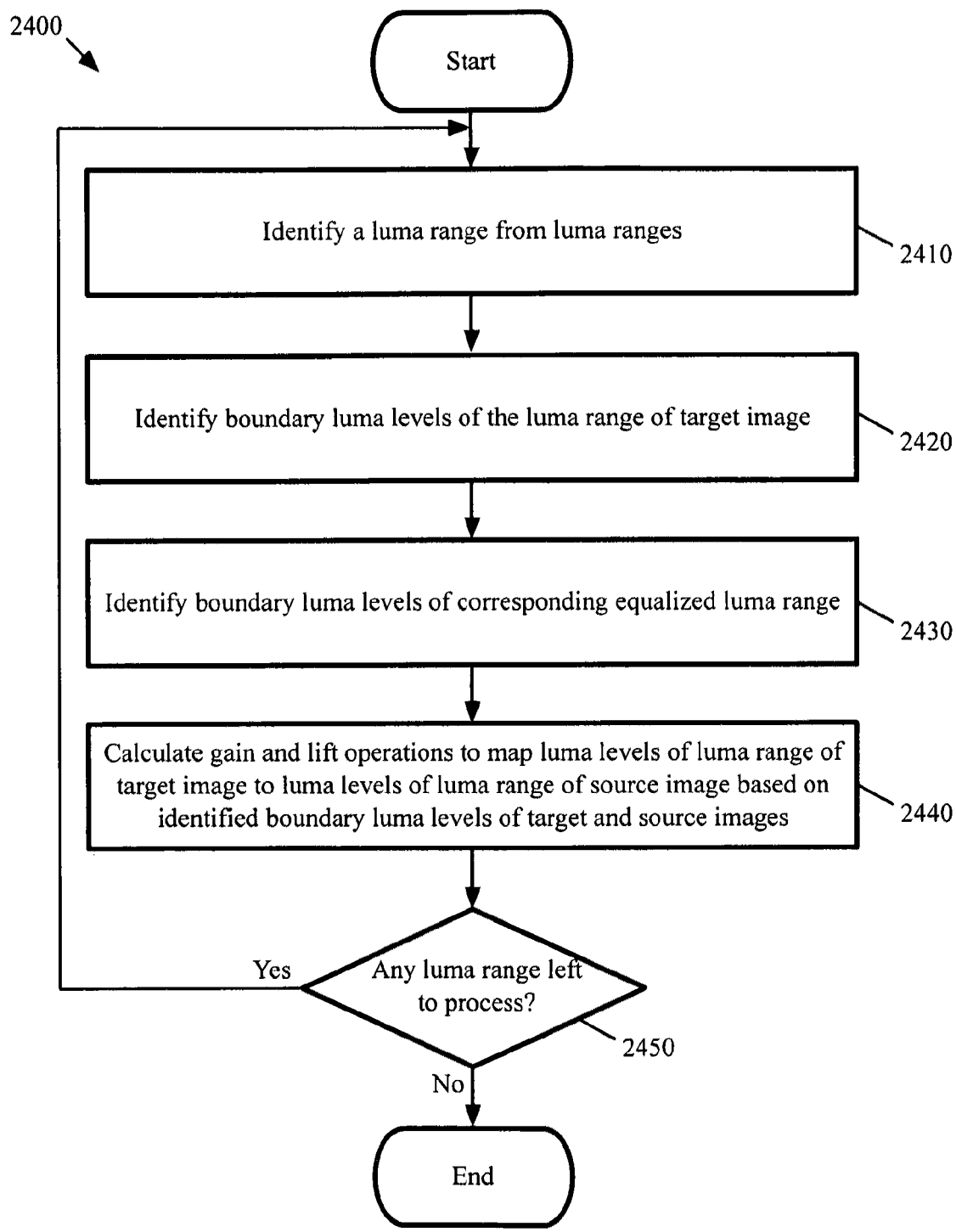
FIG. 24 conceptually illustrates a process of some embodiments for determining gain and lift operations.

In some embodiments, gain and lift operations map luma levels of the target image to luma levels of the set of equalized luma ranges in order to match the contrast of the target image to the contrast of the reference luma distribution. FIG. 24, which will be described in more detail below, illustrates a process of some embodiments for determining such gain and lift operations. The gain and lift operations of some embodiments are represented by a transformation matrix.

Next, the process 2000 applies (at 2020) the determined gain and lift operations to the target image (or a copy of the target image). By applying the gain and lift operations to the target image, the contrast of the target image and the contrast of the reference luma distribution are matched. The gain and lift operations of some embodiments match the contrast of the target image to the contrast of the set of equalized luma ranges by mapping luma levels of the target image to luma levels of the set of equalized luma ranges in order to match the distribution of the luma of pixels in the target image to the reference luma distribution. In other words, each of the luma ranges of the target image has the same range of luma levels as the corresponding luma range of the reference luma distribution after such gain and lift operations have been applied to the target image. As noted above, some embodiments use a transformation matrix to represent the gain and lift operations. In such embodiments, the gain and lift operations are applied to the target image by applying the transformation matrix to the target image.

Figure 21:
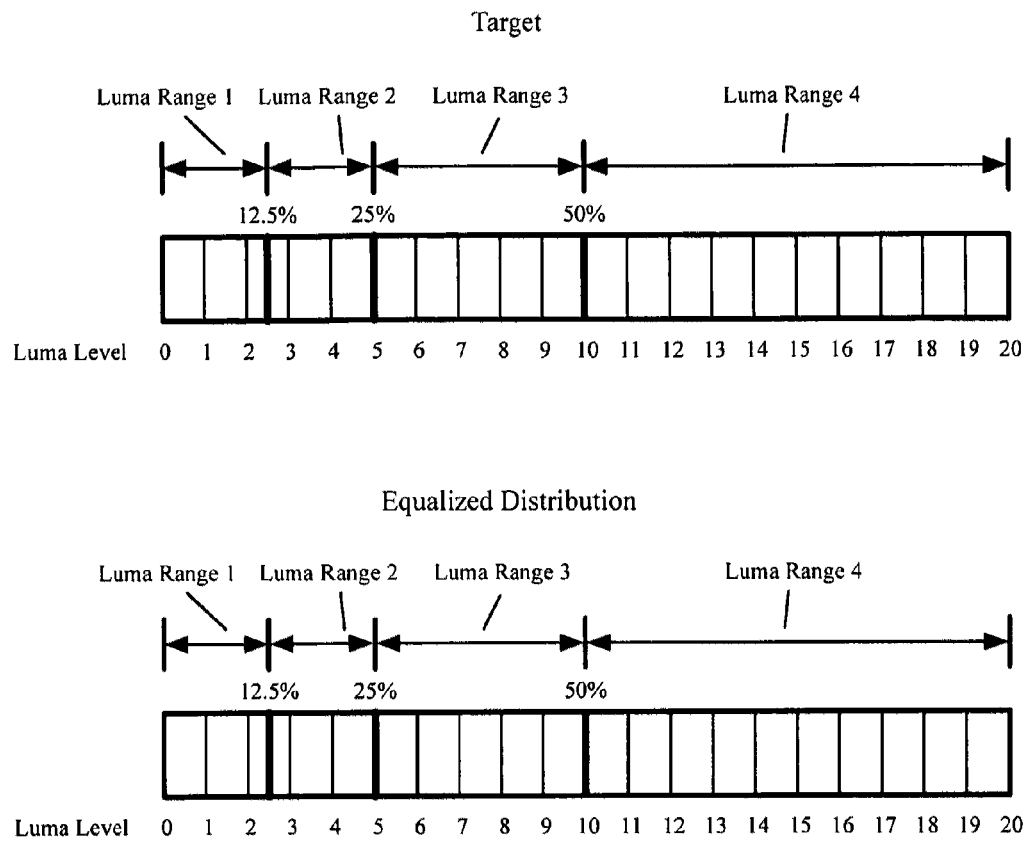
FIG. 21 conceptually illustrates the luma ranges illustrated in FIG. 17 after gain and lift operations have been applied to an image according to some embodiments of the invention.

FIG. 21 conceptually illustrates the luma ranges of the target image and the equalized luma distribution illustrated in FIG. 17 after gain and lift operations have been applied to the target image. As shown, the distribution of the luma of pixels in the target image matches the distribution of the equalized luma distribution. That is, 12.5 percent of the pixels in the target image have luma component values of 0-2.5, 12.5 percent of the pixels in the target image have luma component values of 2.5-5, 25 percent of the pixels in the target image have luma component values of 5-10, and 50 percent of the pixels in the target image have luma component values of 10-20.

The process 2000 then determines (at 2030) black balance and white balance operations to balance the colors of the target image (to which the determined gain and lift operations have been applied at operation 2020). In some embodiments, the white balance operation modifies the average color (e.g., chrominance in a Y'CbCr color space) of pixels in the target image that have luma component values equal to the top of a luma range towards a defined color (e.g., a neutral color). In such embodiments, the black balance operation matches the average color (e.g., chrominance in a Y'CbCr color space) of pixels in the target image that have luma component values equal to the bottom of a luma range towards a defined color (e.g., a neutral color). Further, the process illustrated in FIG. 25, which will be described in further detail below, is used to determine black balance and white balance operations in some embodiments. The black balance and white balance operations of some embodiments are represented by a transformation matrix.

Next, the process 2000 applies (at 2040) the determined gain and lift operations and the determined black balance and white balance operations to the original target image (or a copy of the original target image). In some embodiments, the process 2000 applies just the determined black balance and white balance operations to the target image (or a version of the target image) used to determine the black balance and white balance operations since the determined gain and lift operations are already applied to that target image. As mentioned above, some embodiments use a transformation matrix to represent the black balance and white balance operations. The black balance and white balance operations are applied to the target image by applying the transformation matrix to the target image, in such embodiments.

Figure 29:
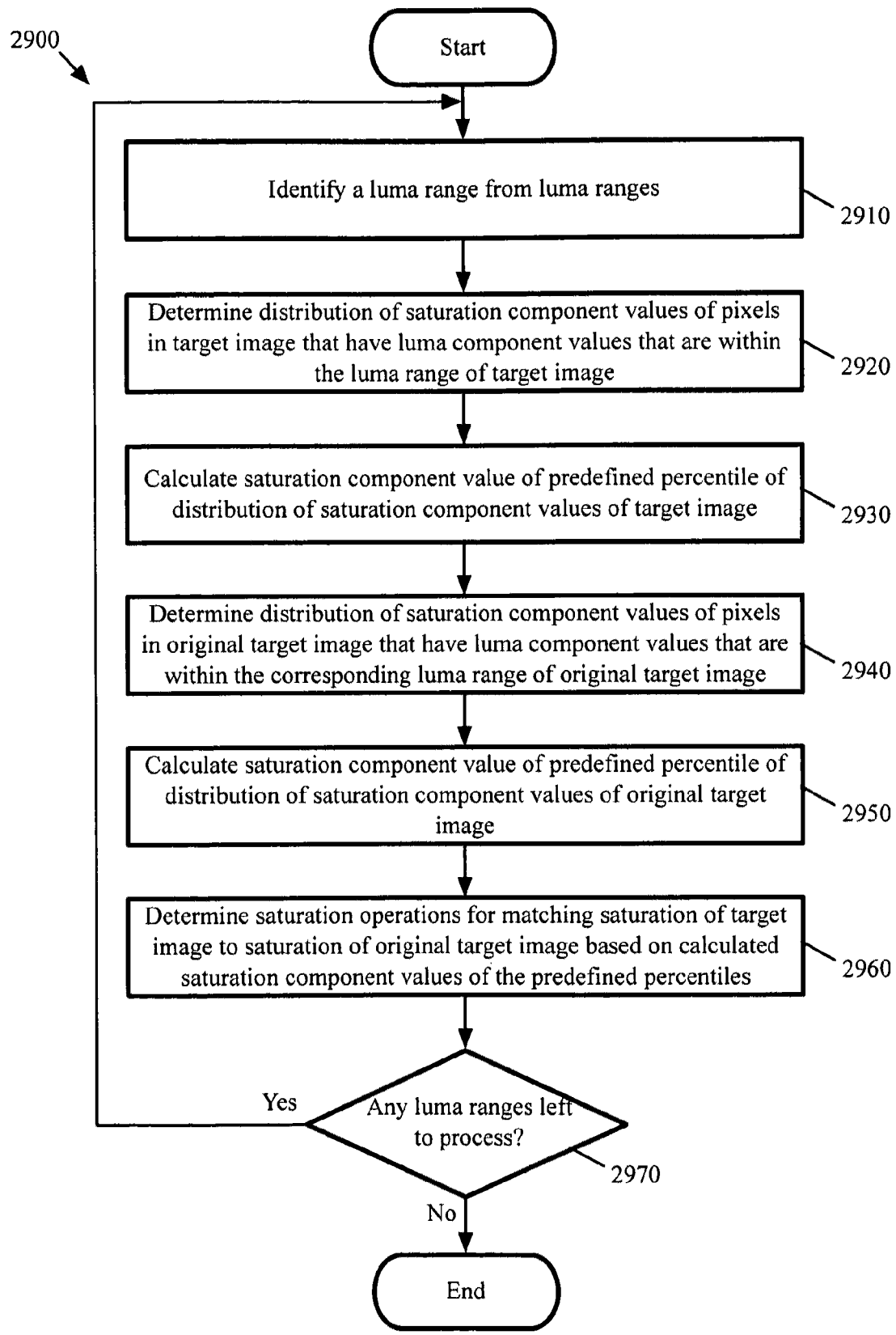
FIG. 29 conceptually illustrates a process of some embodiments for determining saturation operations.

At 2050, the process 2000 determines saturation operations to balance the saturation of the target image. For instance, the process 2000 of some embodiments determines saturation operations to balance the saturation of the target image (to which the determined gain and lift operations and the determined black balance and white balance operations have been applied) to the saturation of the original target image. In some embodiments, the saturation is the intensity of a specific color. In some embodiments, saturation is the colorfulness of a specific color relative to its own brightness. The saturation operations of some embodiments match the saturation level at a percentile of the distribution of saturation levels of pixels in the target image (to which the determined gain and lift operations and the determined black balance and white balance operations have been applied) to the saturation level at the corresponding percentile of the distribution of saturation levels of pixels in the original target image. FIG. 29, which will be described in more detail below, illustrates a process of some embodiments for determining such saturation operations.

Finally, the process 2000 determines (at 2060) transforms to balance colors of target image based on the determined gain and lift operations, black balance and white balance operations, and saturation operation. As mentioned above, some embodiments determine a set of transforms for each luma range of the target image. In this fashion, the colors of the target image are balanced on a luma range-by-luma range basis.

Figure 22:
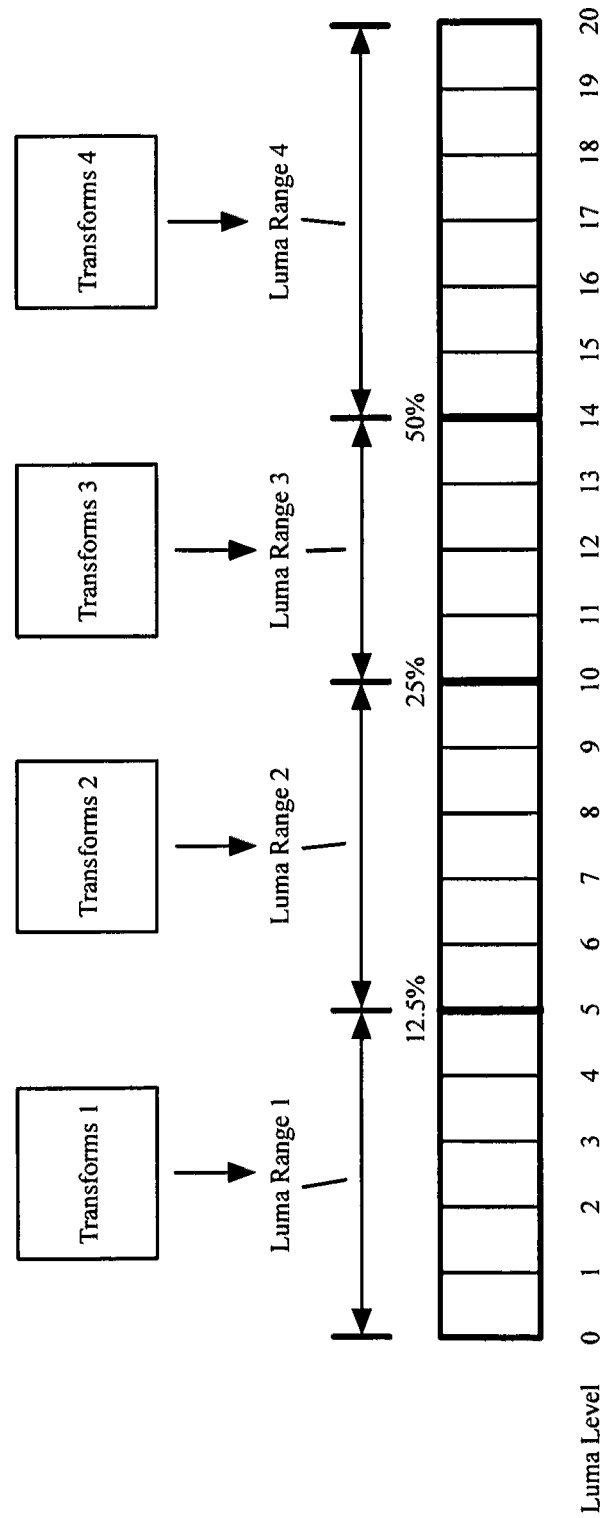
FIG. 22 illustrates an example of a set of transforms that is generated for each luma range of a target image illustrated in FIG. 17 according to some embodiments of the invention.

FIG. 22 illustrates an example of a set of transforms that is determined for each luma range of the target image illustrated in the third stage 1730 of FIG. 17 according to some embodiments of the invention. As shown, the first set of transforms is associated with the first luma range (and each luma level in the first luma range), the second set of transforms is associated with the second luma range (and each luma level in the second luma range), the third set of transforms is associated with the third luma range (and each luma level in the third luma range), and the fourth set of transforms is associated with the fourth luma range (and each luma level in the fourth luma range).

In some embodiments, a transformation matrix is used to represent the set of transforms (e.g., the determined operations) determined for each luma range. In other words, the determined operations for a luma range are incorporated into a transformation matrix to balance the colors of the target image for pixels in the target image that have luma component values in the luma range. For example, the gain and lift operations, black balance and white balance operations, and saturation operations may each be represented by a transformation matrix in some embodiments. In some such embodiments, the transformation matrices of each operation are multiplied together in order to incorporate the operations into a single transformation matrix. Different embodiments define different transformation matrices with different dimensions to represent the set of transforms for a luma range. For instance, some embodiments define a single 3×4 transformation matrix to represent the set of transforms for a luma range. Other embodiments define a transformation matrix with different dimensions to represent the set of transforms for a luma range.

Figure 23:
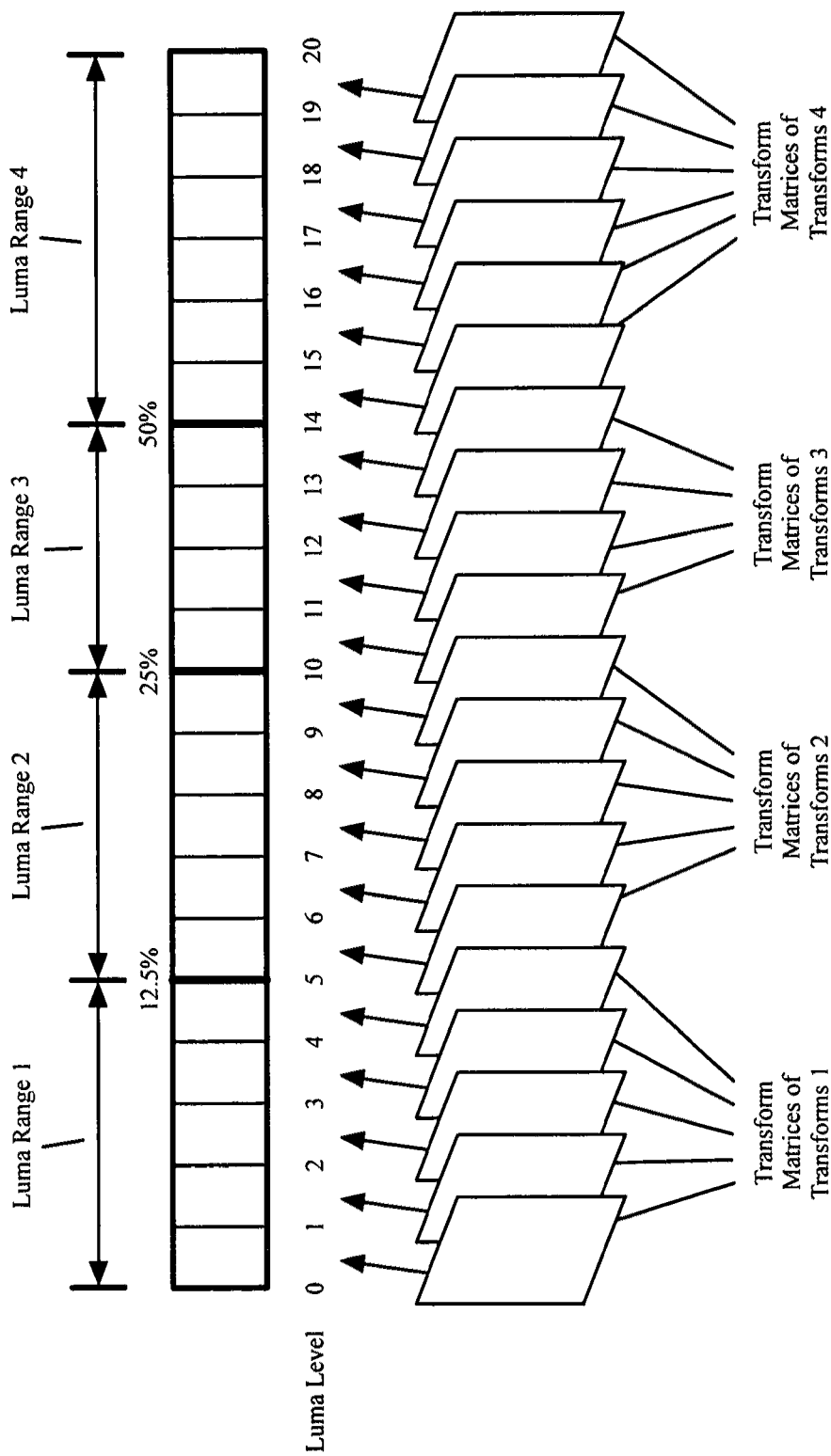
FIG. 23 illustrates an example of a transformation matrix associated with each luma level of the target image illustrated in FIG. 22 according to some embodiments of the invention.

Furthermore, some embodiments associate a transformation matrix with each luma level of the target image. FIG. 23 illustrates an example of a transformation matrix associated with each luma level of the target image illustrated in FIG. 22 according to some embodiments of the invention. As shown, the transforms determined for each luma range of the target image (i.e., transforms 1, transforms 2, transforms 3, and transforms 4) are the same as the ones illustrated in FIG. 22. FIG. 23 also illustrates a transformation matrix associated with each of the 20 luma levels (i.e., luma levels 0-20), as indicated by the arrows associating a transformation matrix with a luma level.

Since a set of transforms determined for a luma range, the transformation matrices associated with luma levels in the luma range are the same (i.e., have the same values). For example, the transformation matrices associates with luma levels 0-5 are the same, the transformation matrices associates with luma levels 5-10 are the same, the transformation matrices associates with luma levels 10-15 are the same, and the transformation matrices associates with luma levels 15-20 are the same.

1. Determining Gain and Lift Operations

As described above by reference to the process 2000, some embodiments determine gain and lift operations as part of the process for determining the transforms for balancing the colors of a target image. In some embodiments, the gain and lift operations map luma levels of the target image to luma levels of a reference luma distribution (e.g. an equalized luma distribution) in order to match the contrast of the target image to the contrast of the reference luma distribution. FIG. 24 conceptually illustrates a process 2400 of some embodiments for determining such gain and lift operations. As described above, the process 2400 is performed by the process 2000 of some embodiments (e.g., at the operation 2010). The process 2400 will be described by reference to the third stage 1730 of FIG. 17, which illustrates luma ranges of a target image and corresponding luma ranges of an equalized luma distribution determined by the process 1600 of some embodiments.

The process 2400 begins by identifying (at 2410) a luma range of the target image. In some embodiments, the luma range is a luma range identified by the process 1600, which is previously described above by reference to FIG. 16.

The process 2400 then identifies (at 2420) boundary luma levels of a luma range of the target image. In some embodiments, the boundary luma levels of a luma range are the bottom and top luma levels of the luma range. Referring to the third stage 1730 of FIG. 17, the boundary luma levels of the first luma range of the target image are luma level 0 (i.e., the bottom) and luma level 5 (i.e., the top), the boundary luma levels of the second luma range of the target image are luma level 5 (i.e., the bottom) and luma level 10 (i.e., the top), the boundary luma levels of the third luma range of the target image are luma level 10 (i.e., the bottom) and luma level 14 (i.e., the top), and the boundary luma levels of the fourth luma range of the target image are luma level 14 (i.e., the bottom) and luma level 20 (i.e., the top).

Next, the process identifies (at 2430) boundary luma levels of the corresponding luma range of the equalized luma distribution. Referring again to the third stage 1730 of FIG. 17, the boundary luma levels of the first luma range of the equalized luma distribution image are luma level 0 (i.e., the bottom) and luma level 2.5 (i.e., the top), the boundary luma levels of the second luma range of the equalized luma distribution are luma level 2.5 (i.e., the bottom) and luma level 5 (i.e., the top), the boundary luma levels of the third luma range of the equalized luma distribution are luma level 5 (i.e., the bottom) and luma level 10 (i.e., the top), and the boundary luma levels of the fourth luma range of the equalized luma distribution are luma level 10 (i.e., the bottom) and luma level 20 (i.e., the top).

The process 2400 then calculates (at 2440) gain and lift operations to map luma levels of the identified luma range of the target image to the luma levels of the identified luma range of the equalized luma distribution based on the identified boundary luma levels of the target image and the equalized luma distribution. In some embodiments, the gain and lift operations are represented by a linear equation. In some such embodiments, the gain operation is expressed as the slope of the equation and the lift operation is expressed as the y-intercept. The following is an example of such an equation:

$$y = \frac{\text{equalized luma level}_{top} - \text{equalized luma level}_{bottom}}{\text{luma level of target}_{top} - \text{luma level of target}_{bottom}} x + b \quad (1)$$

where x is a luma level of the luma range of the target image, y is the corresponding luma level of the equalized luma distribution image to which luma level x is mapped, and b is the lift operation. The following equation is an example of applying the above equation (1) with respect to the first luma ranges illustrated in the third stage 1730 of FIG. 17.

$$y = \frac{2.5 - 0}{5 - 0}x + b = \frac{1}{2}x + b \quad (2)$$

$$b = 2.5 - \frac{1}{2}(5) = 0$$

$$y = \frac{1}{2}x$$

In some embodiments, the linear equation does not directly map a luma level of the target image to a luma level of the equalized luma distributions. For instance, the linear equation determined for the first luma ranges of the third stage 1730 of FIG. 17 maps luma level 1 of the target image to luma level 0.5 of the equalized luma distribution and maps luma level 3 of the target image to luma level 1.5 of the equalized luma distribution.

The following equation is an example of applying the above equation (1) with respect to the fourth luma ranges illustrated in the third stage 1730 of FIG. 17.

$$y = \frac{20 - 10}{20 - 14}x + b = 1.\overline{6}x + b \quad (3)$$

$$b = 20 - 2(20) = -20$$

$$y = 1.\overline{6}x - 20$$

In some embodiments, the gain and lift operations determined for a luma range are represented by a transformation matrix that matches the contrast of the luma range of the target image to the contrast of the luma range of the equalized luma distribution.

Additionally, some embodiments apply a contrast matching factor to the gain and lift operations in order to control the matching of contrast of the target image. For example, some embodiments apply the following equation to control the amount of contrast:

luma level$_{adj}$=luma level$_{before}$(1−factor$_{cont}$)+(luma level$_{after}$*factor$_{cont}$)

which can also be expressed as luma level$_{adj}$=luma level$_{before}$+factor$_{cont}$*(luma level$_{after}$−luma level$_{before}$)

where luma level$_{before}$ is the luma level before the gain and lift operations have been applied, factor$_{cont}$ is a contrast factor value that ranges from 0 to 1, luma level$_{after}$ is the luma level after the gain and lift operations have been applied to the luma level$_{before}$, and luma level$_{adj}$ is the adjusted luma level based on the contrast factor. Different embodiments may define different contrast matching factors (the mapping decreases as the value of factor$_{cont}$ decreases). For instance, some embodiments may define a contrast matching factor of 0.82. Other embodiments may define other contrast matching factors as well.

Returning to FIG. 24, the process 2400 determines (at 2450) whether any luma range of the target image is left to process. When the process 2400 determines that there is a luma range of the target image to process, the process 2400 returns to the operation 2410 to process any remaining luma ranges of the target image. Otherwise, the process 2400 ends.

2. Determining Black Balance and White Balance Operations

In addition to balance the contrast of the target image, some embodiments also balance the colors of the target image. As described with respect to process 2000, some embodiments determine black balance and white balance operations to balance the colors of the target image. In some embodiments, gain and lift operations are applied to the target image before the target image is used to determine the black balance and white balance operations. That is, the distribution of the luma of pixels in the target image that is used in some such embodiments matches an equalized luma distribution, and each of the luma ranges of the target image has the same range of luma levels as the corresponding luma range of the equalized luma distribution.

Figure 25:
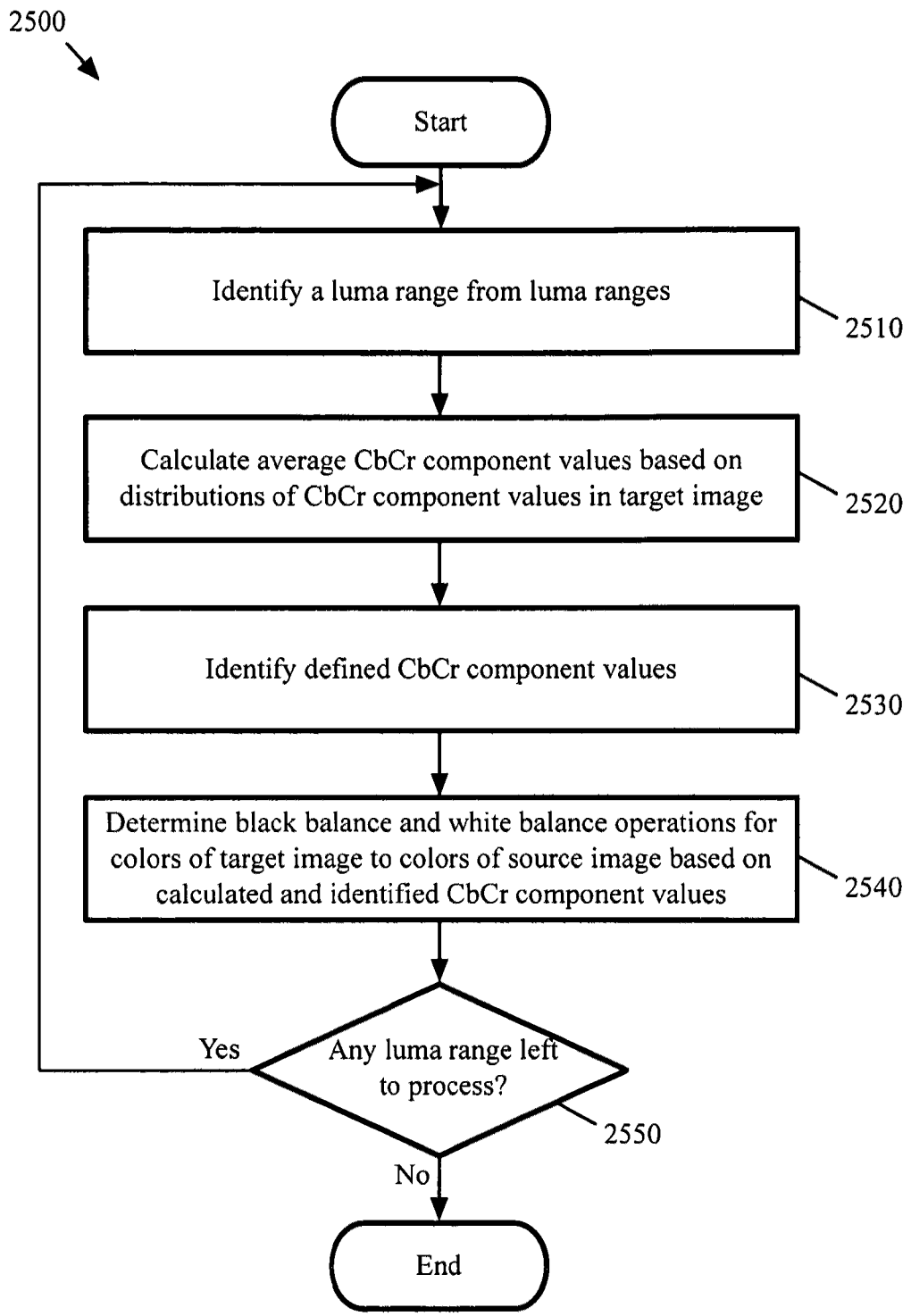
FIG. 25 conceptually illustrates a process of some embodiments for determining black balance and white balance operations.

FIG. 25 conceptually illustrates a process 2500 of some embodiments for determining such black balance and white balance operations. As mentioned above, the process 2500 is performed by the process 2000 of some embodiments (e.g., at the operation 2030). The process 2500 starts by identifying (at 2510) a luma range of the target image. In some embodiments, the luma range is a luma range identified by the process 1600, which is previously described above by reference to FIG. 16.

Next, the process 2500 calculates (at 2520) average CbCr component values based on distributions of CbCr (i.e., chrominance) component values of pixels of the target image that have CbCr component values within a luma range of the target image. In some embodiments, the process 2500 determines a distribution of CbCr component values of pixels in the target image that have luma component values equal to the bottom luma level of the luma range and a distribution of CbCr component values of pixels in the target image that have luma component values equal to the top luma level of the luma range. The distribution of the bottom luma level is for determining the black balance operation. The distribution of the top luma level is for determining the white balance operation.

Figure 26:
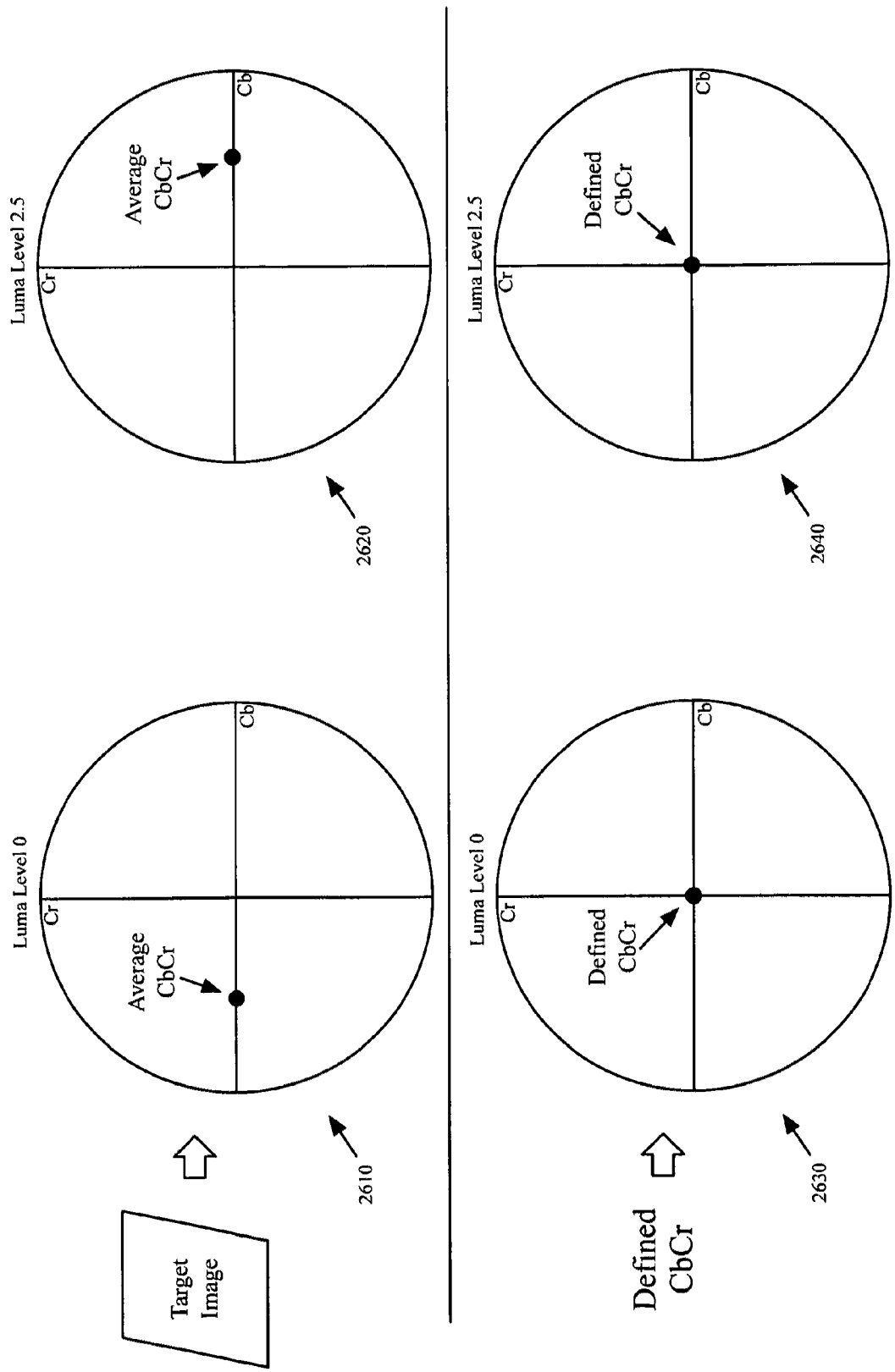
FIG. 26 illustrates examples of average CbCr component values based on histograms of example distributions of CbCr component values of an image.

FIG. 26 illustrates two-dimensional CbCr planes 2610 and 2620 that indicate example average CbCr component values of the target image. In this example, the CbCr plane 2610 illustrates an average CbCr component value, indicated by a black dot, based on an example distribution (not shown) of pixels in the target image that have luma component values equal to the bottom luma level (i.e., luma level 0) of the first luma range of the target image shown in FIG. 21. The CbCr plane 2620 shows a CbCr component value, also indicated by a black dot, based on an example distribution (not shown) of pixels in the target image that have luma component values equal to the top luma level (i.e., luma level 2.5) of the first luma range of the target image illustrated in FIG. 21.

For this example, the horizontal axis of the CbCr plane 2610 represents different Cb component values (not shown) and the vertical axis of the CbCr plane 2610 represents different Cr component values (not shown). Different embodiments define the Cb and Cr components to each represent a different number of Cb and Cr component values. For example, some of these embodiments define the Cb and Cr components to each represent 256 possible Cb and Cr component values (e.g., 0-255, −127 to 128, etc.), respectively. Other embodiments define the Cb and Cr components to each represent any number of possible Cb and Cr component values.

The process 2500 then identifies (at 2530) a set of defined CbCr component values. In some embodiments, the process 2500 identifies defined CbCr component values for the bottom luma level of the luma range and defined CbCr component values for the top luma level of the luma range. As mentioned above, the bottom luma level is for determining the black balance operation, and the top luma level is for determining the white balance operation.

Returning to FIG. 26, this figure further illustrates two-dimensional CbCr planes 2630 and 2640 that indicate example defined CbCr component values. As shown, CbCr planes 2630 and 2640 are similar to the CbCr planes 2610 and 2620. That is, the horizontal axis of the CbCr planes 2620 and 2640 represents different Cb component values (not shown) and the vertical axis of the CbCr planes 2630 and 2640 represents different Cr component values (not shown). The CbCr plane 2630 illustrates defined CbCr component values, indicated by a black dot, of (0,0) for the bottom luma level (i.e., luma level 0) of the first luma range shown in FIG. 21. The CbCr plane 2640 shows defined CbCr component values, also indicated by a black dot, of (0,0) for the top luma level (i.e., luma level 2.5) of the first luma range illustrated in FIG. 21.

The process 2500 then determines (at 2540) black balance and white balance operations for balancing the colors of the target image based on the calculated average CbCr component values and the identified set of defined CbCr component values. In some embodiments, the black balance and white balance operations are represented by a shear transformation for balancing the colors of the target image. In some such embodiments, a shear transformation balances the colors of the target image by shifting the average CbCr component value of the pixels in the target image that have luma component values equal to the bottom of the luma range of the target image towards the defined CbCr component values for the bottom luma range. In addition, the shear transformation balances the colors of the target image by shifting the average CbCr component value of the pixels in the target image that have luma component values equal to the top of the luma range of the target image towards the defined CbCr component values for the top luma range.

Figure 27:
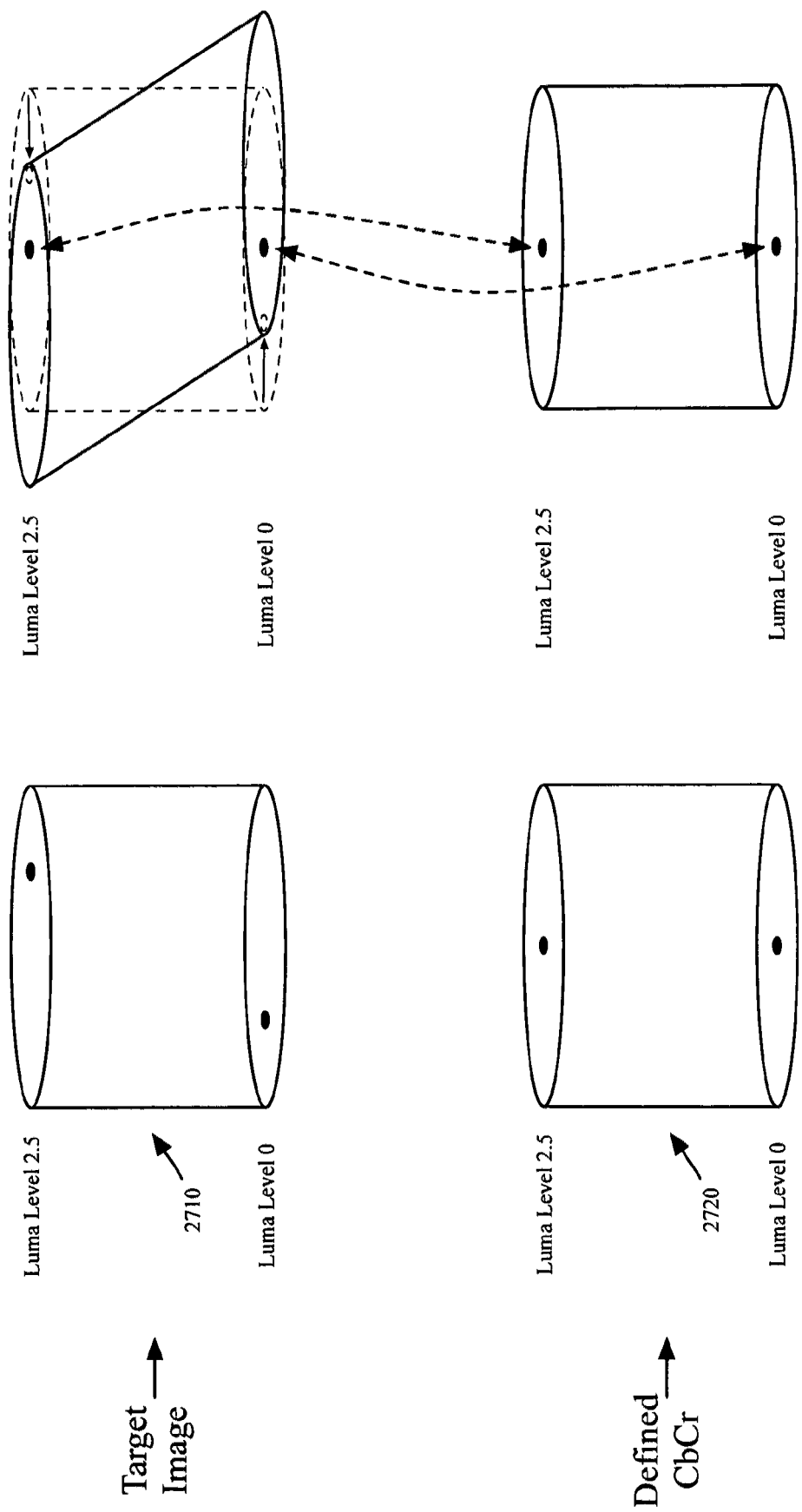
FIG. 27 illustrates an example of black balance and white balance operations for balancing colors of an image.

FIG. 27 illustrates an example of black balance and white balance operations that balance the colors of the target image based on a shear transformation. Specifically, this figure conceptually illustrates the CbCr planes 2610-2640 illustrated in FIG. 26 in a three-dimensional Y'CbCr color space. As shown on the left side of FIG. 27, the CbCr plane 2620 is illustrated at the top of a three-dimensional representation 2710 of the colors in the first luma range of the target image. In addition, the CbCr plane 2610 is illustrated at the bottom of the three-dimensional representation 2710. The left side of FIG. 27 also shows the CbCr plane 2640 at the top of a three-dimensional representation 2720 of colors and the CbCr plane 2630 at the bottom of the three-dimensional representation 2720.

The right side of FIG. 27 conceptually illustrates an example black balance and white balance operation that balance the colors of the target image to the defined colors for the first luma ranges illustrated in FIG. 21. In particular, the right side of FIG. 27 illustrates a shear transformation that is applied to the three-dimensional representation 2710 of the colors of the target image. As noted above, a three-dimensional shear transformation, in some embodiments, maintains a fixed plane and shifts all planes parallel to the fixed plane by a distance proportional to their perpendicular distance from the fixed plane. As illustrated in this figure, a three-dimensional shear transformation is applied to the three-dimensional representation 2710 such that the average CbCr component value of luma level 0 of the target image matches the defined CbCr component values for luma level 0 and the average CbCr component value of luma level 2.5 of the target image matches the defined CbCr component values for luma level 2.5. This matching is shown by the vertical dashed arrows indicating that the CbCr component values of the corresponding luma levels are the same. As shown, the shear transformation also shifts luma levels in between the top and bottom luma levels (luma levels between 0 and 2.5 in this example) of the first luma range accordingly.

In some embodiments, the black balance and white balance operations determined for a luma range are represented by a transformation matrix that matches the black balance of the luma range of the target image to the defined black balance for the corresponding luma range and matches the white balance of the luma range of the target image to the defined white balance for the corresponding luma range. For instance, the embodiments that use a shear transformation described above can represent the shear transformation by a transformation matrix that matches black balance and white balance of the target image to the defined black balance and defined white balance.

In addition, some embodiments apply a balance matching factor to the black balance and white balance operations in order to control the balancing of colors of the target image. For example, some embodiments apply the following equation to control the amount of balancing:

$$CbCr_{adj} = CbCr_{before}(1-\text{factor}_{bal}) + (CbCr_{after} * \text{factor}_{bal})$$

which can also be expressed as $$CbCr_{adj} = CbCr_{before} + \text{factor}_{bal} * (CbCr_{after} - CbCr_{before})$$

where $CbCr_{before}$ is the CbCr component values before black balance and/or white balance operations have been applied, $\text{factor}_{bal}$ is a balance factor value that ranges from 0 to 1, $CbCr_{after}$ is the CbCr component values after black balance and/or white balance operations have been applied to $CbCr_{before}$, and $CbCr_{adj}$ is the adjusted CbCr component values based on the balance factor. Different embodiments may define different balance matching factors (the balancing decreases as the value of $\text{factor}_{bal}$ decreases). For instance, some embodiments may define a balance matching factor of 0.65. Other embodiments may define other balance matching factors as well.

Finally, the process 2500 determines (at 2550) whether any luma range of the target image is left to process. When the process 2500 determines that there is no luma range of the target image to process, the process 2500 ends. When the process 2500 determines that there is a luma range of the target image to process, the process 2500 returns to the operation 2510 to process any remaining luma ranges of the target image. Some embodiments use some or all of the calculations of the previously processed luma ranges when processing (e.g., determining the black balance and white balance operations) remaining luma ranges. For example, since the luma level at (or near) the top level of a particular luma range is the same or similar to a luma level at (or near) the bottom level of another adjacent luma range, some embodiments use the white balance operation (e.g., the calculated average CbCr component value) determined for the particular luma range as the black balance operation for the other luma range.

Referring to FIG. 21 as an example, some embodiments might calculate an average CbCr component value based on pixels in the target image that have luma component values equal to 2.5. Since this luma level is at (or near) the top of luma range 1 and at (or near) the bottom of luma range 2, some embodiments use the calculated average CbCr component value for luma level 2.5 as the white balance of luma range 1 and also as the black balance of luma range 2.

As mentioned, the process 2500 determines the black balance operation based on the distribution of CbCr component values of pixels that have luma component values equal to the bottom of a luma range and white balance operations based on the distribution of CbCr component values of pixels that have luma component values equal to the top of the luma range. However, in some embodiments, the black balance, operation is determined based on the distribution of CbCr component values of pixels that have luma component values near the bottom of a luma range and white balance operations is determined based on based on the distribution of CbCr component values of pixels that have luma component values near the top of the luma range.

For instance, some embodiments determine such operations based on the distribution of CbCr component values of pixels that have luma component values within 2 luma levels of an end of a luma range. Referring to FIG. 21, such embodiments determine the white balance operation of the first luma range (and/or black balance operation of the second luma range) based on the distribution of CbCr component values of pixels that have luma component values in luma levels 1-4, the white balance operation of the second luma range (and/or black balance operation of the third luma range) based on the distribution of CbCr component values of pixels that have luma component values in luma levels 4-6, and the white balance operation of the third luma range (and/or black balance operation of the fourth luma range) based on the distribution of CbCr component values of pixels that have luma component values in luma levels 9-11.

Figure 28:
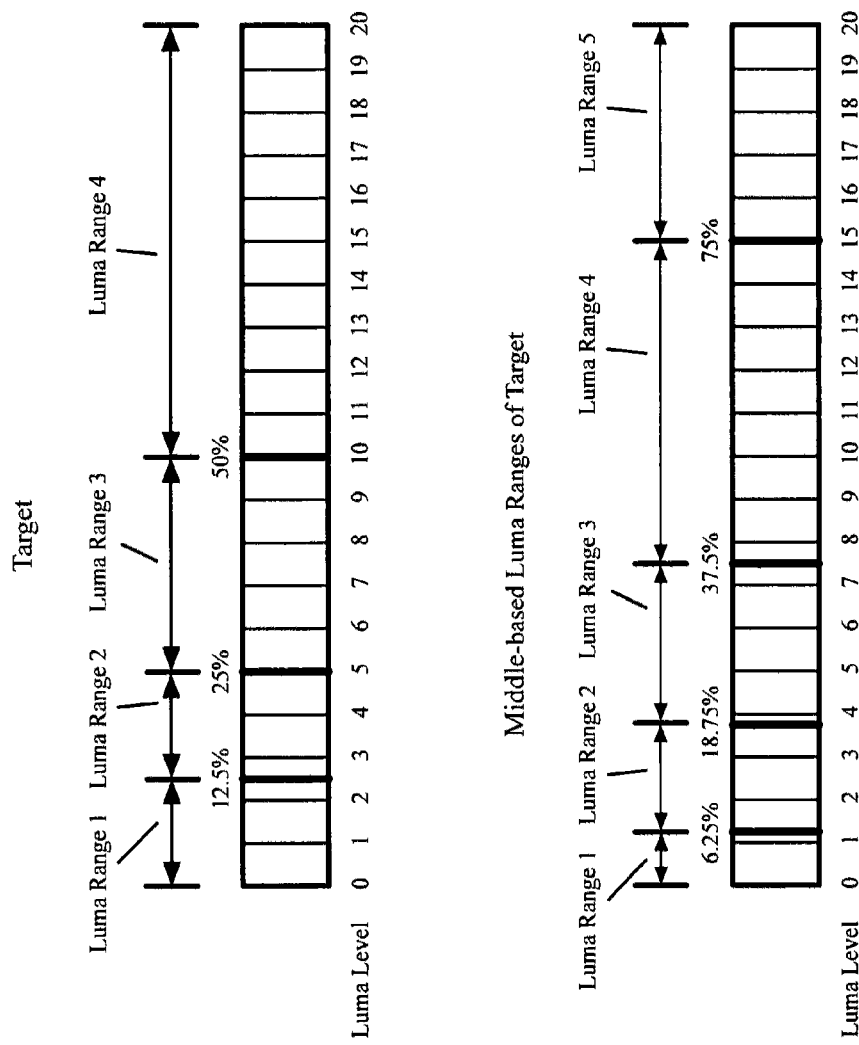
FIG. 28 conceptually illustrates luma ranges of a target image that are defined by the middle of the luma ranges illustrated in FIG. 21 according to some embodiments of the invention.

The process described above by reference to FIG. 25 determines black balance and white balance operations based on luma ranges determined by the process described by reference to FIG. 16. However, some embodiments of the process 2500 may determine black balance and white balance operations based on different luma ranges of the target image. For example, the process 2500 may use luma ranges that are defined by the middle (e.g., midpoints) of the luma ranges defined by the processed described by reference to FIG. 16. FIG. 28 conceptually illustrates an example of such luma ranges. Specifically, FIG. 28 conceptually illustrates luma ranges of the target image that are defined by the middle of the luma ranges illustrated in FIG. 21. As shown, the middle of the first luma range of the target is luma level 1.25, the middle of the second luma range of the target image is luma level 3.75, the middle of the third luma range of the target image is luma level 7.5, and the middle of the fourth luma range of the target image is luma level 15. Accordingly, in this example, the process 2500 is performed using five luma ranges 0-1.25, 1.25-3.75, 3.75-7.5, 7.5-15, and 15-20. The process 2500 may employ different luma ranges in other embodiments as well.

While FIGS. 25 and 26 illustrate determining black balance and white balance operations based on CbCr component values of pixels, some embodiments determine such operations based on other types of component values of the pixels that represent the pixels' colors. For instance, some such embodiments of the process 2500 determine black balance and white balance operations based on a hue component value while other such embodiments of the process 2500 determine the operations based on red, green, and blue component values.

3. Determining Saturation Operations

As mentioned above, some embodiments determine saturation operations to balance the saturation of the target image. As described with respect to process 2000, gain and lift operations and black balance and white balance operations are applied to the target image before it is used to determine the saturation operations in some embodiments. Thus, at this point, each of the luma ranges of the target image has the same range of luma levels as the corresponding luma range of the source image.

FIG. 29 conceptually illustrates a process 2900 of some embodiments for determining saturation operations. As noted above, the process 2900 is performed by the process 2000 of some embodiments (e.g., at the operation 2050). The process 2900 begins by identifying (at 2910) a luma range of the target image. In some embodiments, the luma range is a luma range identified by the process 1600, as described above by reference to FIG. 16.

Figure 30:
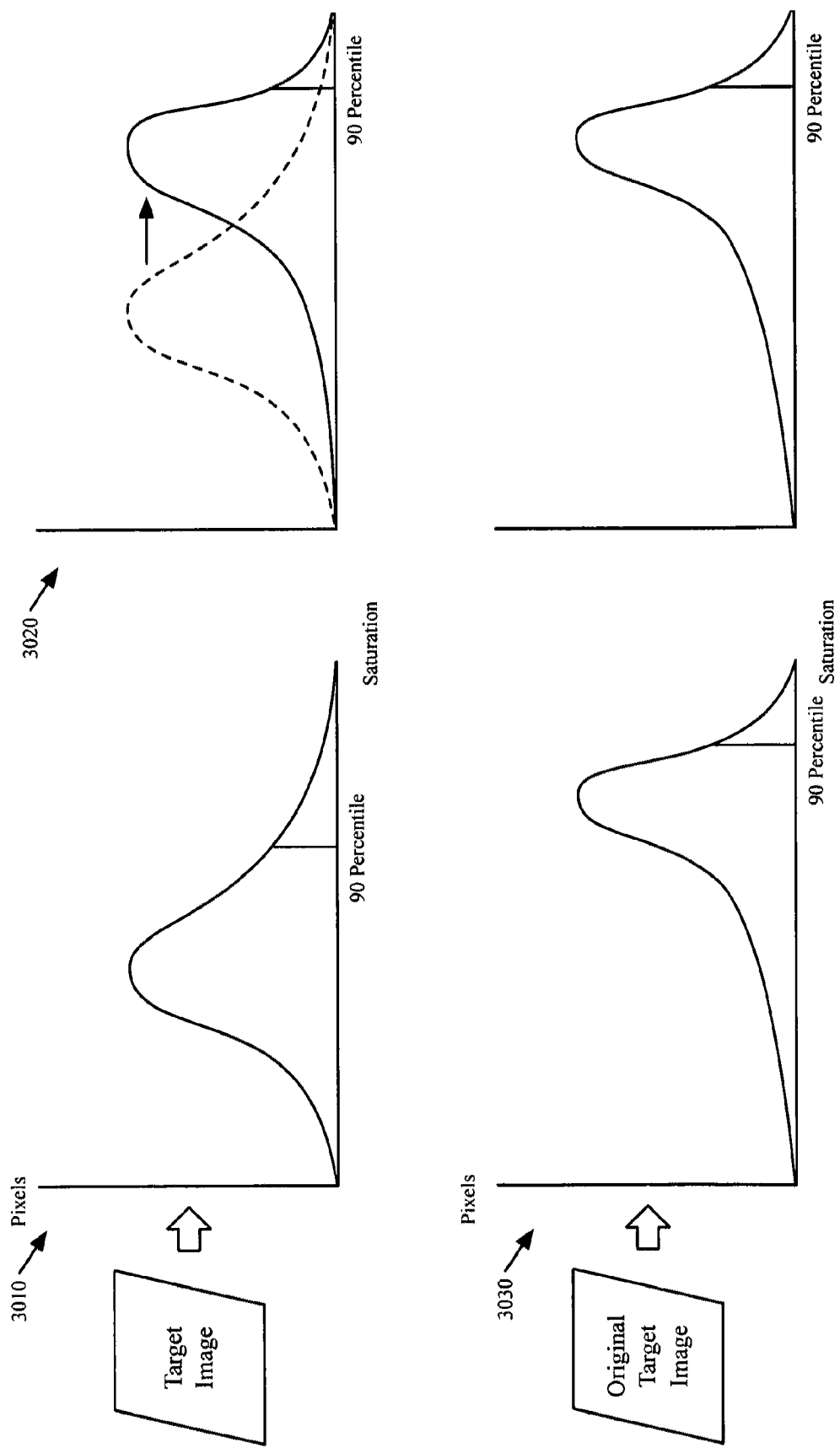
FIG. 30 illustrates an example of saturation operations that balances the saturation of an image.

The process 2900 then determines (at 2920) the distribution of saturation values of pixels in the target image (to which the determined gain and lift operations and the determined black balance and white balance operations have been applied) that have luma component values that are within a luma range of the target image (i.e., a luma range of the equalized luma distribution). FIG. 30 illustrates histograms 3010 and 3020 of example distributions of saturation values. Specifically, this figure illustrates the histogram 3010 of an example distribution of saturation component values of pixels in the target image that have luma component values within the luma range. For this example, the horizontal axis of the histogram 3010 represents different saturation component values. Different embodiments define the saturation component value of an image to represent a different number of saturation component values. For example, some of these embodiments define the saturation component to represent 256 possible saturation component values (e.g., 0-255, –127 to 128, etc.). Other embodiments define the saturation component to represent any number of possible saturation component values. Furthermore, the vertical axis of the histogram 3010 represents the number of pixels in the target image that have a particular saturation component value.

Next, the process 2900 calculates (at 2930) the saturation component value associated with a predefined percentile of the distribution of the saturation component values determined at operation 2920. In some embodiments, the predefined percentile is ninety percent. However, other embodiments can define the predefined percentile to be any number of different percentiles (e.g., seventy percent, eighty percent, ninety-five percent, etc.).

Continuing with the example illustrated in FIG. 30, the calculated predefined percentile of the distribution of saturation component values is indicated in the histogram 3010. For this example, the predefined percentile is ninety percent. As such, ninety percent of the pixels in the target image have saturation component values that are less than or equal to the saturation component value (not shown) indicated in the histogram 3010.

The process 2900 then determines (at 2940) the distribution of saturation values of pixels in the original target image that have luma component values that are within the corresponding luma range of the original target image. Referring to FIG. 30, this figure further illustrates the histogram 3030 of an example distribution of saturation component values of pixels in the original target image that have luma component values within the corresponding luma range. Similar to the histogram 3010, the horizontal axis of the histogram 3030 represents different saturation component values, and the vertical axis of the histogram 3030 represents the number of pixels in the original target image that have a particular saturation component value.

Next, the process 2900 calculates (at 2950) the saturation component value associated with the predefined percentile of the distribution of the saturation component values determined at operation 2930. Continuing with the example illustrated in FIG. 30, the calculated predefined percentile of the distribution of saturation component values is indicated in the histogram 3020. As noted above, the predefined percentile is ninety percent in this example. Thus, ninety percent of the pixels in the original target image have saturation component values that are less than or equal to the saturation component value (not shown) indicated in the histogram 3030.

The process 2900 then determines (at 2960) the saturation operations for matching the saturation of the target image to the saturation of the original target image based on the calculated saturation component values of the predefined percentiles. In some embodiments, the saturation operations match the saturation of the target image to the saturation of the original target image by adjusting the saturation component values of pixels in the target image that have luma component values within the luma range by an amount such that the saturation component value associated with the predefined percentile of the distribution of the saturation component values of pixels in the target image matches the saturation component value associated with the predefined percentile of the distribution of the saturation component values of pixels in the original target image. In addition, some embodiments represent the saturation operations determined for a luma range using a transformation matrix that matches the saturation of the luma range of the target image to the saturation of the luma range of the original target image.

Referring back to FIG. 30, this figure further illustrates an example of saturation operations that match the saturation of pixels in a luma range of the target image to the saturation of pixels in the luma range of the original target image. In particular, FIG. 30 illustrates increasing the saturation of pixels of a luma range of a target image to match the saturation component value associated with the ninety percentile of the target image to the saturation component value associated with the ninety percentile of the original target image, as indicated by an arrow in the histogram 3020.

Some embodiments apply a saturation matching factor to the saturation operations in order to control the matching of saturation of the target image. For instance, some embodiments apply the following equation to control the amount of saturation:

$$\text{Saturation}_{adj} = \text{Saturation}_{before}(1-\text{factor}_{sat}) + (\text{Saturation}_{after} * \text{factor}_{sat})$$

which can also be expressed as $$\text{Saturation}_{adj} = \text{Saturation}_{before} + \text{factor}_{sat} * (\text{Saturation}_{after} - \text{Saturation}_{before})$$

where $\text{Saturation}_{before}$ is the saturation component value before saturation operations have been applied, $\text{factor}_{sat}$ is a saturation factor value that ranges from 0 to 1, $\text{Saturation}_{after}$ is the saturation component value after saturation operations have been applied to $\text{Saturation}_{before}$, and $\text{Saturation}_{adj}$ is the adjusted saturation component value based on the saturation factor. Different embodiments may define different saturation matching factors (the saturation decreases as the value of $\text{factor}_{sat}$ decreases). For instance, some embodiments may define a balance matching factor of 0.36. Other embodiments may define other balance matching factors as well.

Finally, the process 2900 determines (at 2970) whether any luma range of the target image is left to process. When the process 2900 determines that there is a luma range of the target image to process, the process 2900 returns to the operation 2910 to process any remaining luma ranges of the target image. Otherwise, the process 2900 ends.

As explained above by reference to FIG. 29, the process matches the saturation of the target image to the saturation of the original target image. In some cases, the application of the determined gain and lift operations and the determined black balance and white balance operations to the target image may alter the saturation of the target image (e.g., decrease the saturation of the target image). Therefore, in order to preserve the saturation of the original target image, the saturation of the target image (to which the determined gain and lift operations and the determined black balance and white balance operations have been applied) to the saturation of the original target image.

iii. Blending of Transforms

Figure 31:
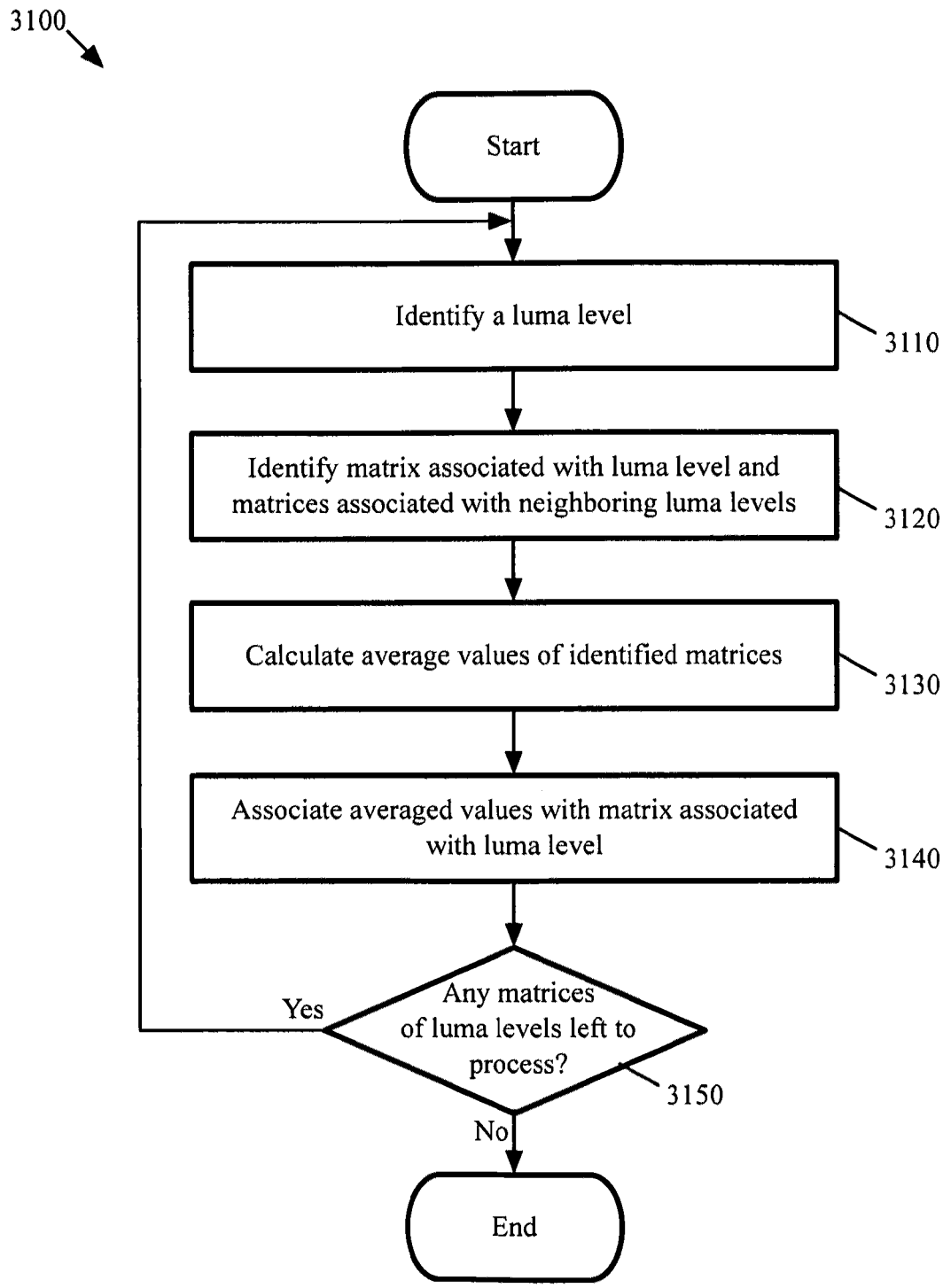
FIG. 31 conceptually illustrates a process of some embodiments for blending transforms.
Figure 32:
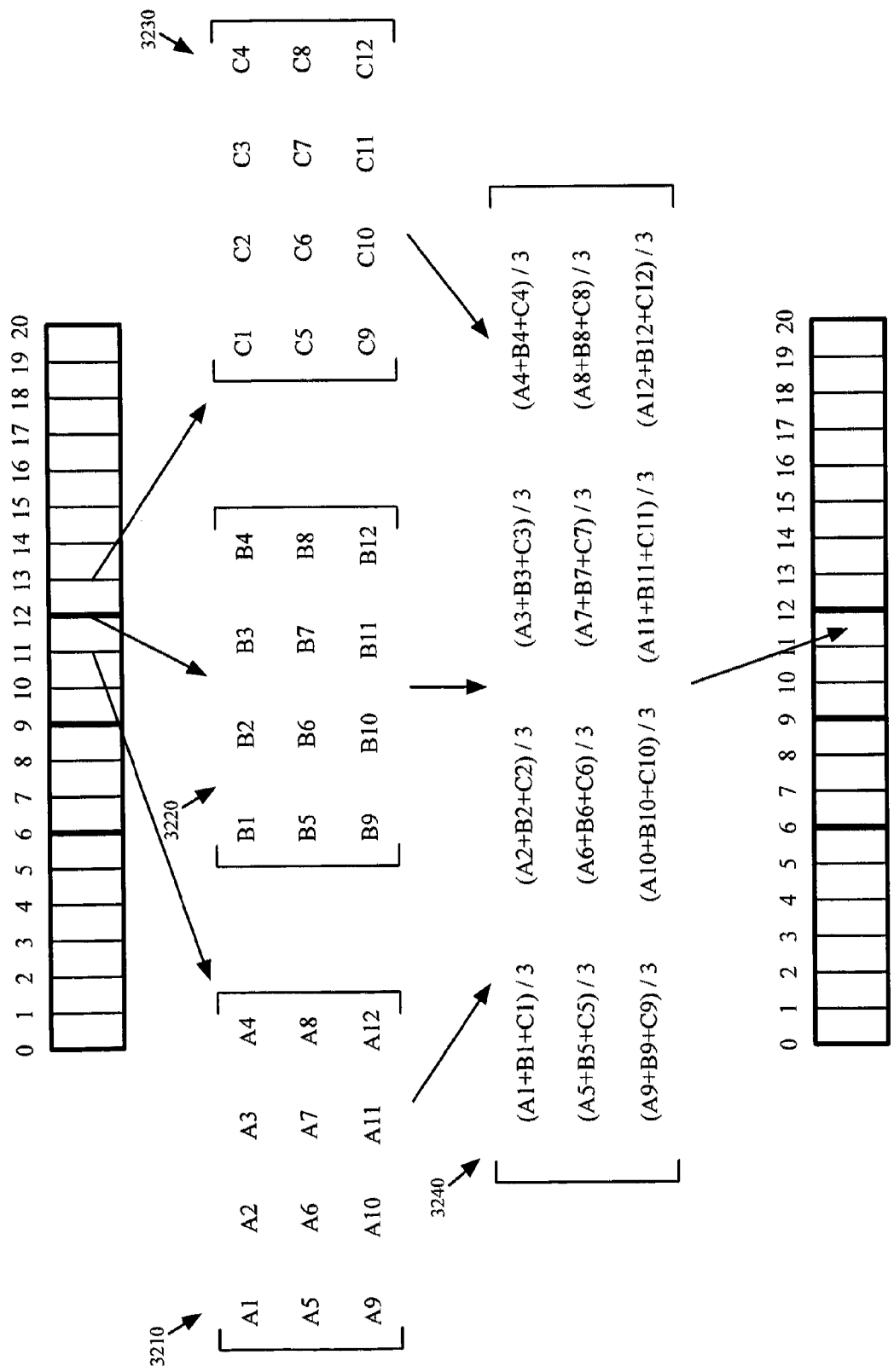
FIG. 32 illustrates an example of blending a transform associated with a luma level of a target image.

To reduce or eliminate sharp transitions among transforms of luma levels near the border of luma ranges, some embodiments blend transforms in order to smooth out these sharp transitions. As described with respect to the process 1400, some embodiments perform a blending operation on transforms after the transforms are determined. FIG. 31 conceptually illustrates a process 3100 of some embodiments for blending transforms. As described above, the process 3100 is performed by the process 1400 of some embodiment (e.g., at the operation 1450). The process 3100 will be described by reference to FIG. 32, which illustrates an example of blending a transform associated with a luma level of the target image. In this example, a transformation matrix is associated with each luma level, similar to the example described above by reference to FIG. 23. As shown, transformation matrix 3210 is associated with luma level 11, transformation matrix 3220 is associated with luma level 12, and transformation matrix 3230 is associated with luma level 13. Furthermore, 3×4 transformation matrices are used to represent the transforms in this example, as shown in FIG. 32.

The process 3100 begins by identifying (at 3110) a luma level of the target image. Referring to FIG. 32, luma level 12 of the target image is the luma level identified for this example. Since luma level 12 and luma level 13 are each part of different luma ranges, in some embodiments, the transformation matrices are also different and, thus, include different values. In addition, the transformation matrix 3210 associated with luma level 11 might include different values than the values of the transformation matrix 3220 associated with luma level 12. For instance, the transformation matrix 3210 associated with luma level 11 might have been previously blended (e.g., with the transformation matrices associated with luma level 10 and luma level 12).

Next, the process 3100 identifies (at 3120) matrix associated with the identified luma level and the transformation matrices associated with neighboring luma levels. In this example, the neighboring luma levels are luma level 11 and luma level 13. As shown, the 3×4 transformation matrix 3210 associated with luma level 11 includes the values A1-A12, the 3×4 transformation matrix 3220 associated with luma level 12 includes the values B1-B12, and the 3×4 transformation matrix 3230 associated with luma level 13 includes the values C1-C12.

The process 3100 then calculates (at 3130) the average of the values of the identified matrices. Referring to FIG. 32, the average of the values of the identified matrices are calculated by adding the corresponding values of each matrix and dividing by the number of matrices (three in this example). For instance, the blended transformation matrix 3240 illustrates that the average value of the values in the first column and first row of the transformation matrices is A1+B1+C1/3. As shown, the average values of the other values in the transformation matrices are calculated in a similar manner for the blended transformation matrix 3240.

After calculating the average values of the identified matrices, the process 3100 associates (at 3140) the calculated average values with the transformation matrix associated with the identified luma level. For the example illustrated by FIG. 32, the calculated average values are associated with the blended transformation matrix 3240, which is associated with luma level 12. As such, the calculated average values are now the values of the transformation matrix associated with luma level 12.

Finally, the process 3100 determines (at 3150) whether any luma range of the target image is left to process. When the process 3100 determines that there is a luma range to process, the process 3100 returns to the operation 3110 to process any remaining luma ranges. Otherwise, the process 3100 ends.

By averaging the values of the transformation matrix of a luma level with the transformation matrices of the luma level's neighboring luma levels, any sharp transitions (e.g., near the borders of luma ranges) among the transformation matrices is reduced by smoothing out the values of the transformation matrices. Further, some embodiments repeat the process 3100 a predefined number of times to smooth the transitions among the transformation matrices even further. For instance, some of these embodiments repeat the process 3100 a predefined 32 times. The predefined number of times to repeat the process 3100 can be defined as any number in other embodiments.

While the example illustrated by FIG. 32 and described with respect to the process 3100 shows averaging the values of the transformation matrix of the identified luma level with the transformation matrices of the luma levels immediately neighboring the identified luma level, different embodiments average the values of the transformation matrix of the identified luma level with the transformation matrices of a different number of neighboring luma levels. For instance, some embodiment average the values of the transformation matrix of the identified luma level with the transformation matrices of luma levels within two neighbors on each side of the identified luma level. Referring to FIG. 32, some such embodiments would average the values of the transformation matrix of luma level 12 with the transformation matrices of luma levels 10, 11, 13, and 14.

Furthermore, some embodiments might not perform the operations 3110-3140 for each luma level of the target image. Instead, some embodiments perform the operations 3110-3140 for a number of luma levels near the border of adjacent luma ranges. For instance, some such embodiments perform the operations 3110-3140 for luma levels immediately adjacent to a border of adjacent luma ranges. Referring to FIG. 32 as an example, these embodiments would perform the operations 3110-3140 for luma levels 6, 7, 9, 10, 12, and 13. Other embodiments perform the operations 3110-3140 for luma levels within a defined number of luma levels (e.g., 2, 3, 4) from the border of adjacent luma ranges. For instance, in embodiments where the luma component is defined to represent 256 different luma levels (e.g., 0-255), these embodiments would blend the transformation matrix associated with a particular level with the transformation matrixes of 4 neighboring luma levels (e.g., 2 below and 2 above the particular luma level). In such cases, the transformation matrix associated with the particular luma level would not blend with transformation matrices associated with luma levels across multiple luma ranges as might be the case in the example illustrated in FIG. 32.

B. Balancing Colors of Images

As described with respect to the process 1300, some embodiments apply transforms to the target image after the transforms for balancing the colors of the target image are determined. FIG. 33 conceptually illustrates a process 3300 of some such embodiments for applying transforms to a target image to balance the colors of the target image. As mentioned above, the process 3300 is performed by the process 1300 of some embodiment (e.g., at the operation 1340). The process 3300 starts by identifying (at 3310) a pixel in the target image.

Next, the process 3300 determines (at 3320) the luma component value of the identified pixel. As mentioned above, for an image defined in a Y'CbCr color space, some embodiments represent the brightness of pixels in an image using a luma (Y') component value (and chrominance values for representing the pixel's chrominance). In such embodiments, the luma component value of the identified pixel is already determined. However, for an image defined in other color spaces, such as an RGB color space, some embodiments apply a transform to determine the luma component value of a pixel in the image. In other embodiments, the image is converted to a color space that uses a luma component value (e.g., a Y'CbCr color space) before starting the process 3300.

The process 3300 then identifies (at 3330) the transformation matrix associated with the determined luma component value. As described above by reference to FIG. 23, a transformation matrix is associated with each luma level of the target image in some embodiments.

After identifying the transformation matrix, the process 3300 applies (at 3340) the transformation matrix to the identified pixel to modify its color and brightness based on the transformation matrix. FIG. 34 illustrates an example of determining new values for a pixel of a target image. For this example, the pixels of the target image are defined in an RGB color space. As such, each pixel in the target image includes a red component value, a blue component value, and a green component value, as mentioned above. As shown, the transformation matrix in this example is a 3×4 transformation matrix. The transformation matrix and a 4×1 matrix that includes the red, green, and blue component values of the pixel and a constant, K, are multiplied. In some embodiments, K is defined as 1. In other embodiments, K is defined as another value (e.g., −1, 0, etc.). In addition, the calculation of the new value of each of the red, green, and blue components is also shown in FIG. 34.

Finally, the process 3300 determines (at 3350) whether any pixel in the target image is left to process. When the process 3300 determines that there is a pixel in the target image left to process, the process 3300 returns to the operation 3310 to process any remaining pixels in the target image. When the process 3300 determines that there is not a pixel in the target image left to process, the process 3300 ends. At this point, the colors of the target image are matched to the colors of the source image.

While FIG. 33 illustrates a process for applying transforms to a target image to balance the colors of the target image, some embodiments may apply the transforms determined for the target image to the remaining images of the video clip of which the target image is a part. However, in some embodiments, each image or frame in the video clip is balanced individually. For example, in such embodiments, the process 1300 is performed on each image in the video clip.

II. Color Match

As noted above, some embodiments of the invention provide a novel color matching tool for a media-editing application. The color matching tool automatically matches colors of an image (e.g., target image or destination image) or video clip to colors of another image (e.g., source image or reference image) or video clip. In some embodiments, the color matching tool matches the colors of a target image to the colors of a source image by modifying the color attributes of pixels in the target image so that the colors of the target image appear the same or similar to the colors of the source image. The image that is matched (modified) will be referred to below as the target image and the image to which the target image is matched will be referred to below as the source image. In some embodiments, the target image and the source image may each be a still image, an image (e.g., frame or field) in a video, or any other type of image.

An image in some embodiments is an array of pixels (e.g., 800×600 pixels, 1024×768 pixels, 1600×1200 pixels). Each pixel represents a portion of the image and includes the color and brightness information for such portion of the image. Different embodiments represent the color and brightness information of pixels in an image differently for different color spaces. For instance, for an image defined in an RGB color space, the pixels' color and brightness information are represented by a red component value, a green component value, and a blue component value in some embodiments. In other embodiments, the color and brightness of pixels of an image defined in a Y'CbCr color space are represented using a luma (Y') component value for brightness and a blue-difference (Cb) component value and a red-difference (Cr) component value for chrominance (i.e., color). In some embodiments, the luma component is the weighted sum of the nonlinear gamma compressed R'G'B' components. In some of these embodiments, R'G'B' is gamma corrected red, green, and blue components. Other ways of representing the pixels' color and brightness are possible for images defined in other color spaces. A video clip is a sequence of images (e.g., frames) in some embodiments.

Figure 35:
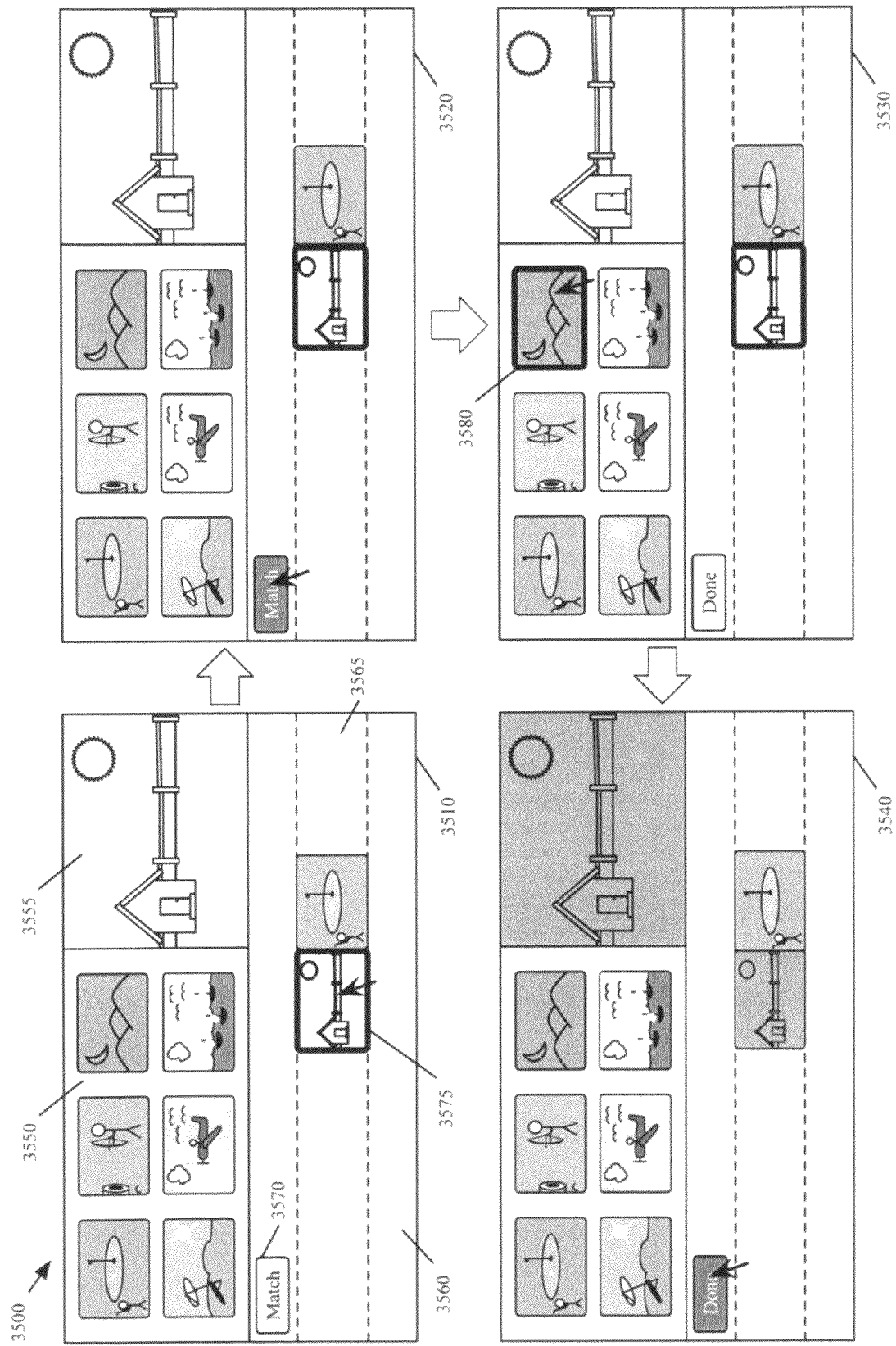
FIG. 35 conceptually illustrates a GUI of a media-editing application that provides a color matching tool of some embodiments.

FIG. 35 conceptually illustrates a graphical user interface (GUI) 3500 of a media-editing application of some embodiments that provides such a color matching tool. Specifically, FIG. 35 illustrates the GUI 3500 at four different stages 3510-3540 of a color matching operation of the color matching tool that matches the colors of a target image to the colors of a source image.

As shown in FIG. 35, the GUI 3500 includes a media library 3550, a preview display area 3555, and a compositing display area 3560. The preview display area 3555 displays a preview of a composite presentation that the application creates by compositing several media clips (e.g., video clips, audio clips, audio and video clips, still images, etc.).

The media library 3550 (also referred to as an "organizer display area") is an area in the GUI 3500 through which a user of the application can select media clips to add to a presentation that the user is compositing with the media-editing application. In addition, the media library 3550 of some embodiments can be used for other purposes, such as organizing media clips, compositing media clips, etc. The media clips in the media library 3550 are represented as thumbnails that can be selected and added to the compositing display area 3560 (e.g., through a cursor operation or a menu selection operation). The media clips in the media library 3550 may also be represented as a list, a set of icons, or any form of representation that allows a user to view and select the various media clips in the media library 3550. In some embodiments, the media library 3550 may include audio clips, video clips, audio and video clips, text overlays, pictures, sequences of media clips, and other types of media clips.

The compositing display area 3560 provides a visual representation of the composite presentation being created by the user. Specifically, it displays one or more geometric shapes that each represents one or more media clips that are part of the composite presentation. In some embodiments, the compositing display area 3560 specifies a description of a composite presentation (also referred to as a "composite media presentation" or a "composite representation").

As shown in FIG. 35, the compositing display area 3560 includes a central compositing lane 3565 and a user selectable user interface (UI) item 3570. The central compositing lane 3565 spans a timeline and displays a graphical representation of the composite presentation by displaying thumbnail representations of media clips that form the composite presentation. One or more media clips can be placed on the central compositing lane 3565.

The user selectable UI item 3570 is a conceptual illustration of one or more UI items that allows the color matching tool to be invoked (e.g., by a cursor operation such as clicking a mouse, tapping a touchpad, or touching the UI item on a touchscreen). Different embodiments implement the UI item 3570 differently. Some embodiments implement the UI item 3570 as a UI button while other embodiments implement the UI item 3570 as a menu selection command that can be selected through a pull-down, drop-down, or pop-up menu. Still other embodiments implement the UI item 3570 as a keyboard command that can be invoked through one or more keystrokes or a series of keystrokes. Yet other embodiments allow the user to invoker the color matching tool through two or more of such UI implementations or other UI implementations.

The operation of the GUI 3500 will now be described by reference to the four different stages 3510-3540 that are illustrated in FIG. 35. The first stage 3510 illustrates that a user has selected media clip 3575 in the compositing display area 3560 using a cursor (e.g., by clicking a mouse button, tapping a touchpad, or touching a touchscreen). The selection is illustrated by a bolding of the border of the media clip 3575. In this example, the user selects the media clip 3575 as the media clip that the user wants to modify (e.g., the target media clip). As shown, the thumbnail representation of the media clip 3575 shows an image of a house, a fence, and a sun in the sky. For this example, the media clip 3575 is a still image. However, the media clip 3575 can be any other type of media clip, as mentioned above.

The first stage 3510 also illustrates the image of the media clip 3575 displayed in the preview display area 3555. In some embodiments, the media-editing application displays the image of the media clip 3575 in the preview display area 3555 when the media-editing application receives the selection of the media clip 3575 from the user.

The second stage 3520 shows that the user has selected the user selectable UI item 3570 (e.g., by clicking a mouse button, tapping a touchpad, or touching the media clip 3575 on a touchscreen) to activate the color matching tool. The second stage 3520 illustrates this activation by changing the appearance of the UI item 3570. After the user has activated the color matching tool, the user can select another media clip (e.g., a source media clip) to which the user wishes to match the media clip 3575. In some embodiments, after the user has activated the color matching tool, the media-editing application provides another user selectable UI item (e.g., a "Cancel" button) for deactivating the color matching tool. The user can select this UI item in order to deactivate the color matching tool without applying a color matching operation to the media clip 3575. In some cases where the user selects this UI item to deactivate the color matching tool, the media-editing application returns to the state illustrated in the first stage 3510 (without the media clip 3575 selected and bolded in some embodiments).

The third stage 3530 illustrates that the user has selected media clip 3580 displayed in the media library 3550 using the cursor (e.g., by clicking a mouse button, tapping a touchpad, or touching the media clip 3580 displayed on a touchscreen). The selection of the media clip 3580 is indicated by a bolding of the border of the media clip 3580. Similar to the media clip 3575, the media clip 3580 is a still image in this example, but the media clip 3580 may be any other type of media clip. As shown, the thumbnail representation of the media clip 3580 shows a dark image as indicated by a gray cast in the thumbnail. As mentioned above, after the color matching tool is activated, the user selects another media clip to which the user wants to match the media clip 3575. In this example, the user has selected media clip 3580 as the media clip to which the user wants to match the media clip 3575.

The third stage 3530 also shows that the text of the UI item 3570 has changed. As shown, the text of the UI item 3570 has changed from "Match" to "Done". The media-editing application of some embodiments modifies the text of the UI item 3570 from "Match" to "Done" and displays the modified UI item 3570 when the media-editing application receives the selection of UI item 3570 as described above in the second stage 3520. After the user has selected a media clip to which the user wishes to match the media clip 3575, the user can select the modified UI item 3570 to invoke a color matching operation that matches the colors of the media clip 3575 to the colors of the selected media clip.

As noted above, the media clip 3580 is a still image in the example illustrated in FIG. 35. In cases where the user wants to select an image from a video clip to which the user wishes to match the media clip 3575, some embodiments of the color matching tool allow the user to identify a frame in the video clip using a playhead indicator (also referred to as a scrubber bar) and to select an identified frame in the video clip using a cursor control operation (e.g., clicking a mouse button, tapping a trackpad, or touching a touchscreen). In some embodiments, the user might want to match the colors of a frame in a video clip to the colors of another frame in the same video clip. Some such embodiments provide the user with the same method noted above for identifying (i.e., using a playhead indicator) and selecting the frames in a video clip.

The fourth stage 3540 illustrates that the user has selected the modified UI item 3570 to invoke a color matching operation that matches the colors of the media clip 3575 to the colors of the media clip 3580. The fourth stage 3540 illustrates the selection of the modified UI item 3570 by changing the appearance of the UI item 3570. As shown at the stage 3540, the color matching tool has modified the colors of the media clip 3575 to match the colors of the media clip 3580 as indicated by the similar gray cast shown in the thumbnail representation of the media clip 3575. In addition, the fourth stage 3540 shows a preview of the modified media clip 3575 displayed in the preview display area 3555. The media-editing application of some embodiments displays the preview of the modified media clip 3575 in the preview display area 3555 when the media-editing application receives the selection of the modified UI item 3570.

After the color matching tool completes the color matching operation, the media editing application of some embodiments removes the bolding of the border of the media clips 3575 and 3580 that were used in the color matching operation, as shown in the fourth stage 3540. Furthermore, some embodiments of the media-editing application deactivate the color matching tool after the color matching tool completes the color matching operation by changing the text of the modified UI item 3570 from "Done" back to "Match".

Some embodiments of the media-editing application provide a preview of a color matching operation applied to the target media clip before invoking the color matching operation to modify the target media clip. In this manner, the user can see how the target media clip would look with the color matching operation applied without actually applying the color matching operation to the target media clip. However, some embodiments apply the color matching operation to the target media clip when providing a preview of the color matching operation applied to the target media clip. The color matching operation might be applied to the thumbnail representation of the target media clip in some embodiments in order to save processing power when creating a preview. This allows the user to quickly browse through different media clips to select a source media clip to which the user wants to match the target media clip.

Different embodiments provide the preview of the color matching operation applied to the target media clip differently. For example, some embodiments of the media-editing application provide the preview in the preview display area 3555. In such embodiments, the media-editing application displays the preview of the target media clip with the color matching operation applied to it when the user selects a source media clip to which the user wishes to match the target image (e.g., in the third stage 3530). Each time the user selects a media clip in the media library 3550 or the compositing display area 3560, the media-editing application of these embodiments generates a preview of the target media clip with the color matching operation applied to it based on the selected source media clip. As another example, some embodiments of the media-editing application provide a second preview display area for displaying the preview when the color matching tool is activated (e.g., in the second stage 3520). In some such embodiments, the second preview display area may be part of a picture-in-picture arrangement with the preview display area 3555 (e.g., as the main picture or as the inset picture) while, in other such embodiments, the second preview display area is a display area separate from the preview display area 3555.

FIG. 35 illustrates one arrangement of a GUI of a media-editing application. However, different embodiments of the media-editing application can be arranged any number of different ways. For example, in some embodiments, the media library 3550 may be located on the right side of the GUI 3500, the preview display area 3555 may be located on the left side of the GUI 3500, and the compositing display area 3560 may be located near the top region of the GUI 3500. In addition, some embodiments allow the user to move these display areas around the GUI 3500. The GUI of a media-editing application of some embodiments can include additional and/or other UI elements than those illustrated in FIG. 35. For instance, some embodiments may provide a menu tool bar, user selectable UI items to resize the GUI 35 and/or display areas 3550-3560, other display areas, etc.

As described above, FIG. 35 illustrates one way a user of the color matching tool of some embodiments may invoke a color matching operation. Some embodiments of the color matching tool allow the user to invoke the color matching operation by first selecting two media clips and then selecting the UI item 3570 to match the colors of one of the selected media clips with the colors of the other selected media clips. Conversely, some embodiments of the color matching tool allow the user to invoke the color matching operation by first selecting the UI item 3570 and then selecting two media clips to match the colors of one of the selected media clips with the colors of the other selected media clip. The color matching tool of some embodiments allows the user to invoke the color matching operation using any combination of different methods described above.

The stages 3510-3540 of FIG. 35 show the user selecting various UI elements in the GUI 3500 using a cursor. However, other embodiments provide other ways of selecting UI elements. For example, some embodiments of the media-editing application allow the user to select UI elements by touching the UI elements that are displayed on a touchscreen. As another example, the media-editing application of some embodiments allows user to select the UI elements through a keyboard command (e.g., a keystroke, a combination of keystrokes, or a series of keystrokes, etc.). In some embodiments, the media-editing application allows the user select the UI elements through a command included in a menu (e.g., a drop-down menu, a pull-down menu, a pop-up menu, etc.) Other ways of selecting the various UI elements of the GUI 3500 are possible.

While the example illustrated in FIG. 35 shows a particular sequence of operations for a color matching operation, other sequences of operations are possible. For instance, after the user has activated the color matching tool in the second stage 3520, the user may select any number of different media clips in the media library 3550 and the compositing display area 3560 in order to find a media clip (e.g., a source media clip) to which the user wishes to match the media clip 3575 (e.g., a target media clip). The media clip that the user most recently selected before selecting the modified UI item 3570 is the media clip to which the media clip 3575 will be matched.

Figure 36:
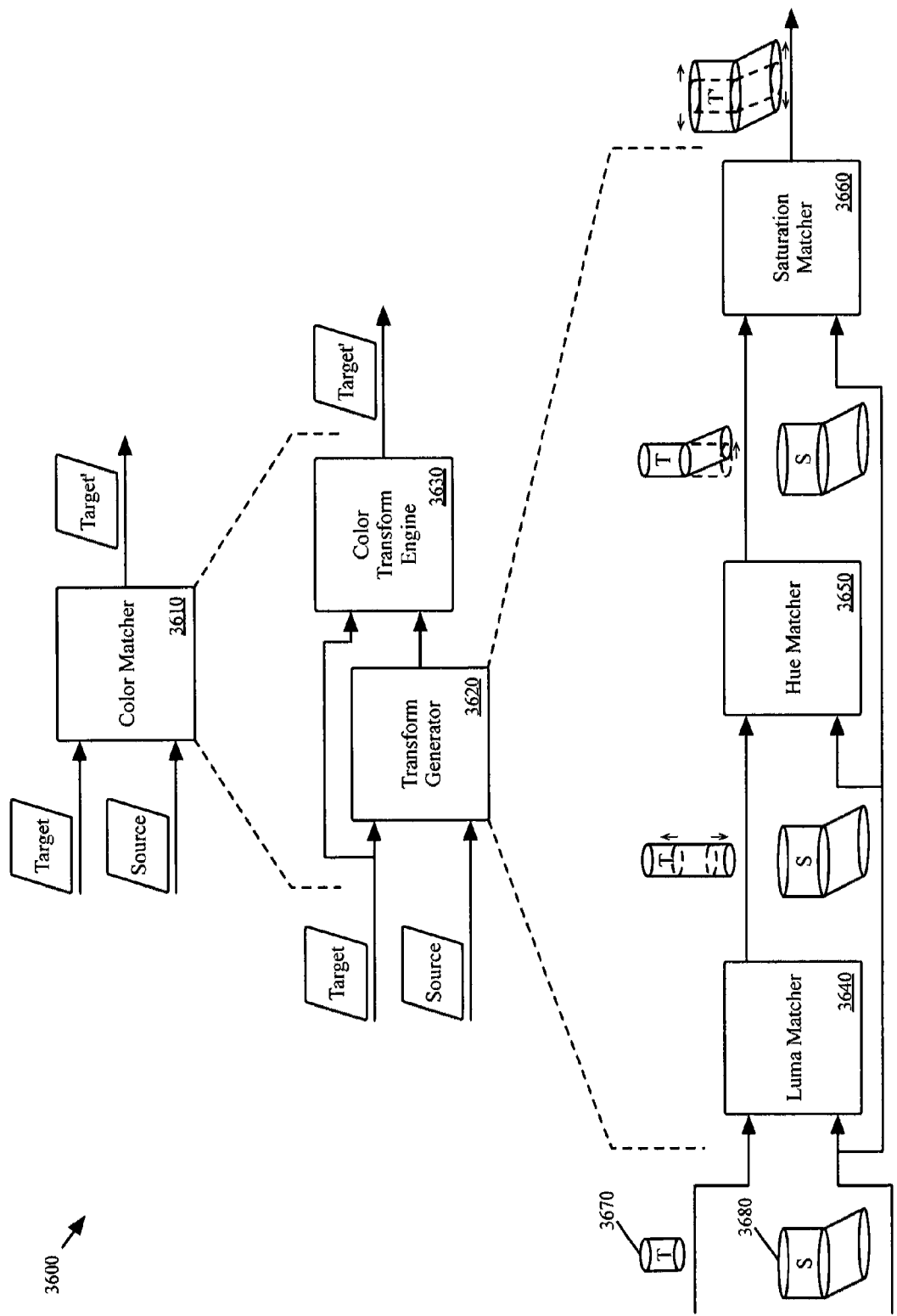
FIG. 36 conceptually illustrates a software architecture of a color matching tool of some embodiments.

The following FIG. 36 conceptually illustrates a software architecture 3600 of a color matching tool of some embodiments. As shown, FIG. 36 illustrates the software architecture 3600 at three different hierarchical levels. The top level of the software architecture 3600 includes a color matcher 3610. As illustrated at the top level, the color matcher 3610 receives a target image (or a frame from a video clip) and a source image (or a frame from a video clip). In some embodiments, the color matcher 3610 receives the images from a media-editing application or any other application that provides the color matching tool. The color matcher 3610 analyzes the attributes (e.g., contrast, saturation, luminance, luma, hue, etc.) of each of the received images. In some embodiments, the color matcher 3610 converts the color space of the received images (e.g., from RGB to Y'CbCr) before analyzing their attributes.

Based on the analyses of the images, the color matcher 3610 of some embodiments modifies the target image (as indicated by the "Target'" notation) so that the colors of the target image match the colors of the source image. Instead of modifying the target image, some embodiments of the color matcher 3610 generate a version of the target image with the colors that match the colors of the source image. This leaves an unmodified copy of the target image as well as the modified version with the colors matched to the colors of the source image. In some embodiments, the color matcher 3610 outputs the color matched target image (e.g., to a preview display area of a GUI).

The middle level of the software architecture 3600 illustrates the modules that are included in the color matcher 3610 of some embodiments. As shown at this level by dashed brackets, the color matcher 3610 includes a transform generator 3620 and a color transform engine 3630. The transform generator 3620 receives the target image and the source image as input. In some embodiments, the transform generator 3620 analyzes the attributes of the target image and the source image in order to determine and generate transforms that match the colors of the target image to the colors of the source image. The transform generator 3620 then sends the generated transforms to the color transform engine 3630.

As shown at the middle level of the software architecture 3600, the color transform engine 3630 receives as input the target image and receives from the transform generator 3620 the transforms generated by the transform generator 3620. As mentioned, the generated transforms are for matching the colors of the target image to the colors of the source image. The color transform engine 3630 of some embodiments applies the transforms to the target image so that the colors of the target image match the colors in the source image. In some embodiments, the color transform engine 3630 applies the transforms to an unmodified version (e.g., a copy) of the target image (since the transform generator 3620 of some embodiments modifies the target image in order to determine some transforms). After applying the transforms to the target image (or a copy of the target image), some embodiments of the color transform engine 3630 output the modified target image (e.g., to a preview display area of a GUI).

At the bottom level of the software architecture 3600, FIG. 36 illustrates the modules that are included in the transform generator 3620 of some embodiments. As shown at this level by dashed brackets, the transform generator 3620 includes a luma matcher 3640, a hue matcher 3650, and a saturation matcher 3660. Each of the modules 3640-3660 determines different transforms for matching different attributes of the target image to the attributes of the source image.

As shown, the bottom level also illustrates conceptual representations of the color values (e.g., pixel values) of an example target image and an example source image in a three-dimensional color space. In particular, the bottom level of FIG. 36 illustrates the conceptual effects that the transforms determined by each of the modules 3640-3660 have on the representations of the colors of the target image in an HSL color space (also referred to as a HSL color space), which is a hue, saturation, and luma (or lightness in some embodiments) color space in this example. In the HSL color space, the angle around a central vertical axis represents different hues, the distance from the central vertical axis represents different saturation levels, and the distance along the central vertical axis represents different levels of luma.

While these conceptual representations are shown as contiguous cylinders, one of ordinary skill in will recognize that the pixel values of an image are actually a set of discrete pixel values that may occupy an arbitrary set of points in a color space (e.g., the HSL color space shown in this example). Transforms applied by the color matching tool of some embodiments will affect each pixel value separately. In some embodiments, the pixel values of a particular pixel are the color values assigned to the pixel in a particular color space (e.g., the hue, saturation, and luma values). In addition, although the conceptual representations illustrated in FIG. 36 represent the color values of pixels in the images, the conceptual representations could instead represent the color values of pixels in the images having luma values within a particular range of luma levels. Some embodiments apply particular transforms to the pixels of an image that have luma values in a particular range of luma levels in order to modify the pixel values of those pixels.

As illustrated in FIG. 36, the luma matcher 3640 receives the target image and the source image as input. As shown, a short and thin cylinder is shown for a color space representation 3670 of the pixel values of the target image in the HSL color space and a tall and thick cylinder 3680 with the bottom portion of the cylinder shifted towards the right is shown for a color space representation 3680 of the pixel values of the source image. In some embodiments, the luma matcher 3640 determines transforms for matching the luma (e.g., contrast) of the target image to the luma of the source image.

As mentioned above, the distance along the central vertical axis of the three-dimensional color space represents different levels of luma. Therefore, in this example, the luma matcher 3640 determines transforms that match the range of luma levels of the pixel values of the target image to the range of luma levels of the pixel values of the source image. The effect of these transforms is conceptually illustrated by the vertical stretching of the color space representation 3670 of the colors of the target image to match the vertical length of the color space representation 3680 of the colors of the source image. In some embodiments, the luma matcher 3640 applies the determined transform to the target image and then sends the modified target image to the hue matcher 3650.

The hue matcher 3650 receives from the luma matcher 3640 the target image to which transforms determined by the luma matcher 3640 have been applied. The hue matcher 3650 also receives as input the source image. The hue matcher 3650 of some embodiments determines transforms for matching the hues (e.g., colors) of the target image to the hues (e.g., colors) of the source image. In some such embodiments, the transforms are shear transformations that shift the pixel values of the target image toward the pixel values of the source image. In some embodiments, a two-dimensional shear transformation maintains a fixed axis and shifts all points parallel to the fixed axis by a distance proportional to their perpendicular distance from the fixed axis and a three-dimensional shear transformation maintains a fixed plane and shifts all planes parallel to the fixed plane by a distance proportional to their perpendicular distance from the fixed plane.

The angle around the central vertical axis of the HSL color space represents different hues, as noted above. Thus, in this example, the hue matcher 3650 determines transforms that match the average pixel value at each of the levels of luma of the target image to the average pixels values at each of the corresponding levels of luma of the source image. The effect of these transforms is conceptually illustrated by the horizontal shifting (e.g., shearing) along the vertical axis of the color space representation of the target image so that the center of the circles along the vertical axis of the color space representation of the target image aligns with the center of the corresponding circles along the vertical axis of the color space representation of the source image. As shown, the lower portion of the color space representation of the target image is shifted towards the right to match the color space representation of the source image. Some embodiments of the hue matcher 3650 apply the determined transform to the target image that the hue matcher 3650 received from the luma matcher 3640 (to which the luma matcher 3640 has already applied the transforms determined by the luma matcher 3640). The hue matcher 3650 of some of these embodiments then sends the modified target image to the saturation matcher 3660.

As shown at the bottom level of the software architecture 3600 illustrated in FIG. 36, the saturation matcher 3660 receives from the hue matcher 3650 the target image (or a copy of the target image) that has the transforms determined by the luma matcher 3640 and the hue matcher 3650 applied to it. In addition, the saturation matcher 3660 receives as input the source image. Some embodiments of the hue matcher 3650 determine transforms for matching the saturation of the target image to the saturation of the source image.

As mentioned above, the distance from the central vertical axis of the HSL color space represents different saturation levels. As such, in this example, the saturation matcher 3660 determines transforms that adjusts (e.g., increases or decreases) the saturation of the colors of the target image such that the saturation of the colors of the target image matches the saturation of the colors of the source image. The effect of these transforms is conceptually illustrated by a horizontal expansion of the color space representation of the target image to match the color space representation of the source image. As shown, FIG. 36 conceptually illustrates that the color space representation of the target image appears the same or similar to the color space representation of the source image after the transforms determined by the modules 3640-3660 have been applied to the target image.

While many of the features have been described as being performed by one module (e.g., the luma matcher 3640, the hue matcher 3650, the saturation matcher 3660, etc.), one of ordinary skill in the art will recognize that the functions described herein might be split up into multiple modules. Similarly, functions described as being performed by multiple different modules might be performed by a single module in some embodiments (e.g., the color matching function, the transform generating function, etc.).

Figure 37:
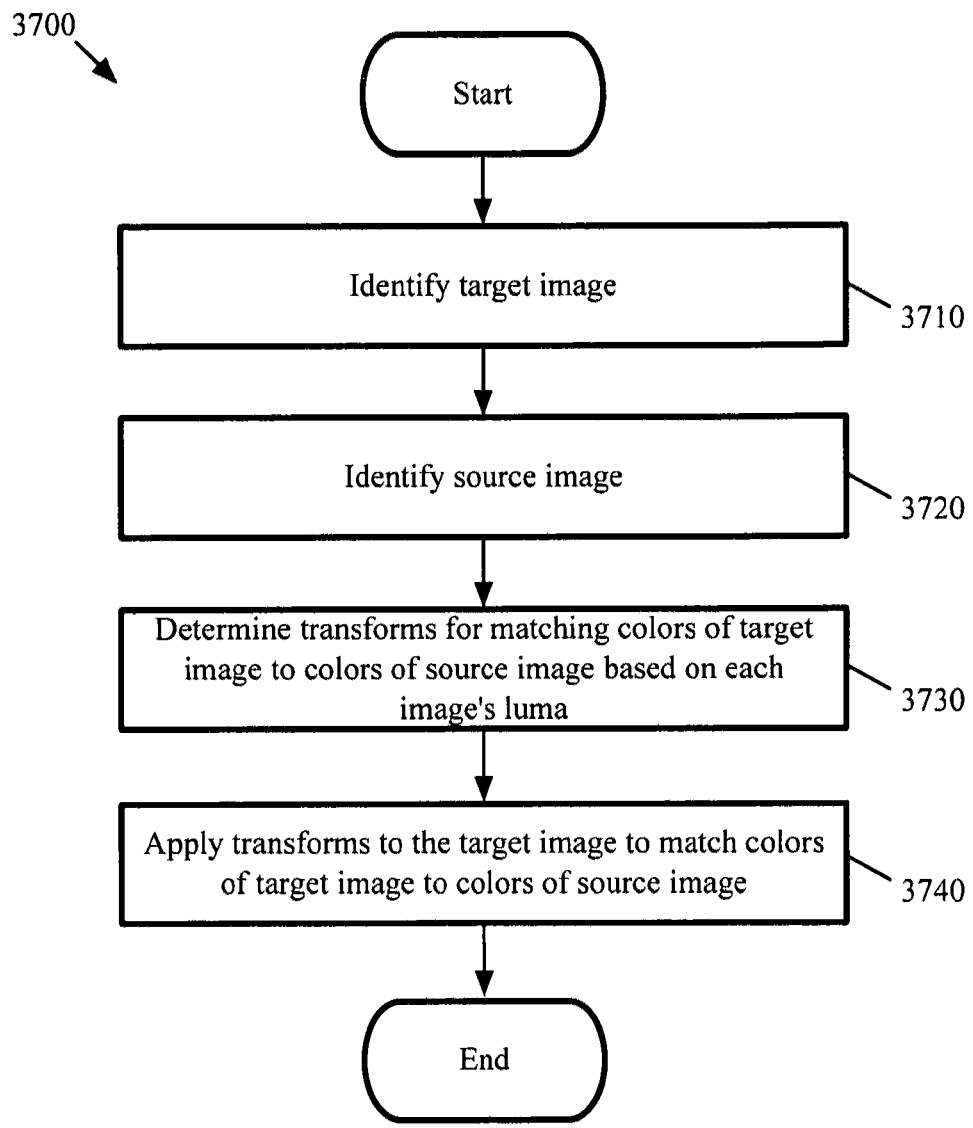
FIG. 37 conceptually illustrates a process of some embodiments for color matching images based on the images' luma.

The above FIG. 36 conceptually illustrates matching the colors (e.g., luma, hue, and saturation) of an image to the colors of another image according to some embodiments of the invention. These embodiments match the colors in a luma-based manner. FIG. 37 conceptually illustrates a luma-based color matching process 3700 of some embodiments. In some embodiments, the process 3700 is performed by the color matching tool when it performs a color matching operation (e.g., when the user selects the modified UI item 3570 in the third stage 3530 as described above by reference to FIG. 35).

As shown, the process 3700 begins by identifying (at 3710) a target image. The process 3700 then identifies (at 3720) a source image. As mentioned above, the target image and the source image may each be a still image, an image (e.g., frame) from a video, or any other type of image. In some embodiments, the identified images are images that are selected by a user through a GUI of an application (e.g., GUI 3500) that provides the color matching tool.

After the target image and the source image have been identified, the process 3700 then determines (at 3730) transforms for matching the colors of the target image to the colors of the source image based on each image's luma. In some embodiments, a set of transforms is determined for every luma level (e.g., luma component value) of an image while, in other embodiments, a set of transforms is determined for each of several luma ranges (e.g., ranges of luma levels).

Finally, the process 3700 applies (at 3740) the transforms to the target image to match the colors of the target image to the colors of the source image. For each pixel in the target image, some embodiments apply a set of transforms to the pixel. After all the pixels in the target image are processed, the colors of the target image match the colors of the source image.

FIG. 37 illustrates a process for color matching a target image to a source image. In some instances, the target image may be part of a video clip. In these cases, some embodiments of the process 3700 apply the transforms determined based on the target image to the remaining images of the video clip in order to match the remaining images to the source image. However, in some embodiments, the process 3700 is individually performed for each image or frame in the video clip.

While the above figures describe a technique for matching the colors of the target image to the colors of the source image based on the images' luma (also referred to as global color matching), the following will describe another technique for matching the colors of a target image to the colors of a source image. Some embodiments of the color matching tool provide a more localized color matching technique that matches the colors of the images based on the images' hues (also referred to as local color matching). Some of these embodiments utilize a dominant hue-dependent color matching technique. In such a technique, dominant hues in the target image and the source image are identified and dominant hues in the target image are shifted to match dominant hues in the source image that are the same or similar.

Different embodiments implement dominant hue-dependent color matching differently. For instance, some embodiments match the colors of the images based on the images' dominant hues and independent of the luma (or luminance) of the images. In other embodiments, after the dominant hue-dependent color matching technique is performed, all of the operations described above by reference to FIG. 36 (or a subset of them) are also performed on the images. Unlike the previously described color matching technique, such embodiments analyze the hues of the images and adjust (e.g., shift) the hues in the target image before performing the operations described by reference to FIG. 36.

As noted above, some of the operations described by reference to FIG. 36 are conceptually viewed as vertical adjustments of the colors of a target image along the vertical axis, horizontal shifts of colors of the target image along the vertical axis, and horizontal expansion or contraction of the colors of the target image along the vertical axis. In this same conceptual example, the dominant hue-dependent color matching technique can be viewed as a rotation of the colors (e.g., hues) of the target around the vertical axis that is independent of luma (or lightness). Alternatively, the dominant hue-dependent color matching can be conceptually viewed as rotations of a two-dimensional color space (e.g., a two-dimensional color wheel) around a center point.

Figure 38:
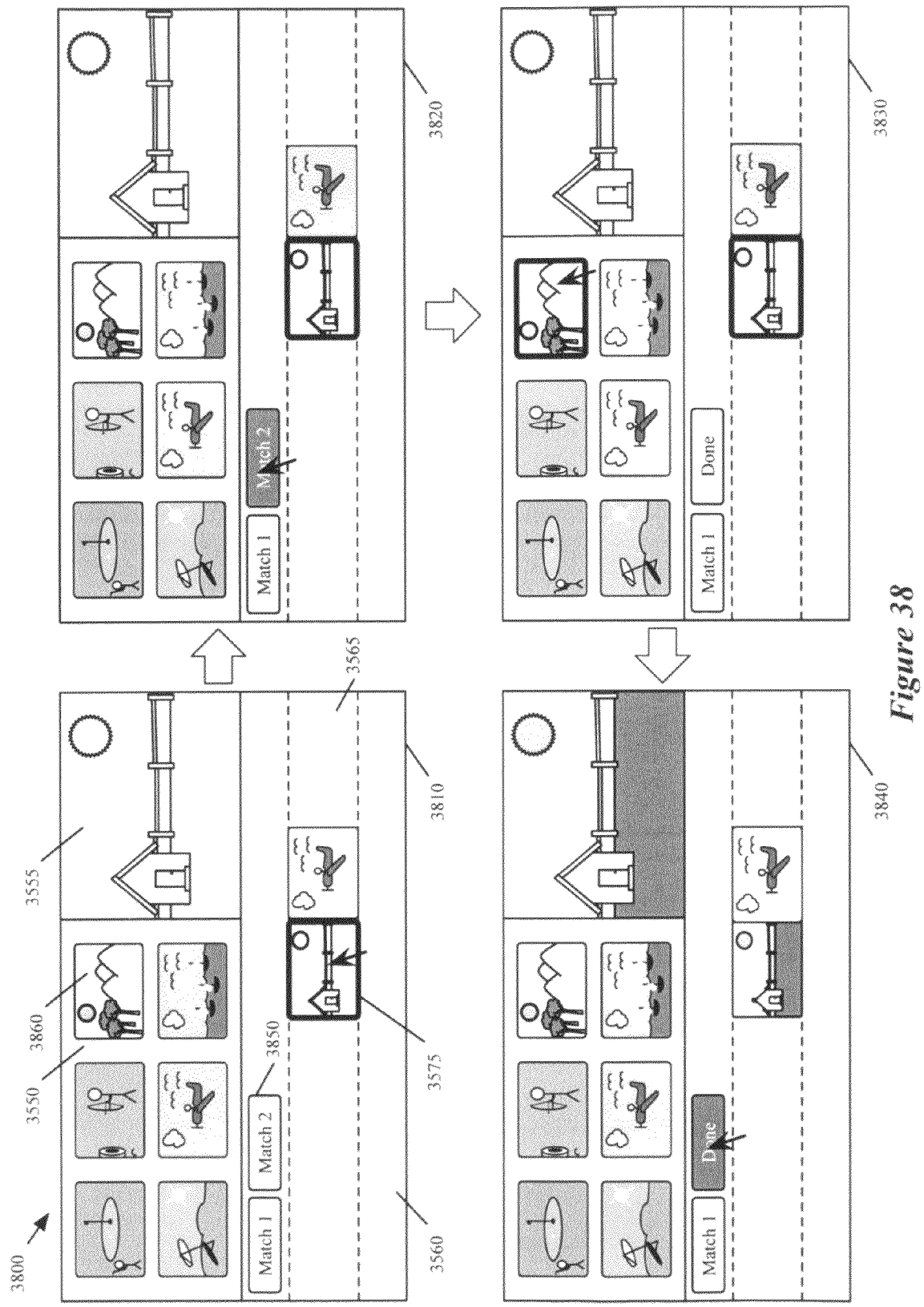
FIG. 38 conceptually illustrates the GUI of a media-editing application illustrated in FIG. 35 that provides a color matching tool of some embodiments.

FIG. 38 conceptually illustrates a GUI 3800 of a media-editing application that provides both local and global color matching tools. As shown, the GUI 3800 is similar as the GUI 3500 illustrated in FIG. 35 except the GUI 3800 includes media clip 3860 instead of the media clip 3580 and includes an additional user selectable UI item 3850 that is labeled "Match 2". In addition, the UI item 3570 is labeled "Match 1" accordingly. The UI item 3850 is similar to the UI item 3570, but instead of allowing for the global color matching tool to be invoked, the UI item 3850 allows the local color matching tool to be invoked. As such, the UI item 3850 is a conceptual illustration of one or more UI items for invoking the local color matching tool and can be implemented using the many different ways described above for the UI item 3570.

The operation of the GUI 3800 will now be described by reference to four different stages 3810-3840 that are illustrated in FIG. 38. The first stage is the same as the first stage 3510 that is described above by reference to FIG. 35. In the first stage 3810, the user has selected the media clip 3575, which is the media clip that the user wants to modify (e.g., the target media clip).

The second stage 3820 is similar to the second stage 3520, which is described above by reference to FIG. 35. However, in the second stage 3820, the user has selected the UI item 3850 (e.g., by clicking a mouse button, tapping a touchpad, or touching the media clip 3575 on a touchscreen) instead of the UI item 3570 in order to activate the local color matching tool after which the user can select another media clip to which the user wishes to match the media clip 3575. This stage 3820 similarly illustrates the selection of the UI item 3850 by changing the appearance of the UI item 3850. After the user has activated the local color matching tool, the media-editing application of some embodiments provides another user selectable UI item (e.g., a "Cancel" button) for deactivating the local color matching tool. The user can select this UI item in order to deactivate the local color matching tool without applying a local color matching operation to the media clip 3575. In some instances where the user selects this UI item to deactivate the local color matching tool, the media-editing application returns to the state illustrated in the first stage 3810 (without the media clip 3575 selected and bolded in some embodiments).

The third stage 3830 is similar to the third stage 3530 that is described above by reference to FIG. 35 except, at the third stage 3830, the user has selected the media clip 3860 as the media clip to which the user wants to match the media clip 3575. The selection of the media clip 3860 is indicated by a similar bolding of the border of the media clip 3860. In this example, the media clip 3860 is a still image. However, as mentioned above, the media clip 3860 may be any other type of media clip. As shown, the thumbnail representation of the media clip 3860 shows an image of mountains, a sun, and trees.

Similar to the third stage 3530, the third stage 3830 of the GUI 3800 shows the text of the UI item 3850 modified from "Match 2" to "Done" and displayed when the media-editing application receives the selection of UI item 3850 as described above in the second stage 3820. After the user has selected a media clip to which the user wishes to match the media clip 3575, the user can select the modified UI item 3850 to invoke a local color matching operation that matches the colors of the media clip 3575 to the colors of the selected media clip.

The fourth stage 3840 is similar to the fourth stage 3540 that is described above by reference to FIG. 35 but, in this fourth stage 3840, the user has selected the modified UI item 3850 to invoke a local color matching operation that matches the colors of the media clip 3575 to the colors of the media clip 3860. The fourth stage 3840 illustrates the selection of the modified UI item 3850 by similarly changing the appearance of the UI item 3850. As shown at the fourth stage 3840, the local color matching tool has modified the colors of the media clip 3575 to match the colors of the media clip 60. In particular, the green color of the grass in the media clip 3575 is matched to the green color of the trees in the media clip 3860, as indicated by the matching medium gray color of the grass. In addition, the yellow color of the sun in the media clip 3575 is matched to the yellow color of the sun in the media clip 3860, which is indicated by the matching light gray of the sun. The fourth stage 3840 also shows a preview of the modified media clip 3575 displayed in the preview display area 3555. In some embodiments, the media-editing application displays the preview of the modified media clip 3575 in the preview display area 3555 when the media-editing application receives the selection of the modified UI item 3850.

For purposes of explanation and simplicity, the local color matching illustrated in the fourth stage 3840 shows that only the green color of the grass in the media clip 3575 matched to the green color of the trees in the media clip 3860 and the yellow color of the sun in the media clip 3575 matched to the yellow color of the sun in the media clip 3860 in this example. However, other colors in the media clip 3575 may also be matched as well (e.g., the blue color of the sky in the media clip 3575 can be matched to the blue color of the sky in the media clip 3860).

After the local color matching tool completes the local color matching operation, the media editing application of some embodiments removes the bolding of the media clips 3575 and 3860 that were used in the local color matching operation, as shown in the fourth stage 3840. Moreover, some embodiments of the media-editing application deactivate the local color matching tool after the local color matching tool completes the local color matching operation by changing the text of the modified UI item 3850 from "Done" back to "Match 2".

Different embodiments of the media-editing application provide a preview of a local color matching operation applied to the target media clip before invoking the local color matching operation to modify the target media clip in the various different ways described above by reference to FIG. 35. That is, some embodiments provide the preview in the preview display area 3555, and some embodiments of the media-editing application provide a second preview display area (e.g., in a picture-in-picture fashion or as a preview display area separate from a first preview display area) for displaying the preview when the local color matching tool is activated (e.g., in the second stage 3820).

Similar to the GUI 3500, the display areas 3550-3560 in GUI 3800 can be arranged differently, resized, moved, etc. in some embodiments, as described above. In addition, the GUI 3800, in some embodiments, can invoke the local color matching tool in the numerous different ways that are described above for the GUI 3500. Also, the user media-editing application of some embodiments allows the user to select the numerous UI elements in the GUI 3800 in the different ways, as described above for the GUI 3500.

While the example illustrated in FIG. 38 shows a particular sequence of operations for a local color matching operation, other sequences of operations are possible. For example, after the user has activated the local color matching tool in the second stage 3820, the user may select any number of different media clips in the media library 3550 and the compositing display area 3560 in order to find a media clip (e.g., a source media clip) to which the user wishes to match the media clip 3575 (e.g., the target media clip). The most recent media clip that the user selects before selecting the modified UI item 3850 is the media clip to which the media clip 3575 is matched.

Figure 39:
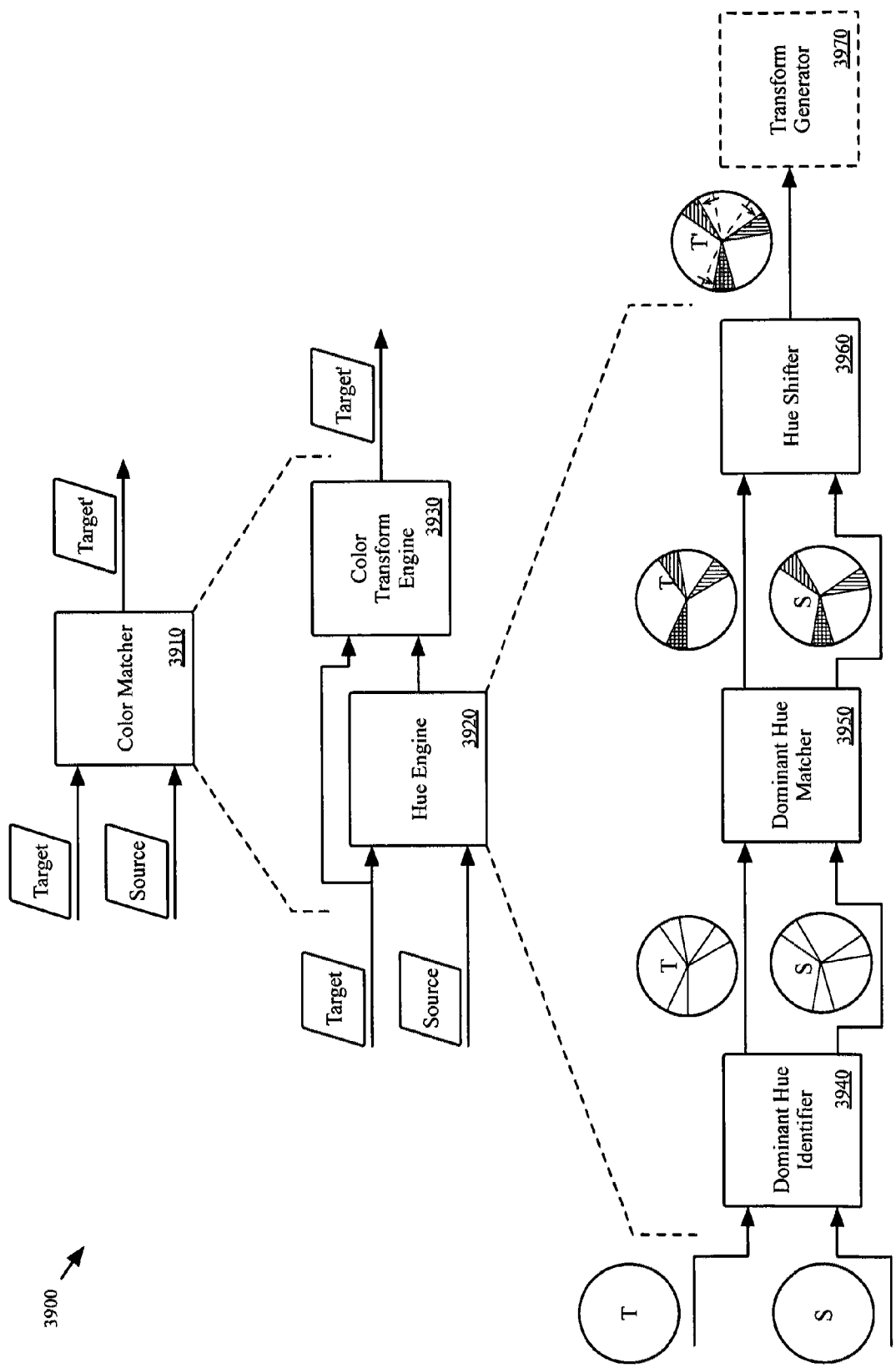
FIG. 39 conceptually illustrates a software architecture of a color matching tool of some embodiments.

FIG. 39 conceptually illustrates a software architecture 3900 of a local color matching tool of some embodiments. Specifically, FIG. 39 illustrates the software architecture 3900 at three different hierarchical levels. As shown, the top level of the software architecture 3900 includes a color matcher 3910 that receives a target image (e.g., a frame from a video clip) and a source image (e.g., a frame from a video clip). Some embodiments of the color matcher 3910 receive the images from a media-editing application or any other application that provides the local color matching tool. The color matcher 3910 analyzes the hue attributes of each of the received images in order to identify dominant hues in each of the images. In some embodiments, the color matcher 3910 converts the color space of the received images (e.g., from RGB to Y'CbCr) before performing this analysis.

Based on the dominant hues that were identified in each of the images, some embodiments of the color matcher 3910 determine matching dominant hues in each of the images. In this manner, dominant hues in the target image are matched to the same or similar dominant hues in the source image. After identifying and matching dominant hues in each of the images, the color matcher 3910 of some embodiments modifies the target media clip (as indicated by the "Target'" notation) so that the colors of the target media clip match the colors of the source media clip. Instead of modifying the target image, some embodiments of the color matcher 3910 generate a version of the target image with the colors that match the colors of the source image. In some embodiments, the color matcher 3910 outputs the color matched target image (e.g., to a preview display area of a GUI).

The middle level of the software architecture 3900 illustrates the modules that are included in the color matcher 3910. As shown at this level by dashed brackets, the color matcher 3910 includes a hue engine 3920 and a color transform engine 3930. The hue engine 3920 receives as input the target image and the source image. In some embodiments, the hue engine 3920 analyzes the hue attributes of the target image and the source image to identify the dominant hues in the target image and the dominant hues in the source image. In addition, the hue engine 3920 of such embodiments matches dominant hues in the target image with dominant hues in the source image that are the same or similar. Based on the analyses of the images' hues, the hue engine 3920 shifts the hues in the target image so that the dominant hues in the target image align with the matching dominant hues in the source image. In some embodiments, the hue engine 3920 determines and generates transforms that match the colors of the dominant hues of the target image to the colors of the dominant hues of the source image. The hue engine 3920 then sends the generated transforms to the color transform engine 3930.

The color transform engine 3930 is similar in many ways to the color transform engine 3630 describe above. However, in this example, the color transform engine 3930 receives as input the target image and receives from the hue engine 3920 the transforms generated by the hue engine 3920. As mentioned, the generated transforms are for matching the colors of the target image to the colors of the source image. Some embodiments of the color transform engine 3930 apply the transforms to the target image so that the dominant hues of the target image match to corresponding dominant hues in the source image. In some embodiments, the color transform engine 3930 applies the transforms to an unmodified version (e.g., a copy) of the target image (since the transform generator 3920 of some embodiments modifies the target image in order to determine some transforms). After applying the transforms to the target image (or a copy of the target image in some embodiments), some embodiments of the color transform engine 3930 output the modified target image (e.g., to a preview display area of a GUI).

At the bottom level of the software architecture 3900, FIG. 39 illustrates the modules that are included in the hue engine 3920. As shown, the hue engine 3920 includes a dominant hue identifier 3940, a dominant hue matcher 3950, and a hue shifter 3960.

In addition, the bottom level illustrates conceptual representations of the color values (e.g., pixel values) of an example target image and an example source image in a two-dimensional color wheel. Specifically, the bottom level shows the conceptual effects that the functions performed by each of the modules 3940-3960 have on the representations of the hues of the target image. In this example, the angle around the center of the color wheel represents different hues. As such, a "wedge" in the color wheel represents a range of hues.

While these conceptual representations are shown as contiguous circles and wedges, one of ordinary skill in will realize that the pixel values of an image are actually a set of discrete pixel values that may occupy an arbitrary set of points in a color space (e.g., the HSL color space show in this example). These pixel values may be more highly concentrated in the regions of the color space represented by the wedges in this FIG. 39. Transforms applied by the color matching tool of some embodiments will affect each pixel value separately. In some embodiments, the pixel values of a particular pixel are the color values assigned to the pixel in a particular color space (e.g., the hue, saturation, and luma values).

As illustrated in FIG. 39, the dominant hue identifier 3940 receives the target image and the source image as input. As shown, a color wheel that represents the hues in the target image and is indicated with a "T" and a color wheel that represents the hues in the source image is indicated with an "S". Some embodiments of the dominant hue identifier 3940 identify dominant hues in the target image and dominant hues in the source image.

In this example, the dominant hue identifier 3940 has identified three dominant hue ranges in the target image and three dominant hue ranges in the source image. As shown, three wedges in the color wheel that represents the hues in the target image represent three dominant hue ranges of pixel values in the target image. In addition, three wedges in the color wheel that represents the hues in the source image represent three dominant hue ranges of pixel values in the source image. After identifying the dominant hues in the target image and the source image, the dominant hue identifier 3940 sends to the dominant hue matcher 3950 information that indicates the dominant hues in the images along with the target image and the source image.

The dominant hue matcher 3950 receives from the dominant hue identifier 3940 the target image, the source image, and information indicating the dominant hues that the dominant hue identifier 3940 has identified in each of the images. Based on this information, the dominant hue matcher 3950 of some embodiments matches dominant hue ranges of pixel values in the target image with corresponding same or similar dominant hue ranges of pixel values in the source image. In some embodiments, the dominant hue matcher 3950 matches the dominant hue ranges of pixel values in the target image with corresponding same or similar dominant hue ranges of pixels in the source image based on similarity factors, such as the range pixel values of dominant hues (e.g., the angle formed by the wedge that represents the range of pixel values of dominant hue in the color wheel), the size of the portion (e.g., the number of pixels) of each of the images that has pixel values in the dominant hue ranges, and the amount of overlapping hues in the dominant hues (e.g., the amount of overlap of pixel values in each of the color wheels).

For this example, the dominant hue matcher 3950 has matched the three dominant hue ranges of pixel values in the target image with the three dominant hue ranges of pixel values in the source image, as indicated by the same type of lines filled in the matching wedges of the color wheels of the images. As shown, the dominant hue matcher 3950 matched the wedge filled with the horizontal lines in the color wheel of the target image with the wedge filled with the horizontal lines in the color wheel of the source image. Likewise, the dominant hue matcher 3950 matched the wedge filled with the vertical lines in the color wheel of the target image with the wedge filled with the vertical lines in the color wheel of the source image and matched the wedge filled with the horizontal and vertical lines in the color wheel of the target image with the wedge filled with the horizontal and vertical lines in the color wheel of the source image. After matching the dominant hue ranges of pixel values in the target image and the source image, the dominant hue matcher 3950 sends to the hue shifter 3960 information regarding the matched dominant hue ranges of pixel values in the images along with the target image and the source image.

As shown at the bottom level of the software architecture 3900 illustrated in FIG. 39, the hue shifter 3960 receives from the dominant hue matcher 3950 the target image, the source image, and information that indicates matching dominant hue ranges of pixel values in the images. Based on this information, the hue shifter 3960 of some embodiments performs a hue shift for each of the matching dominant hue ranges of pixel values in the target image and the source image so that each dominant hue range of pixel values in the target image is shifted towards the corresponding matching dominant hue range of pixel values in the source image. Some embodiments of the hue shifter 3960 send the hue shifted target image and the source image (not shown) to a transform generator 3970.

The transform generator 3970 of some embodiments determines and generates transforms that match the colors of the target image to the colors of the source image. In particular, some of these embodiments determine transforms that match the color attributes of the dominant hues in the target image to the color attributes of the matching dominant hues in the source image. As indicated by the dashed box of the transform generator 3970, the transform generator 3970 does not determine and generate these transforms in some embodiments. Instead, the hue shifter 3920, in some embodiments, determines and generates such transforms before sending the hue shifted target image to the color transform engine 3930.

While many of the features have been described as being performed by one module (e.g., the dominant hue identifier 3940, the dominant hue matcher 3950, the hue shifter 3960, etc.), one of ordinary skill in the art will realize that the functions described herein might be split up into multiple modules. Similarly, functions described as being performed by multiple different modules might be performed by a single module in some embodiments (e.g., the color matching function, the hue analysis function, etc.).

Several of the figures illustrated above describe a local color matching tool that matches the colors of the target image to the colors of the source image based on the images' hues. The following FIG. 40 conceptually illustrates a process 4000 of some embodiments for color matching images based on the images' hues. In some embodiments, the process 4000 is performed by the local color matching tool when it performs a local color matching operation (e.g., when the user selects the modified UI 3850 in the third stage 3830 as described above by reference to FIG. 38).

The process 4000 begins in the same way as the process 3700, which is described above by reference to FIG. 37. Operations 4010 and 4020 are the same as described above for operations 3710 and 3720. At these operations, the process 4000 identifies a target image and a source image. As noted above, the target image and the source image may each be a still image, an image (e.g., frame) from a video, or any other type of image. In some embodiments, the identified images are selected by a user through a GUI of an application (e.g., GUI 3800) that provides the color matching tool.

After identifying the target image and the source image, the process 4000 then analyzes (at 4030) the target image and the source image based on the images' hue in order to identify dominant hues in the target image that match dominant hues in the source image. In some embodiments, hue is the degree to which a color is similar to or different from the colors red, blue, green, and yellow.

The process 4000 of some embodiments analyzes the target and source images by examining the hue distribution of each image and identifying dominant hues (e.g., hue bumps) in the image. After the dominant hues are identified in each image, some embodiments identify dominant hues of the target image and dominant hues of the source image as matching dominant hues based on the similarity of the dominant hues. For example, dominant red and blue hues in a target image may be identified as matching dominant maroon (i.e., dark red) and navy (i.e., dark blue) hues, respectively, in a source image.

Next, the process 4000 determines (at 4040) a set of transforms for matching colors of the target image to the colors of the source image based on analysis at operation 4030. Operation 4040 is similar to operation 3730. However, in some embodiments, a hue shift is performed to align the dominant hues in the target image with the corresponding matching dominant hues in the source image before the transforms are determined.

Finally, the process 4000 applies (at 4050) the transforms to the target image to match the colors of the target image to the colors of the source image. Operation 4050 is similar to operation 3740 except only pixels in the target image that have hues that are identified as dominant hues in the target image are modified using the transforms. In some embodiments, pixels in the target image that have hues that are identified as not within a dominant hue in the target image are unmodified. In this manner, a more localized color matching method is provided so that dominant colors of the target image are matched to corresponding dominant colors of the source image.

Figure 40:
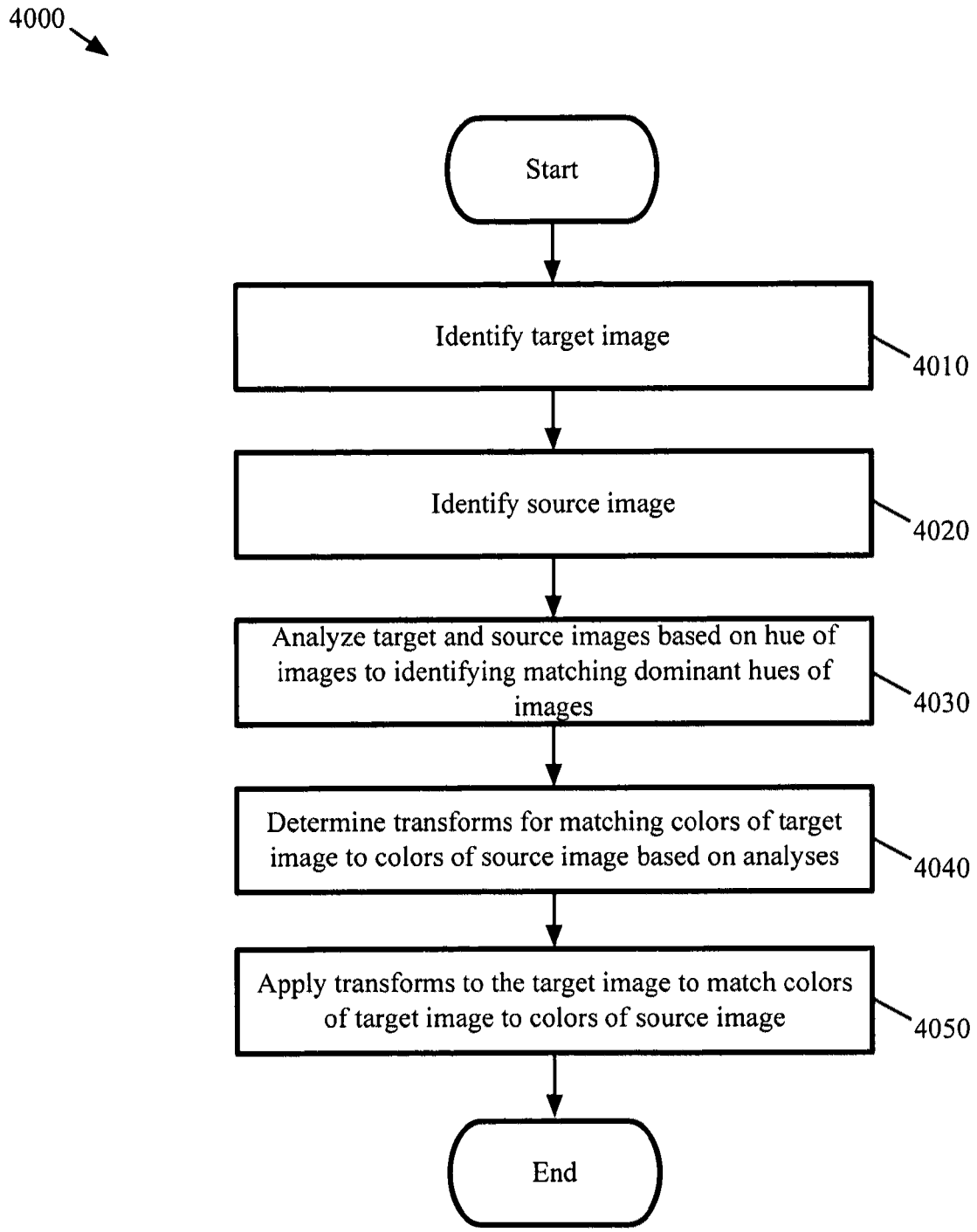
FIG. 40 conceptually illustrates a process of some embodiments for color matching images based on the images' hues.

FIG. 40 illustrates a process for color matching a target image to a source image. In some instances, the target image may be part of a video clip. In these cases, some embodiments of the process 4000 apply the transforms determined based on the target image to the remaining images of the video clip in order to match the remaining images to the source image. However, in some embodiments, the process 4000 is individually performed for each image or frame in the video clip.

The figures above describe some techniques for global color matching and for local color matching. However, some embodiments provide other techniques for global color matching and local color matching. For instance, some embodiments implement global color matching by analyzing the overall characteristics of the images and using a color segmentation technique.

Some embodiments segment colors of an image by modifying transforms that are used to convert the color space of the image to a color space that facilitates identifying certain colors in the image (e.g., whites and blacks). In some such embodiments, the transforms are modified so that certain colors are shifted (or skewed) towards other colors. Segmenting an image in this manner allows some embodiments to identify different subject types in the image based on the color of the subject types. For example, white and blue colors can be used to identify sky, green colors can be used to identify foliage, and red and brown colors can be used to identify earth or terrain. These embodiments match the colors of the images by matching the colors of the subject types in the target image to the colors of the corresponding subject types in the source image.

Figure 41:
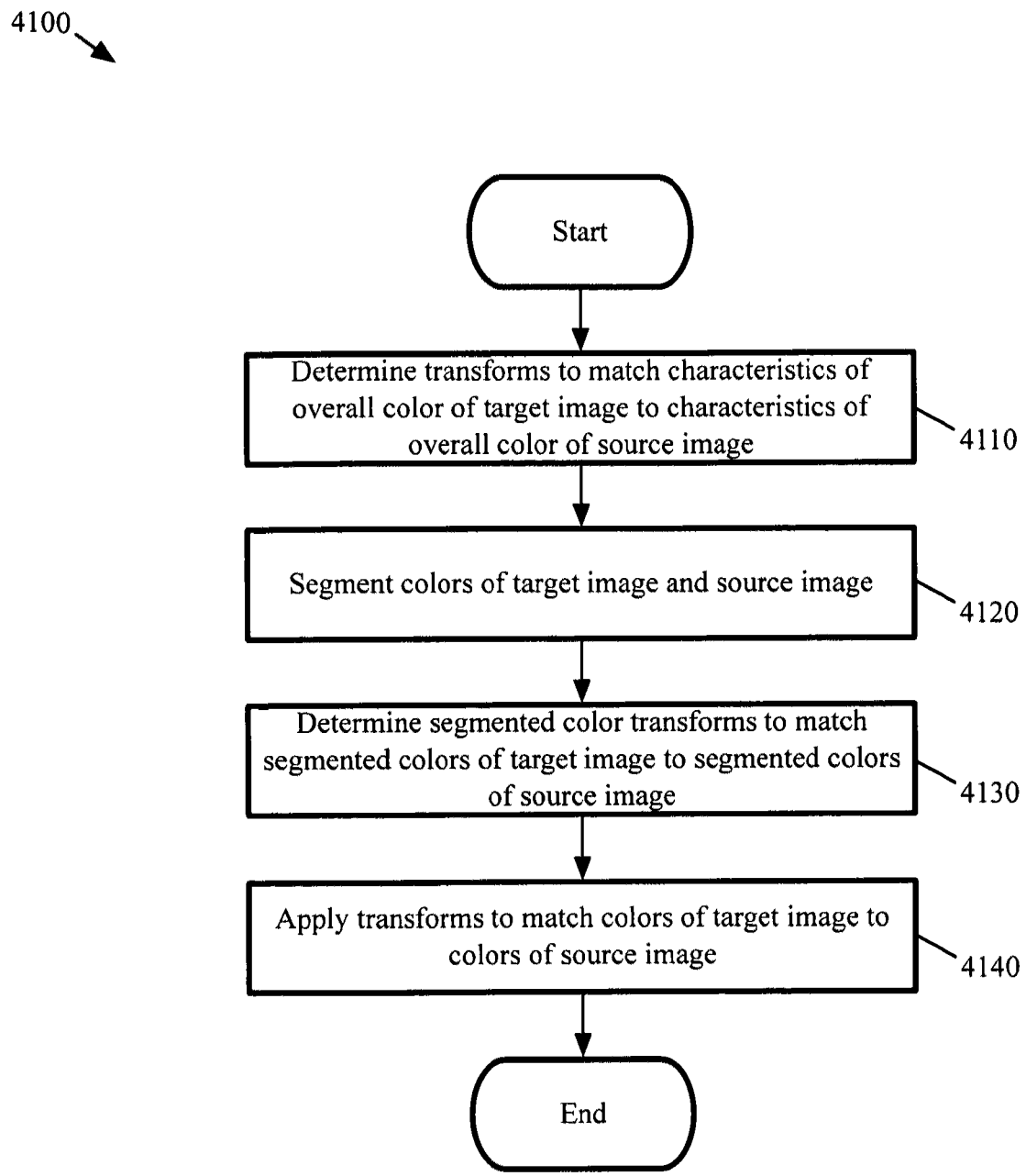
FIG. 41 conceptually illustrates a process of some embodiments for color matching images by color segmenting the images.

FIG. 41 conceptually illustrates a process 4100 of some embodiments for color matching images by color segmenting the images. As shown, the process 4100 starts by determining (at 4110) transforms to match a set of characteristics of the target image to the set of characteristics of the source image. Different embodiments of the transforms match different combinations of characteristics of the images. Examples of characteristics include the average color of the image, the average color of dark portions of the image, the average color of bright portions of the image, the average saturation of the image, the contrast of the image, among other characteristics.

The process 4100 then segments (at 4120) the colors of the target image to identify a set of colors in the target image and segments the colors of the source image to identify the set of colors in the source image. Some embodiments segment the colors of an image by converting the color space of the image to a device-independent color space (e.g., a XYZ color space). Some such embodiments segment the colors of the image by modifying a set of transforms to convert the image to the device-independent color space so that certain colors in the device-independent color space are shifted towards other colors. For instance, the transform can be modified to shift white colors (e.g., highlights) towards blue colors and to shift dark colors (e.g., shadows) towards red and brown colors. Different embodiments modify the transform to shift other and/or additional colors towards other colors.

Next, the process 4100 determines (at 4130) transforms for matching a set of characteristics of each color in the set of colors in the target image to a corresponding set of characteristics of the color in the source image. Different embodiments of these transforms match different combinations of characteristics of each color in the set of colors in the images. Examples of characteristics include the average color value of the color in the image, the average color value of dark portions in the image with the color, the average color value of bright portions off the image with the color, the average saturation value of the color in the image, the contrast of the color in the image, among other characteristics.

Finally, the process 4100 applies (at 4140) the transforms to the target image in order to match the colors of the target image to the colors of the source image. In some embodiments, the transforms determined at operation 4110 are applied to the target image so that the set of characteristics of the target image is matched to the corresponding set of characteristics of the source image. In some embodiments, the transforms determined at operation 4130 are applied to the target image so that the set of characteristics of each color in the set of colors of the target image is matched to the corresponding set of characteristics of the color of the source image.

While the process 4100 illustrates the transforms determined at the operations 4110 and 4130 applied to the target image at the operation 4140, some embodiments of the process 4100 apply the transforms determined at the operation 4110 before the operation 4120, and apply the transforms determined at the operation 4130 at the operation 4140.

FIG. 41 illustrates a process for color matching a target image to a source image. In some instances, the target image may be part of a video clip. In these cases, some embodiments of the process 4100 apply the transforms determined based on the target image to the remaining images of the video clip in order to match the remaining images to the source image. However, in some embodiments, the process 4100 is individually performed for each image or frame in the video clip.

The GUI 3500 and the GUI 3800 illustrated in FIGS. 35 and 38, respectively, both include a preview display area (e.g., the preview display area 3555) for displaying a target image in some embodiments.

As mentioned above, some embodiments provide a preview of a color matching operation applied to a target media clip before invoking the color matching operation to modify the target media clip so that a user can see how the target media clip would look with the color matching operation applied without actually applying the color matching operation to the target media clip. Some of these embodiments provide a preview of a color matching operation applied to a target media clip and a preview of the unmodified target clip in the same preview display area.

Figure 42:
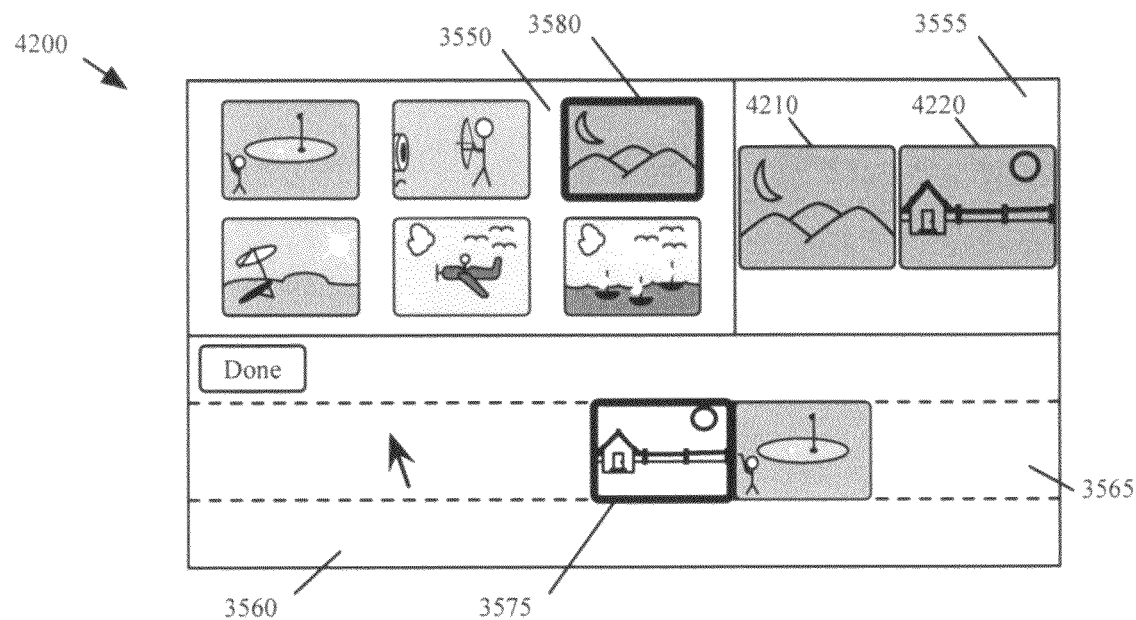
FIG. 42 illustrates an example preview display area of a GUI of a media-editing application of some embodiments.

FIG. 42 illustrates an example preview display area of a GUI 4200 of a media-editing application. As shown, the GUI 4200 is similar the GUI 3500, but the preview display area 3555 provides a preview 4210 of a color matching operation applied to a target media clip (e.g., the media clip 3575 in this example) and a preview 4220 of the unmodified target clip. This example illustrates the GUI 4200 at a stage after a color matching tool is activated and a source media clip (e.g., the media clip 3580 in this example) has been selected. In some embodiments, the media-editing application provides the previews 4210 and 4220 when the media-editing application receives a selection of a source media clip.

Figure 43:
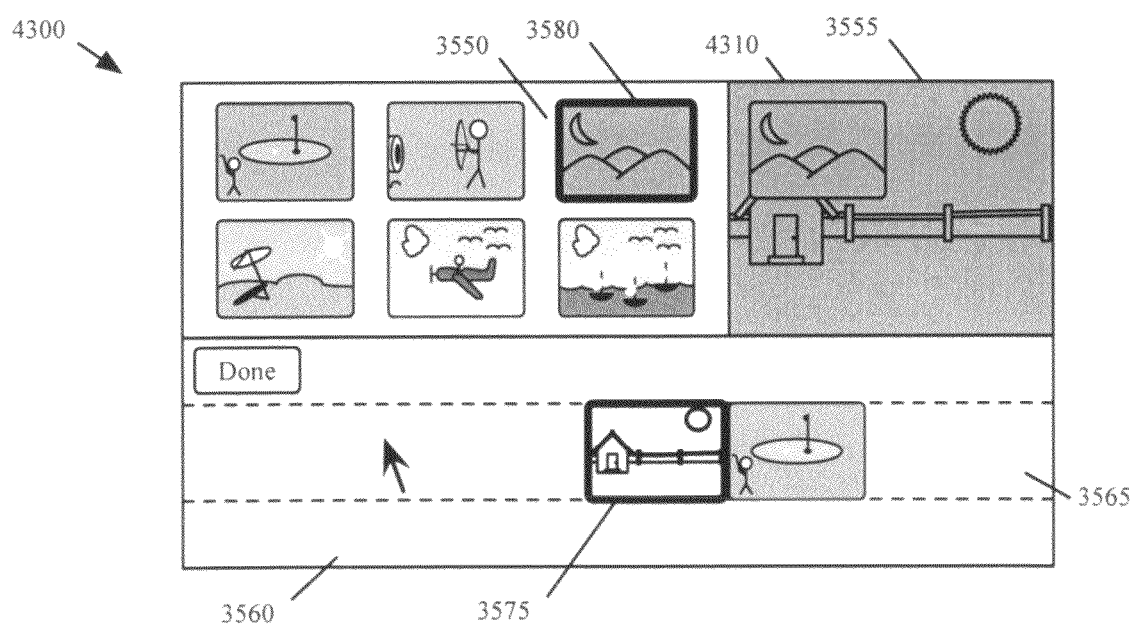
FIG. 43 illustrates another example preview display area of a GUI of a media-editing application of some embodiments.

In addition, some embodiments of the media-editing application provide a first preview display area for displaying an unmodified target clip and a second preview display area for displaying a preview of a color matching operation applied to a target media clip. For instance, some embodiments provide the second preview display area as part of a picture-in-picture arrangement with the first preview display area. FIG. 43 illustrates an example of such picture-in-picture arrangement.

FIG. 43 illustrates another example preview display area of a GUI 4300 of a media-editing application. The GUI 4300 is similar to the GUI 4200 except the preview display area 3555 and another preview display area 4310 are arranged in a picture-in-picture manner. Specifically, the preview display area 3555 is the main picture of the picture-in-picture arrangement and the preview display area 4310 is the inset picture of the picture-in-picture arrangement. As shown, the preview display area 3555 provides a preview of the unmodified target clip (e.g., the media clip 3575 in this example) and a preview of a color matching operation applied to a target media clip. This example illustrates the GUI 4300 at a stage after a color matching tool is activated and a source media clip (e.g., the media clip 3580 in this example) has been selected. In some embodiments, the media-editing application provides the picture-in-picture arrangement when the media-editing application the color matching tool is activated.

Several different techniques for matching colors of a target image to colors of a source image are described above. However, different embodiments may employ different combinations of these techniques to match the images' color. For example, some embodiments may match the images' colors based on the images' hues and then use the color segmentation technique to further match the images' colors (or vice versa). Other combinations are possible.

Different types of applications may provide the method of automatically matching colors of a target image to colors of a source image. As described above, some embodiments provide such features in a media-editing application (e.g., Final Cut Pro® and iMovie®) in order to match the colors of an image or video clip to the colors of another image or video clip. In some embodiments, image-editing applications (e.g., Aperture®), image organizers, image viewers, and any other type of image application provide the automatic color matching functionality of some embodiments to match the colors of an image to the colors of another image. Furthermore, the color matching functionality may be provided by an operating system of a computing device (e.g., a desktop computer, tablet computer, laptop computer, smartphone, etc.) in some embodiments.

III. Manual Color Correction

In addition to the color balance tools and color matching tool described above, some embodiments of the color workflow include manual color correction adjustments, as mentioned above. Different embodiments of the color workflow may provide different manual color correction adjustments. For instance, some embodiments provide manual color correction operations, that are applied to an entire media clip. These types of manual color correction operations are also referred to as primary color correction operations. In addition, some embodiments provide manual color correction operations that are applied to a portion of a media clip (e.g., a portion of a still image, a portion of a frame or field in a video clip). These types of manual color correction operations are also referred to as secondary color correction operations.

The following section will describe an example of a primary color correction tool (e.g., a color board tool) followed by several examples of secondary color correction tools (e.g., a color masking tool and a shape masking tool) that are each provided by the media-editing application of some embodiments.

A. Color Board Adjustments

Some embodiments of the invention provide a novel two-dimensional slider control in a graphical user interface (GUI). The two-dimensional slider control includes a sliding region and several sliders (discs, pucks, slider shapes, etc.), which will be referred to below as slider shapes. In these embodiments, the slider shapes can each be movably positioned within the sliding region in order to select a value from a range of values. In some embodiments, each slider shape is associated with an operation. A user can control the operation associated with a slider shape by movably positioning the slider shape within the sliding region to select a value from a range of values for the operation. The user can control multiple operations by movably positioning multiple sliders in the single sliding region. Moreover, by serving as one region for placing multiple slider shapes that define multiple attributes, the user can observe multiple operations being controlled and get a feel of multiple slider shape adjustments made at different points in time.

Figure 44:
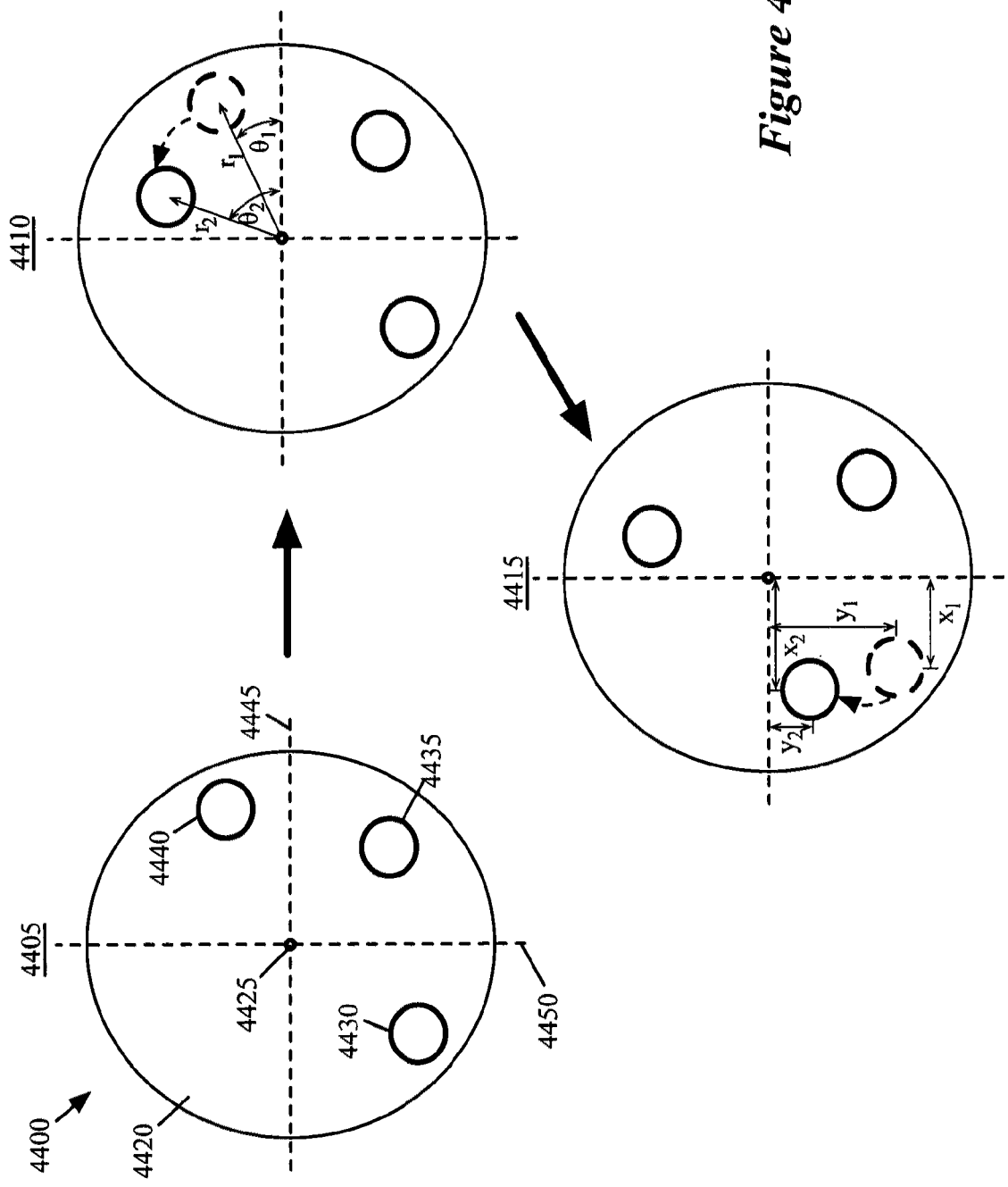
FIG. 44 conceptually illustrates a two-dimensional slider control of some embodiments.

FIG. 44 conceptually illustrates a two-dimensional slider control 4400 of some embodiments. Specifically, this figure illustrates the two-dimensional slider control 4400 at three different stages 4405-4415. Each of these stages will be described in further detail below. However, the elements of the two-dimensional slider control 4400 will be introduced first.

As shown in FIG. 44, the two-dimensional slider control 4400 includes a contiguous sliding region 4420, a center 4425, slider shapes 4430-4440, and axes 4445 and 4450. The axes 4445 and 4450 are shown in this figure to demonstrate the use of various coordinate systems to describe positions in the sliding region 4420, which is described in further detail below.

The sliding region 4420 is a contiguous two-dimensional area within which slider shapes may be movably positioned. As described below, the sliding region 4420 of some embodiments provides a single scale of values from which multiple slider shapes can each select a value based on their positions in the sliding region 4420.

Different embodiments describe positions in the sliding region 4420 using different two-dimensional coordinate systems. For example, some embodiments describe positions in the sliding region 4420 by using a polar coordinate system. As such, the position in the sliding region 4420 is expressed in terms of a radial distance and an angle. In such embodiments, the center 4425 is a fixed reference point (i.e., the pole) from which radial distances are determined. In addition, a ray starting from the center 4425 and directed towards the right along the axis 4445 (i.e., the polar axis) is a fixed direction from which angles are determined. Since radial distance and angle are used to describe positions in the sliding region 4420, they are referred to below as position variables.

Some embodiments describe positions in the sliding region 4420 using a Cartesian coordinate system. Thus, a position in the sliding region 4420 is expressed in terms of two distances, each from a particular reference line (e.g., the x-axis, the y-axis). In such embodiments, the center 4425 is the origin, and the axis 4445 (e.g., the x-axis) and the axis 4450 (e.g., the y-axis) are the two reference lines from which the distances are determined. Like radial distance and angle mentioned above, the distances from a particular reference line used to describe positions in the sliding region in terms of a Cartesian coordinate system are also referred to below as position variables.

Two examples of two-dimensional coordinate systems are described above. However, other two-dimensional coordinate systems, such as a two-dimensional parabolic coordinate system, can be used to describe positions within the sliding region 4420 in some embodiments. In addition, although the positions of the slider shapes 4430 and 4440 are shown as being described using different coordinate systems, the positions of the slider shapes 4430-4440 can be described using a single coordinate system in some embodiments.

In some embodiments, a range of values is defined for each of the different position variables. In such embodiments, each of the possible values for a particular position variable (e.g., the different radial distances for the radial distance position variable, the different angles for the angle position variable, etc.) is associated with one or more values in a range of values. In some embodiments, the same range of values is defined for all the different position variables while in other embodiments the range of values for some or all of the different position variables are defined differently. Furthermore, values in a range of values can be defined differently in different embodiments. For instance, the values of a range of values can be defined as a set of continuous integers, such as 0 to 255, −127 to 128, 500-600, etc. Some embodiments define the values of a range of values as a set of integers at fixed intervals (e.g., 0 to 4400 at intervals of 5). Also, the number of values in a range of values can be different in different embodiments and is based on how the range of values is defined. As such, values in a range of values can be defined any number of different ways.

As mentioned above, a range of value can be defined for the values of a particular position variable and positions in the sliding region 4420 can be described in terms of the position variable in some embodiments. Therefore, every position within the sliding region 4420 is associated with a value in the range of values since every position within the sliding region 4420 can be described in terms of the particular position variable. In this manner, a position of a slider shape within the sliding region 4420 can be used to specify a value from the range of values (e.g., by identifying the value in the range of values associated with the value of the particular position variable for the slider shape's position) defined for a position variable.

In some embodiments, different slider shapes select a value from a range of values based on different position variables. For instance, in some embodiments, the slider shape 4435 selects a value from a range of values based on a radial distance position variable, the slider shape 4430 selects a value from a range of values based on an x-axis distance position variable, and the slider shape 4440 selects a value from a range of values based on an angle position variable. However, a slider shape can be defined to select a value from a range of values based on a different position variable in different embodiments.

In some embodiments, a slider shape selects multiple values based on multiple position variables of the slider shape within the sliding region 4420. In such embodiments, each value is selected from a different range of values based on a different position variable. Using the slider shape 4430 as an example, the slider shape 4430 of some embodiments selects a value from a first range of values based on a radial distance position variable and also selects a value from a second range of values based on an angle position variable. That is, the slider shape 4430s can be movably positioned within the sliding region 4420 to select two values. In other embodiments, a slider shape can be defined to select values from different ranges of values based different numbers of different position variables.

Selecting multiple values through a positioning of a single slider shape within the sliding region 4420 allows the user to control multiple operations (i.e., multiple operations can be associated with a particular slider shape) at once. In some such embodiments, each selected value controls a different operation. In other such embodiments, some of the values each control different operations and some of the values, together, control a single operation. In yet other such embodiments, the multiple selected values control a single operation.

The operation of the two-dimensional slider control 4400 will now be described by reference to FIG. 44. In the first stage 4405, the slider shapes 4430-4440 are positioned at various locations within the sliding region 4420. Specifically, the slider shape 4430 is positioned near the bottom of the sliding region 4420 on the left side of the axis 4445, the slider shape 4435 is positioned in the lower right portion of the sliding region 4420, and the slider shape 4440 is positioned on the right side of the sliding region 4420 above the axis 4445.

The second stage 4410 illustrates the slider shape 4440 movably positioned within the sliding region 4420. In this example, the position of the slider shape 4440 is illustrated in terms of a polar coordinate system. As shown, the slider shape 4440 starts at a position of distance $r_1$ and angle $\theta_1$ and is movably positioned (e.g., by performing a drag-and-drop operation) to a position of distance $r_2$ and angle $\theta_2$, as shown by an arrow. The movement modifies the values of the at least one of the radial distance and angle position variables of the slider shape 4440. In this manner, movably positioning the slider shape 4440 within the sliding region 4420 can select different values for the radial distance position variable and the angle position variable.

The third stage 4415 illustrates the slider shape 4430 movably positioned within the sliding region 4420. However, in this example, the position of the slider shape 4430 is illustrated in terms of a Cartesian coordinate system. The slider shape 4430 starts at a position of $x_1$ and $y_1$ and is movably positioned (e.g., by performing a drag-and-drop operation) to a position of $x_2$ and $y_2$, thereby modifying the values of the x-axis distance and y-axis distance position variables of the slider shape 4430. Accordingly, movably positioning the slider shape 4440 within the sliding region 4420 can select different values for the x-axis position variable and the y-axis position variable.

In FIG. 44, the slider shapes 4430-4440 are presented as circles. However, different embodiments present slider shapes differently. Slider shapes can be presented using any number of different visual presentations (e.g., dots, squares, thumbnails, icons, colors, text, etc.). In some embodiments, such as the two-dimensional slider control 4400, the slider shapes are displayed using the same visual presentation. In other embodiments, slider shapes are displayed differently based on the operation associated with the slider shapes. That is, slider shapes associated with the same operation are displayed using the same visual presentation and slider shapes associated with different operations are displayed using different visual presentations.

The area of a sliding region of a two-dimensional slider control can be defined in any number of different ways (e.g., size, shape, etc.). For instance, FIG. 44 illustrates the area of the sliding region 4420 of the two-dimensional slider control 4400 is defined as a circle. Other geometrical shapes can also be used, such as a square, a rectangle, a triangle, an oval, etc.

Figure 45:
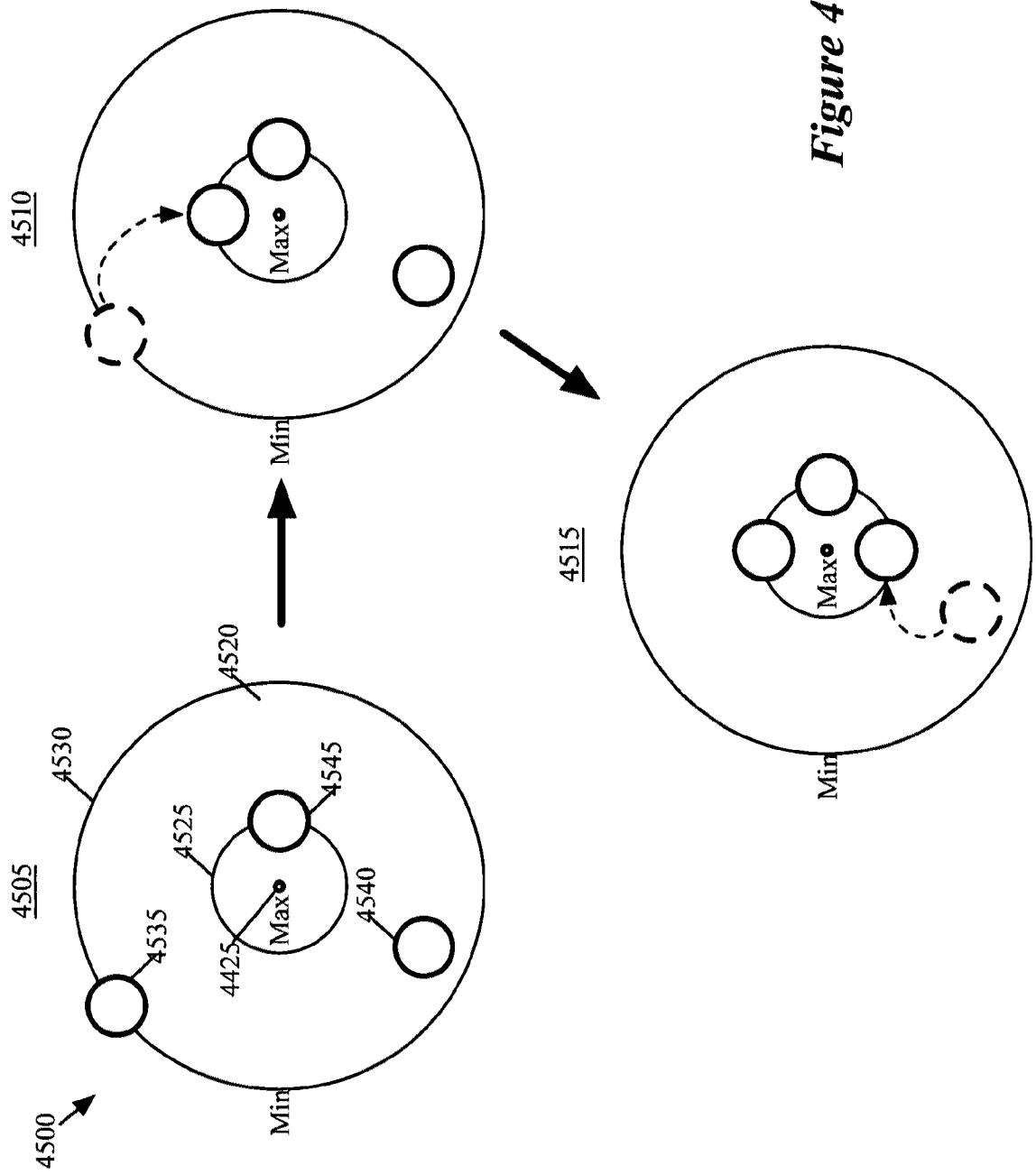
FIG. 45 conceptually illustrates another two-dimensional slider control of some embodiments.

FIG. 45 conceptually illustrates a two-dimensional slider control 4500 of some embodiments. As mentioned above, the sliding region of different embodiments of the two-dimensional slider control are defined differently. In particular, FIG. 45 shows the two-dimensional slider control 4500 that includes a ring-shaped sliding region 4520, the center 4425, and slider shapes 4535-4545. FIG. 45 illustrates the two-dimensional slider control 4500 at three different stages 4505-4515.

As shown, an inner circle 4525 and an outer circle 4530 define the sliding region 4520. In some embodiments, the outer circle 4530 represents a minimum value of a range of values and the inner circle 4525 represents a maximum value of the range of values. In some such embodiments, positioning a slider shape on or near the outer circle 4520 selects a minimum value (e.g., 0, low, off, etc.) for an operation associated with the slider shape, positioning the slider shape on or near the inner circle 4525 selects a maximum value (e.g., 100, high, on, etc.) for the operation associated with the slider shape, and positioning the slider shape in between the outer and inner circles 4525 and 4530 selects a value somewhere in between (e.g., 50, medium, etc.).

The first stage 4505 shows the slider shapes 4535-4545 positioned within the sliding region 4520 of the two-dimensional slider control 4500. Specifically, the slider shape 4535 is positioned on top left of the outer circle 4530, the slider shape 4540 is positioned between the inner circle 4525 and the outer circle 4530 in the lower left area of the sliding region 4520, and the slider shape 4545 is positioned on the right side of the inner circle 4525. Thus, in this stage, the slider shape 4535 selects a minimum value from a range of values, the slider shape 4540 selects a value from the range of values that is in between the minimum value and a maximum value, and the slider shape 4545 selects the maximum value from the range of values.

In the second stage 4510, the slider shape 4535 is moved within the sliding region 4520. As shown, the slider shape is movably positioned (e.g., by performing a drag-and-drop operation) from a position on the outer circle 4530 to a position on the inner circle 4525 of the sliding region 4520. As such, the slider shape 4535 selects the maximum value from the range of values in this stage. This stage also illustrates that the shape of the sliding region 4520 allows the slider shapes 4535 and 4545 to simultaneously select the maximum value without overlapping each other.

The third stage 4515 shows the slider shape 4540 moved within the sliding region 4520. In particular, the slider shape 4540 is movably positioned (e.g., by performing a drag-and-drop operation) onto the inner circle 4525 of the sliding region 4520. At this stage, the slider shape 4540 selects the maximum value from the range of values. This stage also shows each of the slider shapes 4535-4545 positioned on the inner circle 4525 to select the maximum value without overlapping each other.

As illustrated by FIG. 45, some embodiments provide a ring-shaped sliding region so that multiple slider shapes can be positioned within the sliding region to simultaneously select a maximum value from a range of values without having to overlap each other. Furthermore, the various embodiments of the two-dimensional slider control illustrated and described above and below may not show a ring-shaped sliding region. However, one of ordinary skill in the art will recognize that these two-dimensional slider controls can include such a ring-shaped sliding region (or other sliding regions as well) in different embodiments.

Figure 46:
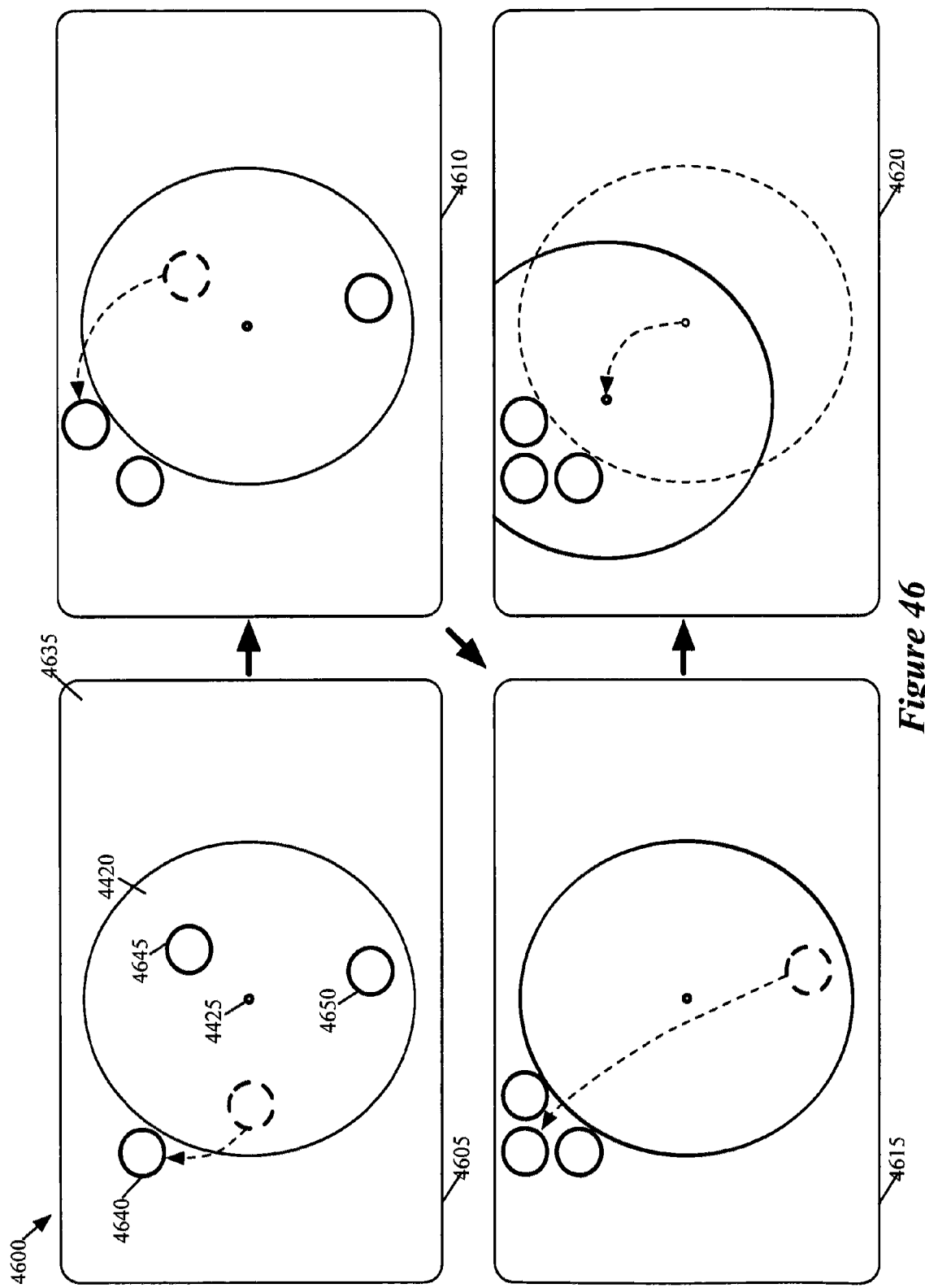
FIG. 46 conceptually illustrates another two-dimensional slider control of some embodiments.

FIG. 46 conceptually illustrates a two-dimensional slider control 4600 that includes a background region 4635. As shown, the two-dimensional slider control 4600 includes the background region 4635, a sliding region 4420, slider shapes 4640-4650, and a center 4425. The sliding region 4420, slider shapes 4640-4650, and the center 4425 are similar to the ones illustrated above in FIG. 44.

The background region 4635 is an area in the two-dimensional slider control 4600 within which slider shapes 4640-4650 can be positioned. In some embodiments, when a slider shape is positioned in the background region 4635, the operation(s) associated with the slider shape is not functioning and the slider shape is referred to as disabled, inactive, off, etc. When the slider shape is positioned in the sliding region 4420, the operation(s) associated with the slider shape is functioning and the slider shape is referred to as enabled, active, on, etc. Thus, instead of positioning a slider shape within the sliding region 4420 that corresponds to an "off" position or minimum value (e.g., the outer circle 4530 of the sliding region 4520), the user can place the slider shape in the background region 4635 to reduce clutter or when the user does not wish to use the slider shape at this time. In addition, the background region 4635 of some embodiments provides a region within which the sliding region can be movably positioned (instead of slider shapes) to control operations associated with slider shapes, as will be described in the following example.

FIG. 46 also illustrates the two-dimensional slider control 4600 at four different stages 4605-4620. The stages 4605-4615 show slider shapes movably positioned within the background region 4635 and the stage 4620 illustrates an example of movably positioning the sliding region 4420. At the first stage 4605, the slider shape 4640 is movably positioned (e.g., by performing a drag-and-drop operation) from within the sliding region 4420 to the upper left corner of the background region 4635, as indicated by an arrow. The previous position of the slider shape 4640 is indicated by a dotted circle. In this stage, operation(s) associated with the slider shape 4640 are disabled.

Similarly, the second and third stages 4610 and 4615 show the slider shapes 4645 and 4650 movably positioned (e.g., by performing drag-and-drop operations) from their respective position in the sliding region 4420 to the upper left corner of the background region 4635, as indicated by respective arrows. Accordingly, the operation(s) associated with the slider shapes 4645 and 4650 (and slider shape 4640) are disabled at this stage. The third stage 4650 illustrates the sliding region 4620 movably positioned (e.g., by performing a drag-and-drop operation on the center 4425) towards the upper left corner of the background region 4635, as indicated by an arrow. The previous position of the sliding region 4420 is demonstrated by a dotted circle. At this stage, the slider shapes 4640-4650 are active since they are positioned within the sliding region 4420. Therefore, by movably positioning the sliding region 4420, multiple slider shapes can be controlled and adjusted through a single action (i.e., the movable positioning of the slider region 4625). As shown, portions of the sliding region 4420 that would extend past the border of the two-dimensional slider control 4600 are not displayed.

FIGS. 44 and 46 show a two-dimensional slider control with a fixed number (i.e., three) of slider shapes. Other embodiments of the two-dimensional slider control can include any static number of slider shapes. In some embodiments, the number of slider shapes is based on the number of operations a user is allowed to control. Furthermore, some embodiments only allow the slider shapes to be movably positioned within the sliding region of the two-dimensional slider control whereas other embodiments, such as that illustrated in FIG. 46, allow the slider shapes of the two-dimensional slider control to be movably positioned anywhere within the display area of the two-dimensional slider control (i.e., inside as well as outside of the sliding region).

For a two-dimensional slider control, different embodiments provide different starting configurations for the slider shapes. For example, some embodiments provide a starting configuration in which the slider shapes are "zeroed out." That is, the slider shapes are positioned within the sliding region such that the operations associated with the slider shapes are off (e.g., inactive, disabled, select a value of zero, select a minimum value, etc.). Using the sliding region 4420 in FIG. 44 as an example, in some such embodiments, radial distance based slider shapes can be "zeroed out" by positioning the slider shapes along the outer edge of the sliding region 4420. For angle based slider shapes, they are "zeroed out" by positioning the slider shapes to the right of the center 4425 and along the axis 4445 in some embodiments. One of ordinary skill in the art will recognize that "zeroing out" the slider shapes depends on how values of a defined range of values are associated with positions within the sliding region and thus any number of different starting configurations are possible in order to "zero out" slider shapes. In addition, some embodiments "zero out" a slider shape by assigning a null value to the slider shape. Moreover, other embodiments provide other starting configurations for slider shapes. For instance, some embodiments of a two-dimensional slider control provide a starting configuration in which slider shapes are positioned at default positions/values. Some embodiments start the slider shapes outside of the sliding region.

Some embodiments of the two-dimensional slider control allow a dynamic number of slider shapes. That is, the number of slider shapes in a two-dimensional slider control can change at any given time. Specifically, such embodiments allow slider shapes to be added and deleted as well as movably positioned within the sliding region of the two-dimensional slider control.

Figure 47:
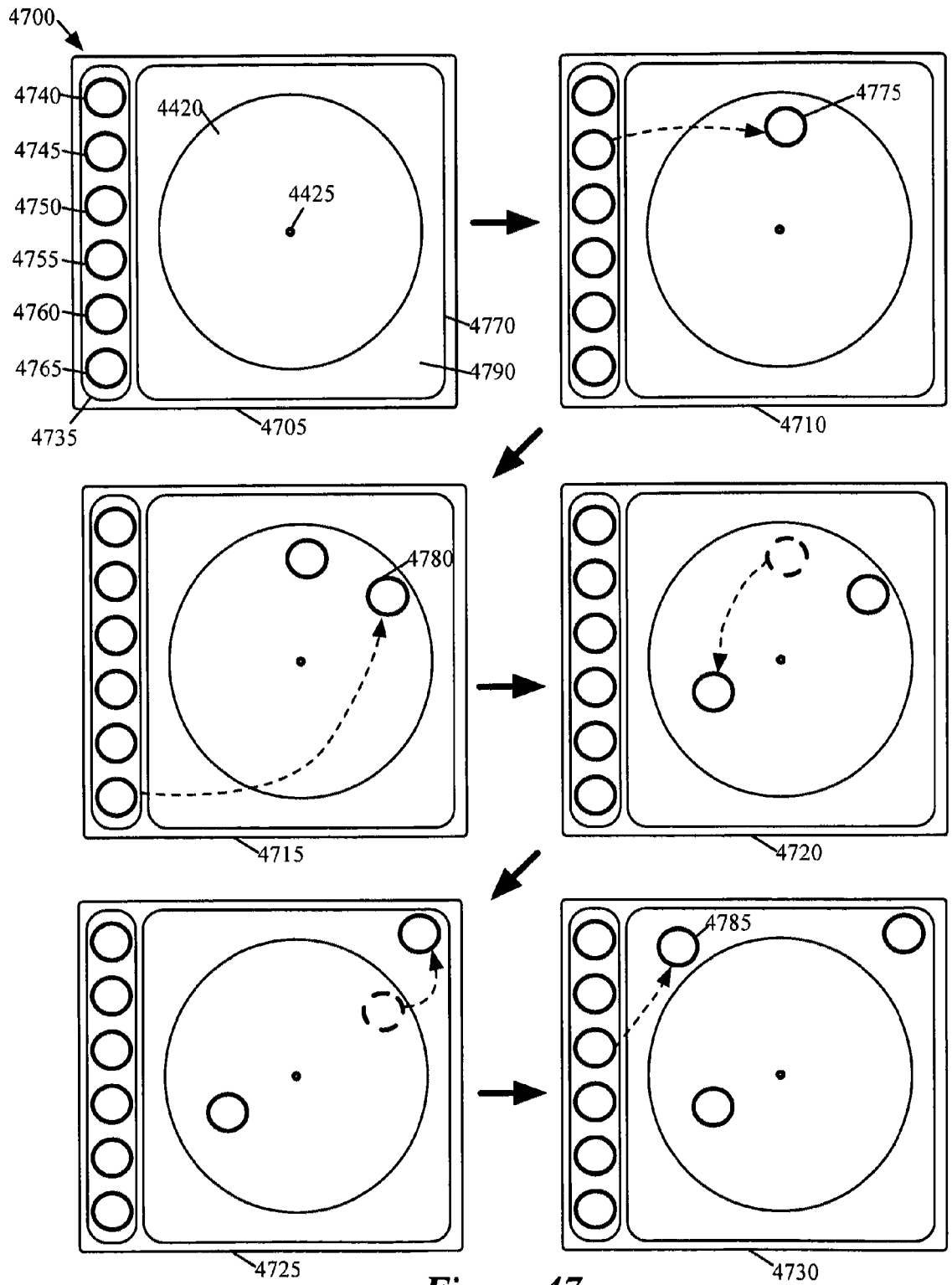
FIG. 47 conceptually illustrates another two-dimensional slider control of some embodiments.

FIG. 47 conceptually illustrates an example of a GUI 4700 for such a two-dimensional slider control 4770 of some embodiments. As shown, the GUI 4700 includes the two-dimensional slider control 4770 and a slider shape tool box 4735. The two-dimensional slider control 4770 is similar to the two-dimensional slider control 4600 (i.e., it includes the sliding region 4420 and the center 4425) except the two-dimensional slider control 4770 includes a background region 4790. The background region 4790 is similar to the background region 4635 except the background region 4790 has a square border instead of a rectangular border.

The slider shape tool box 4735 includes slider shape generators 4740-4765. In some embodiments, a slider shape generator is a user selectable user interface (UI) item (e.g., a button, icon, thumbnail) for adding a slider shape of a particular type to the two-dimensional slider control 4770 when a command is invoked. For example, a slider shape generator of some embodiments adds a slider shape in the two-dimensional slider control 4770 when the slider shape generator is selected and a command (e.g., by clicking, tapping, pressing a hotkey, keystroke, combination of keystrokes, etc.) is invoked.

FIG. 47 also illustrates one way of adding slider shapes using slider shape generators to the two-dimensional slider control 4770 in terms of six different stages 4705-4730. As shown, the first stage 4705 shows the GUI 4700 without any slider shapes in the two-dimensional slider control 4770.

The second stage 4710 shows the GUI 4700 after a slider shape 4775 is added to the two-dimensional slider control 4770. Specifically, this stage shows the addition of the slider shape 4775 by generating it from the slider shape generator 4745. In this example, the slider shape 4775 is generated by selecting and dragging (e.g., by performing a drag-and-drop operation) the slider shape generator 4745 into the sliding region 4420 of the two-dimensional slider control 4770, as indicated by an arrow.

In the third stage 4715, another slider shape 4780 is added to the two-dimensional slider control 4770. This stage shows the slider shape 4780 added to the two-dimensional slider control 4770 by generating it from the slider shape generator 4765. Similar to the slider shape 4775 in the second stage 4710, the slider shape 4775 is generated by selecting and dragging (e.g., by performing a drag-and-drop operation) the slider shape generator 4765 into the sliding region 4420 of the two-dimensional slider control 4770, as indicated by an arrow.

The fourth stage 4720 of the GUI 4700 shows the movement of the slider shape 4775 within the two-dimensional slider control 4770. As shown, the slider shape 4775 is movably positioned (e.g., by performing a drag-and-drop operation) down and to the left within the sliding region 4420. This stage illustrates that the slider shape 4775 can be movably positioned within the sliding region 4420 similar to the movement of the slider shapes 4430 and 4440 described above by reference to FIG. 44.

At the fifth stage 4725, the GUI 4700 illustrates the movement of the slider shape 4780 within the two-dimensional slider control 4770. However, in this stage, the slider shape 4780 is movably positioned (e.g., by performing a drag-and-drop operation) up and to the right from within the sliding region 4420 to the background region 4790. Thus, the fifth stage 4725 shows that the slider shape 4780 can be movably positioned in the background region 4790 similar to the movement of the slider shapes 4640-4650 described above by reference to FIG. 46.

The sixth stage 4730 illustrates the GUI 4700 after another slider shape 4785 is added to the two-dimensional slider control 4770. This stage shows the addition of the slider shape 4785 by generating it from the slider shape generator 4750. The slider shape 4785 is generating by selecting and dragging (e.g., by performing a drag-and-drop operation) the slider shape generator 4750 except it is dragged into the background region 4790 of the two-dimensional slider control 4770. As such, the stages of FIG. 47 show that slider shapes can be added to the background region 4790 as well as the sliding region 4420 of the two-dimensional slider control 4770.

As shown in FIG. 47, the slider shape generators 4740-4765 are included in the slider shape tool box 4735 and arranged in a vertical column. Different embodiments provide different arrangements of slider shape generators and different shapes for a slider shape tool box. For instance, the slider shape generators can be arranged in a horizontal row in a horizontal slider shape tool box that is locate above or below the two-dimensional slider control in some embodiments.

Furthermore, FIG. 47 shows the slider shape tool box 4735 as separate from the two-dimensional slider control 4770. In some embodiments, the slider shape generators can be part of the two-dimensional slider control (e.g., located along a side of the background region) as conceptually illustrated in FIG. 48. This figure shows a two-dimensional slider control 4800 of some embodiments that includes the sliding region 4420, the center 4425, a background region 4820, and slider shape generators 4825-4845. The background region 4820 is similar to the background region 4635 except the background region 4820 is a different rectangular shape. As shown, the slider shape generators 4825-4845 are positioned within the background region 4820 and along the top of the two-dimensional slider control 4800.

Figure 48:
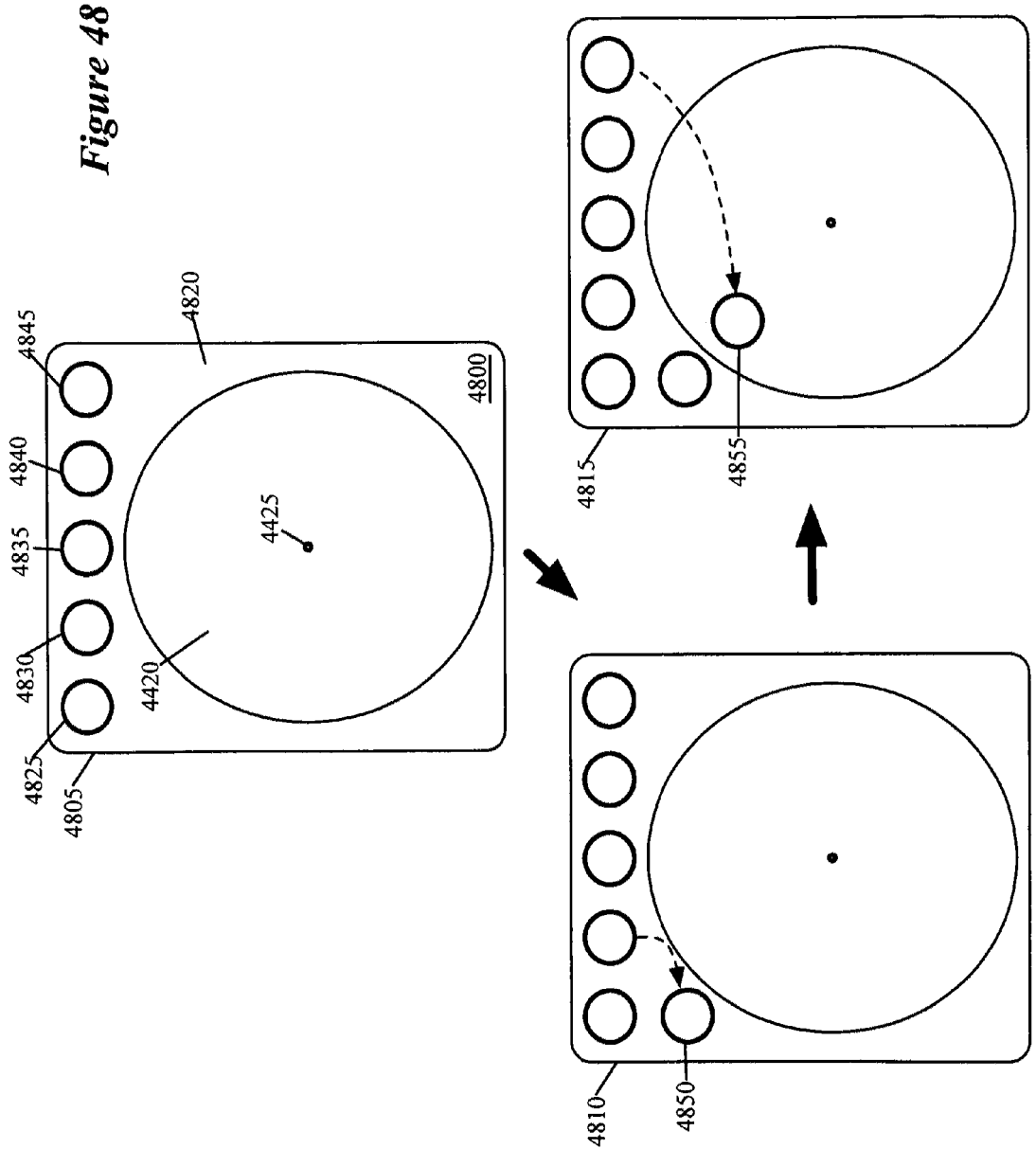
FIG. 48 conceptually illustrates another two-dimensional slider control of some embodiments.

FIG. 48 also illustrates the two-dimensional slider control 4800 at three different stages 4805-4815. Similar to the first stage 4705, the first stage 4805 shows the two-dimensional slider control 4800 without any slider shapes in it.

The second stage 4810 illustrates the addition of slider shape 4850 to the two-dimensional slider control 4800. As shown, the slider shape 4850 is added to the two-dimensional slider control 4800 by generating it from the slider shape generator 4830 in a similar fashion as the generation of the slider shapes 4775-4785. In this stage, the slider shape generator 4845 is selected and dragged (e.g., by performing a drag-and-drop operation) into the background region 4820, as indicated by an arrow.

At the third stage 4815, another slider shape 4855 is added to the two-dimensional slider control 4800 similar to the addition of the slider shape 4850 in the first second stage 4810. In this stage, the slider shape 4855 is selected and dragged (e.g., by performing a drag-and-drop operation) into the sliding region 4420, as shown by an arrow, instead of into the background region 4820.

While FIGS. 47 and 48 illustrate two different configurations of slider shape generators for adding slider shape to a two-dimensional slider control of some embodiments, different embodiments provide different ways of adding slider shapes to the two-dimensional slider control. For example, rather than using a slider shape generator to generate slider shapes, some embodiments add slider shapes to a two-dimensional slider control using a keystroke, a combination of keystrokes, a hotkey, an option selected from a pull-down or pop-up menu, or any other appropriate method. In some such embodiments, slider shape generators are not selected or even displayed.

Figure 49:
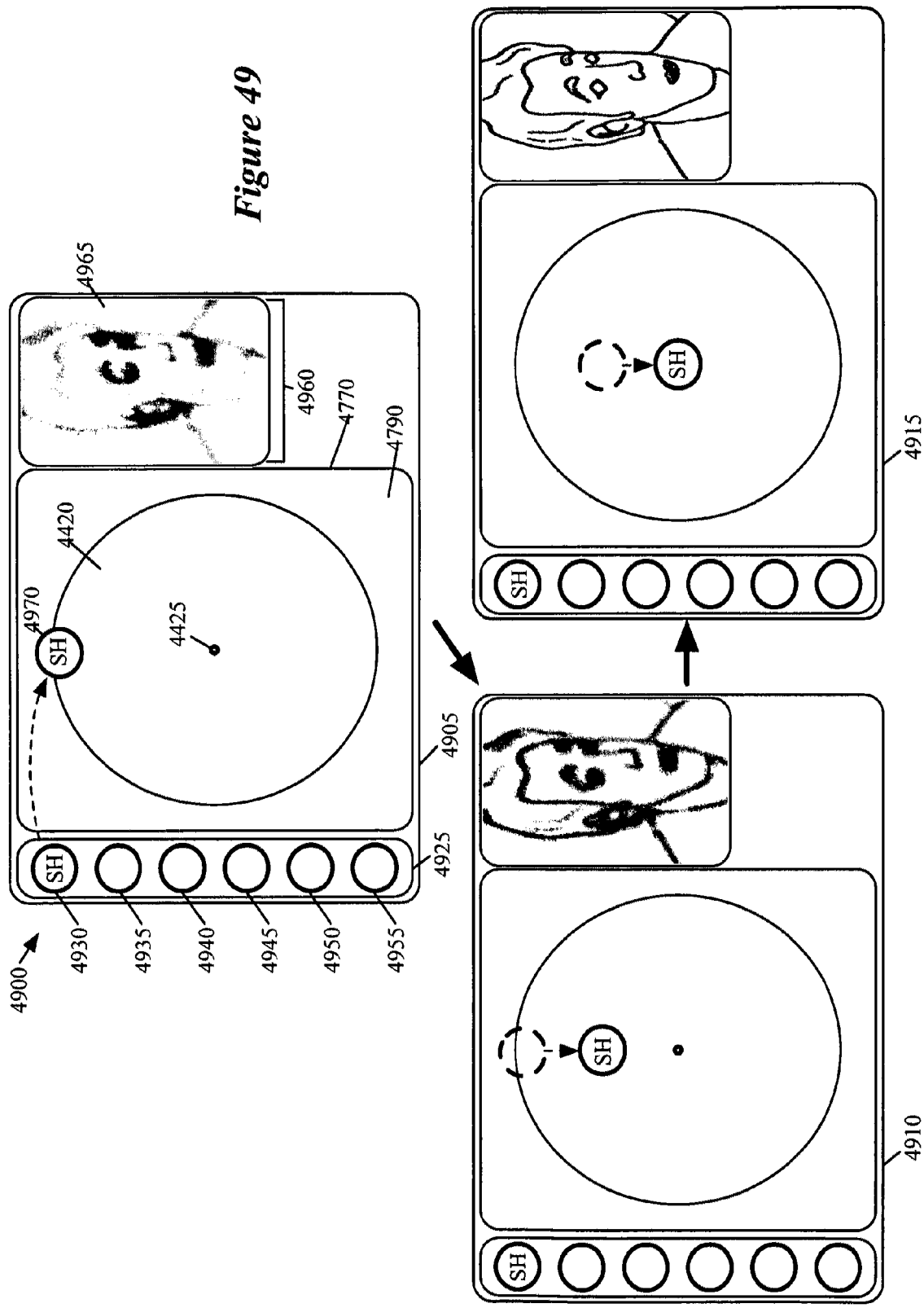
FIG. 49 conceptually illustrates a GUI of an image processing application that includes a two-dimensional slider control of some embodiments.

FIG. 49 conceptually illustrates a GUI 4900 that includes a two-dimensional slider control 4770 of some embodiments for performing various image processing operations. Specifically, this figure illustrates the GUI 4900 at three different stages 4905-4915 of an image processing operation. As shown, the GUI 4900 includes a slider shape tool box 4925, the two-dimensional slider control 4770, and a viewing area 4960. The slider shape tool box 4925 is similar the slider shape tool box 4735 except the slider shape generators 4930-4955 generate slider shapes for performing image processing operations. The viewing area 4960 is for displaying an image 4965 being edited and effects of image processing operations that are applied to the image 4965.

The first stage 4905 shows the GUI 4900 after a slider shape 4970 is added to the two-dimensional slider control 4770 in a similar manner as the addition of the slider shape 4775 to the two-dimensional slider control 4770. As mentioned, the slider shape generators 4930-4955 generate slider shapes for performing image processing operations. In this example, the slider shape generator 4930 generates slider shapes for applying a sharpness operation (e.g., unsharp mask), as indicated by its "SH" label, to the image 4965 based on a radial distance from the center 4425. Specifically, the sharpness operation applied to the image 4965 is increased as the slider shape 4970 is movably positioned closer to the center 4425 of the sliding region 4420. As shown, the slider shape 4970 is positioned near the top and along the edge of the sliding region 4420, which applies a small amount of the sharpness operation to the image 4965. The image 4965 displayed in the viewing area 4960 is a blurry image of the person.

The second stage 4910 illustrates the GUI 4900 after the slider shape 4970 is movably positioned within the sliding region 4420. In particular, this stage shows the slider shape 4970 movably positioned down towards the center 4425. This position is closer to the center 4425 of the sliding region 4420 than its previous position in the first stage 4905, which increases the amount of the sharpness operation applied to the image 4965. As shown in the viewing area 4960, the image 4965 of the person is sharper than in the previous stage due to the increased sharpness operation applied to the image 4965.

In the third stage 4915, the slider shape 4970 is again movably positioned within the sliding region 4420. Specifically, the slider shape 4970 is movably positioned further down towards the center 4425 of the sliding region 4420. At this position of the slider shape 4970 within the sliding region 4420, the amount of the sharpness operation applied to the image 4965 is further increased. Thus, the image 4965 displayed in the viewing area 4960 is a sharper image of the person than in the previous stages.

While FIG. 49 shows various stages of a sharpness operation, the slider shape generator 4930 (and other slider shape generators) can be defined to generate slider shapes that perform other image processing operations (e.g., saturation, contrast, brightness, color balance, noise reduction, etc., on the image 4965 in different embodiments. Moreover, the slider shape 4970 applies the image processing operation based on a radial distance position variable. In other embodiments, the image processing operation may be based on other position variables (e.g., angle, x-axis distance, y-axis distance).

Figure 50:
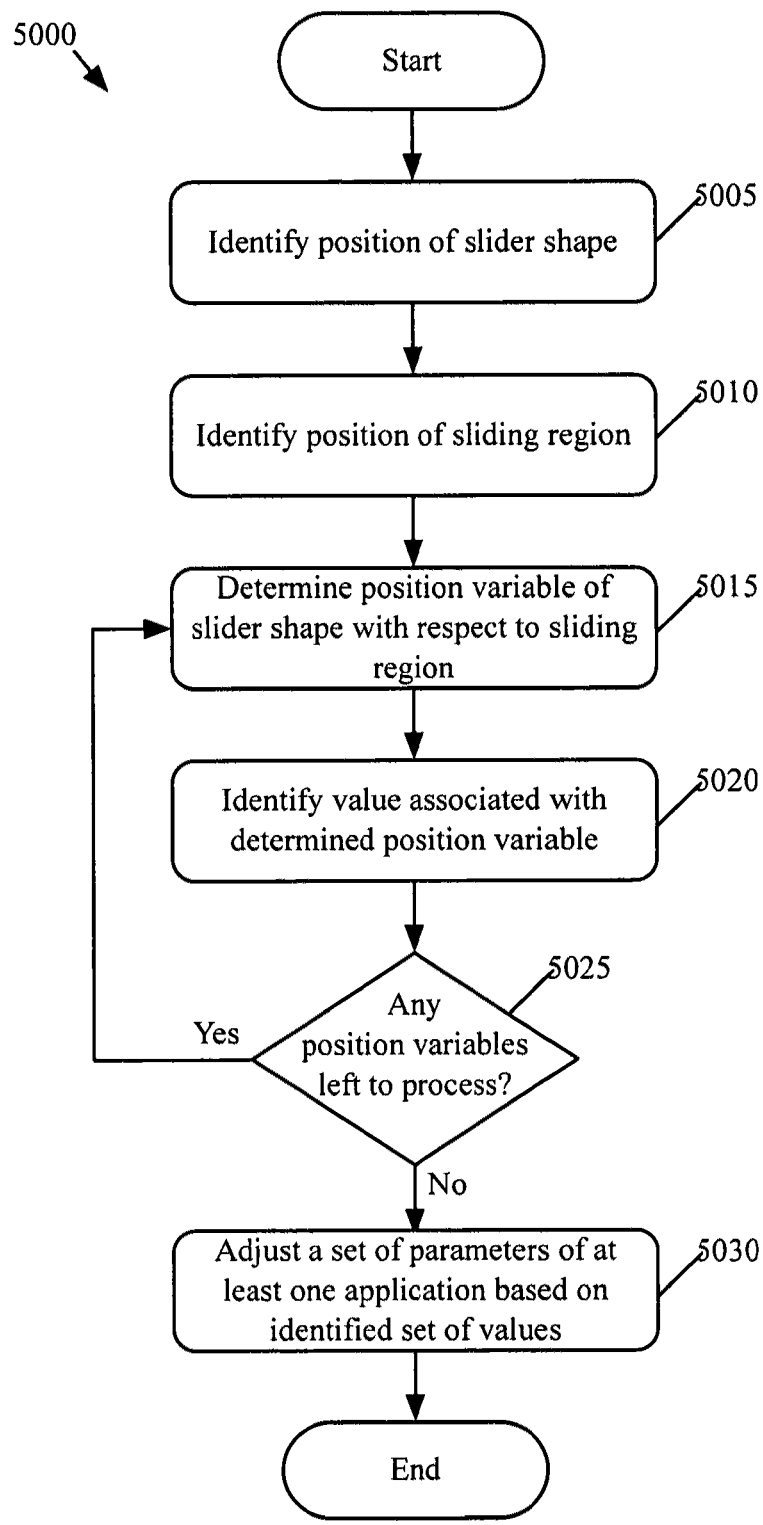
FIG. 50 conceptually illustrates a process for controlling an operation of an application by using a two-dimensional slider control of some embodiments.

FIG. 50 conceptually illustrates a process 5000 for controlling an operation of an application by using a two-dimensional slider control of some embodiments. In some embodiments, the process 5000 is performed while a slider shape or a sliding region is movably positioned within the two-dimensional slider control. For example, in some such embodiments, the process 5000 is constantly performed (i.e., performed in real-time) while the slider shape or the sliding region is being movably positioned within the two-dimensional slider control. In other such embodiments, the process 5000 is performed every time the slider shape or sliding region moves a defined distance (e.g., 10 pixels, 5 millimeters, etc.) while it is being movably positioned in the two-dimensional slider control. In yet other embodiments, the process 5000 is performed when the movable positioning of the slider shape or the sliding region is completed (e.g., the drag-and-drop operation is completed). Moreover, the process 5000 of some embodiments is performed by an application that provides the two-dimensional slider control.

For purposes of explanation, the process 5000 will be described based on the embodiments that perform the process 5000 when the movably positioning of a slider shape or sliding region is completed. The process 5000 begins by identifying (at 5005) a position of a slider shape within a sliding region. Referring to FIG. 46 as an example, when the slider shape 4640 is moved to its position illustrated in the first stage 4605, the process 5000 identifies that illustrated position of the slider shape 4640. Next, the process 5000 identifies (at 5010) the position of the sliding region. In some embodiments, and in this example, the center 4425 of the sliding region 4420 represents the position of the sliding region 4420. In other embodiments, a different point within the sliding region 4420 represents the position of the sliding region 4420. Continuing with the example of FIG. 46, the process 5000 identifies the position of the center 4425 illustrated in the first stage 4605 as the position of the sliding region 4420. Moreover, when the sliding region 4420 is movably positioned, for example, in the fourth stage 4620 of FIG. 46, the process 5000 identifies the position of sliding region 4420 as the position of the center 4425 as shown in the fourth stage 4615.

After identifying the positions, the process 5000 then determines (at 5015) a position variable (e.g., radial distance, angle, x-axis distance, y-axis distance) with respect to the sliding region. Referring again to the slider shape 4640 of FIG. 46 and using radial distance as an example position variable, at 5015, the process 5000 determines the distance between the position of the slider shape 4640 and the center 4425 of the sliding region 4420. Next, the process 5000 identifies (at 5020) a value in a range of values defined for the determined position variable. Continuing with the example of the slider shape 4640, the process 5000 identifies a value from a range of values for the radial distance position variable. For example, if the range of values for the radial distance position variable is defined as a continuous range of integers from 0 to 255, the process 5000 identifies an integer value in that range based on the determined radial distance of the slider shape 4640.

After identifying a value for the determined position variable, the process 5000 determines (at 5025) whether there are any position variables left to process. If the process 5000 determines that there are position variables left to process, the process 5000 returns to operation 5015 to process any remaining position variables. Otherwise, the process 5000 proceeds to operation 5030. For slider shapes that are defined to select a value from a range of values based on one position variable, the process 5000 ends after the one position variable has been processed. However, for slider shapes that are defined to select multiple values from multiple ranges of values based on multiple position variables, the process 5000 performs operations 5015 and 5020 for each of the position variables.

After all the position variables are processed, the process 5000 adjusts (at 5030) a set of parameters of at least one application based on the identified set of values. As mentioned above, a user can movably position a slider shape in a two-dimensional slider control of some embodiments to control an operation of an application (e.g., controlling a sharpness operation in an image processing application as illustrated in FIG. 49). One way of controlling an operation of an application is to adjust a set of parameters for the operation as performed by the process 5000 at 5030. In some embodiments, a different slider shape is associated with each of the parameters in the set of parameters while in other embodiments a slider shape can be associated with one or more parameters in the set of parameters. In addition, the application of some embodiments is a standalone application that runs on a computing device while the application of other embodiments is a component that is part of another application. The application can be an application that is part of an operating system of a computing device in some embodiments.

Although the process 5000 described above is described in a particular order, different embodiments may perform the process 5000 in a different order. For instance, some embodiments of the process 5000 adjust (at 5030) a set of parameters of an application before determining (at 5025) whether any position variables are left to process. Instead of identifying the position of the slider shape before the sliding region, some embodiments identify the position of the sliding region before identifying the position of the slider shape.

Many embodiments of a two-dimensional slider control described above and below define slider shapes such that positioning them along or close to the outer edge of a sliding region selects a minimum value from a range of values, applies a small or no amount of an operation to an image being edited, etc., and positioning the slider shapes in or close to the center of the sliding region selects a maximum value from a range of values, applies a large amount of an operation to an image being edited, etc. In different embodiments, however, the slider shapes may be defined differently. For instance, the slider shapes of some embodiments may be defined to select a minimum value from a range of values, apply a small or no amount of an operation to an image being edited, etc., when they are positioned in or closer to the center of the sliding region, and to select a maximum value from a range of values, apply a large amount of an operation to an image being edited, etc., when they are positioned on or close to the outer edge of the sliding region.

Figure 52A:
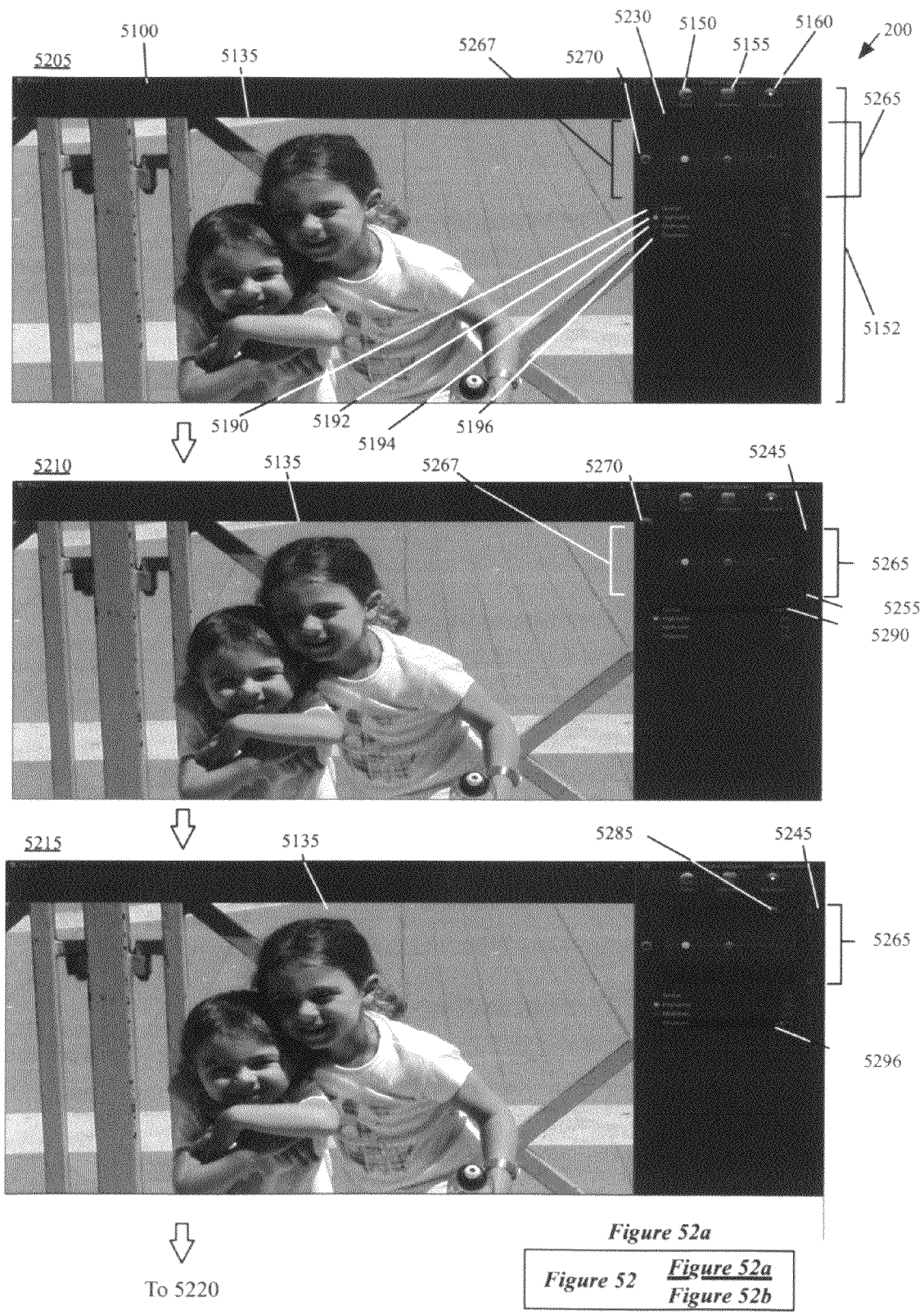
FIG. 52 conceptually illustrates a GUI of a media-editing application of some embodiments that provide a two-dimensional slider control with slider shapes for applying saturation adjustments.
Figures 52, 52A, 52B:
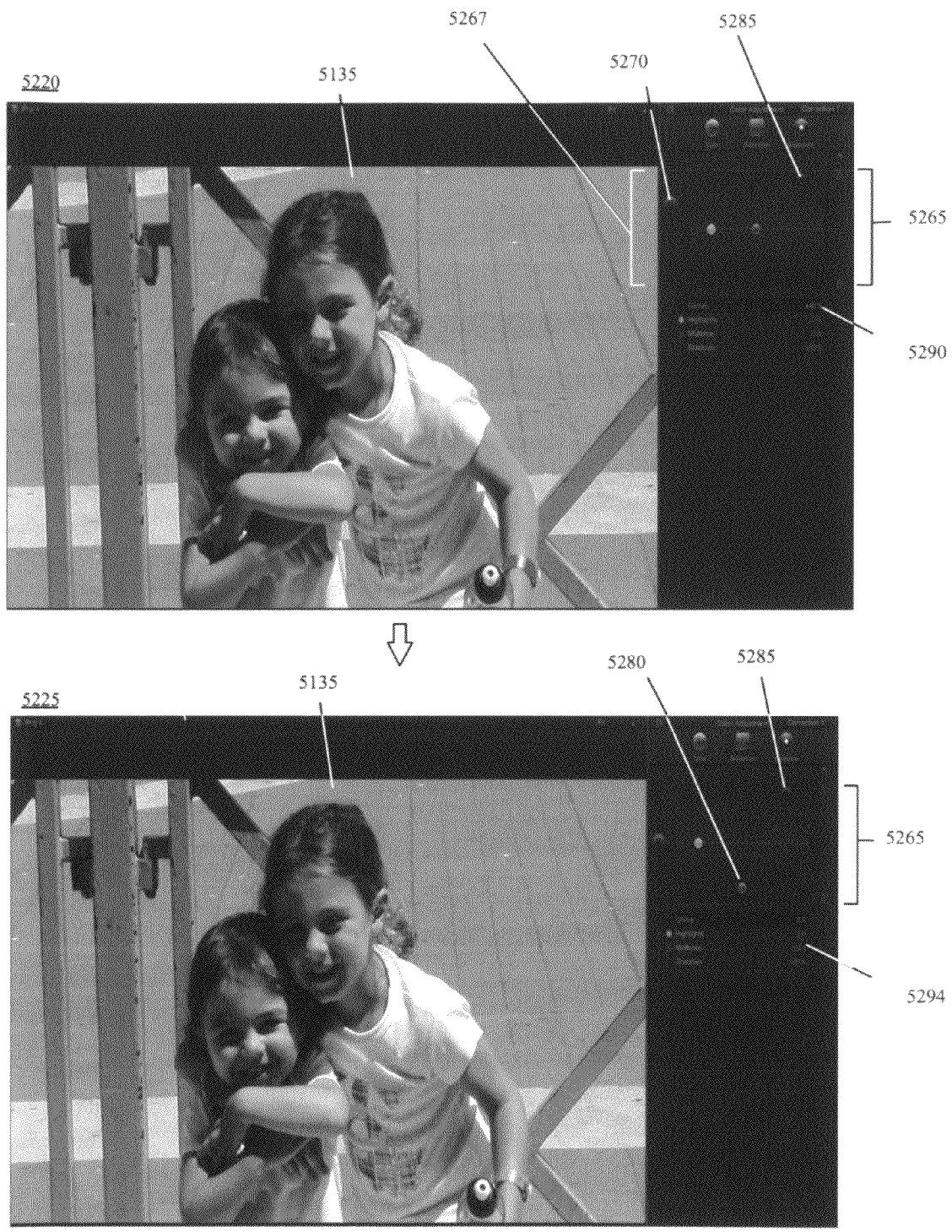
Figure 53A:
FIG. 53 conceptually illustrates a GUI of a media-editing application of some embodiments that provide a two-dimensional slider control with slider shapes for applying brightness adjustments.
Figure 53B:
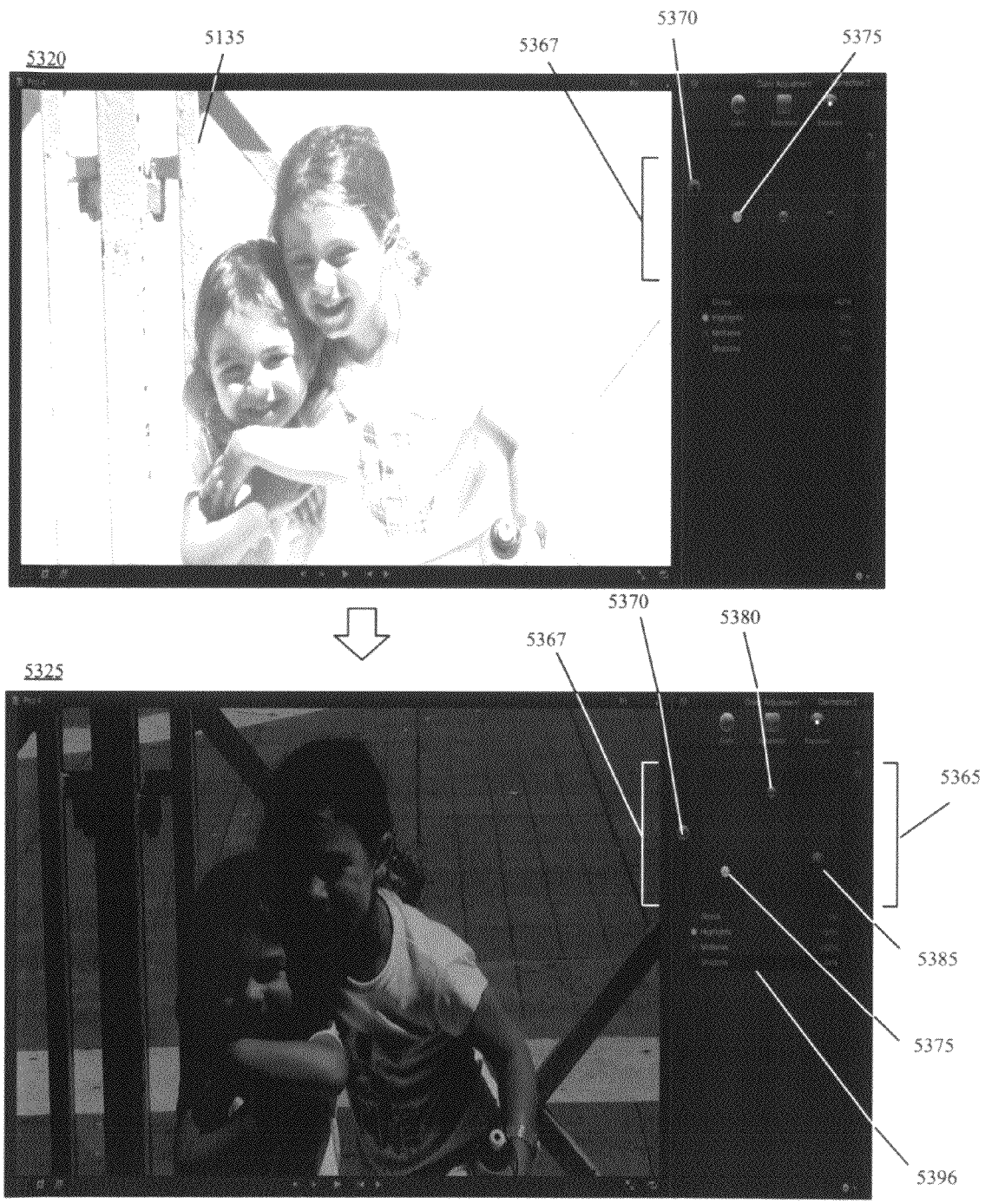

The above description of FIG. 49 illustrates a GUI that includes a two-dimensional slider control that provides a slider shape for applying a sharpness operation to an image. However, the two-dimensional slider control of some embodiments provides slider shapes for applying other types of image editing operations. The following FIGS. 51-53 illustrate several examples of GUIs of a media-editing application that provides such a two-dimensional slider control for applying color adjustments, saturation adjustments, and exposure adjustments respectively.

Figure 51A:
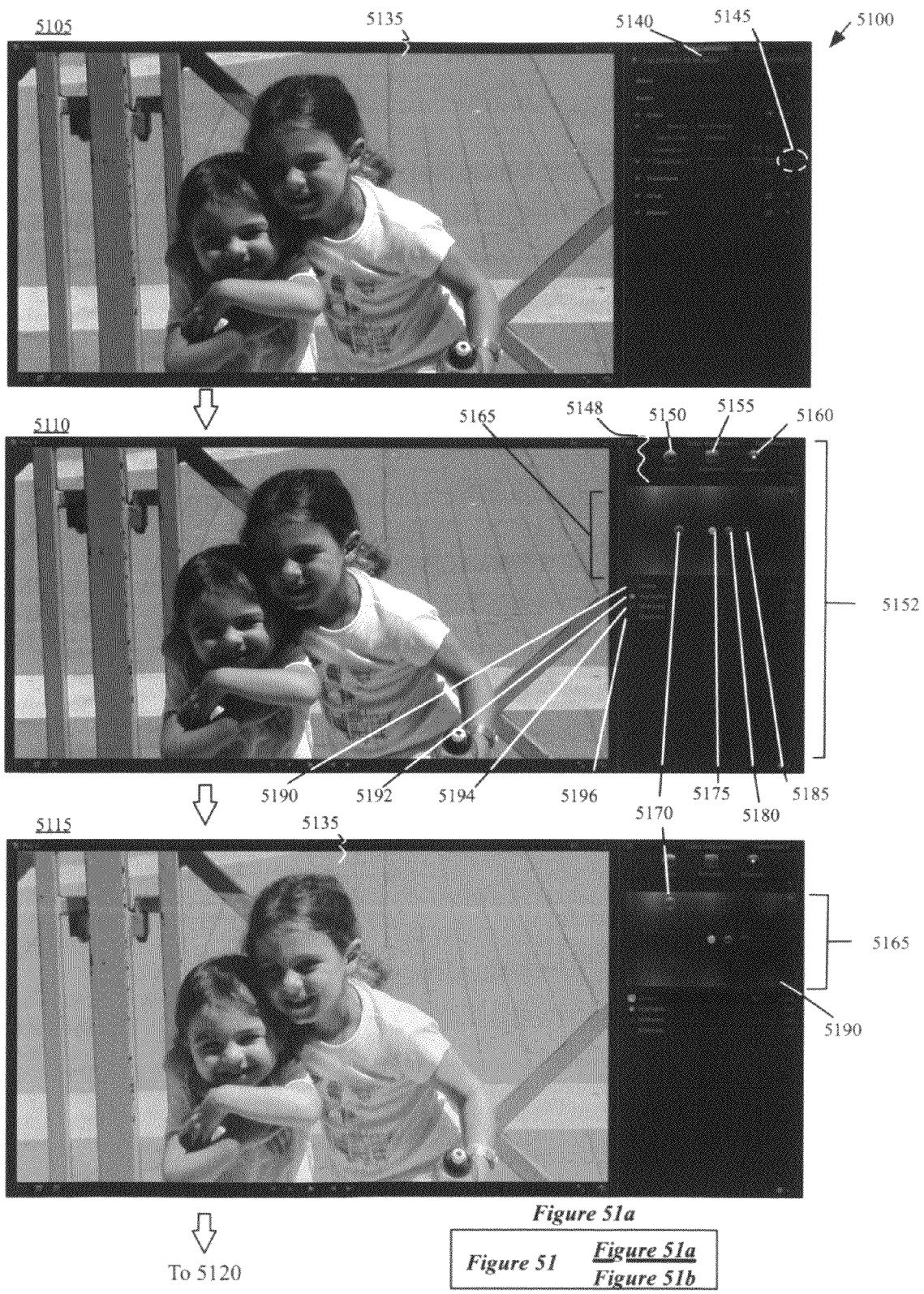
FIG. 51 conceptually illustrates a GUI of a media-editing application of some embodiments that provide a two-dimensional slider control with slider shapes for applying color adjustments.
Figure 51B:
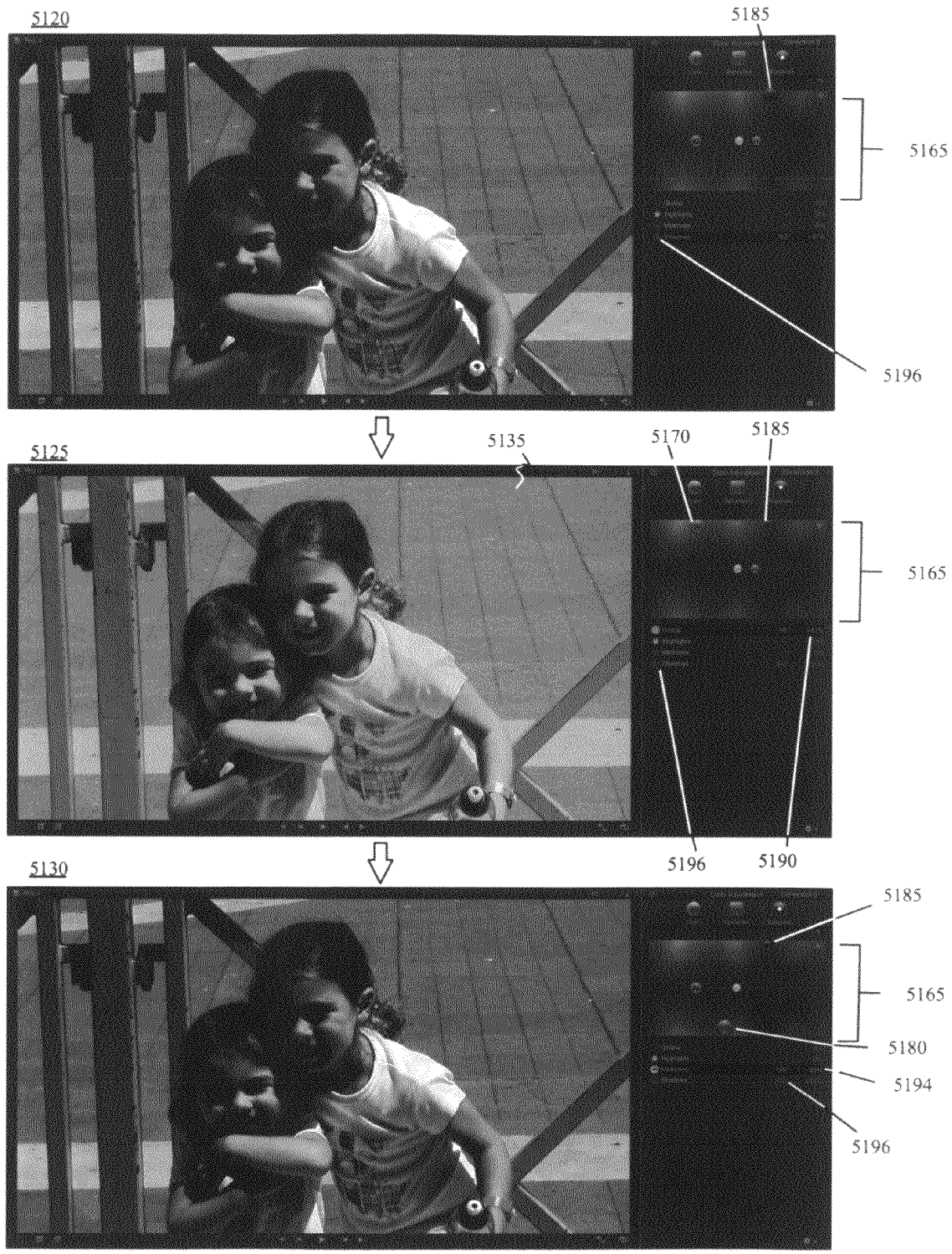

Specifically, FIG. 51 conceptually illustrates a graphical user interface (GUI) 5100 of a media-editing application of some embodiments that provides a two-dimensional slider control with slider shapes for applying color adjustments. This figure illustrates the GUI 5100 at six different stages 5105-5130 of color adjustment operations of the color slider control on an image.

As shown, the GUI 5100 includes image display area 5135 and color correction panel 5140. The image display area 5135 displays an image for a user to edit with a set of editing tools. The color correction panel 5140 provides a user-selectable user interface (UI) item 5145 (e.g., a show color board button 5145 within the color section of the color correction panel 5140) that displays a sliding region (e.g., a color board) upon selection by a user.

The user selectable UI item 5145 is a conceptual illustration of one or more UI items that allows the color board tool to be invoked (e.g., by a cursor operation such as clicking a mouse, tapping a touchpad, or touching the UI item on a touchscreen). Different embodiments implement the UI item 5145 differently. Some such embodiments implement the UI item 5145 as a UI button while other embodiments implement the UI item 5145 as a menu selection command that can be selected through a pull-down, drop-down, or pop-up menu. Still other embodiments implement the UI item 5145 as a keyboard command that can be invoked through one or more keystrokes or a series of keystrokes. Yet other embodiments allow the user to invoker the color board tool through two or more of such UI implementations or other UI implementations.

The first stage 5105 illustrates the GUI 5100 before a user of the media-editing application applies a color adjustment operation on an image. In the first stage, the image display area 5135 displays an image selected by the user of the media-editing application. The second stage 5110 of the GUI 5100 illustrates that upon a selection of the user-selectable UI item 5145, the GUI 5100 provides a slider control panel 5152 to the right of the image display area 5135. This panel includes user-selectable UI tabs 5150, 5155, and 5160 for displaying color, saturation and exposure color panes for display in a display area of the slider control panel 5152.

The second stage 5110 shows the GUI 5100 after the user of the media-editing application has selected the UI item 5145. For this example, when the media-editing application receives the selection of the UI item 5145, the media-editing application displays a color slider control 5148 for adjusting the color attributes of an image.

The color slider control 5148 includes a sliding region 5165, several sliders (i.e., a global slider shape 5170, a highlights slider shape 5175, a midtones slider shape 5180, a shadows slider shape 5185), and one indicator for each slider (i.e., a global indicator 5190, a highlights indicator 5192, a midtones indicator 5194, and a shadows indicator 5196). The user may move the slider shapes 5170, 5175, 5180, and 5185 across the sliding region 5165 in several directions (e.g., in parallel, collinear, orthogonal or other angular directions with respect to each other) to achieve the desired effect over the image. The user may move a slider across the sliding region 5165 by selecting the slider with a cursor and then dragging the slider, or through any other mechanisms (such as keystroke, finger-drag movement, etc.). The sliders may be moved through other mechanisms in some embodiments. The GUI 5100 displays a highlighting of the indicators 5190, 5192, 5194, and 5196 upon the user's selection and movement of the corresponding slider shapes 1070, 5175, 5180, and 5185 across the sliding region 5165.

While in this example the GUI 5100 displays the color slider control 5148 on the slider control panel 5152 upon selection of the user selectable UI item 5145, the GUI 5100 may display a different slider control (e.g., saturation, exposure) upon selection of the user selectable UI item 5145. In some embodiments, the user of the media-editing application may designate (e.g., using a preference setting) the GUI 5100 to display the color slider control on the slider control panel 5152 upon selection of the user selectable UI item 5145. The user may alternate among the three different slider controls by selecting a selectable item on the GUI 5100 (e.g., tabs 5150, 5155, and 5160) or by performing a keystroke, etc.

The third stage 5115 of the GUI 5100 illustrates the movement of the global slider shape 5170 across the sliding region 5165 towards the top edge of sliding region 5165. The user of the media-editing application may perform this movement by selecting the global slider shape 5170 and then dragging the global slider shape 5170 towards the top edge of the sliding region 5165.

As the user selects the global slider shape 5170 and moves it across the sliding region 5165 (e.g., drags the slider 5170 to light green), the GUI 5100 indicates a highlighting of the global indicator 5190 and its corresponding text (e.g., the black highlighting across the global indicator 5190 and its corresponding text). Some embodiments also highlight the global indicator with the color on which the corresponding slider shape is positioned within the sliding region. Moreover, the GUI 5100 displays an enlarged version of the global slider shape 5170 as the user selects and moves the global slider shape 5170 in the sliding region 5165. Different embodiments of the media-editing application may indicate the selection and the movement of the slider shape differently (e.g., displaying an animation or visual effect of the slider shape that is being moved such as spinning the slider shape).

In some embodiments, the media-editing application translates the movement of the slider shape 5170 to an input (e.g., to a vector movement or position) that specifies a movement of the color values in a particular direction with a particular magnitude. It then converts this input into a transform operation that it then uses to adjust the color values of the image displayed in the image display area, and in the case of video editing, to adjust the color values of the images of the video clip associated with the image displayed in the image display area.

Some embodiments apply the color changes to the images and allow the user to preview the changes in the image display area 5135 as the user drags the global slider 5170. Other embodiments display a preview of the color changes as the user moves the slider shapes but require the user to perform an extra action (e.g., by a cursor click when finding the desire position for the slider shape) before global slider 5170 is assigned to a dragged location and the color changes are applied to the image. In some embodiments, the media-editing application reverts the slider shape to its default position if the user does not perform the extra action. The third stage 5115 shows that the user has slid the global slider shape 5170 towards the upper edge of the sliding region 5165 that corresponds to light green in the color spectrum. Additionally, the third stage 5115 shows that the colors in the image displayed in the image display area 5135 has correspondingly changed to include a light green color tint.

The fourth stage 5120 of the GUI 5100 illustrates the movement of the shadows slider shape 5185 across the sliding region 5165 towards the upper edge of the sliding region 5165 and slightly to the left. As in the third stage 5115, the media-editing application highlights the corresponding indicator to the selected slider in the fourth stage 5120. The shadows indicator 5192 is also highlighted since the user has selected and moved the shadows slider shape 5185. While the user moves the shadows slider shape 5185 in the sliding region 5165, the application in some embodiments captures an input (e.g., a vector input), translates that input into a transform, and uses the transform to adjust the colors in the image in order to modify the "shadows" (e.g., pixels in the image that have low luminance component values) to the desired color. The fourth stage 5120 shows that the user has slid the shadows slider shape 5185 towards the upper edge of the sliding region 5165 and slightly to the left, which corresponds to blues in the color spectrum. Also, the fourth stage 5120 shows that the colors of pixels in the image that are determined as "shadows" are towards the blues.

Moreover, as described above, as the user moves the shadows slider shape 5185 across the sliding region 5165, the GUI 5100 displays the shadows indicator 5196 as highlighted. The media-editing application enlarges the shadows slider shape 5185 as the user moves the shadows slider shape 5185 in the sliding region 5165. Different embodiments of the media-editing application may indicate the movement of the slider shape differently.

As mentioned above, the media-editing application of some embodiments applies the changes as the user moves the slider shapes across the sliding region (e.g., by a click-and-drag motion performed through a cursor controller operation) and retains the changes as the user stops moving the slider shape (e.g., upon a release of the mouse after the click-and-drag motion). Some embodiments keep the slider shape at the position in the sliding region that the user left it and allow the user to move other slider shapes. Accordingly, the color slider control in some embodiments allows the user to move multiple slider shapes to different regions within the slider region.

In the fifth stage 5125, the media-editing application retained the shadows slider shape 5185 movement from the previous stage 5120 as the user has moved the global slider shape 5170 towards the upper edge of the sliding region 5165, which displays a light green color. As described above, the media-editing application highlights the corresponding indicator to the selected slider. In this stage 5125, the GUI 5100 highlights the global indicator 5190 as the user moves the global slider shape 5170 after moving the shadows slider shape 5185. Moreover, as the user moves the global slider shape 5170 across the sliding region 5165, the GUI 5100 increases the size of the slider shape 5170 (e.g., creates an animated effect as the user drags the slider shape across the sliding region to indicate which slider shape is being moved).

The media-editing application applies the changes to the image at the same time as the user's moving the slider shapes. As the user moves the global slider shape 5170 after moving the shadows slider shape 5185, the media-editing applies a light green color to the whole image (since changes made by the global slider shape 5170 affects the entire image) in addition to the color applied in the prior stage 5120 (the blue color adjustment applied to the pixels that are determined as "shadows").

In the sixth stage 5130 the global slider shape 5170 has been moved back to its original default position. The sixth stage 5130 illustrates the movement of the midtones slider shape after the movement of the shadows slider shape 5185. In this stage 5130, the user moves the midtones slider shape 5180 across the sliding region 5165 to the bottom edge of the sliding region 5165, which corresponds to a subtraction of a saturated blue color. In some embodiments, the media-editing application modifies the colors of pixels in the image that are determined as "midtones" (e.g., pixels in the image that have medium luminance component values) as the user moves the midtones slider shape 5180. In this stage 5130, since the user has moved the midtones slider shape 5180 towards a saturated orange color, the colors within the image that are determined as "midtones" (e.g., skin tone, etc.) are modified towards this color.

FIG. 52 conceptually illustrates a graphical user interface (GUI) 200 of a media-editing application of some embodiments that provide a two-dimensional slider control with slider shapes for applying saturation adjustments. Specifically, FIG. 52 illustrates the GUI 200 at five different stages 5205-5225 of saturation (or color intensity) adjustment operations of the saturation slider control on an image.

As shown, the GUI 200 includes the image display area 5135 that displays an image for a user to edit and a two dimensional saturation slider control 5230 on a slider control panel 5152 that includes the user-selectable UI tab 5150-5160.

The first stage 5205 illustrates the GUI 200 before a user of the media-editing application applies a saturation adjustment operation on an image. In the first stage 5205, the image display area 5135 displays an image selected by the user of the media-editing application. As shown, the saturation slider control 5230 includes a sliding region 5265, a sliding region 5267, a global slider shape 5270, a highlights slider shape 5275, a midtones slider shape 5280, a shadows slider shape 5285, a global indicator 5290, a highlights indicator 5292, a midtones indicator 5294, and a shadows indicator 5296.

The user may move the slider shape 5270 in the sliding region 5267 in a collinear direction (e.g., up and down). The user may also move the slider shapes 5275, 5280, and 5285 in the sliding region 5265 in a collinear direction (e.g., up and down). In some embodiments, the user may move the slider shapes in various directions (e.g., non-collinear directions, angular directions, etc.) to achieve the desired effect over the image. The GUI 200 displays a highlighting of the indicators 5290, 5292, 5294, and 5296 upon the user's selection and movement of the corresponding slider shapes 1170, 5275, 5280, and 5285 across the sliding region 5265. As mentioned above, different embodiments may implement the tabs and items described above differently.

As described above, upon selection of the user-selectable item 5145, different embodiment of the GUI 200 may display different slider controls as a default slider control. For instance, the GUI 200 display may display the saturation slider control 5230 on the slider control panel 5152 upon selection of the user-selectable item 5145.

The second stage 5210 of the GUI 200 illustrates the movement of the global slider shape 5270 across the sliding region 5267 towards the top end of sliding region 5267. The user of the media-editing application may perform this movement by selecting the global slider shape 5270 with and then dragging the global slider shape 5270 towards the top of the sliding region 5267. In some embodiments, the user may perform this movement by a keystroke, by a finger-drag movement, etc.

As the user selects the global slider shape 5270 and moves it across the sliding region 5267 (e.g., drags the slider 5270 towards higher saturation), the GUI 200 indicates a highlighting of the global indicator 5290 and its corresponding text (e.g., black highlighting across the global indicator 5290 and its corresponding text). Different embodiments may indicate the selection and the movement of the slider shapes differently (e.g., by displaying an animated effect on the slider shape, thru text indication, etc.) In some embodiments, the indicator and its corresponding text remains highlighted until the user selects and moves a different slider shape within the sliding region.

Moreover, the GUI 200 displays an enlarged version of the global slider shape 5270 as the user selects and moves the global slider shape 5270 across the sliding region 5267. Different embodiments of the media-editing application may indicate the selection and the movement of the slider shape differently (e.g., adding an animation effect to the slider shape that is being moved). Some embodiments may indicate the selection and the movement of the slider shape by simultaneously highlighting the indicators and enlarging the slider shape.

In some embodiments, the movement of the slider shapes in an upward direction increases the saturation of the pixels that correspond to that slider shape (e.g., moving the global slider shape upward from the center default position increases the overall saturation of the image, which affects all the pixels in the image whereas moving the midtones slider shape upward increases the saturation values of the pixels in the image that have medium brightness values). Similarly, the movement of the slider shapes in a downward direction decreases the saturation of the pixels that correspond to that slider shape. While in this example, moving the slider shapes upwards corresponds to an increase in saturation (e.g., as indicated by the saturation symbol 5245 and the de-saturation symbol 5255), some embodiments may specify the direction that corresponds to the increase/decrease in saturation differently (e.g., to the right indicates more saturation while to the left indicates less saturation).

Some embodiments apply the saturation adjustments to the image and allow the use to preview the changes in the image display area 5135 as the user moves the global slider 5270. Other embodiments display a preview of the saturation adjustments as the user moves the slider shapes but require the user to perform an extra action (e.g., by a cursor click when finding the desire position for the slider shape) before global slider 5270 is assigned to a dragged location and the saturation adjustments are applied to the image. In some embodiments, the media-editing application reverts the slider shape to its default position if the user does not perform the extra action. The second stage 5210 illustrates that the user has slid the global slider shape 5270 towards the top of the sliding region 5265 (e.g., towards increase saturation) and that all the pixels in the image are increased in saturation.

The third stage 5215 of the GUI 200 illustrates the movement of the shadows slider shape 5285 across the sliding region 5265 towards the top of the sliding region 4265. As in the second stage 5210, the media-editing application highlights the corresponding indicator to the selected slider in the third stage 5215. The shadows indicator 5296 is also highlighted since the user has selected and moved the slider shape 5285. While the user moves the shadows slider shape 5285 in the sliding region 5265, the media-editing application in some embodiments adjusts the saturation of the pixels in the image that are dark (e.g., have low luma values or low luminance component values). The third stage 5215 illustrates that the user has slid the shadows slider shape 5285 towards the upper edge of the sliding region 5265 (e.g., towards increased saturation), the saturation of pixels in the image that are dark (e.g., have low luma levels) are increased.

Moreover, as described above, as the user moves the shadows slider shape 5285 across the sliding region 5265, the GUI 200 displays the shadows indicator 5296 as highlighted. The media-editing application displays an enlarged version of the shadows slider shape 5285 as the user moves the shadows slider shape 5285 in the sliding region 5265. Different embodiments of the media-editing application may indicate the movement of the slider shape differently.

As mentioned above, the media-editing application of some embodiments applies the changes as the user moves the slider shapes across the sliding region (e.g., by a click-and-drag motion performed through a cursor controller operation) and retains the changes as the user stops moving the slider shape (e.g., upon a release of the mouse after the click-and-drag motion). Some embodiments keep the slider shape at the position in the sliding region that the user left it and allow the user to move other slider shapes. Accordingly, the saturation slider control in some embodiments allows the user to move multiple slider shapes to different regions within the slider region.

In the fourth stage 5220, the media-editing application retained the shadows slider shape 5285 movement from the previous stage 5215 as the user moved the global slider shape 5270 towards the top of the sliding region 5267. As described above, the media-editing application highlights the corresponding indicator to the selected slider. In this stage 5220, the GUI 200 highlights the global indicator 5290 as the user moves the global slider shape 5270 after moving the shadows slider shape 5285. Moreover, as the user moves the global slider shape 5270 across the sliding region 5267, the GUI 200 displays an enlarged version of the slider shape 5270 (e.g., creates an animated effect as the user drags the slider shape across the sliding region to indicate which slider shape is being moved).

The media-editing application applies the changes to the image at the same time as the user's moving the slider shapes. As the user moves the global slider shape 5270 after moving the shadows slider shape 5285, the media-editing applies increases the saturation of all the pixels in the image (since changes made by the global slider shape 5270 affects the entire image) beyond the saturation adjustment applied in the prior stage 5215 (the increased saturation of pixels that fall within the "shadows").

In the fifth stage 5225 the global slider shape 5270 has been moved back to its original default position. The fifth stage 5225 illustrates the movement of the midtones slider shape 5280 after the movement of the shadows slider shape 5285. In this stage 5225, the user moves the midtones slider shape 5280 across the sliding region 5265 towards the bottom of the sliding region 5265, which decreases the saturation of pixels in the image that are determined as "midtones" (e.g., pixels in the image that have medium luminance component values). In this stage 5225, since the user has moved the midtones slider shape 5280 towards the decreased saturation, the saturation of pixels in the image that are determined as "midtones" (e.g., skin tone, etc.) are decreased.

FIG. 53 conceptually illustrates a graphical user interface (GUI) 200 of a media-editing application of some embodiments that provide a two-dimensional slider control with slider shapes for applying brightness adjustments. Specifically, FIG. 53 illustrates the GUI 200 at five different stages 5305-5325 of brightness (e.g., luminance) adjustment operations of the exposure slider control on an image.

As shown, the GUI 200 includes the image display area 5135 that displays an image for a user to edit and a two dimensional exposure slider control 5335 on a slider control panel 4254 that includes the user-selectable UI tab 5150-5160.

The first stage 5305 illustrates the GUI 200 before a user of the media-editing application applies an exposure adjustment operation on an image. In the first stage 5305, the image display area 5135 displays an image selected by the user of the media-editing application. As shown, the exposure slider control 5333 includes a sliding region 5365, a sliding region 5367, a global slider shape 5370, a highlights slider shape 5375, a midtones slider shape 5380, a shadows slider shape 5385, a global indicator 5390, a highlights indicator 5392, a midtones indicator 5394, and a shadows indicator 5396.

The user may move the slider shape 5370 in the sliding region 5367 in a collinear direction (e.g., up and down). The user may also move the slider shapes 5375, 5380, and 5385 in the sliding region 5365 in a collinear direction (e.g., up and down). In some embodiments, the user may move the slider shapes in various directions (e.g., non-collinear directions, angular directions, etc.) to achieve the desired effect over the image. The GUI 200 displays a highlighting of the indicators 5390, 5392, 5394, and 5396 upon the user's selection and movement of the corresponding slider shapes 5370, 5375, 5380, and 5385 across the sliding region 5365. As mentioned above, different embodiments may implement the tabs and items described above differently.

As described above; upon selection of the user-selectable item 5145, different embodiment of the GUI 200 may display different slider controls as a default slider control. For this example, the GUI 200 may display the exposure slider control 5333 on the slider control panel 5152 upon selection of the user-selectable item 5145.

The second stage 5310 of the GUI 200 illustrates the movement of the midtones slider shape 5380 across the sliding region 5365 towards the top end of sliding region 5365. The user of the media-editing application may perform this movement by selecting the midtones slider shape 5380 with and then dragging the midtones slider shape 5380 towards the top of the sliding region 5365. In some embodiments, the user may perform this movement by a keystroke, by a finger-drag movement, etc.

As the user selects the midtones slider shape 5380 and moves it across the sliding region 5365 (e.g., drags the slider 5380 towards higher saturation), the GUI 200 indicates a highlighting of the midtones indicator 5394 and its corresponding text (e.g., black highlighting across the midtones indicator 5394 and its corresponding text). Different embodiments may indicate the selection and the movement of the slider shapes differently (e.g., by displaying an animated effect on the slider shape, thru text indication, etc.) In some embodiments, the indicator and its corresponding text remains highlighted until the user selects and moves a different slider shape within the sliding region.

Moreover, the GUI 200 displays an enlarged version of the midtones slider shape 5380 as the user selects and moves the midtones slider shape 5380 across the sliding region 5365. Different embodiments of the media-editing application may indicate the selection and the movement of the slider shape differently (e.g., adding an animation effect to the slider shape that is being moved). Some embodiments may indicate the selection and the movement of the slider shape by simultaneously highlighting the indicators and enlarging the slider shape.

In some embodiments, the movement of the slider shapes in an upward direction increases the exposure of the pixels that correspond to that slider shape (e.g., moving the midtones slider shape upward from the center default position increases the exposure of pixels in the image that are determined as "midtones"). Similarly, the movement of the slider shapes in a downward direction decreases the exposure of the pixels that correspond to that slider shape. While in this example, moving the slider shapes upwards corresponds to an increase in exposure (e.g., as indicated by the exposure symbol 5345 and the de-saturation symbol 5355), some embodiments may specify the direction that corresponds to the increase/decrease in exposure differently (e.g., to the right indicates more exposure while to the left indicates less exposure).

Some embodiments apply the exposure adjustments to the image and allow the user to preview the changes in the image display area 5135 as the user moves the midtones slider 5380. Other embodiments display a preview of the exposure adjustments as the user moves the slider shapes but require the user to perform an extra action (e.g., by a cursor click when finding the desire position for the slider shape) before midtones slider 5380 is assigned to a dragged location and the exposure adjustments are applied to the image. In some embodiments, the media-editing application reverts the slider shape to its default position if the user does not perform the extra action. The second stage 5310 shows that the user has slid the midtones slider shape 5380 towards the top of the sliding region 5365 (e.g., towards increase exposure), the pixels in the image that are determined "midtones" (e.g., pixels in the image that have medium luminance component values) are increased in exposure.

The third stage 5315 of the GUI 200 illustrates the movement of the highlights slider shape 5375 across the sliding region 5365 towards the bottom of the sliding region 5365. As in the second stage 5310, the media-editing application highlights the corresponding indicator to the selected slider in the third stage 5315. The highlights indicator 5392 is also highlighted since the user has selected and moved the slider shape 5375. While the user moves the highlights slider shape 5375 in the sliding region 5365, the media-editing application in some embodiments adjusts the exposure of the pixels in the image that are bright (e.g., have high luma levels or high luminance component values). As shown, the image within the image display area 5135 appears darker than before, indicating a decrease in luminance. The media-editing application adjusted the pixels in the image that are determined as "highlights" (e.g., pixels in the image that have high luminance component values) to decrease in brightness.

Moreover, as described above, as the user moves the highlights slider shape 5375 across the sliding region 5365, the GUI 200 displays the highlights indicator 5392 as highlighted. The media-editing application enlarges the highlights slider shape 5375 as the user moves the highlights slider shape 5375 in the sliding region 5365. Different embodiments of the media-editing application may indicate the movement of the slider shape differently.

As mentioned above, the media-editing application of some embodiments applies the changes as the user moves the slider shapes across the sliding region (e.g., by a click-and-drag motion performed through a cursor controller operation) and retains the changes as the user stops moving the slider shape (e.g., upon a release of the mouse after the click-and-drag motion). Some embodiments keep the slider shape at the position in the sliding region that the user left it and allow the user to move other slider shapes. Accordingly, the exposure slider control in some embodiments allows the user to move multiple slider shapes to different regions within the slider region.

The fourth stage 5320 of the GUI 200 illustrates the movement of the global slider shape 5370 across the sliding region 5367 towards the top end of sliding region 5367. The user of the media-editing application may perform this movement by selecting the global slider shape 5370 with and then dragging the global slider shape 5370 towards the top of the sliding region 5367. In some embodiments, the user may perform this movement by a keystroke, by a finger-drag movement, etc.

As the user selects the global slider shape 5370 and moves it across the sliding region 5367 (e.g., drags the slider 5370 towards higher exposure), the GUI 200 indicates a highlighting of the global indicator 5390 and its corresponding text (e.g., black highlighting across the global indicator 5390 and its corresponding text). Different embodiments may indicate the selection and the movement of the slider shapes differently (e.g., by displaying an animated effect on the slider shape, thru text indication, etc.) In some embodiments, the indicator and its corresponding text remains highlighted until the user selects and moves a different slider shape within the sliding region.

Moreover, the GUI 200 displays an enlarged version of the global slider shape 5370 as the user selects and moves the global slider shape 5370 across the sliding region 5367. Different embodiments of the media-editing application may indicate the selection and the movement of the slider shape differently (e.g., adding an animation effect to the slider shape that is being moved). Some embodiments may indicate the selection and the movement of the slider shape by simultaneously highlighting the indicators and enlarging the slider shape. In the fourth stage 5320, the brighter image indicates that as the user slider the global slider shape 5370 towards the top of the sliding region 5367 (e.g., towards increase exposure), all the pixels in the image are increased in exposure (e.g., the luminance component values of all the pixels in the image are increased).

In the fifth stage 5325 the global slider shape 5370 has been moved back to its original default position. The fifth stage 5325 illustrates the movement of the highlights slider shape 5375, the midtones slider shape 5380, and the shadows slider shape 5385. In this stage 5325, the user moves the highlights slider shape 5370 across the sliding region 5365 towards the bottom of the sliding region 5365, which decreases the exposure of pixels in the image that are determined as "highlights" (e.g., pixels in the image that have high luminance component values), the user moves the midtones slider shape 5380 across the sliding region 5365 towards the top of the sliding region 5265, which increases the exposure of pixels in the image that are determined as "midtones" (e.g., pixels in the image that have medium luminance component values), and the user moves the shadows slider shape 5385 across the sliding region 5365 towards the bottom of the sliding region 5265, which decreases the exposure of pixels in the image that are determined as "shadows" (e.g., pixels in the image that have low luminance component values).

Many of the figures illustrated above (e.g., FIGS. 49 and 50-53) illustrate color correction operations that are applied to an image through a GUI of a media-editing application. As noted above, the image may part of a video clip in some embodiments. In some of these embodiments, the media-editing application may also apply the color correction to the remaining frames of the video clip. This way, a user only has to apply color correction operations to one frame of a video clip (instead applying color correction operations to each frame of the video clip).

B. Color-Based Masks

As mentioned above, the color masking tool of some embodiments allows a user to perform secondary color correction. Some embodiments of the invention provide a novel color masking tool for a media-editing application. The color masking tool defines a first portion of a three-dimensional color space based on a selection (e.g., received from a user through a GUI of the media-editing application) of a first portion of an image (e.g., a still image, a frame or field of a video clip, etc.). In some embodiments, the first portion of the three-dimensional color space is a superellipse-based shape (e.g., a super-ellipsoid or superellipsoid) that includes pixel values in the three-dimensional color space of pixels in the first portion of the image.

An image in some embodiments is an array of pixels (e.g., 800×600 pixels, 1024×768 pixels, 1600×1200 pixels). Each pixel represents a portion of the image and includes the color and brightness information for such portion of the image. Different embodiments represent the color and brightness information of pixels in an image differently for different color spaces. For instance, for an image defined in an RGB color space, the pixels' color and brightness information is represented by a red component value, a green component value, and a blue component value in some embodiments. In other embodiments, the color and brightness of pixels of an image defined in a Y'CbCr color space are represented using a luma (Y') component value for brightness and a blue-difference (Cb) component value and a red-difference (Cr) component value for chrominance (i.e., color). In some embodiments, the luma component is the weighted sum of the nonlinear gamma compressed R'G'B' components. In some of these embodiments, R'G'B' is gamma corrected red, green, and blue components. Other ways of representing the pixels' color and brightness are possible for images defined in other color spaces.

Figure 54:
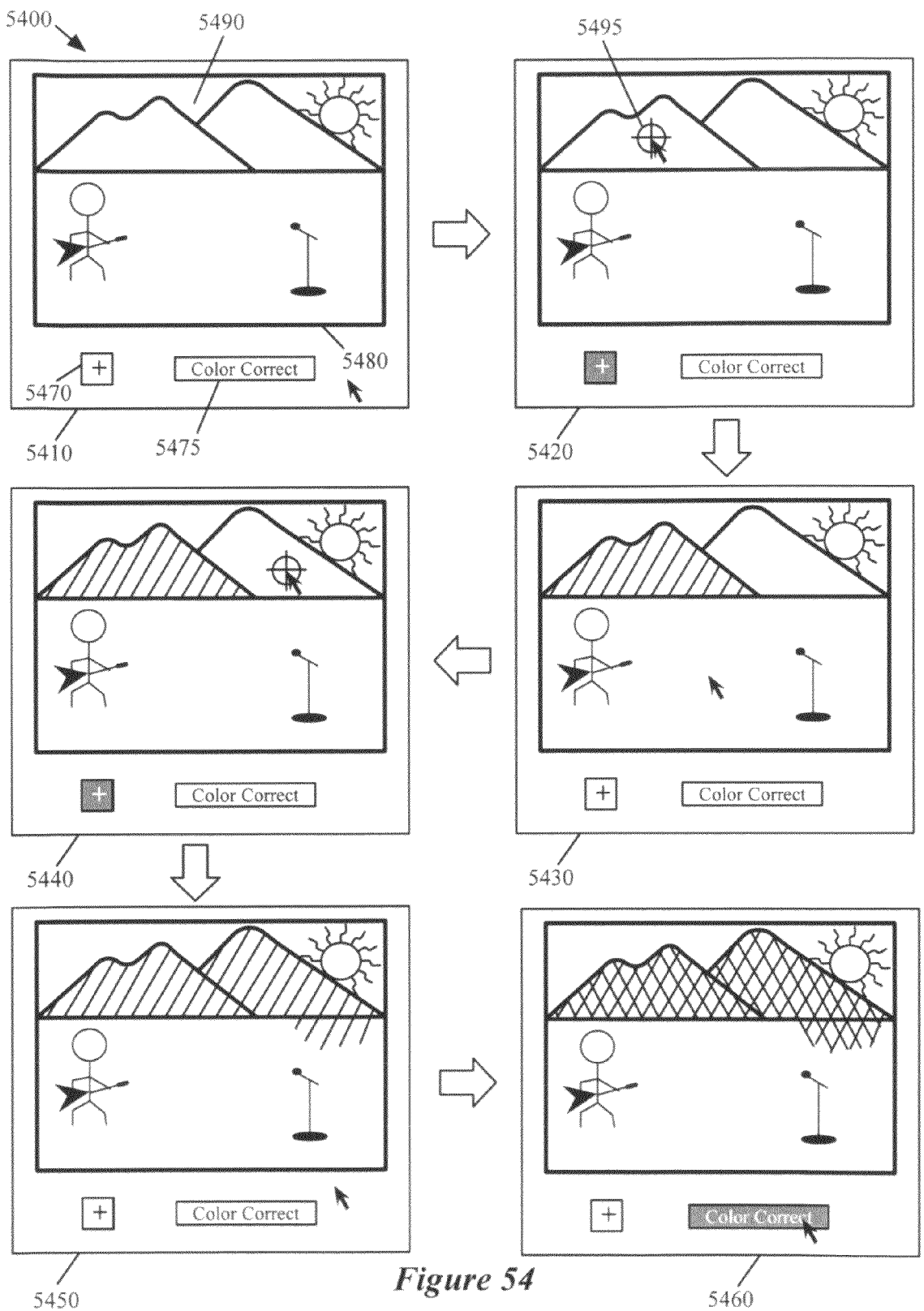
FIG. 54 conceptually illustrates a GUI of a media-editing application that provides a color masking tool of some embodiments.

FIG. 54 conceptually illustrates a graphic user interface (GUI) 5400 of a media-editing application of some embodiments that provides a color masking tool. Specifically, FIG. 54 illustrates the GUI 5400 at six different stages 5410-5460 of a color masking operation of the color masking tool that defines a color mask.

As shown, the GUI 5400 includes a user-selectable user interface (UI) item 5470, a user-selectable UI item 5475, and an image display area 5480. The image display area 5480 displays an image for a user to edit with a set of editing tools (not shown). In some embodiments, the image display area 5480 allows the user to select portions of the image (e.g., using a selection tool) through the image display area 5480.

The user-selectable UI item 5470 is a conceptual illustration of one or more UI items that allows a positive (or additive) color masking tool to be invoked (e.g., by a cursor operation such as clicking a mouse button, tapping a touchpad, or touching the UI item on a touchscreen). When the positive color masking tool is invoked, the user can select a portion of the image through the image display area 5480 in order to create a color mask or to modify (e.g., by adding colors to) an existing color mask. Based on the selected portion of the image, the positive color masking tool of some embodiments defines a color mask. In some embodiments, a color mask specifies a set of pixels in the image that has the same or similar color values as the color values of the pixels in the selected portion of the image.

Differently embodiments implement the UI item 5470 differently. Some such embodiments implement the UI item 5470 as a UI button while other embodiments implement the UI item 5470 as a menu selection command that can be selected through a pull-down, drop-down, or pop-up menu. Still other embodiments implement the UI item 5470 as a keyboard command that can be invoked through one or more keystrokes or a series of keystrokes (e.g., pressing and holding a key to activate the positive color masking tool and releasing the key to deactivate the positive color masking tool). Yet other embodiments allow the user to activate the positive color masking tool through two or more of such UI implementation or other UI implementations.

The user-selectable UI item 5475 is also conceptual illustration of one or more UI items that allows a color correction operation to be invoked (e.g., by a cursor operation such as clicking a mouse button, tapping a touchpad, or touching the UI item on a touchscreen). Examples of color correction operations includes hue adjustments, saturation adjustments, brightness adjustments, or any other type of color correction operation. When the color correction operation is invoked, the positive color masking tool applies the color correction operation to the image. In some embodiments, the positive color masking tool applies the color correction operation to the image by modifying pixels in the image that are included in the color mask. In some cases where a color mask has not been created, the color correction operation is applied to all the pixels in the image. Additionally, the UI item 5475 can be implemented any number of different ways, including those described for the UI item 5470, in different embodiments.

The operation of the GUI 5400 will now be described by reference to the six different stages 5410-5460 that are illustrated in FIG. 54. The first stage 5410 illustrates an image 5490 displayed in the image display area 5480. In some embodiments, the media-editing application displays the image 5490 in the image display area 5480 when the media-editing application receives a selection (e.g., through a keyboard command(s) or a cursor operation) of a representation of the image 5490 (e.g., a thumbnail, text, icon, etc.) in another region (not shown) of the media-editing application (e.g., a file browser, an event library, a compositing display area, etc.).

As shown, the image 5490 displayed in the image display area 5480 is of a person playing a guitar with mountains and a sun in the background. In some embodiments, the image 5490 may be a still image, an image (frame or field) in a video, or any other type of image. In this example, the image 5490 is a still image.

The second stage 5420 of the GUI 5400 illustrates that the user has activated the positive color masking tool by selecting the UI item 5470 using a cursor (e.g., by clicking a mouse button, tapping a touchpad, or touching the image displayed on a touchscreen), as indicated by a highlighting of the UI item 5470. In addition, the second stage 5420 shows a selection tool 5495 displayed in the image display area 5480. As shown, the selection tool 5495 in this example is a circle with a cross hair displayed in the center of the circle. The user can control the selection tool 5495 by moving the cursor (e.g., by moving a mouse across a surface, touching and dragging a finger across a touchpad, or touching and dragging a finger across a touchscreen) in some embodiments. In some embodiments, the media-editing application provides the selection tool 5495 when the positive color masking tool is activated.

In addition, the second stage 5420 shows that the user has selected a portion of the image 5490 displayed in the image display area 5480 using the selection tool 5495 (e.g., by clicking a mouse button, tapping a touchpad, or touching the image displayed on a touchscreen) in order to create a color mask. In particular, the user has created a color mask by selecting a portion of the left mountain in the image 5490. When the media-editing application receives the selection, some embodiments of the positive color masking tool of the media-editing application defines a color mask based on the selection. As mentioned above, a color mask specifies a set of pixels in an image that has the same or similar color values as the color values of the pixels in the selected portion of the image. In this example, the color of the left mountain is all the same color. As such, the positive color masking tool of some embodiments defines a color mask that specifies pixels in the image 5490 that have the same color values as the color values of the pixels in the selected portion of the left mountain.

The third stage 5430 illustrates the GUI 5400 after a color mask has been created based on the portion of the image 5490 selected in the second stage 5420. As shown, the portion of the image 5490 (i.e., pixels) displayed in the image display area 5480 that is specified as being included in the color mask is indicated by diagonal lines in order to provide the user with a visual indication of the portion of the image 5490 that is included in the color mask. In particular, the left mountain in the image 5490 is indicated by diagonal lines. In some embodiments, the media-editing application displays the diagonal lines after the media-editing application defines the color mask.

Although the third stage 5430 illustrates diagonal lines to indicate the portion of the image 5490 included in the color mask, other embodiments of the media-editing application display such indications differently. For instance, some such embodiments might indicate the portion of the image 5490 included in the color mask with patterns (e.g., dots), color indicators, animations (e.g., flashing colors), textual indicators, or any other type of visual indicator.

The third stage 5430 also shows that the UI item 5470 is no longer highlighted and the cursor is provided instead of the selection tool 5495. In some embodiments, the media-editing application deactivates the positive color masking tool, removes the highlighting of the UI item 5470, and provides a cursor instead of the selection tool 5495 when the media-editing application receives a selection of a portion of the image to create a color mask. Some embodiments of the media-editing application may not deactivate the positive color masking tool when the media-editing application receives a selection of a portion of the image to create a color mask in order to allow the user to continue creating or adding colors to a color mask. In some such embodiments, the media-editing application continues to highlight the UI item 5470 and to provide the selection tool 5495.

In the fourth stage 5440, the GUI 5400 illustrates using the positive color masking tool to add colors to an existing color mask. Specifically, the fourth stage 5440 shows that the user has activated the positive color masking tool by selecting the UI item 5470 using a cursor (e.g., by clicking a mouse button, tapping a touchpad, or touching the image displayed on a touchscreen), as indicated by a highlighting of the UI item 5470. The second stage 5420 also illustrates the selection tool 5495 displayed in the image display area 5480. In some embodiments, the media-editing application provides the selection tool 5495 when the positive color masking tool is activated.

The fourth stage 5440 additionally shows that the user has selected a portion of the right mountain in the image 5490 displayed in image display area 5480 using the selection tool 5495 (e.g., by clicking a mouse button, tapping a touchpad, or touching the media clip 5475 on a touchscreen) in order to add colors in the portion of the right mountain to the color mask created in the second stage 5420. For this example, the color of the right mountain is all the same color, which is similar to the color of the left mountain. In addition, the area below the right side of the right mountain is also the same color as the color of the right mountain. As such, the positive color masking tool of some embodiments modifies (e.g., redefines) the color mask that was defined in the second stage 5420 so that the color mask specifies pixels in the image 5490 that have the same color values as the color values of the pixels in the selected portion of the right mountain in addition to specifying pixels in the image 5490 that have the same color values as the color values of the pixels in the selected portion of the left mountain. In some embodiments, the positive color masking tool of the media-editing application modifies (e.g., redefines) the existing color mask when the media-editing application receives a selection of a portion of the right mountain to add colors to the color mask.

The fifth stage 5450 illustrates the GUI 5400 after an addition has been made to an existing color mask based on the portion of the image 5490 selected in the fourth stage 5440. As shown, the area below the right side of the right mountain is included in the color mask. In this example, the color values of the pixels in the right mountain is similar enough to color values of pixels below the right side of the right mountain that those pixels below the right side of the right mountain are included in the color mask. As such, the fifth stage 5450 shows diagonal lines displayed on the area below the right mountain as well as the right mountain itself to indicate that this portion of the image 5490 (i.e., pixels) is included in the color mask. Again, these diagonal lines are displayed in order to provide the user with a visual indication of the portion of the image 5490 that is included in the color mask. Additional and/or other types of visual indicators noted above by reference to the third stage 5430 may be used in different embodiments. In some embodiments, the media-editing application displays the diagonal lines after the media-editing application defines the color mask.

Like the third stage 5430, the fifth stage 5450 shows that the UI item 5470 is not highlighted and the selection tool 5495 is no longer provided. The media-editing application of some embodiments deactivates the positive color masking tool, removes the highlighting of the UI item 5470, and provides a cursor instead of the selection tool 5495 when the media-editing application receives a selection of a portion of the image to add colors to an existing color mask. In some embodiments, the media-editing application may not deactivate the positive color masking tool when the media-editing application receives a selection of a portion of the image to add colors to an existing color mask in order to allow the user to continue adding colors to the color mask. In some of these embodiments, the media-editing application continues to highlight the UI item 5470 and to provide the selection tool 5495.

The sixth stage 5460 illustrates that the user has invoked a color correction operation by selecting the UI item 5475 using the cursor (e.g., by clicking a mouse button, tapping a touchpad, or touching the image displayed on a touchscreen), which is indicated by a highlighting of the UI item 5475. As mentioned above, the color correction operation can be any type of color correction operation (e.g., hue adjustments, saturation adjustments, brightness adjustments) in different embodiments. As shown, the sixth stage 5460 displays crossing diagonal lines to indicate the portion of the image 5490 (which is the portion of the image 5490 specified by the color mask defined in the fourth stage 5440) to which the color correction operation is applied.

In some embodiments, the media-editing application provides a persistent color correction operation. For instance, a user might adjust a color mask or create a new color mask after a color correction operation has been applied to an image. In such embodiments, the media-editing application continues to apply the color correction to the image using the current color mask. In other embodiments, the media-editing application may provide a transient color correction operation. In these embodiments, when the user adjusts the color mask after a color correction operation has been applied to the image, the media-editing application removes (e.g., deletes) the color correction operation and the user will have to apply another color correction operation to the image if the user wishes to apply a color correction operation to the image.

While FIG. 54 illustrates a positive color masking tool allowing a user to add colors to an existing color mask, some embodiments of the positive color masking tool create a new color mask in a similar manner described above by reference to the second stage 5420 when the media-editing application receives a selection of a portion of the image after having previously received another portion of the image.

As shown, the above FIG. 54 illustrates a GUI of a media-editing application for creating a color mask for an image. As noted above, the positive color masking tool of some embodiments defines a portion of a three-dimensional color space based on a selection of a portion of an image (e.g., through a GUI of a media-editing application that provides the positive color masking tool). In some embodiments, the positive color masking tool defines a color mask for the image based on the defined portion of the three-dimensional color space.

Figure 55:
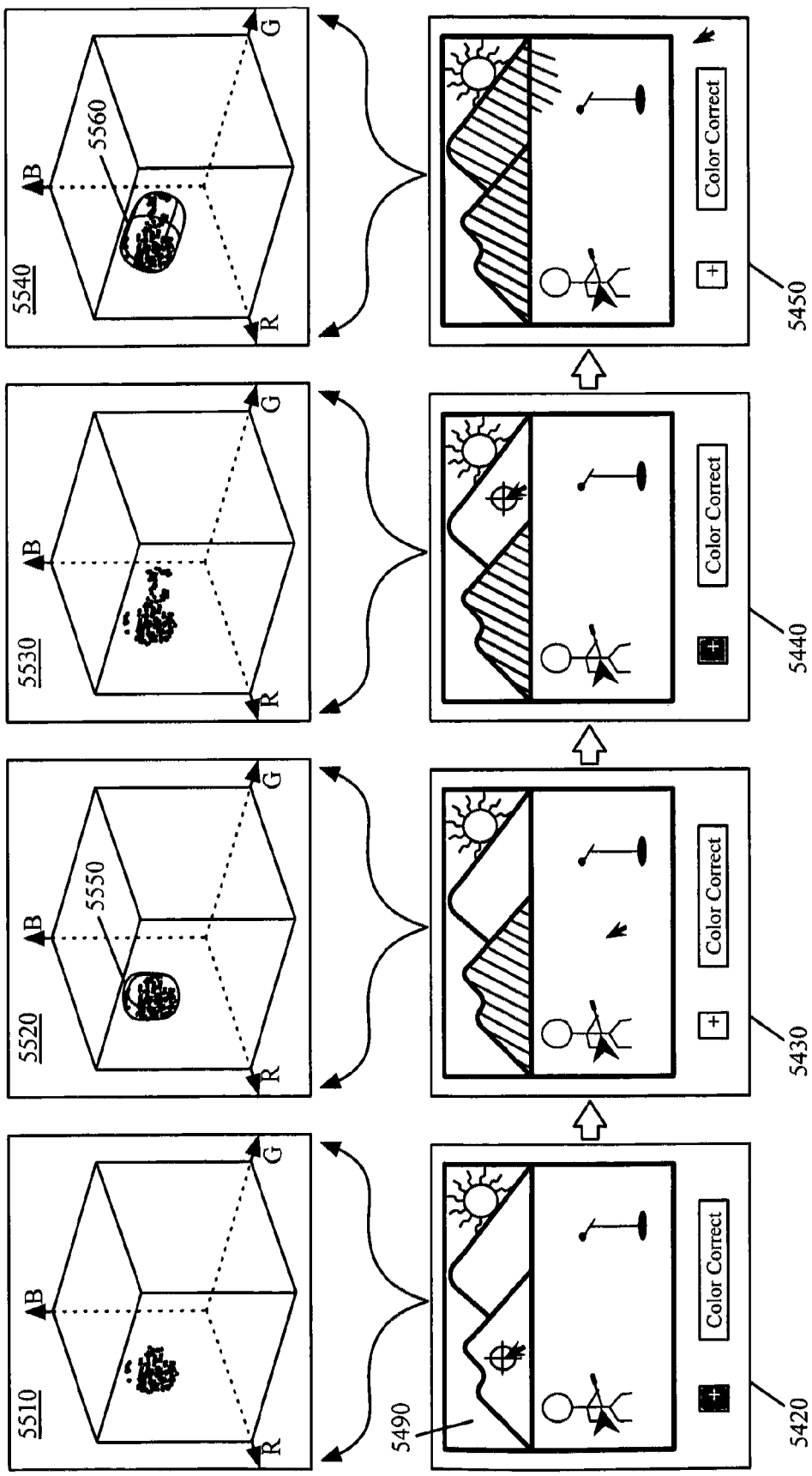
FIG. 55 conceptually illustrates several states of a three-dimensional color space that correspond to several of the stages illustrated in FIG. 54 according to some embodiments of the invention.

FIG. 55 conceptually illustrates several states of a three-dimensional color space that corresponds to several of the stages illustrated in FIG. 54. Specifically, FIG. 55 conceptually illustrates four different states 5510-5540 of a positive color masking tool of some embodiments defining superellipse-based shapes in a three-dimensional color space.

As shown, the three-dimensional color space is an RGB color space, as indicated by the R, G, and B labels along the axes of the three-dimensional color space. A cube that is flush along the axes of the three-dimensional RGB color space is displayed to indicate the maximum values of the range of values along each axis. Different embodiments may define the range of values along the axes of the three-dimensional RGB color space differently. For instance, some embodiments define 256 values (e.g., 0-255) along each axis, which correspond to the range of values used to define a pixel in an image. For instance, in some such embodiments where the range of values are defined to be 0-255, the point in the three-dimensional RGB color space farthest from the origin would have RGB component values of 255, 255, and 255. Other ranges of values are possible in other embodiments.

In this example, image 5490 is defined in RGB color space. Accordingly, the RGB component values of pixels in the image 5490 are used to plot the pixels' corresponding points in the three-dimensional RGB color space. In instances where the image 5490 is defined in another color space, the positive color masking tool of some embodiments converts the image 5490 to the RGB color space (e.g., by applying set of transforms for converting the color space of the image to the RGB color space) in order to determine the RGB component values of the pixels in the image 5490.

The first state 5510 of the three-dimensional color space corresponds to the second stage 5420 illustrated in FIG. 54. As described above, the second stage 5420 illustrates that the user has selected a portion of the left mountain in the image 5490 in order to create a color mask. The points plotted in the three-dimensional RGB color space represent the RGB component values of the pixels in the selected portion of the image 5490. When the media-editing application receives the selection of the portion of the image 5490, some embodiments of the positive color masking tool identify the pixels in the selected portion of the image 5490 and determine the location of corresponding points in the three-dimensional RGB color space for each of the identified pixels.

The second state 5520 of the three-dimensional RGB color space corresponds to the third stage 5430 illustrated in FIG. 54. The third stage 5430, as described above, illustrates the GUI 5400 after a color mask has been created based on the portion of the image 5490 selected in the second stage 5420. As noted above, some embodiments of the color masking tool define a portion of a three-dimensional color space based on a selection of a portion of an image. As shown in the second state 5520 of the three-dimensional RGB color space, the positive color masking tool has defined a portion of the three-dimensional RGB color space based on RGB component values of the pixels in the portion of the image 5490 that was selected in the second stage 5420. Specifically, the portion of the three-dimensional RGB color space includes RGB component values that are the same or similar to the RGB component values of the pixels in the selected portion of the image 5490. As illustrated, the portion of the three-dimensional RGB color space is a superellipsoid 5550 in this example. In some embodiments, the positive color masking tool defines the superellipsoid 5550 when the media-editing application receives the selection of the portion of the image 5490 in the second stage 5420.

Based on the superellipsoid 5550, some embodiments of the positive color masking tool define a color mask. In this example, the positive color masking tool defines a color mask that specifies pixels in the image 5490 that have RGB component values included in the superellipsoid 5550. As illustrated in the third stage 5430, diagonal lines are displayed on the portion of the image 5490 (i.e., pixels) that is included in the color mask. The positive color masking tool of some embodiments uses the superellipsoid 5550 to identify the portion of the image 5490 (i.e., pixels) that is included in the color mask in order for the media-editing application to display visual indicators (e.g., diagonal lines in this example) on such portion of the image 5490.

The third state 5530 of the three-dimensional RGB color space corresponds to the fourth stage 5440 illustrated in FIG. 54. As mentioned above, the fourth stage 5440 illustrates that the user has selected a portion of the right mountain in the image 5490 in order to add colors in the portion of the right mountain to the color mask created in the second stage 5420. In the third state 5530, the superellipsoid 5550 is not shown for the sake of clarity. However, in some embodiments, the superellipsoid 5550 still exists (i.e., the color mask defined in the second state 5520 still exists). As shown, additional points are plotted to the right of the points illustrated in the first state 5510 of the three-dimensional RGB color space. These additional points represent the RGB component values of the pixels in the selected portion of the right mountain in the image 5490. When the media-editing application receives the selection of the portion of the right mountain in the image 5490, some embodiments of the positive color masking tool identify the pixels in the selected portion of the right mountain in the image 5490 and determine the corresponding location in the three-dimensional RGB color space of each of the identified pixels.

The fourth state 5540 of the three-dimensional RGB color space corresponds to the fifth stage 5450 illustrated in FIG. 54. The fifth stage 5450, as previously described above, illustrates the GUI 5400 after an addition has been made to an existing color mask based on the portion of the image 5490 selected in the fourth stage 5440. As illustrated in the fourth state 5540 of the three-dimensional RGB color space, the positive color masking tool has defined a portion of the three-dimensional RGB color space based on RGB component values of the pixels in the portions of the image 5490 that were selected in the second stage 5420 and the fourth stage 5440. In particular, the portion of the three-dimensional RGB color space includes RGB component values that are the same or similar to the RGB component values of the pixels in the selected portions of the image 5490. As shown, the portion of the three-dimensional RGB color space is a superellipsoid 5560 in this example. In some embodiments, the positive color masking tool defines the superellipsoid 5560 when the media-editing application receives the selection of the portion of the image 5490 in the fourth stage 5440.

Based on the superellipsoid 5560, some embodiments of the positive color masking tool define a color mask. For this example, the positive color masking tool defines a color mask that specifies pixels in the image 5490 that have RGB component values included in the superellipsoid 5560. As shown in the fifth stage 5450, diagonal lines are displayed on the portion of the image 5490 (i.e., pixels) that is included in the color mask. Some embodiments of the positive color masking tool use the superellipsoid 5560 to identify the portion of the image 5490 (i.e., pixels) that is included in the color mask in order for the media-editing application to display visual indicators (e.g., diagonal lines in this example) on the portion of the image 5490.

The above figures illustrate examples of creating a color mask and adding colors to an existing color mask. However, in some instances, the user may want to remove colors from an existing color mask. For instance, in the example illustrated in FIG. 54, the user might be trying to select the mountains and nothing else in the image 5490. After selecting the portion of the right mountain to add colors to the color mask, the color values of the pixels in the selected portion of the right mountain is similar enough to color values of pixels below the right side of the right mountain that those pixels below the right side of the right mountain are included in the color mask. In some cases, the user might want to remove the colors of the pixels below the right side of the right mountain from the color mask.

Figure 56:
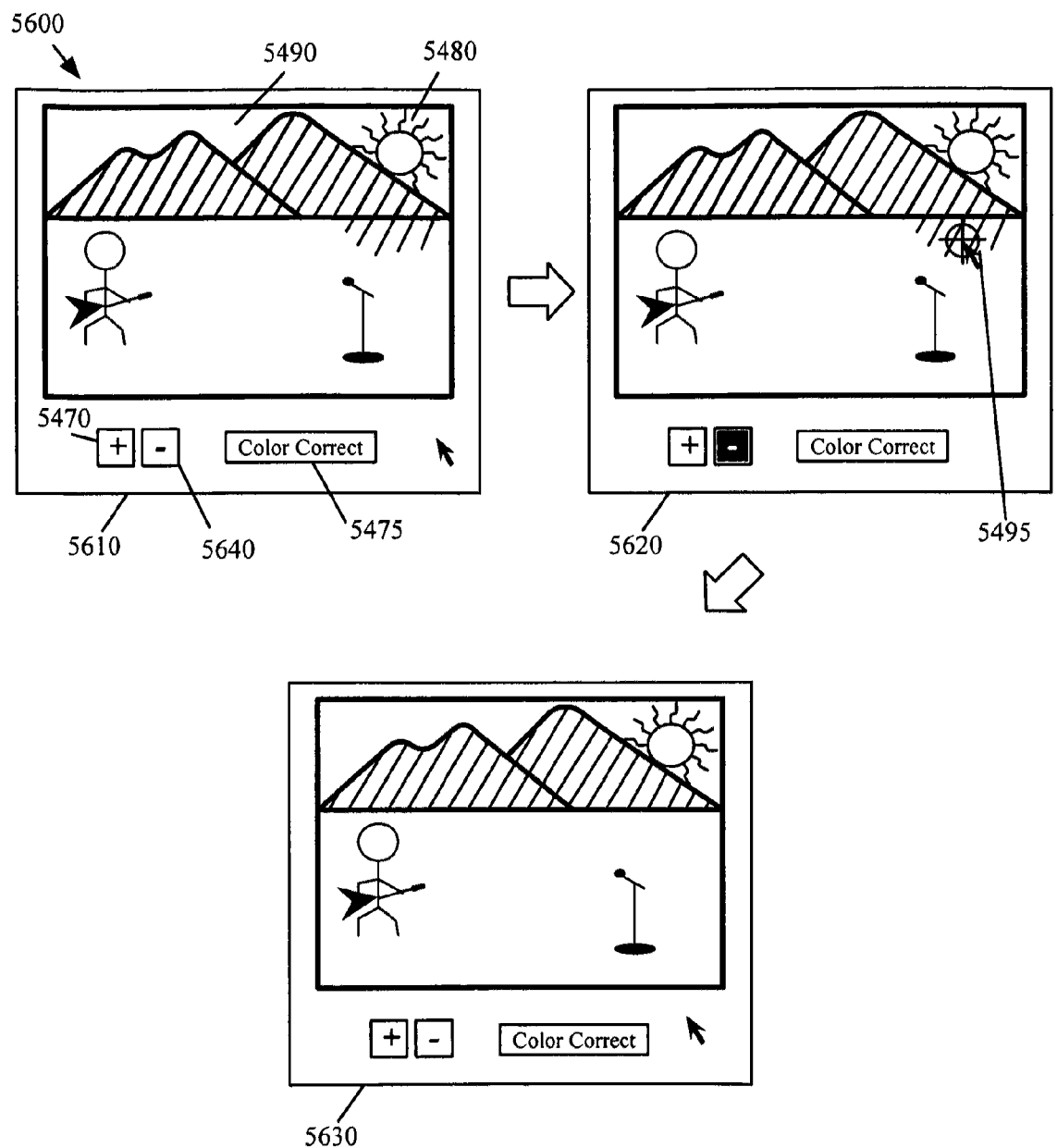
FIG. 56 conceptually illustrates a GUI of a media-editing application that provides a color masking tool of some embodiments.

FIG. 56 conceptually illustrates a GUI 5600 of a media-editing application that provides a color masking tool of some embodiments. Specifically, FIG. 56 illustrates the GUI 5600 at three different stages 5610-5630 of a color masking operation of the color masking tool that removes colors from an existing color mask.

The GUI 5600 is similar to the GUI 5400 illustrated in FIG. 54 but the GUI 5600 includes an additional user-selectable UI item 5640. The user-selectable UI item 5640 is a conceptual illustration of one or more UI items that allows a negative (or subtractive) color masking tool to be invoked (e.g., by a cursor operation such as clicking a mouse button, tapping a touchpad, or touching the UI item on a touchscreen). When the negative color masking tool is invoked, the user can select a portion of the image through the image display area 5480 in order to remove colors from an existing color mask. Based on the selected portion of the image, the negative color masking tool of some embodiments defines a color mask. As mentioned above, a color mask of some embodiments specifies a set of pixels in the image that has the same or similar color values as the color values of the pixels in the selected portion of the image.

Differently embodiments implement the UI item 5640 differently. Some such embodiments implement the UI item 5640 as a UI button while other embodiments implement the UI item 5640 as a menu selection command that can be selected through a pull-down, drop-down, or pop-up menu. Still other embodiments implement the UI item 5640 as a keyboard command that can be invoked through one or more keystrokes or a series of keystrokes (e.g., pressing and holding a key to activate the negative color masking tool and releasing the key to deactivate the negative color masking tool). Yet other embodiments allow the user to invoke the negative color masking tool through two or more of such UI implementation or other UI implementations.

The first stage 5610 is similar to the fifth stage 5450 illustrated in FIG. 54. The first stage 5610 illustrates the GUI 5600 after an addition has been made to an existing color mask based on the portion of the image 5490 selected similar to the selection illustrated in the fourth stage 5440. In addition, diagonal lines are displayed on the portion of the image 5490 (i.e., pixels) in the image display area 5480 that is specified as being included in the color mask.

The second stage 5620 illustrates that the user has activated the negative color masking tool by selecting the UI item 5640 using a cursor (e.g., by clicking a mouse button, tapping a touchpad, or touching the image displayed on a touchscreen), as indicated by a highlighting of the UI item 5640. The second stage 5620 also shows the selection tool 5495 displayed in the image display area 5480. In some embodiments, the media-editing application provides the selection tool 5495 when the negative color masking tool is activated.

In addition, the second stage 5620 illustrates that the user has selected a portion of the image 5490 displayed in the image display area 5480 using the selection tool 5495 (e.g., by clicking a mouse button, tapping a touchpad, or touching the image displayed on a touchscreen) in order to remove colors from the existing color mask. Specifically, the user has removed colors from the existing color mask by selecting a portion of the image 5490 below the right side of the right mountain. When the media-editing application receives the selection, some embodiments of the negative color masking tool of the media-editing application defines a color mask based on the selection. As mentioned above, a color mask specifies a set of pixels in an image that has the same or similar color values as the color values of the pixels in the selected portion of the image. In this example, the color of the area below the right side of the right mountain that is included in the color mask is all the same color but different than the color of the left and right mountains. Thus, the negative color masking tool of some embodiments defines a color mask that excludes pixels in the image 5490 that have the same color values as the color values of the pixels in the selected portion of the image 5490 below the right side of the right mountain.

The third stage 5630 illustrates the GUI 5600 after colors have been removed from the existing color mask based on the portion of the image 5490 selected in the second stage 5620. The portion of the image 5490 (i.e., pixels) displayed in the image display area 5480 that is specified as being included in the color mask is indicated by diagonal lines in order to provide the user with a visual indication of the portion of the image 5490 that is included in the color mask. As shown, the mountains in the image 5490 are still indicated by diagonal lines, but there are no longer diagonal lines in the area below the right side of the right mountain. In some embodiments, the media-editing application displays the diagonal lines after the media-editing application defines the color mask.

Although the third stage 5630 illustrates diagonal lines to indicate the portion of the image 5490 included in the color mask, other embodiments of the media-editing application display such indications differently. For instance, some such embodiments might indicate the portion of the image 5490 included in the color mask with patterns (e.g., dots), color indicators, animations (e.g., flashing colors), textual indicators, or any other type of visual indicator.

The third stage 5630 also shows that the UI item 5640 is no longer highlighted and the cursor is provided instead of the selection tool 5495. In some embodiments, the media-editing application deactivates the negative color masking tool, removes the highlighting of the UI item 5640, and provides a cursor instead of the selection tool 5495 when the media-editing application receives a selection of a portion of the image to remove colors from an existing color mask. In some embodiments, the media-editing application may not deactivate the negative color masking tool when the media-editing application receives a selection of a portion of the image to remove colors from an existing color mask in order to allow the user to continue adding colors to or removing colors from a color mask. In some such embodiments, the media-editing application continues to highlight the UI item 5640 and to provide the selection tool 5495.

The negative color masking tool of some embodiments defines a portion of a three-dimensional color space based on a selection of a portion of an image (e.g., through a GUI of a media-editing application that provides the positive color masking tool) for removing colors from an existing, as noted above. In some embodiments, the negative color masking tool defines a color mask for the image based on the defined portion of the three-dimensional color space.

Figure 57:
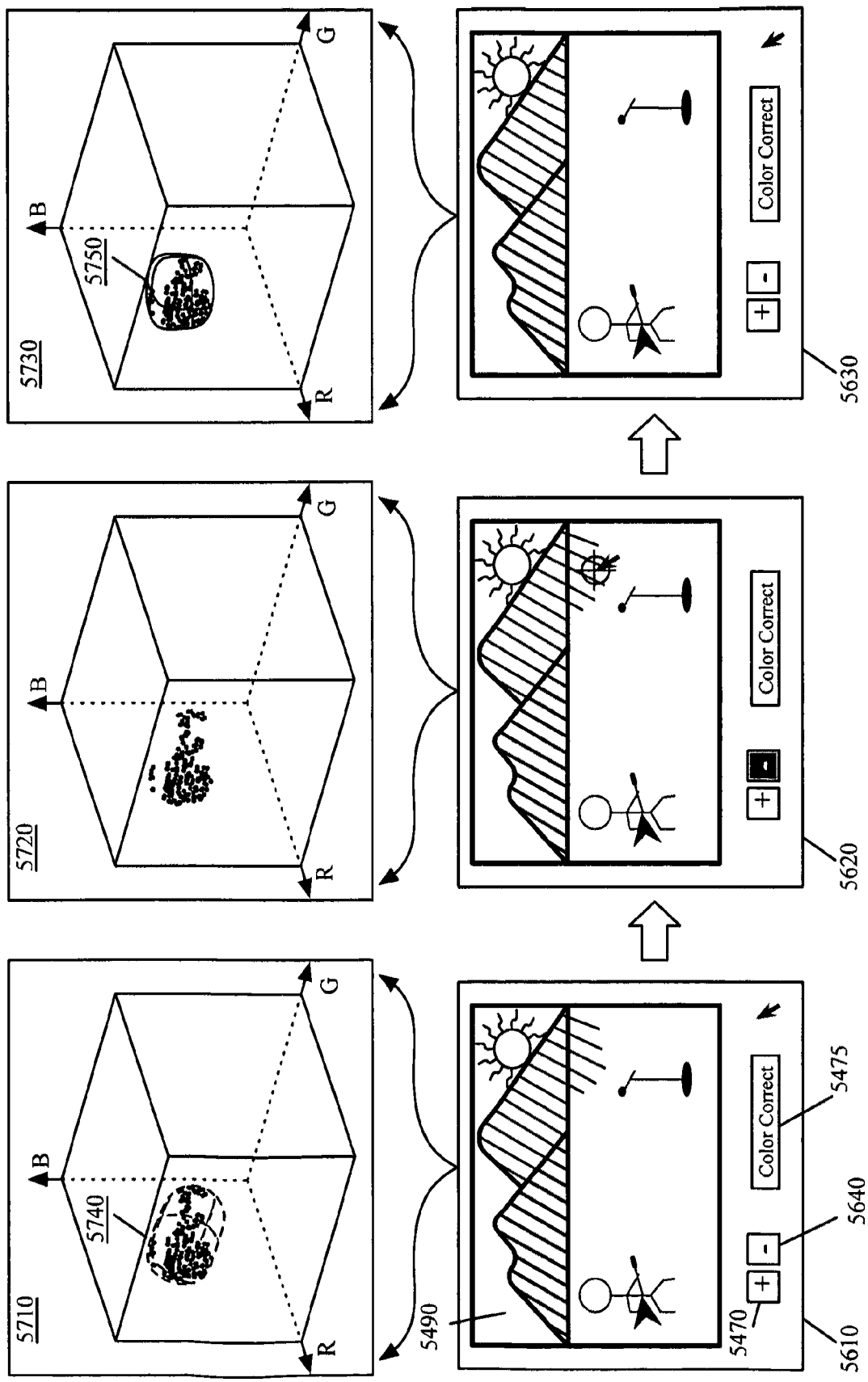
FIG. 57 conceptually illustrates several states of a three-dimensional color space that correspond to several of the stages illustrated in FIG. 56 according to some embodiments of the invention.

FIG. 57 conceptually illustrates several states of a three-dimensional color space that corresponds to several of the stages illustrated in FIG. 56. Specifically, FIG. 57 conceptually illustrates three different states 5710-5730 of a negative color masking tool of some embodiments defining superellipse-based shapes in a three-dimensional color space. The three-dimensional color space illustrated in FIG. 57 is the same three-dimensional color space described above by reference to FIG. 55. That is, the three-dimensional color space is a three-dimensional RGB color space and the RGB component values of pixels in the image 5490 are used to plot the pixels' corresponding points in the three-dimensional RGB color space.

The first state 5710 of the three-dimensional color space corresponds to the first stage 5610 illustrated in FIG. 56. As described above, the first stage 5610 is similar to the fifth stage 5450 illustrated in FIG. 54. The first stage 5610 illustrates the GUI 5600 after an addition has been made to an existing color mask based on the portion of the image 5490 selected similar to the selection illustrated in the fourth stage 5440. Therefore, the first state 5710 of the three-dimensional RGB color space is similar to the fourth state 5540 of the three-dimensional RGB color space illustrated in FIG. 55. That is, the negative color masking tool has defined a portion of the three-dimensional RGB color space based on RGB component values of the pixels (which correspond to the points plotted in the three-dimensional RGB color space) in the portion of the image 5490 that was selected in the second stage 5420 and the fourth stage 5440 of FIG. 54. As mentioned above, the portion of the three-dimensional RGB color space includes RGB component values that are the same or similar to the RGB component values of the pixels in the selected portions of the image 5490. As shown, the portion of the three-dimensional RGB color space is a superellipsoid 5740, which is similar to the superellipsoid 5560 illustrated in FIG. 55.

Based on the superellipsoid 5740, the negative color masking tool of some embodiments defines a color mask. In this example, the negative color masking tool defines a color mask that specifies pixels in the image 5490 that have RGB component values included in the superellipsoid 5740. As illustrated in the first stage 5610, diagonal lines are displayed on the portion of the image 5490 (i.e., pixels) that is included in the color mask. Some embodiments of the negative color masking tool use the superellipsoid 5740 to identify the portion of the image 5490 (i.e., pixels) that is included in the color mask.

The second state 5720 of the three-dimensional color space corresponds to the second stage 5620 illustrated in FIG. 56. As mentioned above, the second stage 5620 illustrates that the user has selected the portion of the image 5490 below the right side of the right mountain in order to remove colors from the existing color mask. The second state 5720 does not show the superellipsoid 5740 for the purpose of clarity. However, in some embodiments, the superellipsoid 5740 still exists (i.e., the color mask defined in the first state 5710 still exists). As shown in the second state 5720, several points on the right side of the plotted points illustrated in the first state 5710 of the three-dimensional RGB color space are grayed out. These gray points represent the RGB component values of the pixels in the selected portion of the image 5490 below the right side of the right mountain. When the media-editing application receives the selection, the negative color masking tool of some embodiments identifies points in the three-dimensional RGB color space that correspond in the pixels in the selected portion of the image 5490 below the right side of the right mountain and removes the identified points from the three-dimensional RGB color space.

The third state 5730 of the three-dimensional color space corresponds to the third stage 5630 illustrated in FIG. 56. As described above, the third stage 5630 illustrates the GUI 5600 after colors have been removed from the existing color mask based on the portion of the image 5490 selected in the second stage 5620. Some embodiments of the color masking tool define a portion of a three-dimensional color space based on a selection of a portion of an image, as mentioned above. As shown in the third state 5730 of the three-dimensional RGB color space, the negative color masking tool has defined a portion of the three-dimensional RGB color space based on RGB component values of the pixels in the portion of the image 5490 that was selected in the second stage 5620. In particular, the negative color masking tool has defined a portion of the three-dimensional RGB color space that includes the RGB component values in the three-dimensional RGB color space illustrated in the first state 5710, but excludes the RGB component values in the three-dimensional color space of the pixels in the portion of the image 5490 that was selected in the second stage 5620. As shown in this example, the portion of the three-dimensional RGB color space is a superellipsoid 5750. In some embodiments, the negative color masking tool defines the superellipsoid 5550 when the media-editing application receives the selection of the portion of the image 5490 in the second stage 5620.

Based on the superellipsoid 5750, some embodiments of the negative color masking tool define a color mask. In this example, the negative color masking tool defines a color mask that specifies pixels in the image 5490 that have RGB component values included in the superellipsoid 5750. As illustrated in the third stage 5630, diagonal lines are displayed on the portion of the image 5490 (i.e., pixels) that is included in the color mask. Some embodiments of the negative color masking tool use the superellipsoid 5550 to identify the portion of the image 5490 (i.e., pixels) that is included in the color mask in order for the media-editing application to display visual indicators (e.g., diagonal lines in this example) on such portion of the image 5490.

The figures above illustrate different ways of defining a color mask for an image. As previously noted above, once a color mask is defined, some embodiments apply color correction operations to the image using the color mask. When using the color mask to apply a color correction operation to a portion of an image, sharp cutoffs may exist between pixels that have colors included in the color mask (to which the color correction operation is applied) and pixels that have colors that are similar to the pixels included in the color mask, but are not included in the color mask (to which the color correction operation is not applied). As such, some embodiments of the color masking tool define a transition region for the color mask to smooth out such sharp cutoffs.

In some embodiments, a transition region specifies a set of pixels in the image that has similar color values as the color values of the pixels included in the color mask, but is not included in the color mask. Pixels in the image that are included in the transition region are partially selected pixels and pixels in the image that are included in the color mask are fully selected pixels, in some embodiments. Accordingly, a color correction operation that is applied to the image is fully applied to fully selected pixels and partially applied to partially selected pixels. In this fashion, the transition between pixels in the image to which the color correction operation is applied and pixels in the image to which the color correction operation is not applied is smoothed.

Figure 58:
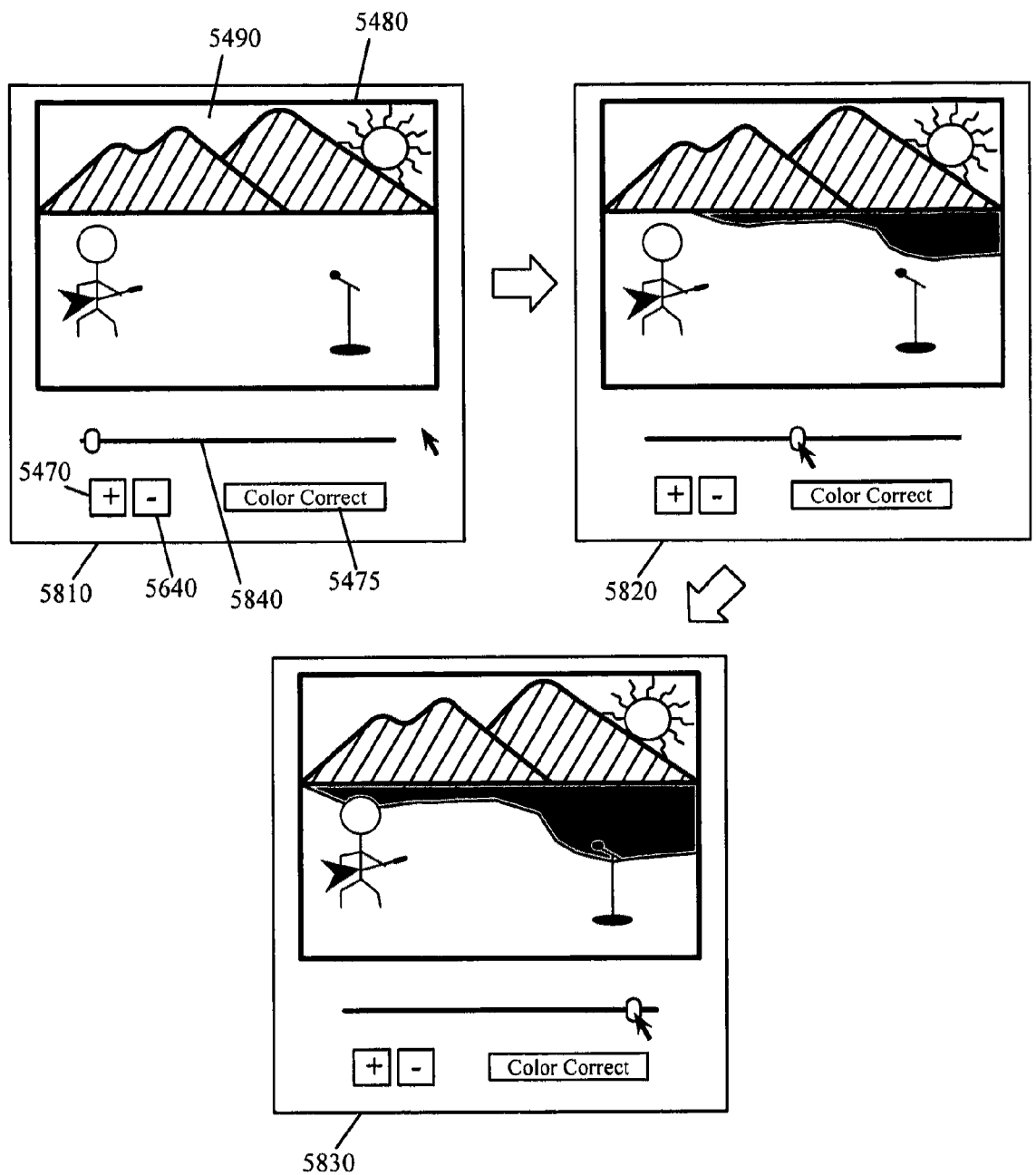
FIG. 58 conceptually illustrates a GUI of a media-editing application that provides a color masking tool of some embodiments.

FIG. 58 conceptually illustrates a GUI 5800 of a media-editing application that provides a color masking tool of some embodiments. In particular, FIG. 58 illustrates the GUI 5800 at three different stages 5810-5830 of a color masking operation of the color masking tool that defines a transition region for a color mask.

As shown, the GUI 5800 is similar to the GUI 5600 illustrated in FIG. 56 except the GUI 5800 includes user-adjustable slider control 5840. The user-adjustable slider control 5840 is a conceptual illustration of one or more UI items that allows a transition region operation to be invoked (e.g., by a cursor operation such as clicking a mouse button and dragging the mouse, tapping a touchpad and dragging across the touchpad, or touching the slider control displayed on a touchscreen and dragging across the touchscreen). When the transition region operation is invoked, the color masking tool defines a transition region for a color mask based on the position of the slide indicator on the slider control 5840. In some embodiments, different positions of the slider indicator along the slider control 5840 corresponds to different transition region values (e.g. offset values).

Different embodiments of the user-adjustable slider control 5840 define the position of the slider indicator along the slider control 5840 differently. In the following example, the leftmost position on the slider control 5840 does not defines a transition region. However, in some embodiments of the slider control 5840, the leftmost position on the slider control 5840 specifies a default transition region. As the position on the slider control 5840 moves from left to right, the transition region increases.

Differently embodiments implement the UI item 5840 differently. Some such embodiments implement the slider control 5840 as a textbox (in which a user can input values that correspond to the size of the transition region) while other embodiments implement the slider control 5840 as a menu selection command that can be selected through a pull-down, drop-down, or pop-up menu. Still other embodiments implement the slider control 5840 as a keyboard command that can be invoked through one or more keystrokes or a series of keystrokes. Yet other embodiments allow the user to invoke the transition region operation through two or more of such UI implementation or other UI implementations.

The first stage 5810 is similar to the third stage 5630 illustrated in FIG. 56. The first stage 5810 illustrates the GUI 5800 after colors have been removed from an existing color mask based on the portion of the image 5490 selected similar to the selection illustrated in the third stage 5630. Similar to the third stage 5630, the first stage 5810 shows diagonal lines displayed on the portion of the image 5490 (i.e., pixels) in the image display area 5480 that is specified as being included in the color mask. In addition, the first stage 5810 illustrates that a transition region has not been defined, as indicated by the leftmost position of the slider indicator on the UI slider control 5840.

The second stage 5820 illustrates that the user has moved the slider indicator to the middle of the slider control 5840 using the cursor (e.g., by clicking a mouse button and dragging the mouse, tapping a touchpad and dragging across the touchpad, or touching the slider control displayed on a touchscreen and dragging across the touchscreen) in order to invoke a transition region operation. In some embodiments, the color masking tool defines the transition region when the media-editing application receives the movement of the slider indicator on the slider control 5840.

Additionally, the second stage 5820 illustrates that a transition region for the color mask has been defined based on the position of the slider indicator on the slider control 5840. In this example, the transition region is indicated by a gray color that is displayed in the image 5490. As shown, the transition region is located in the right portion of the ground, which is below the right side of the mountain. As mentioned, a transition region specifies a set of pixels in an image that has similar color values as the color values of pixels included in a color mask, but is not included in the color mask. As described above by reference to the fifth stage 5450 of FIG. 54, the color values of pixels in the area below the right side of the right mountain are similar to the color values of the pixels in the right mountain. Therefore, this area and other areas below the mountains are included in the transition region for the color mask.

While the second stage 5820 illustrates a gray color to indicate the portion of the image 5490 included in the transition region, other embodiments of the media-editing application display such indicator differently. For instance, some such embodiments might indicate the portion of the image included in the transition region with patterns (e.g., dots), other color indicators, animations (e.g., flashing colors), textual indicators, or any other type of visual indicator.

The third stage 5830 illustrates that the user has moved the slider indicator near the right side of the slider control 5840 using the cursor (e.g., by clicking a mouse button and dragging the mouse, tapping a touchpad and dragging across the touchpad, or touching the slider control displayed on a touchscreen and dragging across the touchscreen) and that a transition region for the color mask has been defined based on the position of the slider indicator on the slider control 5840.

As illustrated in the third stage 5830, the transition region shown in the second stage 5820 has increased. As noted above, the color values of pixels in the area below the right side of the right mountain are similar to the color values of the pixels in the right mountain. For this example, the color values of pixels below the mountains is similar to the color values of the mountains, but not as similar as the area included in the transition region illustrated in the second stage 5820. Since the transition region has increased in this stage compared to the second stage 5820, a larger area below the mountains are included in the transition region for the color mask. In some embodiments, the color masking tool defines the transition region when the media-editing application receives the movement of the slider indicator on the slider control 5840.

As mentioned above, the color masking tool of some embodiments defines an offset portion of the three-dimensional color space that encompasses, but does not include, a portion of the three-dimensional color space defined for a color mask. In some embodiments, the color masking tool defines a transition region for the color mask based on the defined offset portion of the three-dimensional color space.

Figure 59:
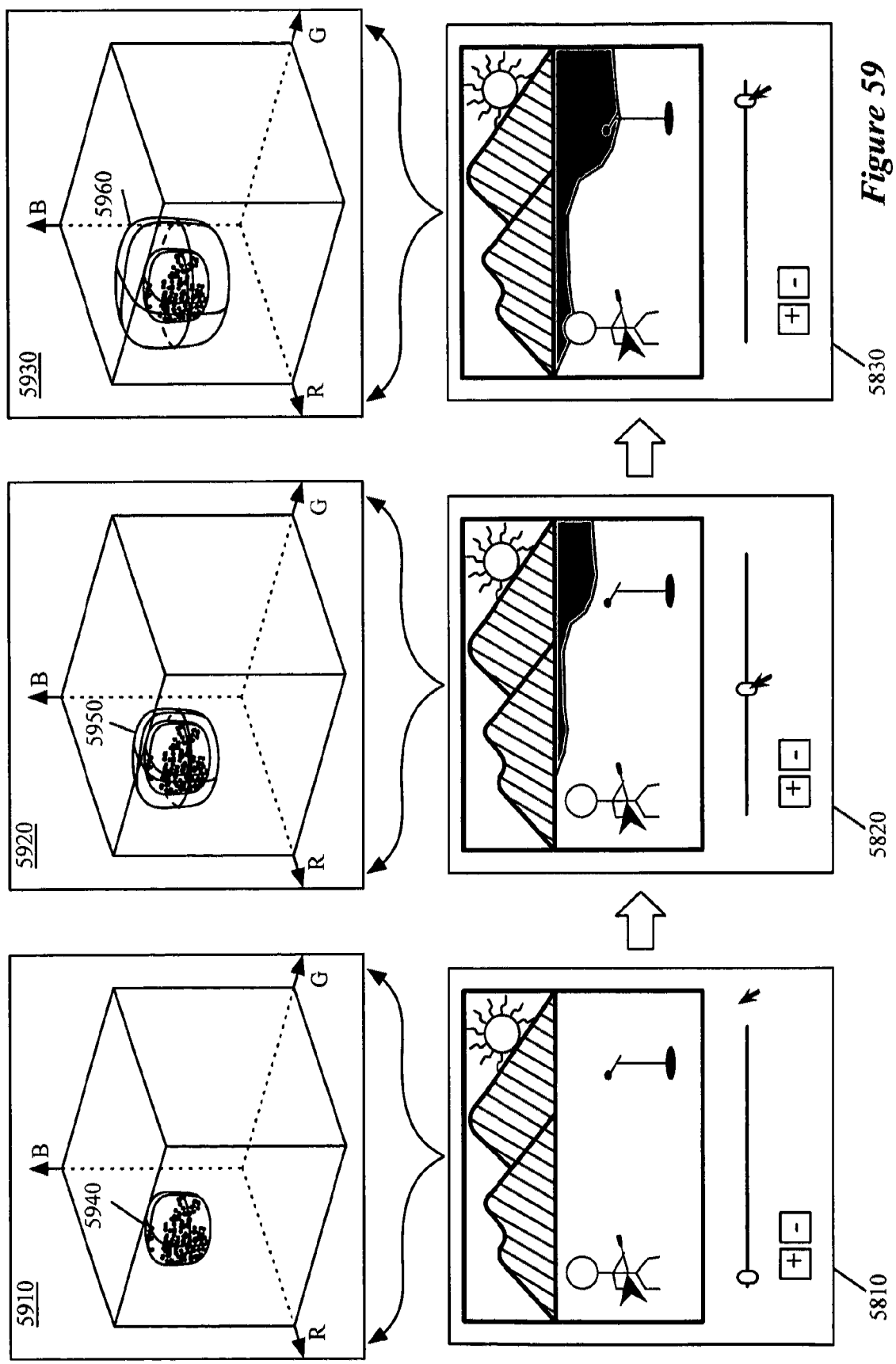
FIG. 59 conceptually illustrates several states of a three-dimensional color space that correspond to several of the stages illustrated in FIG. 58 according to some embodiments of the invention.

FIG. 59 conceptually illustrates several states of a three-dimensional color space that corresponds to several of the stages illustrated in FIG. 58. In particular, FIG. 59 conceptually illustrates three different states 5910-5930 of a color masking tool of some embodiments defining superellipse-based offset shapes in a three-dimensional color space. The three-dimensional color space illustrated in FIG. 59 is the same three-dimensional color space described above by reference to FIG. 55. As described above, the three-dimensional color space is a three-dimensional RGB color space and the RGB component values of pixels in the image 5490 are used to plot the pixels' corresponding points in the three-dimensional RGB color space.

The first state 5910 of the three-dimensional color space corresponds to the first stage 5810 illustrated in FIG. 58. The first stage 5810 is similar to the third stage 5630 illustrated in FIG. 56, as mentioned above. The first stage 5810 illustrates the GUI 5800 after colors have been removed from an existing color mask based on the portion of the image 5490 selected similar to the selection illustrated in the third stage 5630. As such, the first state 5910 of the three-dimensional RGB color space is similar to the third state 5730 of the three-dimensional RGB color space illustrated in FIG. 57. That is, the color masking tool has defined a portion of the three-dimensional RGB color space that excludes the RGB component values in the three-dimensional color space of the pixels in the portion of the image 5490 that was selected in the second stage 5620 (and that includes RGB component values of the pixels in the portion of the image 5490 that was selected in the second stage 5420 and the fourth stage 5440 of FIG. 54). As illustrated, the portion of the three-dimensional RGB color space is a superellipsoid 5940, which is similar to the superellipsoid 5740 illustrated in FIG. 57.

Based on the superellipsoid 5940, the color masking tool of some embodiments defines a color mask. For this example, the color masking tool defines a color mask that specifies pixels in the image 5490 that have RGB component values included in the superellipsoid 5940. As illustrated in the first stage 5810, diagonal lines are displayed on the portion of the image 5490 (i.e., pixels) that is included in the color mask. The color masking tool of some embodiments uses the superellipsoid 5940 to identify the portion of the image 5490 (i.e., pixels) that is included in the color mask.

Since the first stage 5810 illustrates that a transition region has not been defined, the color masking tool of some embodiments did not define an offset portion for the color mask in the first state 5910 of the three-dimensional color space.

The second state 5920 of the three-dimensional color space corresponds to the second stage 5820 illustrated in FIG. 58. As described above, the second stage 5820 illustrates that the user has moved the slider indicator to the middle of the slider control 5840 in order to invoke a transition region operation that defines a transition region for the color mask based on the position of the slider indicator on the slider control 5840. As mentioned above, color masking tool of some embodiments defines an offset portion of the three-dimensional color space that encompasses, but does not include, a portion of the three-dimensional color space defined for a color mask. As shown in the second state 5920 of the three-dimensional RGB color space, the color masking tool has defined such an offset portion of the three-dimensional RGB color space based on the position of the slider indicator on the slider control 5840.

In this example, the offset portion is a superellipsoid 5950, which encompasses, but does not include, the superellipsoid 5940. In some embodiments, the color masking tool defines the superellipsoid 5950 when the media-editing application receives the slider movement of the slider control 5840 in the second stage 5820.

The color masking tool of some embodiments defines a transition region for the color mask based on the superellipsoid 5950. In this example, the color masking tool defines a transition region that specifies pixels in the image 5490 that have RGB component values included in the superellipsoid 5950. As shown in the second stage 5820, a gray color is displayed on the portion of the image 5490 (i.e., pixels) that is included in the transition region. Some embodiments of the color masking tool use the superellipsoid 5950 to identify the portion of the image 5490 (i.e., pixels) that is included in the transition region in order for the media-editing application to display visual indicators (e.g., a gray color in this example) on the portion of the image 5490.

The third state 5930 of the three-dimensional color space corresponds to the third stage 5830 illustrated in FIG. 58. As described above, the third stage 5830 illustrates that the user has moved the slider indicator near the right side of the slider control 5840 in order to invoke a transition region operation that defines a transition region for the color mask based on the position of the slider indicator on the slider control 5840. As mentioned, some embodiments of the color masking tool define an offset portion of the three-dimensional color space that encompasses, but does not include, a portion of the three-dimensional color space defined for a color mask. As illustrated in the third state 5930 of the three-dimensional RGB color space, the color masking tool has defined such an offset portion of the three-dimensional RGB color space based on the position of the slider indicator on the slider control 5840. Similar to the second state 5920, the offset portion is a superellipsoid 5960, which encompasses, but does not include, the superellipsoid 5940 in this example. Since the slider indicator is further towards the right on the slider control 5840 than illustrated in the second stage 5820, which specifies a larger transition region, the superellipsoid 5960 is larger than the superellipsoid 5950. In some embodiments, the color masking tool defines the superellipsoid 5960 when the media-editing application receives the slider movement of the slider control 5840 in the third stage 5830.

In some embodiments, the color masking tool defines a transition region for the color mask based on the superellipsoid 5960. For this example, the color masking tool defines a transition region that specifies pixels in the image 5490 that have RGB component values included in the superellipsoid 5960. As illustrated in the third stage 5830, a gray color is displayed on the portion of the image 5490 (i.e., pixels) that is included in the transition region. The color masking tool of some embodiments uses the superellipsoid 5960 to identify the portion of the image 5490 (i.e., pixels) that is included in the transition region in order for the media-editing application to display visual indicators (e.g., a gray color in this example) on the portion of the image 5490.

While the examples illustrated in FIGS. 54, 56, and 58 each shows a particular sequence of operations for a color masking operation, other sequences of operations are possible. For example, after the user has activated a color masking tool, the user may select any number of different portions of an image to create a color mask, add colors to a color mask, and or remove colors from a color mask. Moreover, the user can apply a color correction operation to the image using the color mask at any time.

FIGS. 54, 56, and 58 each illustrate one arrangement of a GUI of a media-editing application. However, different embodiments of the GUI of the media-editing application can be arranged any number of different ways. For example, in some embodiments, the media-editing application might provide user-selectable UI items and controls in a separate section or panel of the GUI. Some embodiments of the media-editing application may provide a GUI that includes additional and/or other UI elements than those illustrated in FIGS. 54, 56, and 58. For instance, some embodiments provide a user selectable UI item for allowing a user to toggle between specifying the color mask as an inner color mask or an outer color mask, which are described in further detail below.

Several of the figures described above illustrate one type of selection tool (a circle with a cross hair in the middle). However, different embodiments might provide different types of selection tools for selecting a portion of an image (e.g., pixels) in order to create a color mask (or add or remove colors from an existing color mask). For instance, some embodiments of the media-editing application provide an eye dropper selection tool to select a portion of an image. Other embodiments of the media-editing application may provided other types of selection tools.

In some embodiments, the media-editing application provides a selection tool that has a user-adjustable selection area. For example, some of these user-adjustable selection tools allow the user to enlarge or shrink the selection tool's selection area (e.g., by performing a click-and-drag cursor operation on a portion of an image or a touch-and-drag operation on a portion of an image displayed on a touchscreen). This way, the user can more accurately select the colors in the image that the user wants included in a color mask.

The figures illustrated above describe a color masking tool that defines a color mask that specifies pixels in a image that have the same or similar color values as the color values of the pixels in a selected portion of the image. In some embodiments, when a user invokes a color correction operation, the media-editing application applies the color correction operation to pixels in the image that are included in the color mask (also referred to as an inner color mask). However, in some instances a user might want to apply the color correction operation to the entire image except for the portion of the image that is included in the color mask (also referred to as an outer color mask). As such, some embodiments of the color masking tool use the color mask to identify pixels in a image that do not have the same or similar color values as the color values of the pixels in a selected portion of the image. In some such embodiments, the media-editing application applies the color correction operation to the image based on the pixels in the image identified by the color masking tool.

Some of the figures described above conceptually illustrate a three-dimensional color space in which a color masking tool of some embodiments defines a portion of the three-dimensional color space for a color mask, just conceptual illustrations of a 3D color space. However, one of ordinary skill in the art will recognize that the three-dimensional color space may be represented any number of different ways. For instance, some embodiments use a three-dimensional array to represent the three-dimensional color space.

Although the figures above illustrate different color masking tools (e.g., positive color masking tool, negative color masking tool), in some embodiments, the functionalities of two or more of the color masking tools are actually included in a single color masking tool. For example, some embodiments of the color masking tool include the some or all or the features and functions of a positive color masking tool and a negative masking tool. In some embodiments, the color masking tool includes positive and negative masking tools and a transition region tool. Other combinations are possible.

The examples illustrated above describe creating and adjusting a color mask for a still image. As mentioned above, the color masking tool can define a color mask for a frame (or field) of a video clip in some embodiments. In some of these embodiments, the color masking tool defines a color mask for a particular frame of a video clip and associated the color mask with the rest of the frames in the video clip. For instance, a user may create a color mask for a frame of a video clip and invoke a color correction operation on the frame of the video clip. When the user invokes the color correction operation on the frame, the color masking tool of some embodiments applies the color correction to the frame using the color mask and automatically applies the color correction to each of the other frames in the video clip using the color mask. In this manner, the user only has to create a color mask for one frame of a video clip (instead of creating a color mask for each frame of the video clip) in order to apply a color correction operation to the entire video clip based on colors in the frames.

Different types of applications may provide a color masking tool. As described above, some embodiments of a media-editing application (e.g.; Final Cut Pro® and iMovie®) provide a color masking tool. In some embodiments, image-editing applications (e.g., Aperture®), image organizers, image viewers, and any other type of image application provide a color masking tool. Furthermore, a color masking tool may be provided by an operating system of a computing device (e.g., a desktop computer, tablet computer, laptop computer, smartphone, etc.) in some embodiments.

C. Spatial-Based Masks

As mentioned above, the shape masking tool of some embodiments allows a user to perform secondary color correction. Some embodiments provide a novel shape masking tool for a media-editing application. The shape masking tool of some embodiments provides a shape mask for identifying a region of an image. In some embodiments, a shape mask is a deformable two-dimensional shape that is displayed over an image in order to identify a region of the image that is within the two-dimensional shape. In other words, the shape mask is for identifying pixels in the image that are located within the two-dimensional shape. Some embodiments of the shape masking tool apply color correction operations (e.g., invoked by a user through selection of a GUI item provided by the media-editing application) to a portion of the image by using the shape mask to isolate pixels in the image that are located within the shape mask and applying color correction operations (e.g., hue adjustments, saturation adjustments, brightness adjustments, etc.) to the isolated pixels. Additional details and explanation of spatial-based mask (e.g., a shape masking tool) is described in the concurrently filed U.S. patent application Ser. No. 13/134,313, entitled "Shape Masks," for which Andrew Bryant, Daniel Pettigrew, and Olivier Fedkiw are inventors. This application is hereby incorporate by reference.

IV. Color Scopes

As mentioned above, different embodiments of the media-editing application provide different color video scopes. For example, the media-editing application of some embodiments provides a color vectorscope. In some embodiments, the media-editing application provides a color waveform monitor that allows a user of the media-editing application to view relative pixel information (e.g., luma, chroma, RGB, etc.) in the image or clip currently being examined. Different embodiment may provide different types of color waveform monitors. For instance, the media-editing application of some embodiments displays waveforms monitors for displaying different channels or group of channels. Some examples of channels (or groups of channels) include RGB parade, RGB overlay, red, green, blue, luma, chroma, Y'C$_B$C$_R$ parade, etc.

As described above, the media-editing application provides a color waveform monitor for displaying luma information of pixels by displaying a dot (pixel) in the color waveform monitor for each pixel in the image. The luma level of a pixel in the image is indicated by the position of the dot along the y-axis of the color waveform monitor. The relative horizontal location of the pixel in the image is indicated by the position of the dot along the x-axis of the color waveform monitor. In some embodiments the color of a dot in the luma waveform monitor is displayed as the color (or a similar color) of the corresponding pixel in the image. In this manner, the waveform monitor provides a visual indication of the spatial location of highlights and shadows in the image and the color of those highlights and shadows in the image.

As described above in FIG. 7, the user of the media-editing application may activate the color waveform monitor by selecting a menu option from a pull-down menu. In some embodiments, the user may activate the color waveform monitor via keystroke, clicking a selectable item displayed within the graphical user interface (GUI), etc.

Figure 60A:
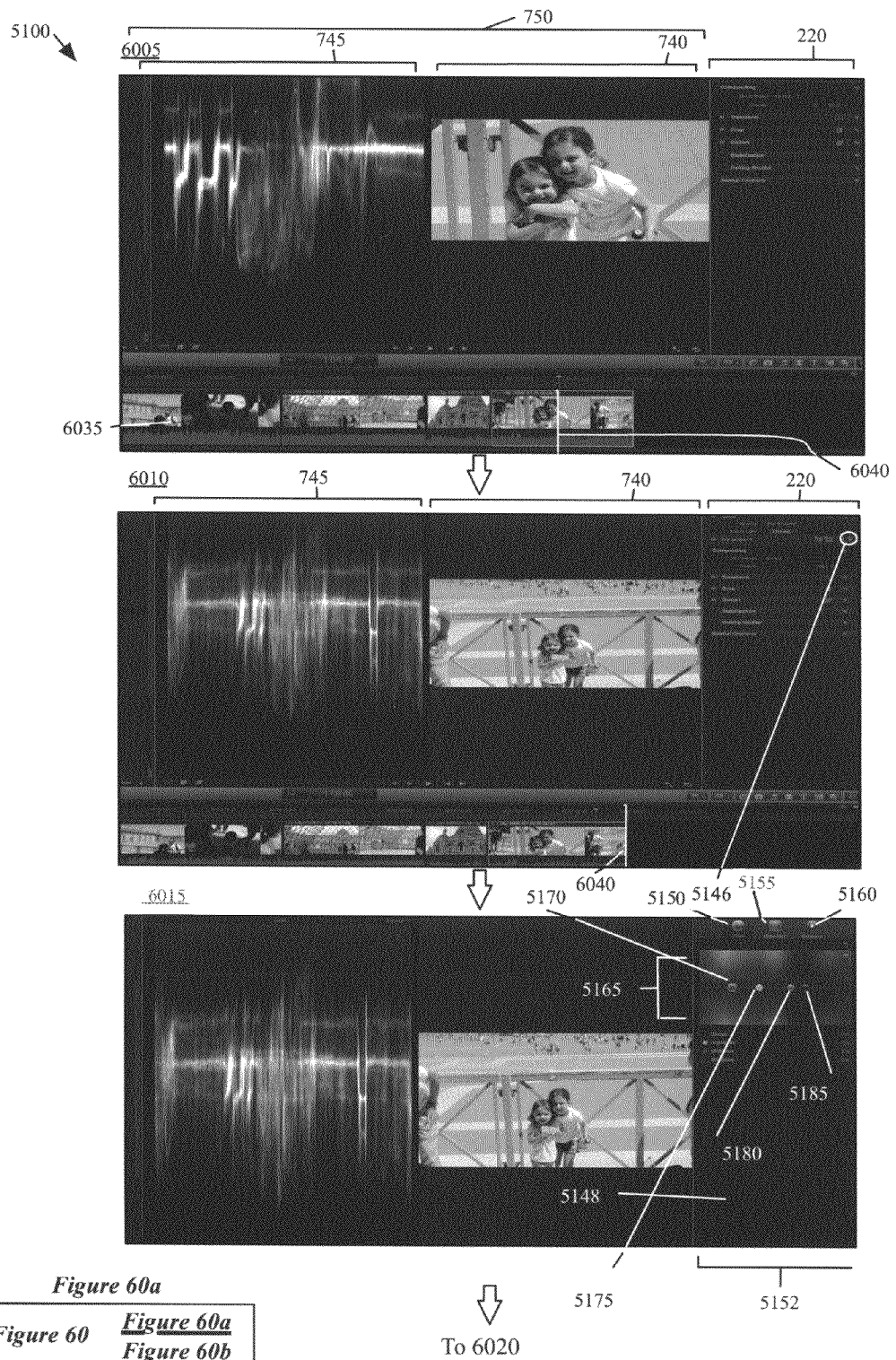
FIG. 60 conceptually illustrates a GUI of a media-editing application of some embodiments that provides a color waveform monitor for displaying luma information of pixels in an image.
Figure 60B:
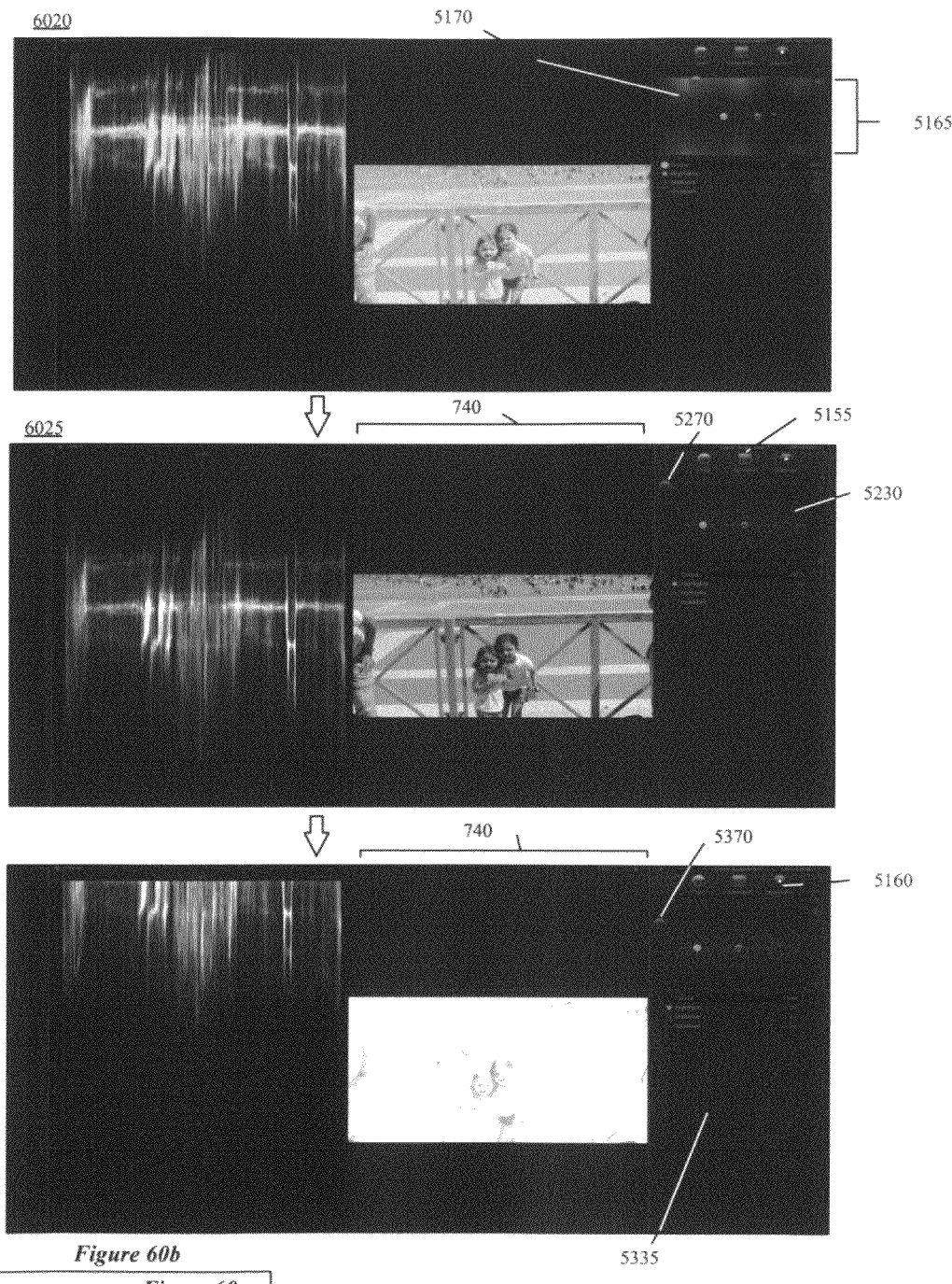

FIG. 60 conceptually illustrates a GUI 5100 of a media-editing application of some embodiments that provides a color waveform monitor for displaying luma information of pixels in an image. Specifically, FIG. 60 illustrates the GUI 5100 at six different stages 6005-6030 of displaying different luma waveforms as the user applies various color correction operations to an image.

As shown and as described above in FIG. 7, the GUI 5100 displays a video scope view layout 750 (which can be activated in a similar manner described above by reference to FIG. 7). As shown in this figure, the GUI 5100 also includes the color correction panel 220 and a timeline 6035 including a sequence of media clips, and a playhead 6040 within the timeline. The video scope view layout 750 includes an image display area 740 a waveform display area 745

As described above, the image display area 740 displays an image selected (e.g., by a user of the media-editing application) from a media clip for the user of the media-editing application to edit. The color correction panel 220, as described above, provides a number of color correction tools (e.g., color balancing tool, color matching tool, color board tool, color masking tool, shape masking tool, etc.) for allowing the user to perform color correction operations on the displayed image.

The timeline 6035 is for displaying a sequence of media clips selected by the user (e.g., by adding media clips from a media library, etc.). The playhead 6040 is a movable item that upon movement (e.g., by a click-and-drag movement of the cursor) within the timeline 6035 causes an image or frame of a media clip in the timeline to 6035 to display on the image display area 740 based on the position of the playhead 6040 in the timeline 6035. In some embodiments, the user may select to display in the image display area 740 an image or a frame in a media clip from the media library (instead of the timeline) by moving a playhead that is within the clip.

The waveform display area 745 is for displaying different types of waveforms (e.g., luma, chroma, RGB overlay, Y'C$_B$C$_R$ parade, etc.) of the image displayed in the image display area 740. In some embodiments, the user may specify the type of waveform (e.g., luma, chroma, RGB overlay, Y'C$_B$C$_R$ parade, etc.) to display in the waveform display area 6040. Some embodiments display the luma waveform by default (e.g., designated by the user's preference settings) upon the user's selection to enter the video scope view layout 750.

In some embodiments, the GUI 5100 displays the image display area 740 and the waveform display area 745 in a side-by-side manner to enable the user of the application to make direct comparisons between the image and its corresponding waveform (e.g., luma, chroma, etc.). Different embodiments may display the displays areas differently, such as in a picture-in-picture manner, top-and-bottom manner, etc.

The first stage 6005 illustrates the display in the waveform display area 745 of a luma waveform of an image displayed in the image display area 740. In this stage 6005, the user has not selected any color correction tools for performing color correction operations on the image. The vertical axis of the waveform monitor displayed in the waveform display area 745 represents a range of luminance values expressed in term of −20 to 120 IRE. The horizontal axis of the waveform monitor represents the relative horizontal location in the image. In other words, the luma values of pixels on the left side of the image are plotted on the corresponding left side of the waveform monitor.

As shown, the waveform includes some sharp dips on the left half of the waveform monitor, indicating the sharp contrast in luminance of the pixels on the left half of the image. The center of the waveform is blurred and the luminance values are spread out, indicating that the wide range of luminance values of where the two girls are in the image. The right side of the image displays a fairly concentrated band of luminance values on the waveform monitor, indicating that the right side of the image has mostly similar luminance values (small range of luminance values) concentrated around a particular range. Additionally, the color of dots in the waveform monitor is displayed with the color (or a similar color) of the corresponding pixel in the image.

The second stage 6010 illustrates that upon a movement of the playhead 6040 (e.g., in the timeline), the image displayed in the image display area 740 changes to an image within a media clip displayed in the timeline 6035 at which the playhead is pointing and the waveform display area 745 displays the corresponding waveform (e.g., in real-time) for that image. As shown in this stage 6010, the user has moved the playhead 6040 to a different location within the timeline 6035. The image display area 740 now displays a more distanced view of the two girls, with more of the background included. The waveform display area 745 displays the corresponding luma waveform of the image. As described above, the luma waveform is plotted in the manner as described above. The center of the image has the widest range of luminance values (ranging from the darkest color within the image up to some whites within the girls' shirts). Accordingly, as shown in the waveform display area 745, the center of the waveform display area 745 displays the widest range of luma values, from approximately 5 to 110 IRE.

In this stage 6010, the user still has not selected any color correction tools for performing color correction operations on the image. In some embodiments, the user may activate the color board tool by selecting user-selectable UI item 5145 (e.g., a show color board button 5145 within the color section of the color correction panel 220). As described above, the color board tool enables the user to perform color correction operations (e.g., hue adjustments, saturation adjustments, exposure adjustments) on the color of pixels within the image (e.g., all pixels, highlight pixels, midtone pixels, shadow pixels).

The third stage 6015 illustrates that upon selection of the user-selectable UI item 5145, the GUI 5100 displays a color slider control 4248 on a slider control panel 5152, indicating that the color board tool is now activated. As described above, the user may select among the three slider controls: color slider control 4248, saturation slider control 5230, and exposure slider control 5335 in the slider control panel 5152 (e.g., by selecting a user-selectable UI tab 5150 for the color slider control, a user-selectable UI tab 5155 for the saturation slider control, and a user-selectable UI tab 5160 for exposure slider control) to perform the respective color correction operation. As described above, the user may move the slider shapes (e.g., the global slider shape 4270, the highlights slider shape 4275, the midtones slider shape 4280, and the shadows slider shape 4285) to different areas within the sliding region 4265 to adjust the pixel colors of the pixels within the image that have color within the corresponding color category (e.g., global, highlights, midtones, and shadows).

The fourth stage 6020 illustrates that upon movement of the global hue slider shape 4270, the luma waveform display shifts upward. As described above, the position of the global hue slider shape 4270 with respects to the sliding region 4265 correspondingly adjusts the color of all the pixels of the image. In this example, moving the global hue slider shape 4270 towards the upper edge of the sliding region 4265 increases a neon yellow color in the pixels in the image and also increases the luma or brightness of the pixels within the image. Therefore, as shown, the luma waveform has shifted slightly upwards, ranging from 30 to above 120 IRE. In addition, the colors of the luma waveform (i.e. plotted dots that correspond to pixels in the image) appears more neon yellow.

The fifth stage 6025 illustrates that upon movement of the global saturation slider shape 5270, the luma waveform changes. Between the fourth and fifth stages, the user has reset the color correction performed in the fourth stage 6020 and has activated the saturation slider control 5230 by selecting the user-selectable UI tab 5155 for the saturation slider control (as described above). As mentioned above, as the user slides the global saturation slider shape 5270 upward, the media-editing application increases the saturation values of all the pixels in the image displayed in the image display area 740. As shown, the shape of the waveform or the range of the waveform does not change because only the saturation of the pixel values has been adjusted. Additionally, the colors of the dots plotted in the waveform are more saturated since the user has increased the overall saturation of the pixel values.

The sixth stage 6030 illustrates that upon movement of the global exposure slider shape 5370, the luma waveform shifts upward. Between the fifth and sixth stages, the user has reset the color correction performed in the fifth stage 6025 and has activated the exposure slider control 5335 by selecting the user-selectable UI tab 5160 for the exposure slider control (as described above). As mentioned above, as the user slides the global exposure slider shape 5370 upward, the media-editing application increases the luminance values of all the pixels in the image displayed in the image display area 740. As shown, the waveform is shifted upward almost completely off the waveform scope. The waveform indicates that the luminance values of the pixels in the image are high.

FIG. 60 illustrates one color waveform monitor for simultaneously displaying visual representations (e.g., dots or pixels) of luma information of pixels in the image and displaying the colors of the visual representations as the same (or similar) colors of corresponding pixels in the image. However, other color waveform monitors for displaying other types of pixel information display the pixel information in a similar manner, in some embodiments. For instance, a color waveform monitor for displaying chroma levels of pixels displays the chroma levels of the pixels in a similar manner as described above. In other words, the chroma level of pixels in the image is indicated by the position of the dot along the y-axis of the color waveform monitor, the relative horizontal location of the pixel in the image is indicated by the position of the dot along the x-axis of the color waveform monitor, and the color of a dot is displayed is the color (or a similar color) of the corresponding pixel in the image.

Figure 61:
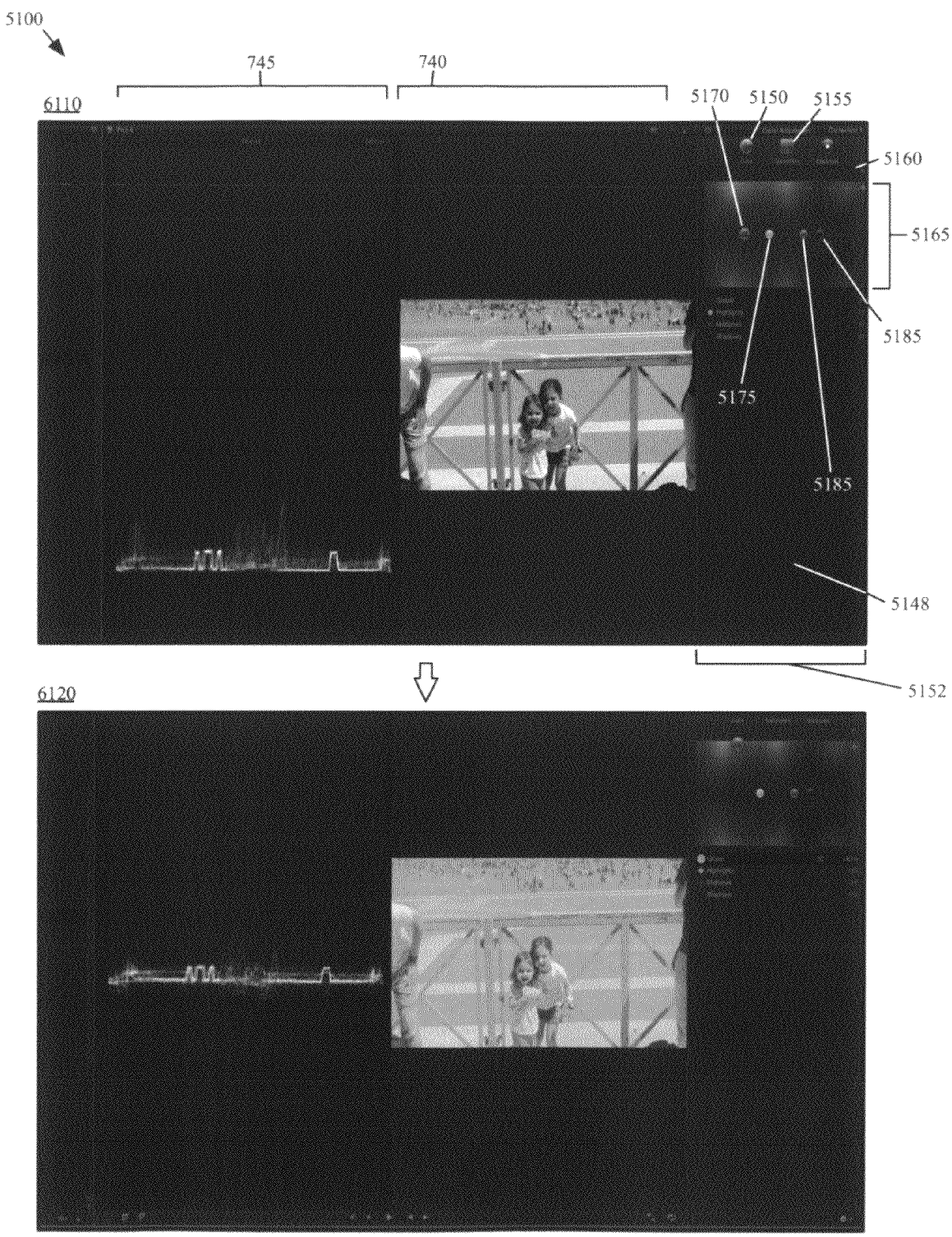
FIG. 61 illustrates the GUI of a media-editing application of some embodiments that provides a color waveform monitor for displaying chroma information of pixels in an image.

FIG. 61 illustrates the GUI 5100 of a media-editing application of some embodiments that provides a color waveform monitor for displaying chroma information of pixels in an image. As shown, the GUI 5100 show a similar layout as the GUI 5100 illustrated in FIG. 60 except in the GUI 5100 of FIG. 61 displays a chroma waveform in the waveform display area 745.

The first stage 6110 is similar to the third stage 6015, which is described above by reference to FIG. 60. In the first stage 6110 illustrates that upon selection of the user-selectable UI item 5145, the GUI 5100 displays a color slider control 4248 on a slider control panel 5152, indicating that the color board tool is now activated.

The first stage 6110 also illustrates that upon the user's selection to view the chroma waveform (e.g., by making a selection from a pull-down menu) the waveform display area 745 displays a chroma waveform of an image displayed in the image display area 740.

As shown, the chroma waveform includes a wider range of values around the center of the image. This indicates that the pixels located near the center of the image has a wider variation of chrominance levels. The left and right sides of the chroma waveform show lower ranges of chrominance indicating a corresponding lower range of chrominance levels in the left and right portions of the image.

The second stage 6120 is similar to the fourth stage 6020. The second stage 6120 illustrates that upon movement of the global hue slider shape 4270, the chroma waveform shifts upward. As described above, the position of the global hue slider shape 4270 with respects to the sliding region 4265 correspondingly adjusts the color of all the pixels of the image. In this example, moving the global hue slider shape 4270 towards the upper edge of the sliding region 4265 increases a neon yellow color in the pixels in the image and also increases the luminance or brightness of the pixels within the image. Therefore, as shown, the chroma waveform has shifted upwards towards the center of the chrominance range. Additionally, the colors of the chroma waveform (i.e. plotted dots that correspond to pixels in the image) appears more neon yellow.

Another type of color waveform monitor for simultaneously displaying visual representations of pixel information of pixels in the image and displaying the colors of the visual representations as the same (or similar) colors of corresponding pixels in the image is a color waveform monitor that displaying Y'CbCr values of pixels (also referred to as a Y'CbCr parade). Such a color waveform monitor of some embodiments displays the values of the luminance component (i.e., the Y' component) of pixels in a similar manner as described above. That is, the luminance level of pixels in the image is indicated by the position of the dot along the y-axis of the color waveform monitor, the relative horizontal location of the pixel in the image is indicated by the position of the dot along the x-axis of the color waveform monitor, and the color of a dot is displayed is the color (or a similar color) of the corresponding pixel in the image.

Figure 62:
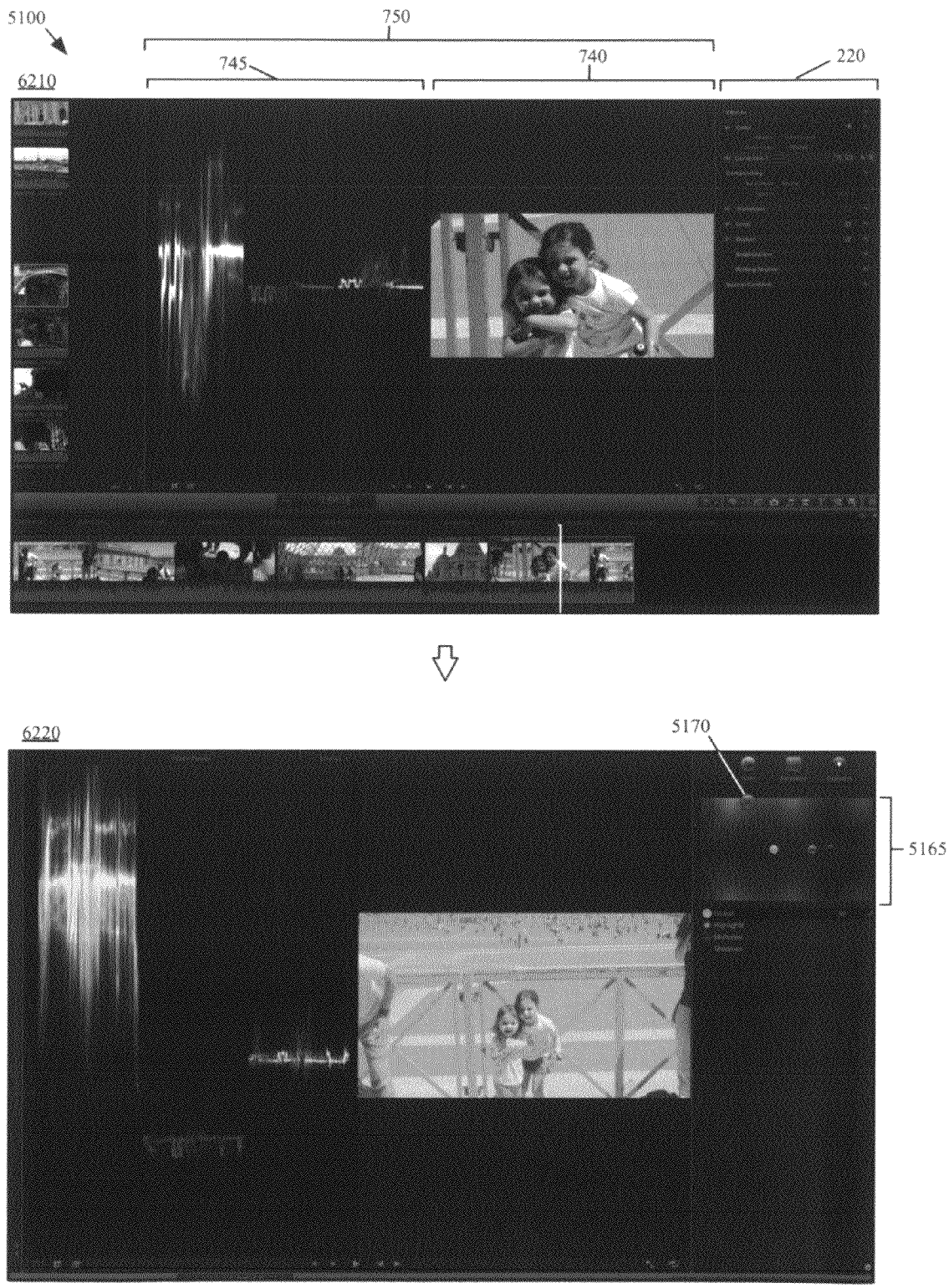
FIG. 62 illustrates the GUI of a media-editing application of some embodiments that provides a color waveform monitor for displaying Y'CbCr information of pixels in an image.

FIG. 62 illustrates the GUI 5100 of a media-editing application of some embodiments that provides a color waveform monitor for displaying Y'CbCr information of pixels in an image. As shown, the GUI 5100 show a similar layout as the GUI 5100 illustrated in FIG. 60 except in the GUI 5100 of FIG. 62 displays a Y'CbCr waveform in the waveform display area 745.

The first stage 6210 is similar to the third stage 6015, which is described above by reference to FIG. 60. In the first stage 6210 illustrates that upon selection of the user-selectable UI item 5145, the GUI 5100 displays a color slider control 4248 on a slider control panel 5152, indicating that the color board tool is now activated.

The first stage 6210 also illustrates that upon the user's selection to view the Y'CbCr waveform (e.g., by making a selection from a pull-down menu) the waveform display area 745 displays a chroma waveform of an image displayed in the image display area 740.

As shown, the Y'CbCr waveform includes three different waveforms. The left waveform displays the Y' component, the middle waveform displays the Cb component, and the right waveform displays the Cr component. In this example, the waveform of the Y' component shows a wide range of Y' levels in the image, and the waveforms of the Cb and Cr component each show a much smaller range of Cb and Cr levels in the image.

The second stage 6220 is similar to the fourth stage 6020. The second stage 6220 illustrates that upon movement of the global hue slider shape 4270, the waveform for Y' component shifts upward, and the waveforms for the Cb and Cr component shifts downwards. As described above, the position of the global hue slider shape 4270 with respects to the sliding region 4265 correspondingly adjusts the color of all the pixels of the image. In this example, moving the global hue slider shape 4270 towards the upper edge of the sliding region 4265 increases a neon yellow color in the pixels in the image and also increases the luma or brightness of the pixels within the image. Therefore, as shown, the waveform for the Y' component has shifted upwards towards the top of the luma range, and the waveforms for the Cb and Cr component shifts downwards. In addition, the colors of the waveform for Y' component (i.e. plotted dots that correspond to pixels in the image) appears more neon yellow.

Similar techniques for displaying visual representations (e.g., dots or pixels) of pixel information of pixels in the image and displaying the colors of the visual representations as the same (or similar) colors of corresponding pixels in the image may be applied to other waveform monitors (e.g., chroma waveform monitor, RGB overlay waveform monitors, etc.) in other embodiments. In addition, these techniques may be applied to other types of video scopes, such as histograms, vectorscope, etc., in some embodiments.

For example, alternatively, or in conjunction with color waveform monitors, some embodiments of the media-editing application provide color vectorscopes. As described above, the media-editing application of some embodiments provides a color vectorscope for displaying chrominance information of pixels in an image by displaying a dot (e.g., a pixel) in the color vectorscope for each pixel in the image. The chrominance components values Cb and Cr of a pixel are represented by corresponding Cartesian coordinates x and y of the position of the dot in the color vectorscope. In other words, pixels' distance from the center of the vectorscope (i.e., the origin of the Cartesian coordinate plane) represents the saturation of the pixel, and the angle around the Cartesian coordinate plane represents the hue of the pixel. Some embodiments additionally display the color of the dot in the color vectorscope as the color (or a similar color) of the corresponding pixel in the image.

Figure 63:
FIG. 63 conceptually illustrates the GUI of a media-editing application of some embodiments that provides a color vectorscope for displaying Cb and Cr information of pixels in an image.

FIG. 63 conceptually illustrates a GUI 6300 of a media-editing application of some embodiments that provides a color vectorscope for displaying chrominance information of pixels in an image. Specifically, FIG. 63 illustrates the GUI 6300 at three different stages 6305-6315 of displaying a color vectorscope as a user applies various color correction operations to an image 6320.

The first stage 6305 illustrates that the GUI 6300 includes the color correction panel 220 and the video scope view layout 750 that includes the image display area 740 and a vectorscope display area 6325 for displaying a color vectorscope of the image displayed in the image display area 740 (the image 6320 in this example). In some embodiments, the media-editing application transitions from displaying the image 6320 in the display area of the video scope view layout 750 (e.g., in a similar manner as the display of the image 715 in stages 705 and 710 of FIG. 7) to displaying the video scope view layout 750 when the media-editing application receives a selection of a user-selectable UI item (e.g., a user-selectable option included in the pull-down menu 735).

As shown in the first stage 6305, the image 6320 includes a bird with blue and yellow feathers and a yellow piece of fruit in the foreground and green foliage in the background. The vectorscope display area 6325 displays, for each pixel in the image 6320, a dot in a color vectorscope. The dot's corresponding pixel's chrominance component values Cb and Cr are used Cartesian coordinate values x and y to display the dot in a Cartesian coordinate plane. In addition, the color of the dot displayed in the vectorscope display area 6325 is the same or similar color as the color of the corresponding pixel in the image 6320.

The second stage 6310 illustrates the GUI 6300 after the user has selected the user-selectable UI item 5145 for displaying the slider control panel 5152 and has selected the user-selectable UI tab 5155 to activate the saturation slider control 5230, which allows the user to adjust the image 6320's saturation. As shown in the second stage 6310, the user has moved in the global slider shape 5270 upwards to increase the saturation values of all the pixels in the image 6320. The color vectorscope displayed in the vectorscope display area 6325 displays the chrominance component values of the saturation-increased pixels in the image 6320. As shown, the increase of the saturation values of all the pixels in the image 6320 is illustrated by a corresponding increase in the distance of the dots from the center of the color vectorscope compared to dots in the color vectorscope in the first stage 6305.

In the third stage 6315, the user has moved the global slider shape 5270 downwards to decrease the saturation values of all the pixels in the image 6320. The color vectorscope displayed in the vectorscope display area 6325 displays the chrominance component values of the saturation-decreased pixels in the image 6320. As shown, the decrease of the saturation values of all the pixels in the image 6320 is illustrated by a corresponding decrease in the distance of the dots from the center of the color vectorscope compared to dots in the color vectorscope in the first stage 6305.

V. Example Graphical User Interface

The figures described above illustrate different GUIs and portions of different GUIs that provide a various different tools. The following figure illustrates an example GUI of a media-editing application that may provide any number of the different tools described above.

Figure 64:
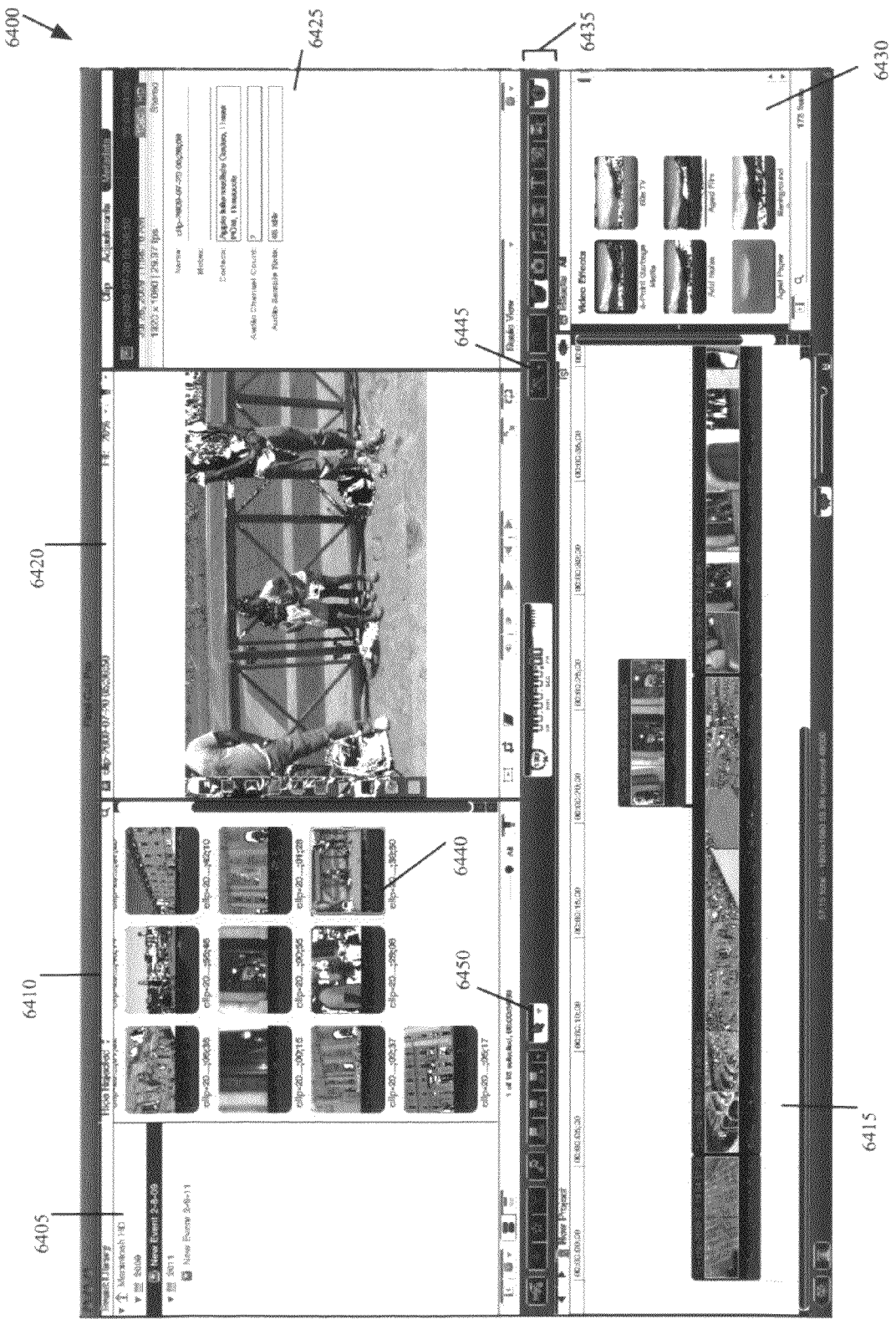
FIG. 64 conceptually illustrates a GUI of a media-editing application of some embodiments.

FIG. 64 conceptually illustrates a graphical user interface (GUI) 6400 of a media-editing application of some embodiments. One of ordinary skill in the art will recognize that the graphical user interface 6400 is only one of many possible GUIs for such a media-editing application. In fact, the GUI 6400 includes several display areas which may be adjusted in size, opened or closed, replaced with other display areas, etc.

The GUI 6400 includes a clip library 6405, a clip browser 6410, a timeline 6415, a preview display area 6420, an inspector display area 6425, an additional media display area 6430, and a toolbar 6435.

The clip library 6405 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 6405 includes media clips from both years 2009 and 2011.

Within a storage device and/or date, users may group the media clips into "events", or organized folders of media clips. For instance, a user might give the events descriptive names that indicate what media is stored in the event (e.g., the "New Event 2-8-09" event shown in clip library 6405 might be renamed "European Vacation" as a descriptor of the content). In some embodiments, the media files corresponding to these clips are stored in a file storage structure that mirrors the folders shown in the clip library 6405.

Within the clip library 6405, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders for an event. These sub-folders may include media clips filtered based on tags (e.g., keyword tags). For instance, in the "New Event 2-8-09" event, all media clips showing children might be tagged by the user with a "kids" keyword, and then these particular media clips could be displayed in a sub-folder of the event that filters clips in this event to only display media clips tagged with the "kids" keyword.

The clip browser 6410 allows the user to view clips from a selected folder (e.g., an event, a sub-folder, etc.) of the clip library 6405. As shown in this example, the folder "New Event 2-8-11 3" is selected in the clip library 6405, and the clips belonging to that folder are displayed in the clip browser 6410. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 6415 provides a visual representation of a composite presentation (or project) being created by the user of the media-editing application. Specifically, it displays one or more geometric shapes that represent one or more media clips that are part of the composite presentation. The timeline 6415 of some embodiments includes a primary lane (also called a "spine", "primary compositing lane", or "central compositing lane") as well as one or more secondary lanes (also called "anchor lanes"). The spine represents a primary sequence of media clips which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The user can add media clips from the clip browser 6410 into the timeline 6415 in order to add the clip to a presentation represented in the timeline. Within the timeline, the user can perform further edits to the media clips (e.g., move the clips around, split the clips, trim the clips, apply effects to the clips, etc.). The length (i.e., horizontal expanse) of a clip in the timeline is a function of the length of media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 6420.

The preview display area 6420 (also referred to as a "viewer") displays images from media files that the user is skimming through, playing back, or editing. These images may be from a composite presentation in the timeline 6415 or from a media clip in the clip browser 6410. In this example, the user has been skimming through the beginning of clip 6440, and therefore an image from the start of this media file is displayed in the preview display area 6420. As shown, some embodiments will display the images as large as possible within the display area while maintaining the aspect ratio of the image.

The inspector display area 6425 displays detailed properties about a selected item and allows a user to modify some or all of these properties. The selected item might be a clip, a composite presentation, an effect, etc. In this case, the clip that is shown in the preview display area 6420 is also selected, and thus the inspector displays information about media clip 6440. This information includes duration, file format, file location, frame rate, date created, audio information, etc. about the selected media clip. In some embodiments, different information is displayed depending on the type of item selected.

The additional media display area 6430 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 6430, in this example, is currently displaying a set of effects for the user to apply to a clip.

The toolbar 6435 includes various selectable items for editing, modifying what is displayed in one or more display areas, etc. The right side of the toolbar includes various selectable items for modifying what type of media is displayed in the additional media display area 6430. The illustrated toolbar 6435 includes items for video effects, visual transitions between media clips, photos, titles, generators and backgrounds, etc. In addition, the toolbar 6430 includes a user-selectable GUI item 6445 (e.g., an "Enhancements" button) for providing a pull-down menu that includes a user-selectable option (not shown) for invoking the display of an adjustments panel (e.g., the color correction panel 220 illustrated in FIG. 2) in the inspector display area 6425. As shown, the toolbar 6435 also includes user-selectable GUI item 6450 for providing a pull-down menu that includes user-selectable options (not shown) for invoking editing tools (e.g., trimming tools, blading tools, etc.).

The left side of the toolbar 6435 includes selectable items for media management and editing. Selectable items are provided for adding clips from the clip browser 6410 to the timeline 6415. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

One or ordinary skill in the art will also recognize that the set of display areas shown in the GUI 6400 is one of many possible configurations for the GUI of some embodiments. For instance, in some embodiments, the presence or absence of many of the display areas can be toggled through the GUI (e.g., the inspector display area 6425, additional media display area 6430, and clip library 6405). In addition, some embodiments allow the user to modify the size of the various display areas within the UI. For instance, when the additional media display area 6430 is removed, the timeline 6415 can increase in size to include that area. Similarly, the preview display area 6420 increases in size when the inspector display area 6425 is removed.

VI. Software Architecture

Figure 65:
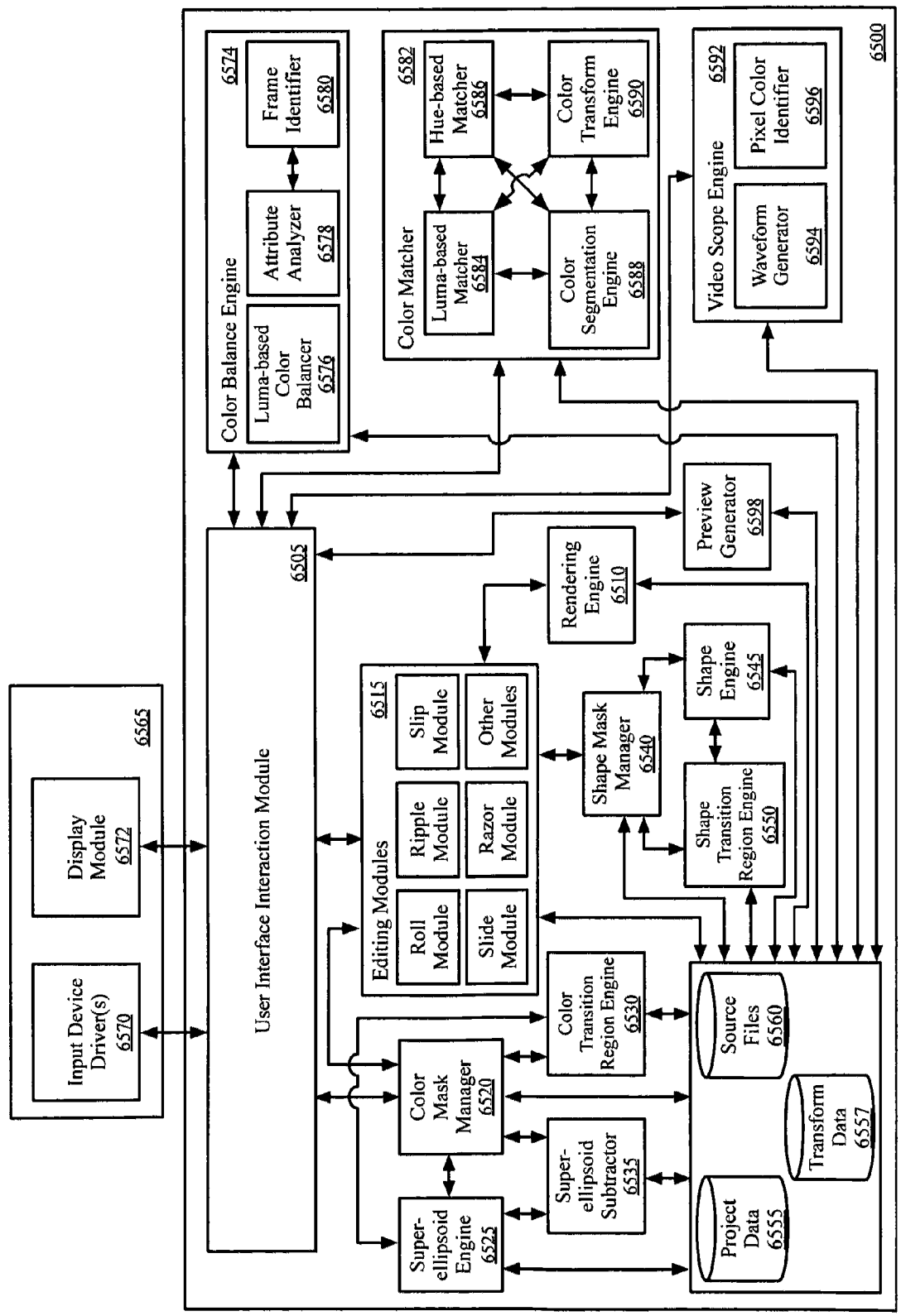
FIG. 65 conceptually illustrates a software architecture of a media-editing application of some embodiments.

In some embodiments, the processes described above are implemented as software running on a particular machine, such as a computer, a handheld device, or a tablet computing device, or stored in a machine readable medium. FIG. 65 conceptually illustrates a software architecture of a media-editing application 6500 of some embodiments. The media-editing application of some embodiments is a stand-alone application or is integrated into another application (e.g., a compositing application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided as a thick client. That is, the application is distributed from the server to the client machine and runs on the client machine.

As shown, the media-editing application 6500 includes a user interface (UI) interaction module 6505, a set of editing modules 6515, a color mask manager 6520, a superellipsoid engine 6525, a superellipsoid subtractor 6535, a color transition region engine 6530, a shape mask manager 6540, a shape engine 6545, a shape transition region engine 6550, and a rendering engine 6510. The media-editing application 6500 also includes project data 6555, transform data 6557 and source files 6560. In some embodiments, the source files 6560 store the media content (e.g., text, audio, image, and video content) data of media clips. In some embodiments, the transform data 6557 stores numerous transform that the media-editing application may apply to images before color matching images (e.g., transforms for converting an image to a particular color space). In some embodiments, the transform data 6557 also stores transforms determined by the color matcher 6582 during color matching images, which the color matcher 6582 might later use for color matching images (e.g., gain and lift transforms, black balance and white balance transforms, saturation transforms, etc.). The project data 6555 stores data structures for composite presentations and media clips as well as color masks, superellipsoid shapes, color transition regions, shape masks, shape transition regions, etc. that include references to media content data stored as mov, avi, jpg, png, mp3, wav, txt, etc. files in the source files 6560. In some embodiments, storages 6555 and 6560 are all stored in one physical storage. In other embodiments, the storages 6555 and 6560 are stored in separate storages. In some cases, for example, the source files 6560 may be stored across multiple hard drives, network drives, etc.

FIG. 65 also illustrates an operating system 6565 that includes input device driver(s) 6570 and display module 6572. In some embodiments, as illustrated, the input device drivers 6570 and display module 6572 are part of the operating system 6565 even when the media-editing application is an application separate from the operating system 6565.

The input device drivers 6570 may include drivers for translating signals from a keyboard, mouse, touchpad, drawing tablet, touchscreen, etc. A user interacts with one or more of these input devices, which send signals to their corresponding device driver. The device driver then translates the signals into user input data that is provided to the UI interaction module 6505.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touchscreen device (e.g., as incorporated into a smart phone, a tablet computer, etc.). In some embodiments with touch control, a user directly manipulates objects by interacting with the graphical user interface that is displayed on the display of the touchscreen device. For instance, a user can select a particular object in the graphical user interface by simply touching that particular object on the display of the touchscreen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 6572 translates the output of a user interface for a display device. That is, the display module 6572 receives signals (e.g., from the UI interaction module 6505) describing what should be displayed and translates these signals into pixel information that is sent to the display device. The display device may be an LCD, a plasma screen, a CRT monitor, a touchscreen, etc.

The UI interaction module 6505 of the media-editing application 6500 interprets the user input data received from the input device drivers 6570 and passes it to various modules, including the editing modules 6515, the color mask manager 6520, the shape mask manager 6540, the color balance engine 6574, the color matcher 6582, the video scope engine 6592, and the preview generator 6598. The UI interaction module 6505 also manages the display of the UI and outputs this display information to the display module 6572. This UI display information may be based on information from the color mask manager 6520, the shape mask manager 6540, the color balance engine 6574, the color matcher 6582, or the video scope engine 6592. The UI display information may also be directly from input data (e.g., when a user moves an item in the UI that does not affect any of the other modules of the media-editing application 6500).

The color mask manager 6520 generates a color mask for an image (or a frame of a video clip) based on input that includes a selection of a portion of the image. The color mask manager 6520 may receive input from the UI interaction module 6505 (e.g., a set of pixels of the image) along with a request to create a color mask for the image. When the color mask manager 6520 receives such a request from the UI interaction module 6505, the color mask manager 6520 sends a request to the superellipsoid engine 6525 for a superellipsoid based on the input (e.g., the set of pixels of the image). When the color mask manager 6520 receives the superellipsoid from the superellipsoid engine 6525, the color mask manager 6520 identifies a portion of the image that is included in the color mask based on the superellipsoid.

In addition, the color mask manager 6520 manages the color mask for the image. For example, the color mask manager 6520 handles modifications (e.g., adding colors to the color mask or removing colors from the color mask) to the color mask. When the color mask manager 6520 receives from the UI interaction module 6505 input (e.g., a set of pixels of the image) and a request to add colors to the color mask, the color mask manager 6520 sends a request to the superellipsoid engine 6525 for a superellipsoid that includes colors of the existing color mask and colors to add to the existing color mask based on the input (e.g., the set of pixels of the image). When the color mask manager 6520 receives the superellipsoid from the superellipsoid engine 6525, the color mask manager 6520 identifies a portion of the image that is included in the color mask based on the superellipsoid. When the color mask manager 6520 receives from the UI interaction module 6505 input (e.g., a set of pixels of the image) and a request to remove colors from the color mask, the color mask manager 6520 sends a request to the superellipsoid subtractor 6535 for a superellipsoid that includes colors of the existing color mask and excludes the colors to be removed from the existing color mask based on the input (e.g., the set of pixels of the image). When the color mask manager 6520 receives the superellipsoid from the superellipsoid subtractor 6535, the color mask manager 6520 identifies a portion of the image that is included in the color mask based on the superellipsoid.

Furthermore, the color mask manager 6520 manages a transition region for a color mask. When the color mask manager 6520 receives input (e.g., a user moves a slider control to create or adjust a transition region) from the UI interaction module 6505 to create or adjust a transition region for the color mask, the color mask manager 6520 sends to the color transition region engine 6530 the color mask and the input to create or adjust a transition region for the color mask. When the color mask manager 6520 receives the transition region from the color transition region engine 6530, the color mask manager 6520 identifies a portion of the image that is included in the transition region of the color mask.

In addition, the color mask manager 6520 receives from the UI interaction module 6505 edits (e.g., color correction operations) to the image based on the color mask. In these cases, the color mask manager 6520 sends the color mask and the edits to the image to the appropriate editing module in the set of editing modules 6515 for applying the edit to the image based on the color mask. Also, the color mask manager 6520 may access the project data 6555 and/or the source files 6560 in order to perform some or all of the functions described above. For instance, the color mask manager 6520 might access the project data 6555 and/or the source files 6560 in order to identify a portion of the image that is included in the transition region of the color mask.

The superellipsoid engine 6525 generates a superellipsoid-based shape in a three-dimensional color space (e.g., a three-dimensional RGB color space) based on a set of colors (e.g., RGB component values of pixels in a selected portion of an image) in the three-dimensional color space. The superellipsoid engine 6525 may receive from the color mask manager 6520 a request for a superellipsoid and the set of colors. In some embodiments, the superellipsoid engine 6525 performs PCA on the set of colors in the three-dimensional colors space in order to generate the superellipsoid-based shape. The superellipsoid engine 6525 may, in some instances, access the project data 6555 and/or the source files 6560 in order to generate the superellipsoid-based shape.

The color transition region engine 6530 is responsible for handling a transition region for a color mask. For instance, the color transition region engine 6530 receives from the color mask manager 6520 input (e.g., a user moves a slider control to create or adjust a transition region) to generate a transition region. When the color transition region engine 6530 receives from the color mask manager 6520 such input, the color transition region engine 6530 translates the input to an offset amount. The color transition region engine 6530 sends a request to the superellipsoid engine 6525 for a scaled version of the superellipsoid defined for the color mask based on the offset amount. In some instances, the color transition region engine 6530 might access the project data 6555 and/or the source files 6560 in order to generate the transition region for the color mask.

The superellipsoid subtractor 6535 removes (i.e., subtracts) colors from a color mask. The superellipsoid subtractor 6535 of some embodiments removes colors form the color mask by generating a superellipsoid, which is defined for the color mask, that excludes the colors to be removed from the color mask. In some of these embodiments, the superellipsoid subtractor 6525 utilizes a collision detection technique (e.g., a triangle-triangle collision detection technique) to identify a bounding box in a three-dimensional color space that includes the colors originally in the color mask but excludes the colors to be removed from the color mask. The superellipsoid subtractor 6535 sends the identified bounding box to the superellipsoid engine 6525 for a superellipsoid based on the identified bounding box. In some embodiments, the superellipsoid subtractor 6535 accesses the project data 6555 and/or the source files 6560 in order to remove colors from a color mask.

The shape mask manager 6540 generates a shape mask for an image (or a frame of a video clip) based on input that includes a selection of a user-selectable UI item for creating (i.e., invoking) a shape mask. Some embodiments of the shape mask manager 6540 may receive from the UI interaction module 6505 input to create the shape mask. In some embodiments, when the shape mask manager 6540 receives from the UI interaction module 6505 input to create the shape mask, the shape mask manager 6540 generates a shape mask (e.g., by creating a data structure that defines the shape mask) and passes the shape mask to the UI interaction module 6505 for the display module 6572 to translate and send to a display device.

Further, the shape mask manager 6540 manages the shape mask for the image. For instance, the shape mask manager 6540 handles modifications (e.g., move, adjust dimensions, scale, rotate, adjust curvature) to the shape of the shape mask. When the shape mask manager 6540 receives from the UI interaction module 6505 input (e.g., a set of pixels of the image) to modify the shape of the shape mask, the shape mask manager 6540 sends to the shape engine 6545 the shape of the shape mask and a request to modify the shape of the shape mask, superellipsoid that includes colors of the existing color mask and colors to add to the existing color mask based on the input (e.g., the set of pixels of the image). When the color mask manager 6520 receives the superellipsoid from the superellipsoid engine 6525, the color mask manager 6520 identifies a portion of the image that is included in the color mask based on the superellipsoid. When the shape mask manager 6540 receives from the shape engine 6545 the modified shape of the shape mask, the shape mask manager 6540 passes the shape mask to the UI interaction module 6505 for the display module 6572 to translate and send to a display device.

In addition, the shape mask manager 6540 manages a transition region for a shape mask. When the shape mask manager 6540 receives input (e.g., when a user moves a user-adjustable shape mask control for adjusting the transition region) from the UI interaction module 6505 to adjust the transition region of the shape mask, the shape mask manager 6540 sends to the shape transition region engine 6550 the shape mask and a request to adjust the transition region for the shape mask. When the shape mask manager 6540 receives the shape mask from the shape transition region engine 6530, the color mask manager 6520 identifies a portion of the image that is included in the transition region of the shape mask.

The color mask manager 6520 also receives from the UI interaction module 6505 edits (e.g., color correction operations) to the image based on the shape mask. In these instances, the shape mask manager 6540 sends the shape mask and the edits to the image to the appropriate editing module in the set of editing modules 6515 for applying the edit to the image based on the shape mask. Additionally, the shape mask manager 6540 may access the project data 6555 and/or the source files 6560 in order to perform some or all of the functions described above. For example, the shape mask manager 6540 may access the project data 6555 and/or the source files 6560 in order to identify a portion of the image that is included in the transition region of the shape mask.

The shape engine 6545 performs modifications to the shape of a shape mask. The modification to the shape of the shape mask may include moving the shape of the shape mask, adjusting dimensions (e.g., x-dimension, y-dimension) of the shape of the shape mask, scaling the shape of the shape mask, rotating the shape of the shape mask, adjusting the curvature of the shape of the shape mask). When the shape engine 6545 receives from the shape mask manager 6540 a shape mask and a request to modify the shape of the shape mask, the shape engine 6545 performs the requested modification to the shape of the shape mask and sends the modified shape mask to the shape mask manager 6540.

The shape transition region engine 6550 handles the transition region for a shape mask. For example, the shape transition region engine 6550 receives from the shape mask manager 6550 input (e.g., a user moves a shape mask control to adjust the transition region of the shape mask) to adjust the transition region of the shape mask. When the shape transition region engine 6550 receives from the shape mask manager 6540 such input, the shape transition region engine 6550 sends a request to the shape engine 6545 for a scaled version of the shape of the shape mask based on the input. In some cases, the shape transition region engine 6550 may access the project data 6555 and/or the source files 6560 in order to adjust the transition region for the shape mask.

The color matcher 6582 matches the colors of an image to the colors of another image based on user inputs received from the UI interaction module 6505. The color matcher 6582 includes a luma-based matcher 6584, a hue-based matcher 6586, a color segmentation engine 6588, and a color transform engine 6590.

The luma-based matcher 6584 matches images based on the images' luma. In these embodiments, the luma-based matcher 6584 might identify luma ranges for images being color matched, determine transforms based on the identified luma ranges, and blend the determined transforms. The luma-based matcher 6584 sends transforms to the color transform engine 6590 to apply the transforms to the image being matched.

The hue-based matcher 6586 matches images based on the images' hues. In some embodiments, the hue-based matcher 6586 includes the hue engine 520, as described above. In these embodiments, the hue-based matcher 6586 may identify dominant hue ranges in the images being color matched, match the identified hue ranges, and perform hue shifts on the matched hue ranges. The hue-based matched 6586 sends transforms to the color transform engine 6590 to apply the transform to the image being matched.

The color segmentation engine 6588 segments images being matched and matches the segmented colors of the images. The color segmentation engine 6588 might identify a frame in a video clip to which to match another image or a frame or frames of another video clip. The color segmentation engine 6588 sends transforms to the color transform engine 6590 to apply the transform to the image being matched.

The color transform engine 6590 receives transforms from the luma-based matcher 6584, the hue-based matcher 6586, and the color segmentation engine 6588 along with an image to which to apply the transforms. In some embodiments, different color matching options are provided by the media-editing application. However, in some embodiments, a combination of different color matching options is provided as one color matching option. In such embodiments, after applying transform to an image, the color transform engine 6590 might send the image to the luma-based matcher 6584, the hue-based matcher 6586, and/or the color segmentation engine 6588 for further color matching.

The color balance engine 6582 balances colors of an image (e.g., a target image) based on user inputs received from the UI interaction module 6505 in order to reduce or eliminate color casts in the image and to adjust the contrast of the image. As shown in FIG. 65, the color balance engine 6582 includes a luma-based color balancer 6576, an attribute analyzer 6578, and a frame identifier 6580.

The luma-based color balancer 6576 balances an image (or a frame of a video clip) based on the image's luma. For instance, the luma-based color balancer 6576 equalizes the distribution of luma component values of pixels in the image in order to adjust the contrast of the image. Some embodiments of the luma-based color balancer 6576 may balance an image (or a frame of a video clip) by translating and scaling the distribution of chroma component values of pixels in the image in order to reduce or eliminate color casts in the image. In some cases, the luma-based color balancer 6576 may balance an image by translating the distribution of hue component values of pixels in the image in order to reduce or eliminate color casts in the image. In other cases, the luma-based color balancer 6576 may balance an image by scaling the distribution of saturation component values of pixels in the image in order to reduce or eliminate color casts in the image. In some embodiments, the luma-based color balancer 6576 may identify luma ranges for images being balanced (e.g., the target image), determine transforms based on the identified luma ranges, and blend the determined transforms. The luma-based color balancer 6576 then applies the transforms to the image being balanced. In some embodiments, the luma-based color balancer 6576 might access the project data 6555 and/or the source files 6560 in order to balance an image.

The frame identifier 6580 identifies a frame (or image) in a video clip based on input that the frame identifier 6580 receives. For example, the frame identifier 6580 might receive a request from the color balance engine 6582 for the middle frame of a video clip. In these cases, the frame identifier 6580 identifies the requested frame and sends the frame (or information related to the frame) to the color balance engine 6574. In some embodiments, the frame identifier 6580 may receive a request from the color balance engine 6582 for a frame of a video clip that has a set of characteristics closest to a defined set of characteristics. In these instances, the frame identifier 6580 may request the attribute analyzer 6578 to determine the set of characteristics for each frame of the video clip and then the frame identifiers 6580 determines the frame of the video clip that has a set of characteristics that is closest to the defined set of characteristics. In some embodiments, the frame identifier 6580 may access the project data 6555 and/or the source files 6560 in order to identify a frame of the video clip.

The attribute analyzer 6578 receives an image (or a frame of a video clip) and a request from the color balance engine 6574 to analyze the image to determine one or more characteristics of the image. Examples of characteristics include average color, luma of darkest pixel, luma of brightest pixel, saturation of most saturated pixel, etc. After analyzing the image, the attribute analyzer 6578 sends information related to the determined characteristics of the image to the color balance engine 6574. In some embodiments, the attribute analyzer 6578 may access the project data 6555 and/or the source files 6560 in order to analyze an image (or a frame of a video clip).

The video scope engine 6592 generates a video scope for an image based on input that includes a selection of a user-selectable UI item for displaying a video scope. The video scope engine 6592 might receive input from the UI interaction module 6505. In some cases, the video scope includes a waveform (e.g., a waveform monitor). In these cases, the video scope engine 6592 requests the waveform generator 6594 to generate a waveform based on the image. In some embodiments, the video scope engine 6592 requests the pixel color identifier 6596 to identify the colors of the pixels in the image for the video scope engine 6592 to determine the colors of portions of the video scope. After generating the video scope, the video scope engine 6592 sends the generated video scope to the UI interaction module 6505 to pass to the display module 6572 for display on a display device. As shown, the video scope engine 6592 includes a waveform generator 6594 and a pixel color identifier 6596.

The waveform generator 6594 generates one or more waveforms for an image based on requests from the video scope engine 6592. In some embodiments, the waveform generator 6594 generates different types of waveforms for the image. For example, the waveform generator 6594 may receive from the video scope engine 6592 requests to generate luma waveforms, red channel waveforms, green channel waveforms, blue channel waveforms, chroma waveforms, etc. The waveform generator 6594 then sends the generated waveform to the video scope engine 6592. In some embodiments, the waveform generator 6594 might access the project data 6555 and/or the source files 6560 in order to generate a waveform for an image (or a frame of a video clip).

The pixel color identifier 6596 identifies colors of pixels in an image based on requests from the video scope engine 6592. In some embodiments, the pixel color identifier 6596 modifies the identified color of a pixel. For example, some of these embodiments of the pixel color identifier 6596 increase the saturation of the pixel and decreases the brightness (e.g., luma or luminance) of the pixel. In other embodiments, the pixel identifier 6596 does not modify the identified color of the pixel. After the pixel color identifier 6596 identifies the colors of the pixels in the image, the pixel color identifier 6596 sends the information related to the colors of the pixels in the image to the video scope engine 6592. In some embodiments, the pixel color identifier 6596 might access the project data 6555 and/or the source files 6560 in order to identify colors of pixels in an image (or a frame of a video clip).

The preview generator 6598 enables the output of audio and video from the media editing application so that a user can preview images or clips. The preview generator 6598 uses the media data to send display instructions to the UI interaction module 6505, which incorporates the preview into the user interface. In some embodiments, the preview generator 6598 sends a preview of a color matching operation to an image or frame in a video clip to the UI interaction module 6505 before the color matcher 6582 actually performs the color matching operation(s).

The set of editing modules 6515 receives the various editing commands (e.g., through editing tools in the UI) for editing media clips. As shown, the set of editing modules 6515 includes a roll module for rolling edit points of media clips, a ripple module for rippling edit points of media clips, a slip module for slipping in and out points of media clips, a slide module for sliding media clips that are in a sequence, a razor module for cutting (i.e., splitting) media clips, along with other editing modules. Based on edits to media clips, the set of editing modules 6515 creates and modifies the project data 6555 describing the affected media clips.

The rendering engine 6510 enables the storage or output of a composite media presentation from the media-editing application 6500. The rendering engine 6510 receives data from the editing modules 6515 and/or storages 6555 and 6560 and, in some embodiments, creates a composite media presentation from the source files 6560. The composite media presentation can be stored in one of the illustrated storages or a different storage.

While many of the features have been described as being performed by one module (e.g., the superellipsoid engine 6525, the color transition region engine 6530, the color segmentation engine 6588, or the preview generator 6598), one of ordinary skill in the art would recognize that the functions might be split up into multiple modules. Similarly, the functions described as being performed by multiple different modules might be performed by a single module in some embodiments (e.g., the superellipsoid subtractor 6535 might be part of the superellipsoid engine 6525, the color transform engine 6590 might be included in each of the luma-based matcher 6584, the hue-based matcher 6586, and the color segmentation engine 6588).

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 66:
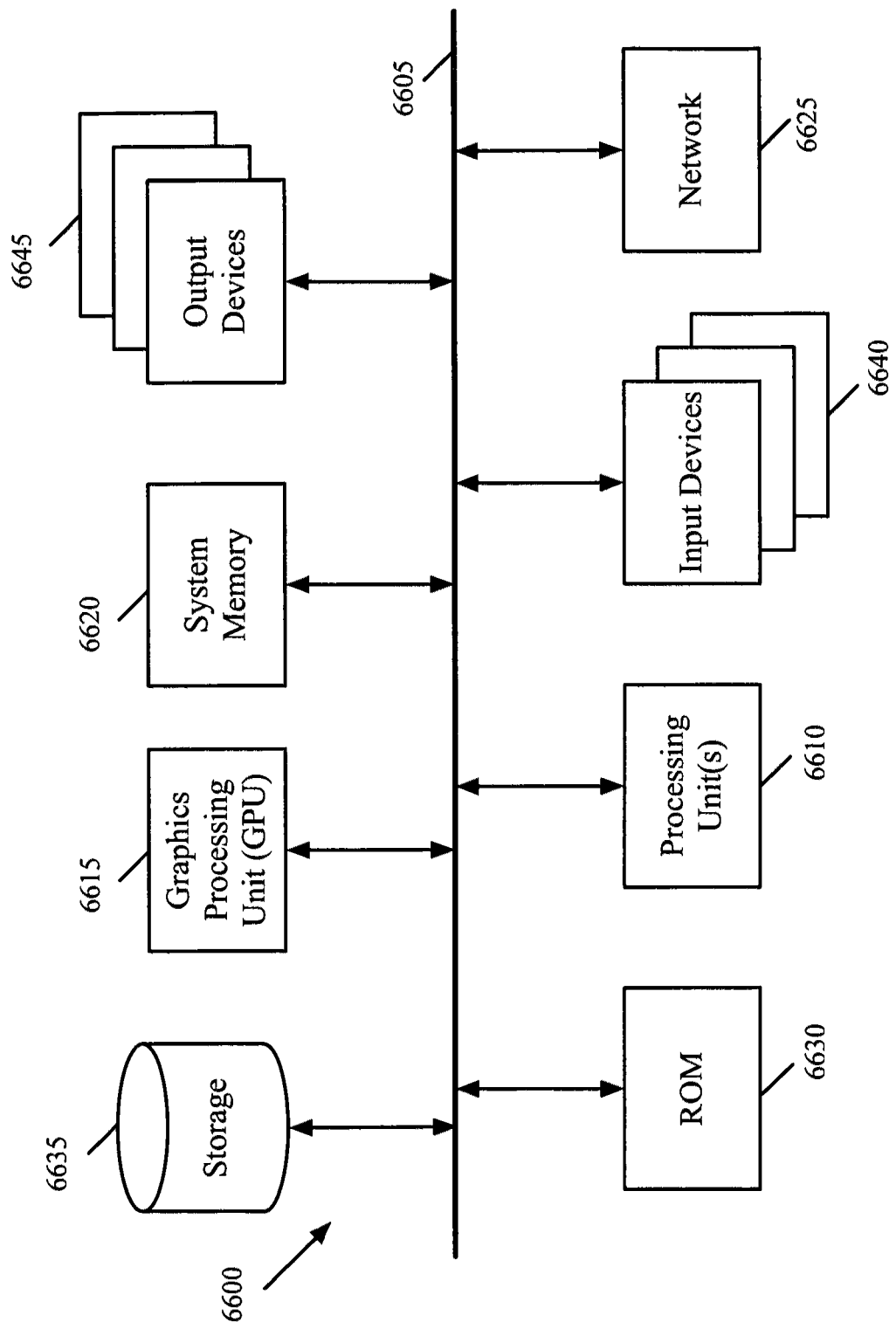
FIG. 66 conceptually illustrates an electronic system with which some embodiments of the invention are implemented.

FIG. 66 conceptually illustrates an electronic system 6600 with which some embodiments of the invention are implemented. The electronic system 6600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 6600 includes a bus 6605, processing unit(s) 6610, a graphics processing unit (GPU) 6615, a system memory 6620, a network 6625, a read-only memory 6630, a permanent storage device 6635, input devices 6640, and output devices 6645.

The bus 6605 collectively represents all system, peripheral, and chipset buses that communicatively connect the numerous internal devices of the electronic system 6600. For instance, the bus 6605 communicatively connects the processing unit(s) 6610 with the read-only memory 6630, the GPU 6615, the system memory 6620, and the permanent storage device 6635.

From these various memory units, the processing unit(s) 6610 retrieves instructions to execute and data to process in order to execute the processes of the invention. The processing unit(s) may be a single processor or a multi-core processor in different embodiments. Some instructions are passed to and executed by the GPU 6615. The GPU 6615 can offload various computations or complement the image processing provided by the processing unit(s) 6610. In some embodiments, such functionality can be provided using CoreImage's kernel shading language.

The read-only-memory (ROM) 6630 stores static data and instructions that are needed by the processing unit(s) 6610 and other modules of the electronic system. The permanent storage device 6635, on the other hand, is a read-and-write memory device. This device is a non-volatile memory unit that stores instructions and data even when the electronic system 6600 is off. Some embodiments of the invention use a mass-storage device (such as a magnetic or optical disk and its corresponding disk drive) as the permanent storage device 6635.

Other embodiments use a removable storage device (such as a floppy disk, flash memory device, etc., and its corresponding disk drive) as the permanent storage device. Like the permanent storage device 6635, the system memory 6620 is a read-and-write memory device. However, unlike storage device 6635, the system memory 6620 is a volatile read-and-write memory, such as random access memory. The system memory 6620 stores some of the instructions and data that the processor needs at runtime. In some embodiments, the invention's processes are stored in the system memory 6620, the permanent storage device 6635, and/or the read-only memory 6630. For example, the various memory units include instructions for processing multimedia clips in accordance with some embodiments. From these various memory units, the processing unit(s) 6610 retrieves instructions to execute and data to process in order to execute the processes of some embodiments.

The bus 6605 also connects to the input and output devices 6640 and 6645. The input devices 6640 enable the user to communicate information and select commands to the electronic system. The input devices 6640 include alphanumeric keyboards and pointing devices (also called "cursor control devices"), cameras (e.g., webcams), microphones or similar devices for receiving voice commands, etc. The output devices 6645 display images generated by the electronic system or otherwise output data. The output devices 6645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 66, bus 6605 also couples electronic system 6600 to a network 6625 through a network adapter (not shown). In this manner, the computer can be a part of a network of computers (such as a local area network ("LAN"), a wide area network ("WAN"), or an Intranet, or a network of networks, such as the Internet. Any or all components of electronic system 6600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 8, 9, 11, 12, 37, 40, 41, 49, and 50) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program which when executed by at least one processing unit provides a graphical user interface (GUI), the GUI comprising:
    a display area for displaying an image comprising a plurality of pixels, each pixel comprising a set of color component values; and
    another display area for displaying a graph comprising a plurality of graphical representations of the plurality of pixels in the image, wherein each graphical representation is (1) plotted along a first axis of the graph based on a position of a corresponding pixel in the image, wherein the first axis indicates a position of the pixels in the image and (2) plotted along a second axis of the graph based on the set of color component values of the corresponding pixel in the image, wherein a color of each graphical representation is similar to a color of the corresponding pixel that is used for displaying the pixel in the display area.

2. The non-transitory machine readable medium of claim 1, wherein the GUI further comprises a selectable GUI item that, when selected, displays the other display area.

3. The non-transitory machine readable medium of claim 1, wherein the display area and the other display area are arranged in a side-by-side layout.

4. The non-transitory machine readable medium of claim 1, wherein the GUI further comprises a set of color correction tools for adjusting the color component values of pixels in the image.

5. The non-transitory machine readable medium of claim 1, wherein each graphical representation is plotted along the second axis of the graph based on a luma component value of the set of color component values of the corresponding pixel in the image.

6. The non-transitory machine readable medium of claim 1, wherein each graphical representation is plotted along the second axis of the graph based on a chroma component value of the set of color component values of the corresponding pixel in the image.

7. The non-transitory machine readable medium of claim 1, wherein the graph is a first graph, wherein the other display area is further for displaying a second graph comprising a plurality of graphical representations of a plurality of chroma component values of the plurality of pixels in the image.

8. The non-transitory machine readable medium of claim 7, wherein the plurality of chroma component value is a first plurality of chroma component values, wherein the other display area is further for displaying a third graph comprising a plurality of graphical representations of a second plurality of chroma component values of the plurality of pixels in the image.

9. The non-transitory machine readable-medium of claim 1, wherein the first plurality of chroma component values are Cb component values and the second plurality of chroma component values are Cr component values.

10. A non-transitory machine readable medium storing a program executable by at least one processing unit, the program comprising sets of instructions for:
    providing a first display area for displaying an image of a video clip, the image comprising a plurality of pixels; and
    providing a second display area for displaying a graphical representation of a component value of each pixel in the image of the video clip, wherein the graphical representation is plotted along an axis of a graph, wherein the axis indicates a position of the pixels in the image, and wherein a color of the graphical representation of the component value of each pixel is similar to a color used for displaying the pixel in the image in the first display area.

11. The non-transitory machine readable medium of claim 10, wherein the program further comprises a set of instructions for providing a set of color correction tools for adjusting colors of the pixels in the image.

12. The non-transitory machine readable medium of claim 10, wherein the set of color correction tools comprises a color board tool for adjusting colors of the pixels in the image.

13. The non-transitory machine readable medium of claim 10, wherein the set of color correction tools comprises a masking tool for adjusting colors of the pixels in the image.

14. The non-transitory machine readable medium of claim 10, wherein the program further comprises a set of instructions for providing a set of editing tools for editing the video clip.

15. For a plurality of pixels of an image, a method of displaying pixel information of the plurality of pixels, each pixel comprising a set of color component values, the method comprising:

for each pixel in the image:
identifying a color of the pixel that is to be used for displaying the image in a display area; and
displaying in another display area a representation of a color component value of the pixel in terms of the identified color of the pixel, said displaying in another display area comprising displaying the representation of the color component value of the pixel at a location along an axis of the other display area, wherein the axis indicates a position of the pixel in the image.

16. The method of claim 15, wherein displaying in the other display area the representation of the color component value of the pixel in terms of the identified color of the pixel color comprises displaying a color of the representation of the pixel in the other display area that is similar to the identified color of the pixel that is to be used for displaying in the image in the display area.

17. The method of claim 15, wherein displaying in the other display area the representation of the color component value of the pixel in terms of the identified color of the pixel color comprises displaying the location of the representation of the color component value of the pixel along the y-axis of the other display area based on the color component value of the pixel.

18. The method of claim 17, wherein displaying in the other display area the representation of the color component value of the pixel in terms of the identified color of the pixel color comprises displaying the location of the representation of the color component value of the pixel along the x-axis of the other display area based on the location of the pixel displayed in the image along the x-axis of the display area.

19. The method of claim 18, wherein the color component value is a luma component value.

20. The method of claim 18, wherein the color component value is a chroma component value.

21. The method of claim 18, wherein the other display area is a luma waveform monitor.

22. The method of claim 18, wherein the other display area is a chroma waveform monitor.

23. The method of claim 18 further comprising displaying the image in the display area.

24. The method of claim 18 further comprising, for each pixel in the image, before displaying in the other display area the representation of the color component value of the pixel, modifying a color of the representation to be displayed in the other display area.

25. The method of claim 24, wherein modifying the color of the representation comprises increasing saturation of the color of the representation to be displayed in the other display area.

26. The method of claim 25, wherein modifying the color of the representation comprises decreasing luminance of the color of the representation to be displayed in the other display area.

* * * * *